(12) United States Patent
McMurray et al.

(10) Patent No.: US 12,268,994 B2
(45) Date of Patent: Apr. 8, 2025

(54) DURABLE BIOFOULING PROTECTION

(71) Applicant: BioFouling Technologies, Inc., Aberdeen, NC (US)

(72) Inventors: Brian McMurray, Aberdeen, NC (US); Cliff Sharpe, Aberdeen, NC (US); Mike Termini, Aberdeen, NC (US); Emily Ralston, Aberdeen, NC (US); Abraham Stephens, Aberdeen, NC (US); Ed Dormier, Aberdeen, NC (US); Lindsey Calcutt, Aberdeen, NC (US); Joseph Basista, Chandler, AZ (US)

(73) Assignee: BIOFOULING TECHNOLOGIES, INC., Aberdeen, NC (US)

( * ) Notice: Subject to any disclaimer, the term of this patent is extended or adjusted under 35 U.S.C. 154(b) by 0 days.

(21) Appl. No.: 18/755,521

(22) Filed: Jun. 26, 2024

(65) Prior Publication Data

US 2024/0350980 A1    Oct. 24, 2024

Related U.S. Application Data

(63) Continuation of application No. 17/246,159, filed on Apr. 30, 2021, now Pat. No. 12,059,653, which is a
(Continued)

(51) Int. Cl.
*A01N 25/10* (2006.01)
*A01N 25/34* (2006.01)
(Continued)

(52) U.S. Cl.
CPC ............ *B01D 69/06* (2013.01); *A01N 25/10* (2013.01); *A01N 25/34* (2013.01); *A01N 31/02* (2013.01);
(Continued)

(58) Field of Classification Search
CPC ........ A01N 25/10; A01N 25/34; A01N 59/00; A01N 59/16
See application file for complete search history.

(56) References Cited

U.S. PATENT DOCUMENTS 3,220,374 A    11/1965 Sloan
3,505,758 A     4/1970 Willisford
(Continued)

FOREIGN PATENT DOCUMENTS

CL    200700725       9/2007
CN    1056537 A      11/1991
(Continued)

OTHER PUBLICATIONS

Jul. 23, 2021, Examination Report Issued in Australian Patent Application No. 2019371455, Australian Patent Office, Australia.
(Continued)

*Primary Examiner* — Sean E Conley
(74) *Attorney, Agent, or Firm* — BRAINSPARK ASSOCIATES, LLC

(57) ABSTRACT

Disclosed are devices, methods and/or systems for use in protecting items and/or structures that are exposed to, submerged and/or partially submerged in aquatic environments from contamination and/or fouling due to the incursion and/or colonization by specific types and/or kinds of biologic organisms and/or plants, including the protection from micro- and/or macro-fouling for extended periods of time of exposure to aquatic environments.

41 Claims, 44 Drawing Sheets

Related U.S. Application Data continuation of application No. PCT/US2019/059546, filed on Nov. 1, 2019.

(60) Provisional application No. 62/817,873, filed on Mar. 13, 2019, provisional application No. 62/754,574, filed on Nov. 1, 2018.

(51) Int. Cl.
*A01N 31/02* (2006.01)
*A01N 59/00* (2006.01)
*A01N 59/16* (2006.01)
*B01D 65/08* (2006.01)
*B01D 67/00* (2006.01)
*B01D 69/02* (2006.01)
*B01D 69/06* (2006.01)
*B63H 5/16* (2006.01)

(52) U.S. Cl.
CPC .............. *A01N 59/00* (2013.01); *A01N 59/16* (2013.01); *B01D 65/08* (2013.01); *B01D 67/0088* (2013.01); *B01D 69/02* (2013.01); *B01D 2315/06* (2013.01); *B01D 2321/168* (2013.01); *B01D 2325/48* (2013.01); *B63H 5/165* (2013.01)

(56) References Cited

U.S. PATENT DOCUMENTS

| | | |
|---|---|---|
| 3,587,508 A | 6/1971 | Pearce |
| 3,870,875 A | 3/1975 | Altimus |
| 4,046,094 A | 9/1977 | Preiser et al. |
| 4,253,877 A | 3/1981 | Miale |
| 4,375,199 A | 3/1983 | Graeme-Barber |
| 4,865,909 A | 9/1989 | Manniso |
| 4,869,016 A | 9/1989 | Diprose et al. |
| 4,998,496 A | 3/1991 | Shaw, III |
| 5,009,757 A | 4/1991 | Riffe et al. |
| 5,072,683 A | 12/1991 | Colonna |
| 5,315,949 A | 5/1994 | Bradley |
| 5,346,598 A | 9/1994 | Riffe et al. |
| 5,354,603 A | 10/1994 | Errede |
| 5,423,631 A | 6/1995 | Inoue |
| 5,552,057 A | 9/1996 | Hughes |
| 6,152,064 A | 11/2000 | Morton |
| 6,183,646 B1 | 2/2001 | Williams et al. |
| 6,247,195 B1 | 6/2001 | O'Brien et al. |
| 6,303,078 B1 | 10/2001 | Shimizu et al. |
| 6,312,591 B1 | 11/2001 | Vassarotti |
| 6,547,952 B1 | 4/2003 | Staerzl |
| 6,609,938 B1 | 8/2003 | Pither |
| 7,390,560 B2 | 6/2008 | Wallach |
| 7,811,513 B2 | 10/2010 | Johnson et al. |
| 8,541,439 B2 | 9/2013 | Eyster et al. |
| 8,591,740 B2 | 11/2013 | Nupnau et al. |
| 9,068,313 B2 | 6/2015 | Kennedy |
| 10,457,570 B2 | 10/2019 | Kuik et al. |
| 11,623,716 B2 | 4/2023 | Eyster |
| 2001/0052364 A1 | 12/2001 | Walker |
| 2002/0030011 A1 | 3/2002 | Costantine et al. |
| 2002/0043493 A1 | 4/2002 | Patil |
| 2003/0203991 A1 | 10/2003 | Schottman et al. |
| 2004/0018583 A1 | 1/2004 | Ho et al. |
| 2006/0024344 A1 | 2/2006 | Matos et al. |
| 2006/0037896 A1 | 2/2006 | Cote et al. |
| 2006/0189686 A1 | 8/2006 | Martensson |
| 2007/0068605 A1 | 3/2007 | Statnikov |
| 2008/0020657 A1 | 1/2008 | Williams |
| 2008/0302713 A1 | 12/2008 | Patrick |
| 2009/0185867 A1 | 7/2009 | Masters et al. |
| 2009/0239009 A1 | 9/2009 | Tanaka |
| 2009/0304621 A1 | 12/2009 | Cavitt et al. |
| 2010/0006018 A1 | 1/2010 | Lathem |
| 2010/0051527 A1 | 3/2010 | Frandsen |
| 2010/0051545 A1 | 3/2010 | Johnson et al. |
| 2011/0036240 A1 | 2/2011 | Taylor et al. |
| 2011/0120362 A1 | 5/2011 | Costas |
| 2011/0305895 A1 | 12/2011 | Roth |
| 2012/0009236 A1 | 1/2012 | Eyster et al. |
| 2012/0018312 A1 | 1/2012 | Yamamoto et al. |
| 2013/0043171 A1 | 2/2013 | Khalil |
| 2013/0109262 A1 | 5/2013 | Zhou |
| 2013/0139744 A1 | 6/2013 | Le Buzit et al. |
| 2013/0175222 A1 | 7/2013 | Spittle |
| 2013/0337201 A1 | 12/2013 | Eyster et al. |
| 2014/0141263 A1 | 5/2014 | Jones et al. |
| 2014/0216093 A1 | 8/2014 | Kaiser et al. |
| 2014/0291253 A1 | 10/2014 | Coulter |
| 2014/0339148 A1 | 11/2014 | Hu |
| 2015/0060360 A1 | 3/2015 | Motherway et al. |
| 2016/0009925 A1 | 1/2016 | Matsuki |
| 2016/0107126 A1 | 4/2016 | Ezra |
| 2016/0122745 A1 | 5/2016 | Jeffs et al. |
| 2017/0173588 A1 | 6/2017 | Tang et al. |
| 2017/0217549 A9 | 8/2017 | Eyster et al. |
| 2017/0349455 A1 | 12/2017 | Katz |
| 2018/0050774 A1 | 2/2018 | Eyster et al. |
| 2019/0174749 A1 | 6/2019 | Yeung et al. |
| 2019/0364886 A1 | 12/2019 | Steele |
| 2021/0009242 A1 | 1/2021 | Eyster et al. |
| 2021/0282403 A1 | 9/2021 | McMurray et al. |

FOREIGN PATENT DOCUMENTS

| | | |
|---|---|---|
| CN | 1769597 A | 10/2006 |
| CN | 105209187 A | 12/2015 |
| CN | 106660082 A | 10/2017 |
| DE | 29514526 U | 1/1997 |
| EP | 0384655 A1 | 8/1990 |
| EP | 631637 A | 1/1995 |
| EP | 1084947 A | 3/2001 |
| EP | 1918190 A1 | 5/2008 |
| EP | 1981659 A | 10/2008 |
| EP | 2218636 A | 8/2010 |
| EP | 3458420 A | 3/2019 |
| FR | 2536363 A1 | 5/1984 |
| GB | 614799 A | 12/1948 |
| GB | 754812 A | 8/1956 |
| GB | 851902 A | 10/1960 |
| GB | 865083 A | 4/1961 |
| JP | 0698662 A | 4/1994 |
| JP | 2000143414 A | 5/2000 |
| JP | 2001-089577 A | 4/2001 |
| JP | 2003-189784 A | 7/2003 |
| JP | 2007186933 A | 7/2007 |
| JP | 4256319 B | 4/2009 |
| JP | 5161201 B | 9/2010 |
| KR | 200194214 Y | 9/2000 |
| KR | 101158675 B | 6/2012 |
| KR | 100572354 B | 4/2016 |
| KR | 10-2018-0043589 A | 4/2018 |
| KR | 10-2018-0043689 A | 4/2018 |
| WO | 9611839 A | 4/1996 |
| WO | 2006/03740 A | 1/2006 |
| WO | 2006037420 A1 | 4/2006 |
| WO | 2012/006333 A | 1/2012 |
| WO | 2015027129 A | 2/2015 |
| WO | 2017/109287 A | 6/2017 |
| WO | 2018/001359 A | 1/2018 |
| WO | 2020093015 A1 | 5/2020 |
| ZA | 926542 B | 2/1993 |

OTHER PUBLICATIONS

Jan. 2, 2022, Notice of Acceptance Issued in Australian Patent Application No. 2019371455, Australian Patent Office, Australia.
Jul. 13, 2023, Examination Report #1 Issued in Australian Patent Application No. 2022202455, Australian Patent Office, Australia.
Dec. 9, 2023, Examination Report #2 Issued in Australian Patent Application No. 2022202455, Australian Patent Office, Australia.
Mar. 12, 2024, Notice of Acceptance Issued in Australian Patent Application No. 2022202455, Australian Patent Office, Australia.

(56) References Cited

OTHER PUBLICATIONS

Dec. 27, 2022, Search Report and Examination Issued in Brazilian Patent Application No. BR112021008206-9, Brazilian Patent Office, Brazil.
May 10, 2022, Exam and Search Report #1 Issued in Chilean Patent Application No. 202101102, Chilean Patent Office, Chile.
Jan. 10, 2023, Exam and Search Report #2 Issued in Chilean Patent Application No. 202101102, Chilean Patent Office, Chile.
Aug. 3, 2023, Exam Report #3 Issued in Chilean Patent Application No. 202101102, Chilean Patent Office, Chile.
Jan. 3, 2024, Acceptance Resolution Issued in Chilean Patent Application No. 202101102, Chilean Patent Office, Chile.
Jan. 10, 2023, Exam and Search Report #1 Issued in Chilean Patent Application No. 202102386, Chilean Patent Office, Chile.
May 10, 2023, Exam Report #2 Issued in Chilean Patent Application No. 202102386, Chilean Patent Office, Chile.
Dec. 1, 2023, Acceptance Resolution Issued in Chilean Patent Application No. 202102386, Chilean Patent Office, Chile.
May 26, 2022, Exam and Search Report #1 Issued in Chinese Patent Application No. 201980077909.8, Chinese Patent Office, Chile.
Dec. 15, 2022, Exam and Search Report #2 Issued in Chinese Patent Application No. 201980077909.8, Chinese Patent Office, Chile.
May 10, 2023, Exam Report #3 Issued in Chinese Patent Application No. 201980077909.8, Chinese Patent Office, Chile.
Sep. 24, 2023, Allowance Issued in Chinese Patent Application No. 201980077909.8, Chinese Patent Office, Chile.
Oct. 20, 2023, Exam and Search Report #1 Issued in Chinese Patent Application No. 202080028355.5, Chinese Patent Office, Chile.
Nov. 6. 2023, Exam and Search Report #1 Issued in Chinese Patent Application No. 202080075712.3, Chinese Patent Office, Chile.
Nov. 30, 2023, Exam and Search Report #1 Issued in Colombian Patent Application No. NC2021/0006306, Colombian Patent Office, Chile.
Apr. 27, 2023, Exam and Search Report #1 Issued in Colombian Patent Application No. NC2021/0012323, Colombian Patent Office, Chile.
Jun. 23, 2023, First Examination Report Issued in Columbian Patent Application No. NC2022/0007582, Columbian Patent Office, Columbia.
Jul. 30, 2021, First Examination Report Issued in Cuban Patent Application No. 2021-0034, Cuban Patent Office, Cuba.
Aug. 9, 2022, Second Examination Report Issued in Cuban Patent Application No. 2021-0034, Cuban Patent Office, Cuba.
Nov. 30, 2022, Third Examination Report Issued in Cuban Patent Application No. 2021-0034, Cuban Patent Office, Cuba.
Oct. 31, 2023, Granting Resolution Issued in Cuban Patent Application No. 2021-0034, Cuban Patent Office, Cuba.
Jul. 30, 2021, First Examination Report Issued in Cuban Patent Application No. 2021-0076, Cuban Patent Office, Cuba.
Aug. 17, 2022, Second Examination Report Issued in Cuban Patent Application No. 2021-0076, Cuban Patent Office, Cuba.
Nov. 11, 2022, Third Examination Report Issued in Cuban Patent Application No. 2021-0076, Cuban Patent Office, Cuba.
Nov. 27, 2023, Fourth Examination Report Issued in Cuban Patent Application No. 2021-0076, Cuban Patent Office, Cuba.
Feb. 5, 2024, First Substantive Requirement Issued in Dominican Patent Application No. P2021-0080, Dominican Republic Patent Office, Dominican Republic.
Mar. 16, 2023, First Substantive Requirement Issued in Dominican Patent Application No. P2021-0189, Dominican Republic Patent Office, Dominican Republic.
Oct. 16, 2023, Second Substantive Requirement Issued in Dominican Patent Application No. P2021-0189, Dominican Republic Patent Office, Dominican Republic.
Dec. 13, 2022, Communication from Examining Division Issued in European Patent Application No. 19880509.5, European Patent Office, Netherlands.
Sep. 5, 2023, Communication from Examining Division Issued in European Patent Application No. 19880509.5, European Patent Office, Netherlands.
Apr. 19, 2022, Supplemental Search Report Issued in European Patent Application No. 20769294.8, European Patent Office, Netherlands.
Feb. 3, 2023, Communication from Examining Division Issued in European Patent Application No. 20769294.8, European Patent Office, Netherlands.
Jan. 23, 2024, Supplemental Search Report Issued in European Patent Application No. 20880621.6, European Patent Office, Netherlands.
Dec. 18, 2023, Office Action Issued in Israeli Patent Application No. 286269, Israeli Patent Office, Israel.
Oct. 17, 2023, Office Action Issued in Japanese Patent Application No. 2021-523161, Japanese Patent Office, Japan.
Feb. 6, 2024, Office Action Issued in Japanese Patent Application No. 2021-555094, Japanese Patent Office, Japan.
Nov. 25, 2021, Notice of Acceptance and Search Report in Moroccan Patent Application No. PV/53199, Maroccan Patent Office, Morocco.
Sep. 7, 2022, State of the Art Exam Report in Panamanian Patent Application No. 93482-01, Panama Patent Office, Panama.
Feb. 9, 2024, State of the Art Exam Report in Panamanian Patent Application No. 93626-01, Panama Patent Office, Panama.
May 22, 2023, First Substantive Report Issued in Saudi Arabian Patent Application No. 521421898, Saudi Patent Office, Saudi Arabia.
Nov. 5, 2023, Second Substantive Report Issued in Saudi Arabian Patent Application No. 521421898, Saudi Patent Office, Saudi Arabia.
Jul. 24, 2023, First Substantive Report Issued in Saudi Arabian Patent Application No. 521430338, Saudi Patent Office, Saudi Arabia.
Oct. 6, 2022, First Written Opinion Issued in Singaporean Patent Application No. 11202103774R, Singapore Patent Office, Singapore.
Aug. 22, 2023, Second Written Opinion Issued in Singaporean Patent Application No. 11202103774R, Singapore Patent Office, Singapore.
Jan. 18, 2024, Grant Notice Issued in Singaporean Patent Application No. 11202103774R, Singapore Patent Office, Singapore.
Feb. 24, 2023, First Written Opinion Issued in Singaporean Patent Application No. 11202109816X, Singapore Patent Office, Singapore.
Oct. 5, 2023, Second Written Opinion Issued in Singaporean Patent Application No. 11202109816X, Singapore Patent Office, Singapore.
Sep. 6, 2023, Written Opinion and Search Report Issued in Singaporean Patent Application No. 11202203862Y, Singapore Patent Office, Singapore.
Jan. 11, 2024, First Office Action in U.S. Appl. No. 17/245,810, United States Patent and Trademark Office, United States of America.
Aug. 14, 2023, First Office Action in Vietnamese Patent Application No. 1-2021-02876, Vietnamese Patent Office, Vietnam.
Jan. 30, 2024, Granting Notice in Vietnamese Patent Application No. 1-2021-02876, Vietnamese Patent Office, Vietnam.
Page 4 of Office Action from U.S. Appl. No. 15/802,593, mailed Jan. 29, 2018, referencing "Websters New World Dictionary of the American Language," Second College Edition, David B. Guralnik, Editor in Chief, The World Publishing Company, 1972, p. 1127, "prevent". (Year: 1972).
PCT International Search Report and Written Opinion, PCT Appl. No. PCT/US2019/59546, Mar. 10, 2020, 1-21 pages.
PCT International Search Report and Written Opinion, PCT Appl. No. PCT/US2020/22782, Jul. 27, 2020, 1-11 pages.
PCT International Search Report and Written Opinion, PCT Appl. No. PCT/US2020/58450, Mar. 11, 2021, 1-34 pages.
Supplemental European Search Report and Opinion, EP Appl. No. 19880509.5, European Patent Office, Dec. 6, 2021, 1-9 pages.
Akhondi et al., "The Performance and Fouling Control of Submerged Hollow Fiber (HF) Systems: A review," Applied Science [online], 2017, vol. 7, 765, pp. 1-39 [Publicly available at https://doi.org/10.3390/app7080765].
Examination Report, AU Appl. No. 2020200533, Australian Patent Office, May 28, 2021.

(56) References Cited

OTHER PUBLICATIONS

Examination Report, AU Appl. No. 2014308708, Australian Patent Office, May 10, 2017.
Examination Report, NZ Appl. No. 718265, New Zealand Patent Office, Jan. 13, 2020.
Jun. 24, 2024, Summons to Attend Oral Proceedings in European Patent Application No. 19880509.5, European Patent Office, Netherlands.
Jan. 1, 2024. Extended Search Report in European Patent Application No. 20880621.6, European Patent Office, Netherlands.
Apr. 30, 2024, Search Report and Written Opinion in Singapore Patent Application No. 10202400584V. Singapore Patent Office, Singapore.
Mar. 22, 2024, Examination Report in Columbian Patent Application No. NC2021/0012323, Colombian Patent Office, Colombia.
Feb. 6, 2024, Office Action in Japanese Patent Application No. JP2021555094, Japanese Patent Office, Japan.
Jun. 3, 2024, Office Action in Dominican Republic Patent Application No. 2022-0092, Dominican Republic Patent Office, Dominican Republic.
Mar. 31, 2024, Office Action in Israeli Patent Application No. 282818, Israeli Patent Office, Israel.
Jul. 22, 2024, Office Action in Chinese Patent Application No. 202080075712.3, Chinese Patent Office, China.
Aug. 15, 2024, Office Action in Costa Rican Patent Application No. 2021-0283, Costa Rican Patent Office, Costa Rica.
Aug. 21, 2024, Office Action in Dominican Republic Patent Application No. P2022-0092, Dominican Republic Patent Office, Dominican Republic.
Aug. 15, 2024, Office Action in U.S. Appl. No. 18/131,081, United States Patent Office, United States.
Apr. 11, 2024, Exam and Search Report Issued in Chilean Patent Application No. 202101102, Chilean Patent Office, Chile.
May 13, 2024, Exam Report Issued in Indian Patent Application No. 202117016856, Indian Patent Office, India.
Aug. 30, 2024, Office Action in U.S. Appl. No. 17/732,333, United States Patent Office, United States.
Jun. 21, 2024, Office Action in U.S. Appl. No. 17/472,456, United States Patent Office, United States.
Jun. 20, 2024, Office Action in Canadian Patent Application No. 3158459, Canadian Patent Office, Canada.
Sep. 3, 2024, Office Action in Saudi Arabian Patent Application No. 521430338, Saudi Arabian Patent Office, Saudi Arabia.
Jul. 9, 2024, Examination Report in Columbian Patent Application No. NC2021/0006306, Colombian Patent Office, Colombia.
Sep. 17, 2024, Examination Report in Columbian Patent Application No. NC2021/0000080, Colombian Patent Office, Colombia.
Oct. 2, 2024, International Search Report and Written Opinion in PCT/2024/030101, United States Patent Office, United States.
Oct. 18, 2024, , Office Action in Chinese Patent Application No. 202080075712.3, Chinese Patent Office, China.
Oct. 18, 2024, , Office Action in Chinese Patent Application No. 202080075712.3, Chinese Patent Office, China (hereinafter "IDS4-NP1").
Sep. 20, 2024, Office Action in Dominican Republic Patent Application No. P2022-0092, Dominican Republic Patent Office, Dominican Republic (hereinafter "IDS4-NP2").
Aug. 6, 2024, Decision of Rejection in Japanese Patent Application No. JP2021555094, Japanese Patent Office, Japan (hereinafter "IDS4-NP3").
Jul. 24, 2024, Office Action in Israeli Patent Application No. 286269, Israeli Patent Office, Israel (hereinafter "IDS4-NP4").
Oct. 28, 2024, Communication in European Patent Application No. 20769294.8, European Patent Office, Netherlands (hereinafter "IDS4-NP5").
Sep. 11, 2022, Article Entitled "Different Types of Corrosion on Ships," ShipInsight, https://shipinsight.com/guide/ different-types-of-corrosion-on-ships, 5 pages (hereinafter "IDS4-NP6").
Oct. 29, 2024, , Office Action in Kuwaiti Patent Application No. KW/P/2021/150, Kuwaiti Patent Office, Kuwait (hereinafter "IDS4-NP7").
Aug. 1, 2024, Office Action in Israeli Patent Application No. 292589, Israeli Patent Office, Israel (hereinafter "IDS4-NP8").
Nov. 13, 2024, Office Action and Search Report in United Arab Emirates Patent Application No. P6001613/2021 Uae Patent Office, Uae (hereinafter "IDS4-NP9").
Oct. 30, 2024, Office Action in Korean Patent Application No. 10-2021-7031938, Korean Patent Office, Korea (hereinafter "IDS4-NP10").
Oct. 30, 2024, Exam and Search Report Issued in Chilean Patent Application No. 202101102, Chilean Patent Office, Chile (hereinafter "IDS4-NP11").
Dec. 5, 2024, Search Report in European Patent Application No. 24210831.4, European Patent Office, Netherlands (hereinafter "IDS4-NP12").
Dec. 10, 2024, Office Action and Search Report in United Arab Emirates Patent Application No. P6000741/2022, Uae Patent Office, Uae (hereinafter "IDS4-NP13").

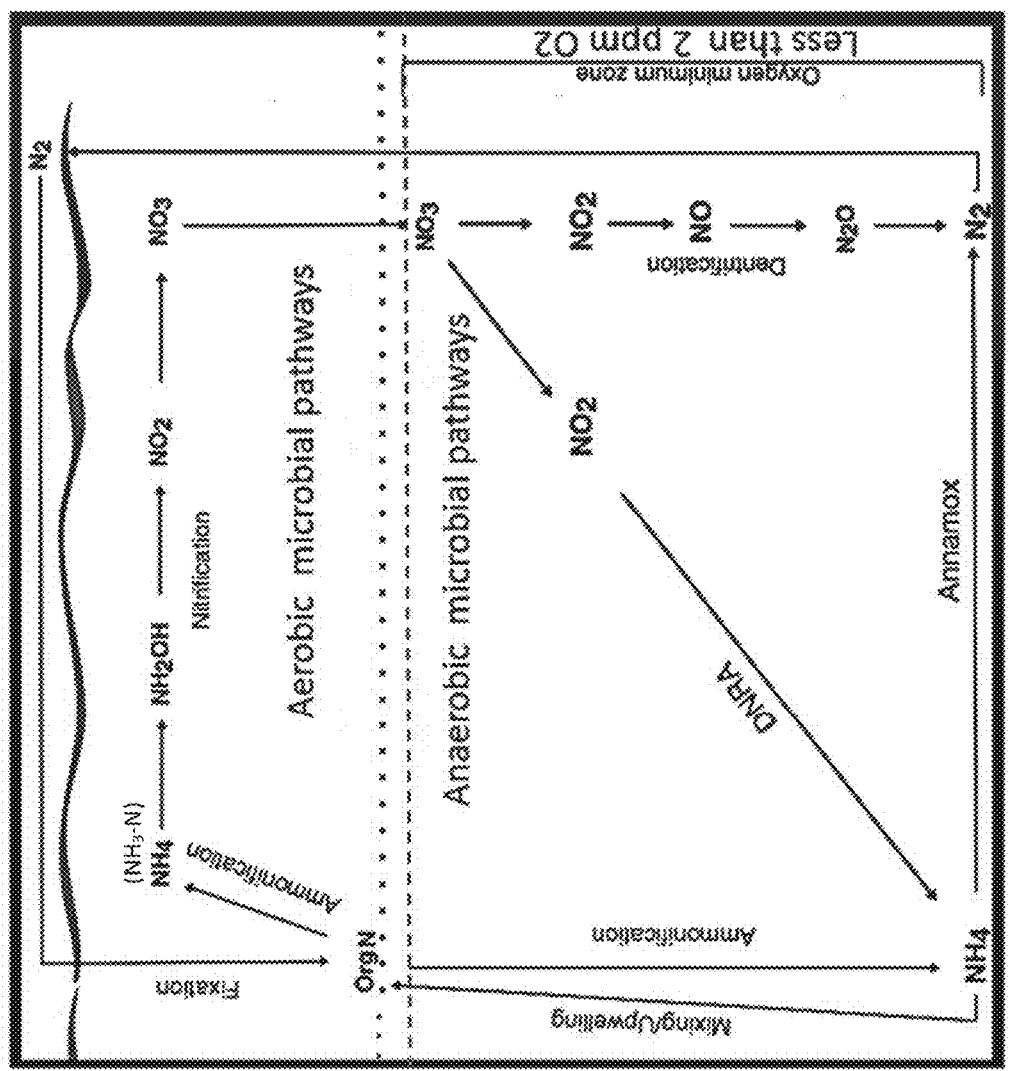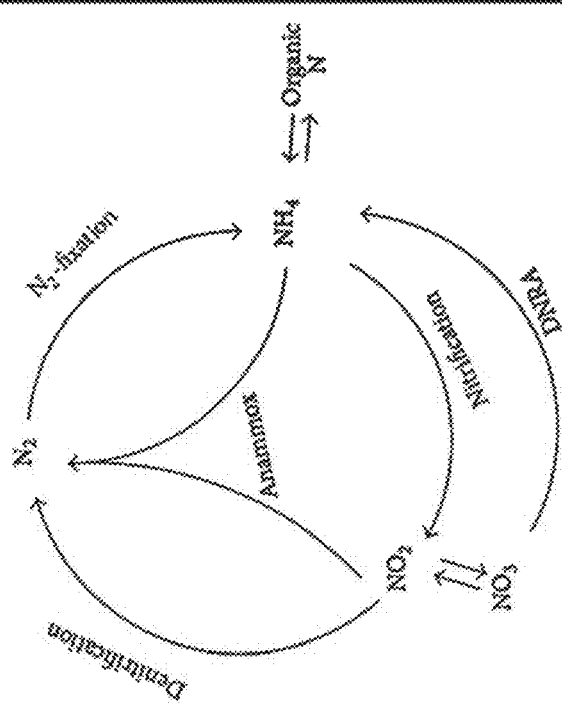
FIGURE 12A

23x23 poly - uncoated

23x23 poly – solvent based (SB) coating

Burlap - uncoated burlap – solvent based (SB) coating burlap – water based (WB) coating

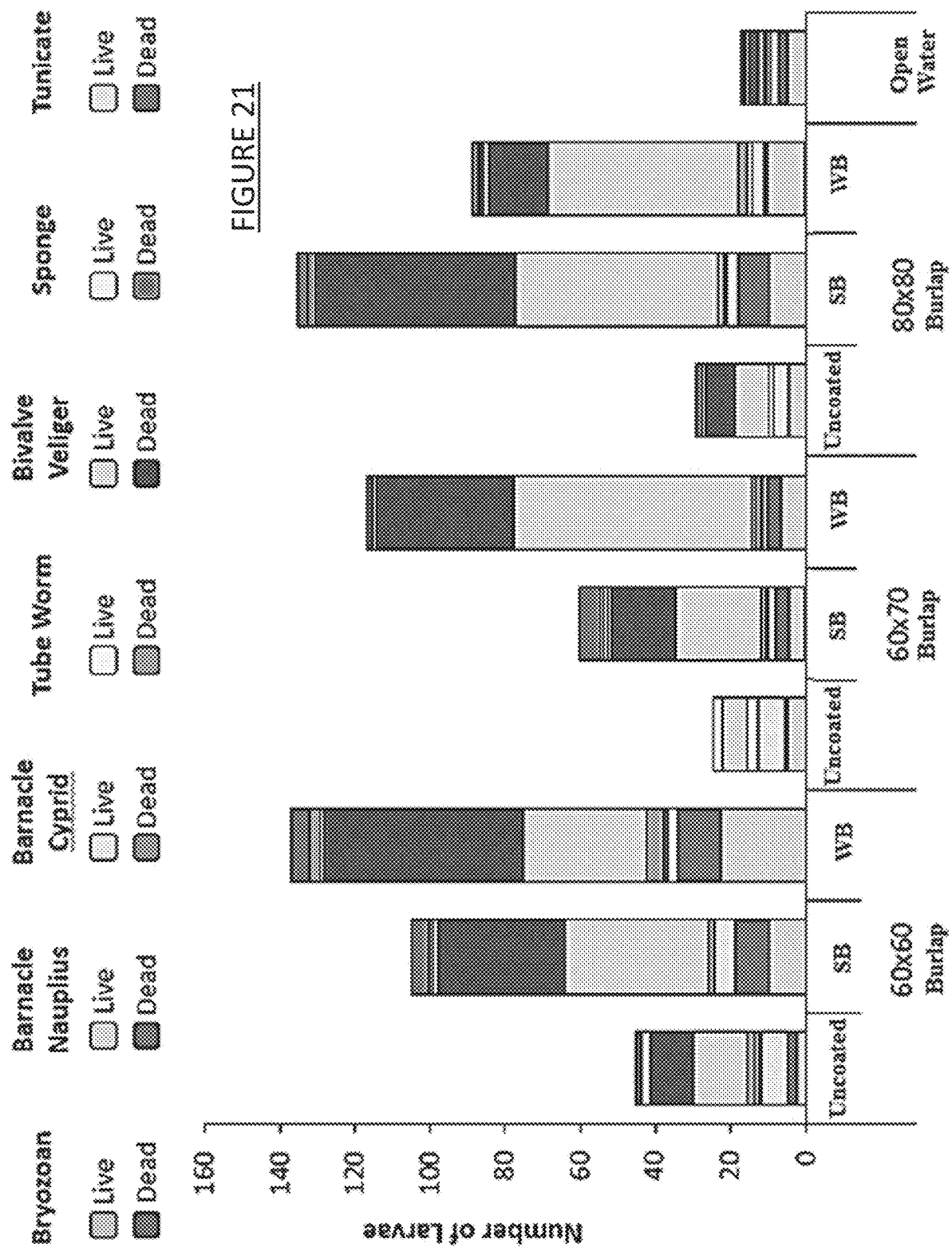

Summary of % add on for coated pieces
Spun Poly – Printed with EDW-152MOD 2200-2400

| Roll | Mesh/Rod/Mag | Air Knife PSUShim | Substrate | Fabric Treatment | Location Across Fabric Width | Wt. in grams prior to coating' (13 x 14" swatch) | Wt. in grams after coating | Grams s/sqm. add on (223.78 1000cP) | Permeability ml | Permeability Sec | Permeability ml/sec /cm² | Yards | Pounds | |
|---|---|---|---|---|---|---|---|---|---|---|---|---|---|---|
| 1 | 60/25/50 | None | Spun Poly | None | Wall | 48.166 | 73.900 | 219.16 | 1000 | 24.83 | 2.05 | 35 | 66.5 | |
| | 60/25/50 | None | Spun Poly | None | Center | 48.166 | 74.322 | 222.76 | 1000 | 24.7 | 2.06 | | | |
| | 60/25/50 | None | Spun Poly | None | Main | 48.166 | 74.870 | 227.42 | 1000 | 30.48 | 1.67 | | | |
| 2 | 60/25/50 | None | Spun Poly | None | Wall | 48.166 | 75.497 | 232.76 | 1000 | 32.67 | 1.56 | 35 | 68.3 | |
| | 60/25/50 | None | Spun Poly | None | Center | 48.166 | 76.554 | 241.77 | 1000 | 25.41 | 2.00 | | | |
| | 60/25/50 | None | Spun Poly | None | Main | 48.166 | 76.715 | 243.14 | 1000 | 56.09 | 0.91 | | | |
| 3 | 60/25/50 | None | Spun Poly | None | Wall | 48.166 | 75.836 | 235.65 | 1000 | 22.1 | 2.31 | 35 | 67.6 | |
| | 60/25/50 | None | Spun Poly | None | Center | 48.166 | 76.474 | 241.09 | 1000 | 23.89 | 2.13 | | | |
| | 60/25/50 | None | Spun Poly | None | Main | 48.166 | 75.914 | 236.32 | 1000 | 41.1 | 1.24 | | | |
| 4 | 60/25/50 | None | Spun Poly | None | Wall | 48.166 | 75.075 | 220.65 | 1000 | 25.89 | 1.97 | 15 | 28.9 | No Air Knife |
| | 60/25/50 | None | Spun Poly | None | Center | 48.166 | 75.121 | 229.56 | 1000 | 24.21 | 2.10 | | | |
| | 60/25/50 | None | Spun Poly | None | Main | 48.166 | 74.426 | 223.64 | 1000 | 32.12 | 1.59 | | | |

FIGURE 27A

| Roll | Mesh/Rod/Mag | Air Knife PSUShim | Substrate | Fabric Treatment | Location Across Fabric Width | Wt. in grams prior to coating (13 x 14" swatch) | Wt. in grams after coating | Grams s/sqm. add on (223.78 1000cP) | Permeability ml | Permeability Sec | Permeability ml/sec /cm² | Yards | Pounds | |
|---|---|---|---|---|---|---|---|---|---|---|---|---|---|---|
| | | | | | | | | | | | | | | |
| | | | | | | | | | | | | | | Air Knife |
| 5 | 60/25/50 | None | Spun Poly | None | Wall | 48.166 | 73.546 | 216.15 | 1000 | 12.83 | 3.97 | 35 | 66 | |
| | 60/25/50 | None | Spun Poly | None | Center | 48.166 | 75.110 | 229.47 | 1000 | 18.88 | 2.70 | | | |
| | 60/25/50 | None | Spun Poly | None | Main | 48.166 | 74.271 | 222.32 | 1000 | 41.64 | 1.22 | | | |
| 6 | 60/25/50 | None | Spun Poly | None | Wall | 48.166 | 73.414 | 215.02 | 1000 | 13.95 | 3.65 | 35 | 65.8 | |
| | 60/25/50 | None | Spun Poly | None | Center | 48.166 | 73.916 | 219.30 | 1000 | 25.35 | 2.01 | | | |
| | 60/25/50 | None | Spun Poly | None | Main | 48.166 | 73.481 | 215.60 | 1000 | 18.4 | 2.77 | | | |
| 7 | 60/25/50 | None | Spun Poly | None | Wall | 48.166 | 72.919 | 210.81 | 1000 | 16.89 | 3.02 | 35 | 66.2 | |
| | 60/25/50 | None | Spun Poly | None | Center | 48.166 | 73.861 | 218.83 | 1000 | 20.39 | 2.50 | | | |
| | 60/25/50 | None | Spun Poly | None | Main | 48.166 | 73.486 | 215.64 | 1000 | 33.85 | 1.50 | | | |
| 8 | 60/25/50 | None | Spun Poly | None | Wall | 48.166 | 71.926 | 202.35 | 1000 | 18.83 | 2.71 | 25 | 65.7 | |
| | 60/25/50 | None | Spun Poly | None | Center | 48.166 | 72.850 | 210.22 | 1000 | 26.57 | 1.92 | | | |
| | 60/25/50 | None | Spun Poly | None | Main | 48.166 | 72.841 | 210.14 | 1000 | 41.78 | 1.22 | | | |
| 9 | 60/25/50 | None | Spun Poly | None | Wall | 48.166 | 72.534 | 207.53 | 1000 | 15.73 | 3.24 | 35 | 65 | |
| | 60/25/50 | None | Spun Poly | None | Center | 48.166 | 73.725 | 217.67 | 1000 | 27.27 | 1.87 | | | |
| | 60/25/50 | None | Spun Poly | None | Main | 48.166 | 73.479 | 215.58 | 1000 | 32.16 | 1.58 | | | |
| 10 | 60/25/50 | None | Spun Poly | None | Wall | 48.166 | 75.411 | 232.03 | 1000 | 44.96 | 1.13 | 16.4 | 31.9 | |
| | 60/25/50 | None | Spun Poly | None | Center | 48.166 | 77.160 | 246.93 | 1000 | 39.87 | 1.28 | | | |
| | 60/25/50 | None | Spun Poly | None | Main | 48.166 | 76.225 | 238.96 | 1000 | 45.76 | 1.11 | | | |
| | | | | | | | | Midpoint 223.78 | | | Midpoint 2.5 | | | |
| | | | | | | | 1000cP | Weight of uncoated fabric is 410 grams/sqm | | | | | | |

Summary of % add on for coated pieces
Spun Poly – Printed with EDW-152MOD 2200-2400

FIGURE 27B

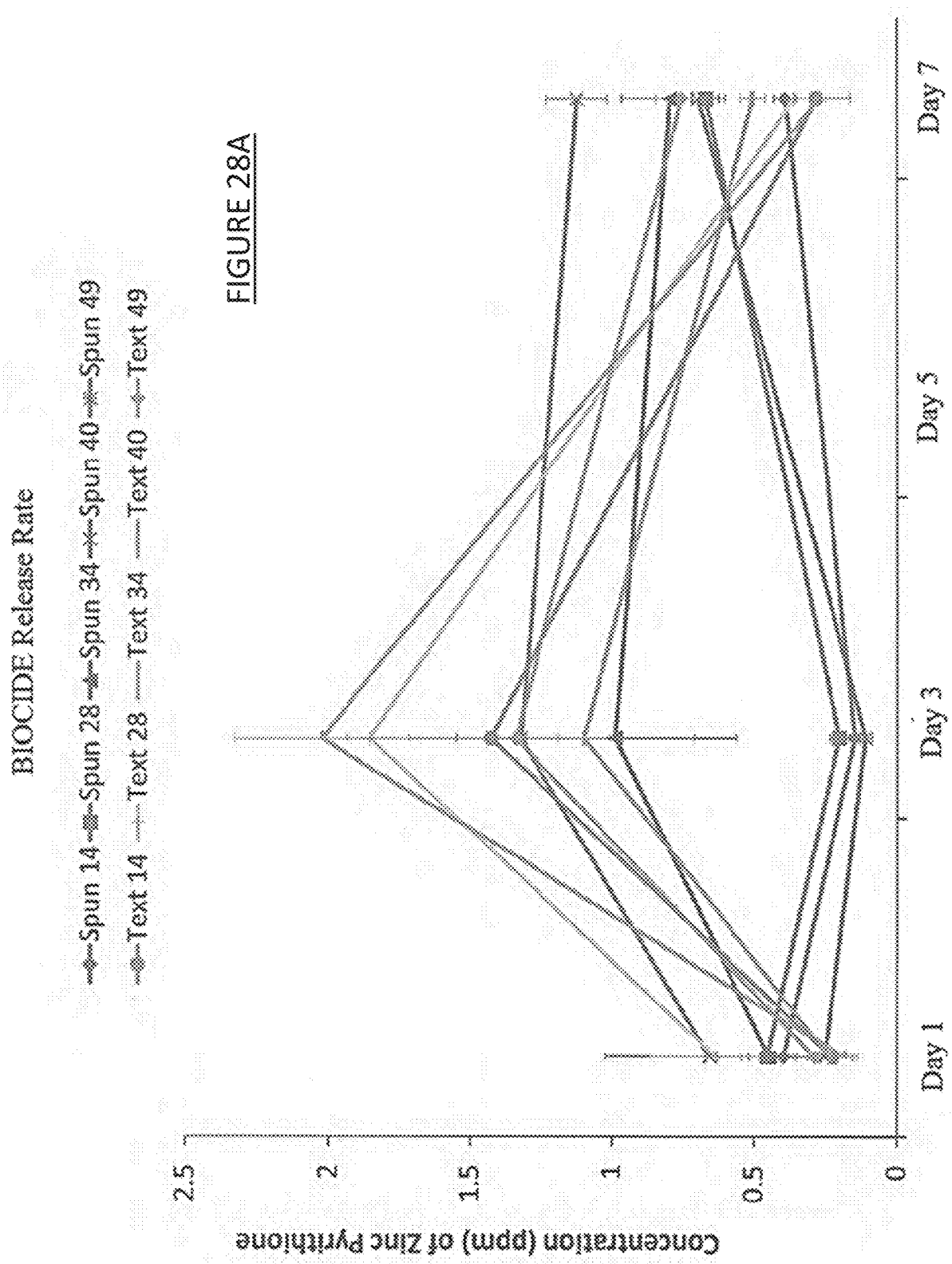

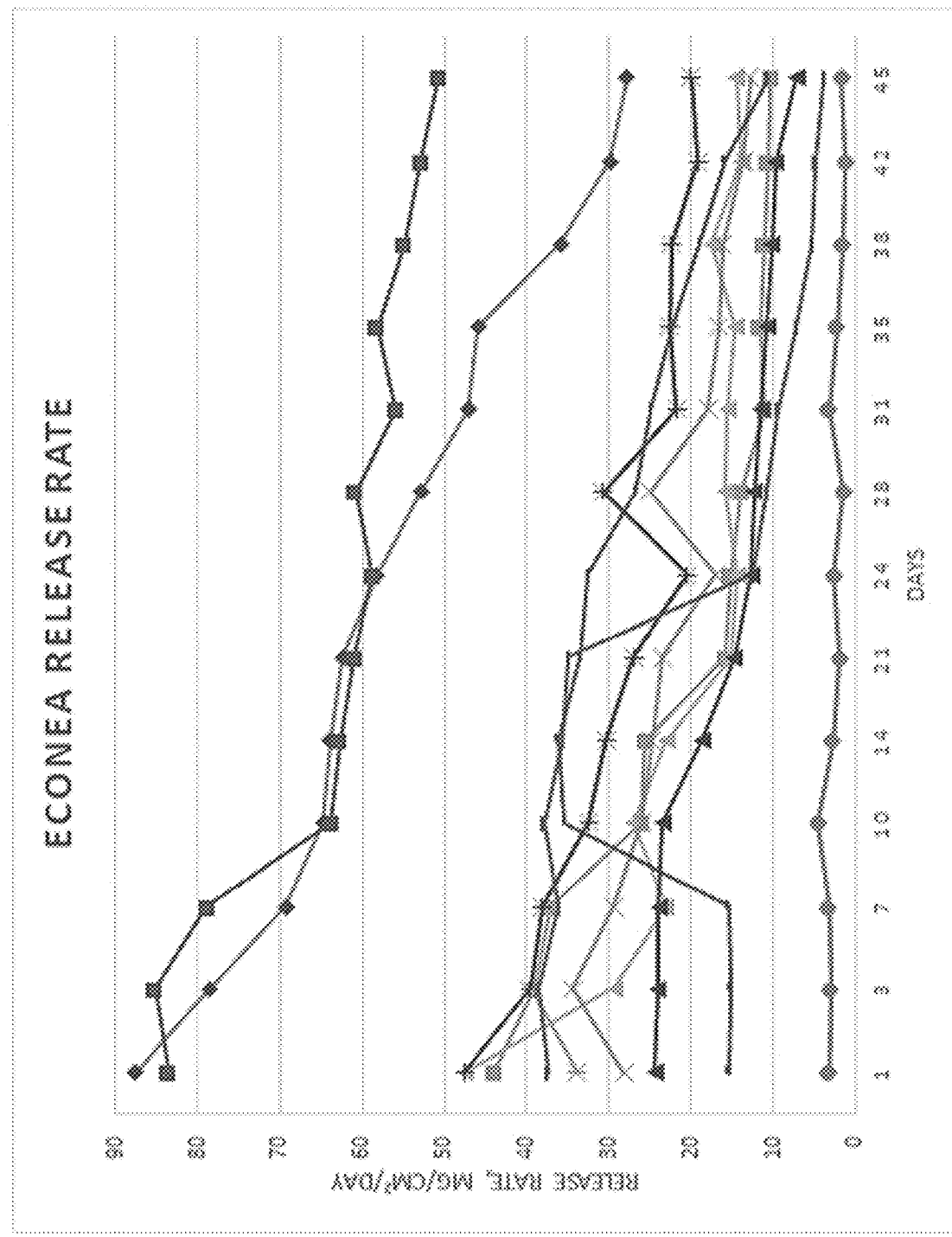

DURABLE BIOFOULING PROTECTION

CROSS-REFERENCE TO RELATED APPLICATIONS

This application is a continuation of U.S. patent application Ser. No. 17/246,159, titled "DURABLE BIOFOULING PROTECTION," filed Apr. 30, 2021, which is a continuation of PCT Patent Application PCT/US19/59546 filed Nov. 1, 2019, titled "DURABLE BIOFOULING PROTECTION," which claims priority to and benefit thereof from U.S. Provisional Patent Application No. 62/754,574 filed Nov. 1, 2018, titled "DURABLE BIOFOULING PROTECTION," and U.S. Provisional Patent Application No. 62/817,873, filed Mar. 13, 2019 and entitled "BIOFOULING PROTECTIVE ENCLOSURES," the disclosures of which are all incorporated by reference herein in their entireties.

TECHNICAL FIELD

The invention relates to improved devices, systems and methods for use in protecting items and/or structures that are exposed to, submerged and/or partially submerged in aquatic environments from contamination and/or fouling due to the incursion and/or colonization by specific types and/or kinds of biologic organisms. More specifically, disclosed are improved methods, apparatus and/or systems for protecting structures and/or substrates from micro- and/or macro-fouling for extended periods of time of exposure to aquatic environments.

BACKGROUND OF THE INVENTION

The growth and attachment of various marine organisms on structures in aquatic environments, known as biofouling, is a significant problem for numerous industries, including both the recreational and industrial boating and shipping industries, the oil and gas industry, power plants, water treatment plants, water management and control, irrigation industries, manufacturing, scientific research, the military (including the Corps of Engineers), and the fishing industry. Most surfaces, such as those associated with boat hulls, underwater cables, chains and pilings, oil rig platforms, buoys, and fishing nets, which are exposed to coastal, harbor or ocean waters (as well as their fresh water counterparts) eventually become colonized by animal species, such as barnacles, mussels (as well as oysters and other bivalves), bryozoans, hydroids, tubeworms, sea squirts and/or other tunicates, and various plant species. Biofouling results from the interaction between various plant and/or animal species with aspects of the substrates to which they ultimately attach, leading to the formation of adhesives that firmly bond the biofouling organisms to substrates leading to biofouling. Despite the appearance of simplicity, the process of biofouling is a highly complex web of interactions effected by a myriad of micro-organisms, macro-organisms and the ever-changing characteristics of the aquatic environment.

The economic impacts of biofouling are of paramount concern for many industries. Large amounts of biofouling on ships can result in corrosion of various surfaces exposed to the aquatic environment, greatly reducing efficacy of the operation of the vessel, and often eventual deterioration of portions of the ship. Macro-organism build-up also causes increases in roughness of the ship's surface such that the ship experiences greater frictional resistance, decreased speed and maneuverability, and increased drag, resulting in increased fuel consumption. These increased costs are experienced by commercial and recreational boaters alike, as barnacles and other animals attach to propellers, drive system components, inlets and/or hull components submerged in water.

Aside from increasing corrosion and other damage to structures, the weight and distribution of macro-fouling on objects can also dramatically alter the buoyancy or stresses and strains experienced by the object and/or support structures, which can lead to premature failure and/or sinking of the fouled objects. For example, navigational buoys or pier posts containing surfaces with large amounts of biofouling are subjected to increased stress loads resulting from increased weight—and can even founder or sink under excessive amounts of macrofouling. This increased stress often results in decreasing the useful life of the structures and necessitating continuous cleaning and/or replacement. Similarly, submerged sensors (including tethered and/or free-floating sensors) will often fail and/or malfunction relatively quickly (often in less than 30 days) due to incursion of and/or colonization by marine organisms.

Biofouling also creates substantial ecological problems by distributing plant and animal species to non-native environments as they "ride along" on the fouled object, and significant legislative and financial resources are allocated to combat the commercial and ecological impacts of biofouling.

Various methods have been used in attempts to halt and/or reduce biofouling build-up. One of the more common methods, particularly in the boating and shipping industry, is biofouling removal by scraping. However, scraping is labor intensive and can damage fouled surfaces, and environmental issues have been raised over the concerns that scraping results in the increased spread of invasive species, along with negative environmental effects on local fauna. Therefore, there exists a need for devices that eliminate or reduce the amount of biofouling on surfaces exposed to an aquatic environment.

One strategy for protecting objects in contact with water and preventing aquatic biofouling includes the use of physical coverings. These coverings desirably act as protective devices by shielding or separating the structures from the water. For example, U.S. Pat. No. 3,220,374 discloses a marine protective device. The invention is directed towards a unique means and method of protecting marine equipment from the corrosive action of the water and/or marine growth when the boat is not in use.

U.S. Pat. No. 3,587,508 discloses an outdrive protective apparatus for easy attachment to a boat. The apparatus protects the outdrive of an inboard-outboard motor from marine growth when the boat is not in use. A bag is placed around the outdrive unit for easy attachment to the transom of a boat in a manner which provides a watertight seal between the bag and the transom and around the outdrive unit.

U.S. Pat. No. 4,998,496 discloses a shroud for a marine propulsion system which includes a waterproof shroud body that can be fastened to the transom of a boat to surround the outboard portion of the propulsion system. Locking and sealing mechanisms secure the shroud to the boat transom in water-tight engagement and a submersible pump is operable to remove water from the shroud body so that the propulsion system is effectively in "dry dock" when not in use.

U.S. Pat. No. 5,072,683 discloses a drainable protective boat motor bag apparatus including a boot defining a bag for fitting over the propeller and stem of an outdrive of a motor mounted on the stern of a boat. The bag includes a channel extending from the mouth to the closed end of the bag for receipt of an open-ended hose such that, once the bag has been positioned over the stem, a hose may be inserted for pumping of residue from such bag. A tie string may be incorporated around the mouth of the bag for tying it to the stem and, if desirable, a separate protective sack may be included for covering the propeller blades to protect them from direct exposure to the bag itself.

U.S. Pat. No. 5,315,949 discloses an apparatus for protectively covering a motor prop of a boat. The cover includes an adjustable collar, a flexible, opaque bag, and an adjustable collar draw line. The bag has an open top end attached to the collar. A closed bottom end of the bag is opposed to the top end, and has a weight attached thereto. The adjustable collar draw line of the collar is such that with the bag placed over the outcropping, the open end of the bag may be closed around the outcropping by pulling the adjustable collar draw line. The collar includes a locking slot for locking the adjustable collar draw line in place around the outcropping. A manipulation handle removably attaches to the collar for facilitating the placement and removal of the cover onto and off of the outcropping. With the cover in place over the outcropping, water and light are desirably prevented from entering the interior of the bag, whereby water borne life forms such as filter feeding creatures and plant life desirably cannot thrive within the cover.

U.S. Pat. No. 6,152,064 discloses a protective propeller cover. The cover includes a flexible sleeve into which buoyant material is placed to provide a buoyant enclosure. A flexible propeller cover portion is secured to the flexible sleeve, and the end of the cover is releasably secured about the propeller. The buoyant enclosure is positioned adjacent to the propeller and extends above the water line when the propeller is positioned beneath the water line. The buoyant enclosure also serves to protect swimmers from direct contact with the propeller when swimming in proximity to the boat. The protective propeller cover apparatus further serves to protect the propeller during transport or storage. The protective propeller cover apparatus further serves as an anchor cover when the boat is underway. The protective propeller cover apparatus further serves as an emergency flotation device.

U.S. Pat. No. 6,609,938 discloses a propeller protector slipper which is used on inboard and outboard motors of boats that are anchored, drifting, aground, docked, in storage, or out of water in transit. The propeller protector slipper ensures protection for the propeller from elements that cause pitting and damage to the propeller, as well as minimizing propeller related injuries. The protector propeller slipper also provides a gage for projecting the distance of the propeller of a trailered boat from a following vehicle.

U.S. Publication No. 2008/0020657 discloses an apparatus for protecting the outdrive of a watercraft. The apparatus comprises a locating member adapted for attachment to the underside of the marlin board of the watercraft and a shroud engageable with the locating member to provide an enclosure about the outdrive. The shroud is buoyant and can be floated into sliding engagement with the locating member. The shroud has an opening which is closed upon engagement of the shroud with the transom of the watercraft to desirably prevent ingress of water into the interior of the shroud. A connection means and the locking means are provided for releasably connecting the shroud to the locating member.

In addition to the use of physical coverings as illustrated above, other strategies have been employed in efforts to reduce biofouling. U.S. Publication No. 2009/0185867 discloses a system and method for reducing vortex-induced vibration and drag about a marine element. The system includes, but is not limited to, a shell rotatably mounted about the marine element, the shell having opposing edges defining a longitudinal gap configured to allow the shell to snap around at least a portion of the marine element. A fin can be positioned along each opposing edge of the longitudinal gap, wherein each fin can extend outwardly from the shell. The fins can be positioned on the shell so as to desirably reduce vortex-induced vibration and minimize drag on the marine element. One or more antifouling agents can be disposed on, in, or about at least a portion of the shell, the fins, or a combination thereof.

U.S. Pat. No. 7,390,560 discloses a coating system for defouling a substrate. The system includes a ship hull, immersed in water or seawater for long periods of time. The system comprises a conductive layer, an antifouling layer and a means for providing an energy pulse to the conductive layer. The conductive layer comprises polymers, such as carbon filled polyethylene, which are electrically conductive. The antifouling layer comprises polymers, such as polydimethylsiloxane, which have a low surface free energy. The layers are designed such that, when the conductive layer is exposed to a pulse of electrical, acoustic or microwave energy or combinations thereof, said conductive layer separates from said antifouling layer.

U.S. Pat. No. 6,303,078 discloses an antifouling structure for protecting objects in contact with seawater, which can include a water-permeable fibrous material which incorporates a molded thermoplastic resin or woven fabric containing large amounts of an antifouling agent, with the antifouling agent leaching into the seawater from the structure. According to this reference, it is important that the leaching agent maintains high concentrations of the anti-fouling agent in the vicinity of the object to prevent the attachment of aquatic organisms. In addition, many of the enclosure embodiments disclosed by this reference create environments with extremely low dissolved oxygen levels (i.e., 8.3% or less), which tend to be highly anoxic and promote excessive microbial corrosion and degradation of the protected object.

A wide variety of surface coatings, paints and/or other materials are also known in the art for application to the exterior surfaces of underwater objects, in an attempt to directly shield and/or sequester these objects from the effects of biofouling. Many of these coatings and/or other materials rely upon biocidal additives and/or metallic additives (i.e., copper) that desirably leach into the surrounding aqueous environment over time and interfere with various aspects of the biofouling organisms. For example, bivalent $Cu^2$ interferes with enzymes on cell membranes and prevents cell division of various biofouling organisms, while tributyltin (TBT) biocide (now banned from use as a marine biocide in many developed countries) and/or other organotin compounds kills or retards the growth of many marine organisms, and many of these substances may also function as endocrine disruptors. However, the process of preparing the underwater surface(s) of objects and then applying and/or bonding such paints/coatings directly to such surface(s) is often an expensive and time-consuming process (which can even require removal of an object from the aqueous environment and/or even drydocking of a vessel), and all of these coatings have a limited duration, typically lose effectiveness over time, and often have a deleterious (and unwanted) effect on organisms in the surrounding aqueous environment. Similar difficulties exist with systems which rely upon ablative and/or surface characteristics such as hydrophobicity, super-hydrophobicity and/or non-adhesive (i.e., non-stick and/or super-ciliated) surfaces.

More recently, systems that rely upon the release or creation of active caustic agents such as chlorine (i.e., electrochlorination systems which generate hypochlorite compounds from seawater) released into the aqueous environment have been used in an attempt to reduce and/or prevent biofouling, especially in cooling and/or filtration water systems for large industrial facilities. In addition to the high cost of purchasing and/or operating such systems, such caustic substances (which may be strong oxidizing agents in the case of chlorine) can cause deleterious effects far beyond their intended environment of use (i.e., once released they can damage organisms in the surrounding aquatic environment), and many of these substances can enhance corrosion and/or degradation of the very items or related system components they are meant to protect.

There have also been various attempts in the art to completely isolate objects from biofouling elements in the aqueous environment, such as by creating a fully sealed environment about an object meant to be protected from biofouling. In these cases, however, the liquid contained within the sealed environment (which is also in direct contact with the protected object) typically becomes stagnant and/or anoxic quite quickly, leading to high levels of anaerobic corrosion of various materials, and especially high levels of corrosion in anoxic sulfate-rich environments such as anoxic seawater.

BRIEF SUMMARY OF THE INVENTION

The various inventions disclosed herein include the realization of a need for improved methods, apparatus and/or systems for protecting structures and/or substrates from micro and/or macro-fouling for extended periods of time of exposure to aquatic environments, including in situations where it may be impracticable, impossible and/or inconvenient for a fully sealed "enclosure" or other types of outer covering to be utilized around an exposed substrate structure on a continuous basis. This could include situations where a substrate or other object is moving through an aqueous environment or is providing some form of propulsive power (i.e., ship propellers and/or boat hulls), where surrounding water in the aqueous environment is being circulated, consumed and/or being utilized (i.e., for cooling water and/or distilled for fresh water), and/or situations where a sensor or other device is being utilized to record and/or sample the surrounding aqueous environment.

The various inventions disclosed herein further include the realization that a completely sealed enclosure which fully isolates a substrate from the surrounding aqueous environment may not adequately protect a substrate from a variety of negative effects of the aqueous environment, in that the "protected" substrate might suffer corrosion or other effects stemming from anoxic, acidic and/or other conditions (and/or other conditions relating to such surroundings, such as the actions of microbially induced corrosion) that may develop within a fully sealed enclosure and/or in proximity to the substrate. Accordingly, optimal protection of the substrate can be provided by an enclosure which at least partially (but not fully) separates the substrate from various features and/or aspects of the surrounding aqueous environment.

In various embodiments, an anti-biofouling "enclosure" or "barrier" is described which can be positioned around, against and/or otherwise in the proximity of a substrate or other object to filter, segregate, separate, insulate, protect and/or shield the substrate from one or more features or characteristics of the surrounding aqueous environment, including the employment of the various embodiments described in U.S. Patent Application Ser. No. 62/754,574, filed Nov. 1, 2018 and entitled "DURABLE BIOFOULING PROTECTION," and U.S. Patent Application Ser. No. 62/817,873, filed Mar. 13, 2019 and entitled "BIOFOULING PROTECTIVE ENCLOSURES, the disclosures of which are incorporated by reference in their entireties. More specifically, various embodiments of an enclosure will desirably create a "bounded," enclosed and/or differentiated aqueous environment in the immediate vicinity of the substrate, which can serve to filter or screen the substrate from direct biofouling by some varieties of micro and/or macro agents as well as, in at least some instances, promote the formation of a relatively durable surface, coating or layer on the substrate and/or enclosure walls which can potentially inhibit, hinder, avoid and/or prevent the subsequent settling, recruitment and/or colonization of the substrate surface by unwanted types of biofouling organisms for extended periods of time, even in the absence of the enclosure. In many instances, fenestrations of the enclosure walls may allow a certain amount of water exchange between the aqueous environment within the enclosure and the aqueous environment outside of the enclosure, and possibly even alter the water chemistry and/or turbidity of the liquid contained within the enclosure, potentially leading to differing levels of clay, silt, finely divided inorganic and organic matter, algae, soluble colored organic compounds, chemicals and compounds, plankton and/or other microscopic organisms suspended in the differentiated liquid as compared to those of the surrounding open aqueous environment-levels of which might contribute in various ways to fouling and/or corrosion (or lack of fouling and/or corrosion) of the substrate contained within the enclosure.

In various embodiments, the enclosures described herein act to produce an "enclosed," "local," "contained" and/or "differentiated" aquatic environment, adjacent to a submerged and/or partially submerged portion of a substrate or surface to be protected, that is or becomes unfavorable for settlement and/or recruitment of aquatic organisms that contribute to various types of biofouling (which may include surfaces that create "negative" settlement cues as well as surfaces that may be devoid of and/or present a reduced level of "positive" settlement cues for one or more types of biofouling organisms). The enclosure(s) in various embodiments can also desirably filter, reduce and/or prevent many marine organisms that contribute to biofouling from entering the enclosure and/or from contacting the submerged and/or partially submerged surface of the substrate.

In various embodiments, an enclosure can comprise a permeable, formable matrix, fibrous matrix and/or fabric material, which in at least one exemplary embodiment can comprise a woven polyester fabric made from spun polyester yarn. In at least one further embodiment, the employment of a spun polyester yarn could desirably increase the effective surface area and/or fibrillation of the fabric material on a minute and/or microscopic scale, which can desirably (1) lead to a significant decrease in the "effective" or average size of natural and/or artificial openings extending through the fabric, (2) decrease the amount and/or breadth of "free space" within openings through and/or within the fabric, thereby potentially reducing the separation distance between microorganisms (within the inflowing/outflowing liquids) with surfaces of the fabric, and/or (3) alter and/or induce changes in the water quality within the enclosure in various ways. The decreased average opening size of the fabric will desirably increase "filtration" of the liquid to reduce and/or prevent various biologic organisms and/or other materials from entering the enclosed or bounded environment, while the reduced "free space" within the opening(s) will desirably reduce the chances for organisms to pass freely through the fabric and/or reduce the speed and/or quantity of "total water exchange" between the enclosed or bounded environment and the open aqueous environment. These factors will desirably result in significant reductions or metering in the size and/or viability of micro and macro-organisms (as well as various organic and/or inorganic foulants and/or other compounds) passing into/out of the enclosure. Moreover, these aspects will also desirably reduce the quantity, extent and/or speed of biofouling or other degradation that may occur on the enclosure material itself and/or within the opening(s) therein, desirably preserving the flexibility, permeability and/or other properties of the fabric of the enclosure for an extended period of time.

Desirably, at least a portion of the fabric walls of the enclosure will be fenestrated and/or perforated to a sufficient degree to allow some amount of liquid and/or other substance(s) to pass and/or "filter" through the walls of the enclosure in a relatively controlled and/or metered manner (i.e., from the external or "open" aqueous environment to the differentiated aqueous environment and/or from the differentiated aqueous environment to the external or open aqueous environment), which desirably provides for a certain level, amount and/or percentage of "mass liquid flow" and/or "total liquid exchange" to occur between the differentiated environment (within the enclosure) and the surrounding open aqueous environment (outside of the enclosure), as well as the potential for various materials and/or compositions to diffuse or otherwise pass through the enclosure walls and/or pores thereof. These movements of liquid and/or other compositions, in combination with various natural and/or artificial processes, desirably induce, facilitate and/or create a relatively "different" or dynamic "artificial" environment within the enclosure, specifically having different characteristics in many ways from the dynamic characteristics of the surrounding aqueous environment, which desirably renders the differentiated environment "undesirable" for many biofouling organisms and thereby reducing and/or eliminating biofouling from occurring within and/or immediately outside of the enclosure. In addition, the presence of numerous small perforations in the walls of the enclosure desirably provide for various levels of filtration of the exchange liquid(s), which can potentially reduce the number and/or viability of organisms entering the enclosure as well as negatively affect organisms within and/or outside of the enclosure that may pass proximate to the enclosure walls.

As one example, the amount of dissolved oxygen in the liquid within the enclosure will desirably differ to a significant degree from the amount of dissolved oxygen in the liquid of the external aqueous environment, with changes in the dissolved oxygen in the differentiated liquid potentially mirroring, trailing and/or "lagging" (to varying amounts) the level of dissolved oxygen in the external aqueous environment. Desirably, this level of dissolved oxygen in the differentiated liquid will typically be less than that of the surrounding aqueous environment (although in various embodiments it may equal to and/or be more than that of the surround environment, including on a periodic and/or continuous basis), and in various embodiments the level of dissolved oxygen may fluctuate at values above levels conducive to the activity of sulfate-reducing or similar bacteria (i.e., microbially induced corrosion-"MIC") and/or other anoxic degradation/corrosion, with the fluctuations themselves desirably helping to inhibit and/or control the predominance of any single undesirable type or group of micro and/or macro-organisms within the enclosure or various sections or portions thereof.

In various embodiments, a gradient of dissolved oxygen and/or other water chemistry components may develop within the liquid of the enclosure between the inner wall of the enclosure and the outer surface of the protected substrate, with this gradient potentially creating a "more hospitable zone" proximate to the inner wall of the enclosure and/or a "less hospitable zone" proximate to the surface(s) of the substrate, which in some embodiments may induce various microorganisms to travel towards the inner enclosure wall and/or away from one or more surfaces of the substrate (which may be due to the increase dissolved oxygen percentage that may exist closer to the enclosure walls, as one example), as well as potentially impelling some microorganisms to not colonize, settle, thrive and/or grow on the surface(s) of the substrate. In various embodiments, this gradient may be due, at least in part, to the influx of water through and/or into the enclosure, and/or may be due, at least in part, to the outflow of water through and/or out of the enclosure. The resulting "exchange" of water into and/or out of the enclosure, and the various concentrations of chemicals and/or compounds contained therein, will desirably reduce the quantity, extent and/or speed of biofouling or other degradation that may occur to the substrate in its natural (i.e., unprotected) state.

In various embodiments, water or other aqueous media which enters and or leaves the enclosure will desirably accomplish this passage in primarily an "en masse" fashion, where localized variations in water velocity and/or "currents" within the enclosure will be minimized. The resulting relatively quiescent nature of the water within the enclosure will desirably reduce and or inhibit significant "mixing" of water within the enclosure, desirably leading to a greater level of stratification and/or differentiation within the enclosure, which can include stratification based on oxygenation levels (i.e., chemoclines) and/or other properties (i.e., salinity, density, temperature), potentially leading to the creation of localized regions of anoxia and/or euxinia within the enclosure (which regions may be suspended within the enclosure and/or separated from the surface of the substrate by other regions of water within the enclosure). Moreover, the water leaving the enclosure, which can comprise a variety of metabolic wastes and/or detrimental compounds (including various known and/or unknown microbial "toxins") and/or other inhibiting compounds generated within the differentiated environment, will desirably "linger" within the pores of the enclosure and/or in the vicinity of the outer walls of the enclosure in a "cloud" of such wastes/compounds for varying lengths of time, which will desirably reduce and/or impeded colonization of the enclosure walls (including the externally facing walls) by fouling organisms.

In one exemplary embodiment, an enclosure may be utilized in proximity to a substrate to create an oxygen-depleted zone within the enclosure, with at least a portion of this oxygen-depleted zone in proximity to or in contact with the substrate, wherein in some embodiments the oxygen-depleted zone may comprise the entirety of the differentiated aqueous environment (i.e. within the enclosure) while in other embodiments the oxygen-depleted zone may comprise only a portion of the of the differentiated aqueous environment. Desirably, various aspects of the enclosure's unique design and arrangement will allow one or more natural processes to initially generate an oxygen depletion zone, although in some embodiments additional actions and/or activities may be undertaken to initiate, accelerate, maintain, delay, reduce and/or supplement the one or more natural process(es), which can affect the oxygen depletion region created thereby.

Desirably, the enclosure will provide a unique protected environment within the aqueous environment, wherein the quantity and/or diversity of bacteria and/or other microorganisms within the enclosure may differ from those located outside of the enclosure. Moreover, the enclosure may create a plurality of differentiated environments within the enclosure, which could include a first differentiated "environment" that could be quantified as "proximal to the inner wall of the enclosure" (i.e., within a few millimeters of the inner wall of the enclosure, for example) and at least a second differentiated "environment" that could be quantified as proximal to (i.e., within a few millimeters of) the outer surface of the substrate. In various exemplary embodiments, a given differentiated environment could induce or promote the formation of one or more biofilm(s) within the enclosure, which could include formation of a biofilm on the surface of the substrate which may differ in various aspects from a biofilm that might be formed on the substrate within the aqueous environment in the absence of the enclosure and/or a different biofilm on an inside surface or within the pores of the enclosure wall. For example, the substrate biofilm in the "enclosed" or differentiated environment might incorporate a lower/lesser diversity of bacteria or other microorganisms, or may comprise a "thinner" layer of biofilm than would normally be formed on the surface of an unprotected equivalent substrate. In various instances, this differentiated biofilm may be advantageous for preventing and/or reducing micro and/or macro-fouling of the substrate.

In some embodiments, the unique protected environment within the aqueous environment may induce a unique quantity and/or diversity of bacteria and/or other microorganisms within the enclosure that may induce or promote the formation of one or more biofilm(s) within the enclosure, wherein such biofilms may be "less tenaciously attached" to the substrate than biofilms normally encountered in unprotected environments. Such biofilms may facilitate the removal and/or "scraping off" of fouling organisms from the substrate and/or from intermediate biofilm layers. In such cases, the microflora and/or microfauna may comprise different phyla (i.e., different bacteria and/or cyanobacteria and/or diatoms) from those located outside of the enclosure.

In various embodiments, the presence of the enclosure and the various perforation(s) there through may create a "differentiated" aqueous environment that may be less conducive to micro and/or macro fouling of the substrate than the surrounding aqueous environment, which might include the existence and/or presence of biofilm local settlement cues within the differentiated environment that are at a lower positive level than the biofilm local settlement cues of the surrounding aqueous environment. Desirably, the enclosure will create "differences" in the composition and distribution of various environment factors and/or compounds within the differentiated aqueous environment as compared to similar factors and/or compounds within the surrounding open aqueous environment, with these "differences" inhibiting and/or preventing significant amounts of biofouling from occurring (1) on the surface of the protected substrate, (2) on the inner wall surfaces of the enclosure, (3) within the interstices of openings and/or perforations in the walls of the enclosure and/or (4) on the outer wall surfaces of the enclosure. In some embodiments, the enclosure will create a gradient of settlement cues within the enclosure that induces and/or impels some and/or all of the micro and/or macro fouling organisms to be located somewhat distal to the substrate, while in other embodiments the enclosure may create a microenvironment proximate to the substrate which is not conducive to biofouling and/other degradation of the substrate. In still other embodiments, the enclosure may be positioned proximate to and/or in direct contact with the substrate, such as being directly wrapped around the substrate, and still provide various of the protections described herein.

In various other embodiments, the presence of the perforated enclosure walls can similarly affect various water chemistry factors and/or the presence/absence of nutrients and/or wastes within the differentiated environment and/or portions thereof as compared to those of the surrounding aqueous environment. For example, the pH, total dissolved nitrogen, ammonium, nitrates, nitrites, orthophosphates, total dissolved phosphates and/or silica could vary between the differentiated environment and the surrounding open aqueous environment, and even within the differentiated environment the levels of such nutrients can vary across the enclosed or bounded aqueous region. In general, the water chemistry, nutrient levels and/or levels of waste metabolites in the liquid within the enclosure at a location proximate to at least a portion of the enclosure walls (i.e., an "upstream portion" based on a direction of mass water flow) might more closely approximate the levels of the liquid outside of the enclosure, with greater variation typically seen further within the enclosure and/or proximate to the substrate surface.

In various embodiments, the presence of an enclosure such as described herein might alter water chemistry such that fouling organisms that might land on the substrate may not settle or attach to the substrate and/or may be unable to thrive and/or colonize the substrate because of the various "inhospitable" conditions within the differentiated environment that render the organism unable to grow (including an inability to grow as quickly as comparable organisms situated outside of the enclosure), thrive and/or pass through one or more of the required natural processes and/or stages these organisms undergo in order to become fully functioning macrofouling organisms. For example, various chemistry changes could occur within the enclosure (as compared to the surrounding open aqueous environment), including lower dissolved oxygen levels, altered pH, different nutrient levels and/or concentrations, levels of waste products and/or lack of movement of the water within the enclosure, etc. In many cases, fouling organisms might even disconnect and/or "die off" from an already-fouled surface when the substrate is placed within the various enclosures described herein, which could potentially halt and/or reduce fouling of the substrate, as well as potentially loosen and/or detach some existing biofouling organisms and/or skeletal remains such as shells, skeletons, exoskeletons and/or related support structures from the fouled surface(s).

In various embodiments, the arrangement, small size and/or distribution of the perforations of the walls of the enclosure, as well as the presence of the various threads and/or thread portions (i.e., ciliation) positioned therein, could limit, prevent and/or regulate the presence and/or availability of sunlight or other light/heat energy (including man-made and/or bioluminescent energy sources) within the enclosure or various portions thereof, including limiting and/or preventing various energy sources (such as sunlight for photosynthesis, for example) from being readily available for use by various microorganisms and/or other degenerative processes, especially where the enclosure is being utilized nearer the surface of the aqueous environment or close to such other energy sources. If desired, the availability or existence of such energy sources proximate to the walls of the enclosure (i.e., through the perforations) may induce some motile organisms to congregate and/or collect proximal to the inner walls of the enclosure, desirably reducing their presence proximate to the substrate surface to be protected. In various alternative embodiments, a light or other energy source could be positioned in the surrounding aqueous environment proximate to the enclosure and/or could be positioned within the enclosure in various locations, including proximate to the protected substrate, thereby increasing the availability of such energy source proximate to and/or within the enclosure. Such embodiments might be particularly useful in limiting the presence and/or growth of biofouling organisms sensitive to the added energy source (i.e., such as providing a light source to inhibit zebra mussels-who typically prefer darker environments).

In various embodiments, the arrangement, small size and/or distribution of the perforations of the walls of the enclosure, as well as the presence of the various threads and/or thread portions therein, can limit, prevent and/or regulate the location and/or quantity of higher velocity mass flow(s) of water which may occur within the enclosure or various portions thereof, including limiting and/or preventing various types of laminar and/or turbulent flow(s) of liquid (i.e., localized streams or "jets" of water) within the enclosure and/or proximate to the substrate. In some embodiments, the relatively "slack" but somewhat less than completely "quiescent" nature of the water that can be attained within the enclosure can prevent significant numbers of non-sessile microorganisms from coming into contact with the substrate or a boundary layer proximate thereto. Moreover, the limited flow of liquid within the enclosure may allow a thinner/thicker aqueous liquid boundary layer to exist proximate to the protected substrate and/or the enclosure walls, which can further limit microorganism or other contact with the protected substrate as well as induce or allow the formation of a thinner/thicker biofilm layer on the substrate than normally exists in the more active flow situation(s) of the open aqueous environment.

In at least one alternative embodiment, various advantages of the present invention might be provided by a non-permeable enclosure (including plastic, wood and/or metal wall sheets or plates, etc.) which incorporates a supplemental and/or artificial water exchange mechanism, such as a powered pump or "check valve" arrangement, propeller system and/or petal system, that provides for a desirable level of water exchange between the differentiated aqueous environment and the surrounding open aqueous environment.

In some embodiments of the present invention, some or all of the biofouling protections and/or effectiveness described herein for a protected substrate can desirably be provided by the enclosure and its permeable, formable matrix, fibrous matrix and/or fabric wall materials without the use of various supplemental anti-biofouling agents, while in other embodiments the enclosure could comprise a permeable, formable fibrous matrix and/or fabric wall material which incorporates one or more biocidal and/or anti-fouling agents into some portion(s) of the wall structure and/or coatings thereof. In some embodiments, the biocidal and/or antifouling agent(s) could provide biofouling protection for the enclosure walls and/or components (with the enclosure itself providing a level of biofouling protection for the substrate), while in other embodiments the biocidal and/or antifouling agent(s) might provide some level of biofouling protection for the substrate itself, while in still other embodiments the biocidal and/or antifouling agent(s) could provide biofouling protection for both the enclosure and substrate, and/or various combinations thereof.

In some embodiments, the enclosure may provide biofouling protection to both the substrate and the enclosure walls to differing degrees, even in the absence of a supplemental biocide or other fouling protective substance, inhibitor and/or toxin that may be integrated into and/or supplementally provided to the enclosure structure. For example, when an enclosure such as described herein is placed around a substrate and creates the disclosed differentiated environment(s), the environment(s) may also develop increased concentrations of a variety of metabolic wastes, and the various processes and/or metabolic activities occurring within the enclosure may generate one or more substances (such as hydrogen sulfide or $NH_3$—N-Ammoniacal Nitrogen, for example) having detrimental, harmful, toxic and/or other negative effect on fouling organisms. For example, $NH_3$—N is the undissociated form of ammonia also known as free ammonia nitrogen (FAN) or ammoniacal nitrogen, which is found to be detrimental and/or toxic to microorganism since it can permeate the cell membrane. In some embodiments, a desired concentration of such detrimental compounds (including various known and/or unknown microbial "toxins") and/or inhibiting compounds may develop within the enclosure (and these concentrations may then be continually "replenished" by the various processes occurring within the enclosure), where they can reside in the differentiated aqueous region within the enclosure and/or elute through the walls of the enclosure, potentially creating a localized "cloud" of detrimental chemicals that protects the outer walls of the enclosure from fouling organisms to some degree. However, once these compounds leave the enclosure, these detrimental and/or inhibitory compounds may quickly become diluted and/or broken down by various natural processes, thus obviating significant concerns about the longer-term effects of these substances on the environment at some distance from the enclosure. In addition, because the processes creating these compounds within the enclosure are continuous and/or periodic, the enclosure may constantly generate and/or elute these inhibitory compounds at a relatively constant level on an indefinite basis without requiring elution reservoirs and/or external replenishment or external power sources.

In at least one exemplary embodiment, an enclosure can comprise a permeable, formable fibrous matrix of polyester fabric made from spun polyester yarn, which can be coated on at least one side (such as an externally facing surface of the enclosure) with a biocidal compound or coating or paint containing a biocidal agent, wherein at least some of the biocide compound penetrates at least a portion of the way into the body of the fabric. In at least one further embodiment, the employment of a ring spun polyester yarn could desirably increase the effective surface area and/or fibrillation of the fabric material on a minute and/or microscopic scale, which can desirably (1) lead to a significant decrease in the average size of natural openings extending through the fabric and/or (2) decrease the amount and/or breadth of "free space" within openings through and/or within the fabric, thereby potentially reducing the separation distance between microorganisms (within the inflowing/outflowing liquids) and the biocide coating(s) resident on the fabric. The decreased average opening size of the fabric in such embodiments will desirably increase "filtration" of the liquid to reduce and/or prevent various biologic organisms and/or other materials from entering the enclosed or bounded environment, while the reduced "free space" within the opening(s) will desirably increase or amplify the effects of the biocide on organisms passing through the enclosure (including an increased potential for direct contact to occur between the biocide and various organisms) as they pass very close to the biocidal coating. These factors will desirably result in significant reductions in the size and/or viability of micro and macro-organisms (as well as various organic and/or inorganic foulants) passing into the enclosure. Moreover, the presence of biocide coating(s) and/or paint(s) and/or additive(s) on and/or in the fabric of the enclosure will desirably significantly reduce the quantity, extent and/or speed of biofouling or other degradation that may occur on the enclosure material itself and/or within the opening(s) therein, desirably preserving the flexibility, permeability and/or other properties of the fabric of the enclosure for an extended period of time.

In some embodiments and/or some aqueous environments, the presence of a biocide coating on at least the outer surface of the flexible enclosure material will desirably reduce the thickness, density, weight and/or extent of biofouling and/or other degradation experienced on and/or within openings within the enclosure itself, which will optimally maintain a desired level of water exchange between the enclosure and the surrounding environment and/or extend the useful life of the enclosure in its desired position around the substrate. In many situations, biofouling of an enclosure significantly increases the weight and/or stiffness of the enclosure, which can damage the enclosure and/or structures attached to the enclosure (including the substrate itself), as well as adversely affect the buoyancy of the enclosure and/or any objects attached thereto. In addition, biofouling of the enclosure itself can reduce the flexibility and/or ductility of various fabric components, which can cause and/or contribute to premature ripping and/or failure of the fabric and/or related attachment mechanisms in the dynamic aqueous environment. Moreover, biofouling formation on/within the enclosure can potentially "clog" or diminish the size of and/or close openings through and/or within the enclosure fabric, which can potentially alter the permeability and/or liquid exchange rate between the differentiated environment and the surrounding dynamic and/or open aqueous environment, possibly resulting in undesirable conditions (i.e., low dissolved oxygen levels and/or anoxia) and/or corrosion or other issues occurring within the enclosure.

In at least one embodiment, an enclosure may include an initial biocide treatment that elutes and/or otherwise dispenses for a limited period of time after deployment of the enclosure, wherein this period of time is sufficient to allow other features of the enclosure to develop the differentiated environment, wherein the differentiated environment can generate various inhibitory substances to provide subsequent biofouling protection to the substrate and/or the enclosure after the initial biocide elution has dropped to lower and/or ineffective levels and/or has ceased eluting or dispensing.

BRIEF DESCRIPTION OF THE SEVERAL VIEWS OF THE DRAWINGS

The foregoing and other objects, aspects, features, and advantages of embodiments will become more apparent and may be better understood by referring to the following description, taken in conjunction with the accompanying drawings, in which:

FIG. 12A depicts the biologically driven nitrogen cycling which naturally occurs in various bodies of water;

FIG. 21 depicts various plankton types and conditions identified in various enclosure embodiments;

FIGS. 27A and 27B depict various flexible fabrics suitable for use in constructing various enclosure embodiments;

FIGS. 28A through 28C depict exemplary biocide release rates from various enclosure embodiments;

DETAILED DESCRIPTION OF THE INVENTION

Figure 1:
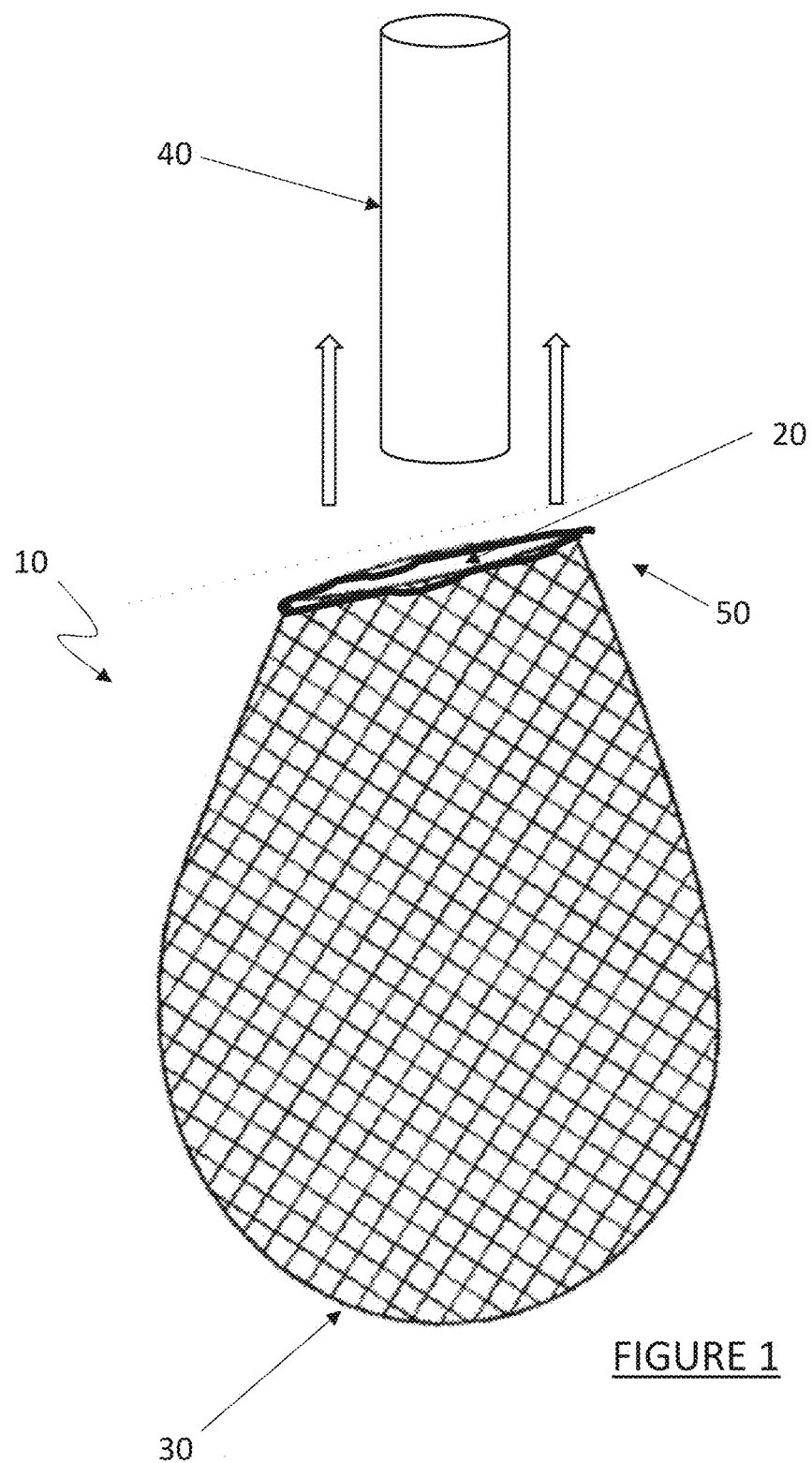
FIG. 1 depicts one exemplary embodiment of an enclosure in the form of a bag or sack.

The disclosures of the various embodiments described herein are provided with sufficient specificity to meet statutory requirements, but these descriptions are not necessarily intended to limit the scope of the claims. The claimed subject matter may be embodied in a wide variety of other ways, may include different steps or elements, and may be used in conjunction with other technologies, including past, present and/or future developments. The descriptions provided herein should not be interpreted as implying any particular order or arrangement among or between various steps or elements except when the order of individual steps or arrangement of elements is explicitly described.

Disclosed herein are a variety of simple-to-assemble and/or use enclosures and/or other devices which may be placed in proximity to, around, within, on top of and/or below a substrate or other object that is located within (or that is placed within) an aqueous environment or aqueous holding tank that is susceptible to biofouling. In various embodiments, systems, devices and methods are disclosed that can protect a submerged and/or partially submerged substrate or other object (or portions thereof) from the effects of aqueous biofouling, including the creation and potential retention of biofouling resistance by the substrate for some extended period of time after the enclosure may be opened and/or removed.

In various embodiments, protective enclosures are disclosed that can be formed from relatively inexpensive and readily available materials such as polyester, nylon or rayon fabrics and/or natural materials such as cotton, linen or burlap fabrics (or various combinations thereof). In various embodiments, an enclosure could include disposal and/or biodegradability features that allow the enclosure or portions thereof to decouple from the substrate and/or support structure, decompose and/or otherwise deteriorate after a certain amount of exposure to the aqueous environment, which could include deterioration and/or detachment after formation of a desired biofilm or other layer on the substrate.

In various embodiments disclosed herein, the terms "differentiated aqueous environment" and/or "local aqueous environment" are meant to broadly encompass some and/or all of the aqueous area in which the water chemistry has been or will be altered due to the enclosure's impact and/or presence, which may include one or more of the following (and/or any combinations thereof): 1) any water inside of the inner wall of the enclosure (i.e., the "enclosed" or "differentiated" aqueous environment), 2) any water within any pores or spaces between the inner and outer surfaces of the enclosure (i.e., the "entrained" aqueous environment), and/or 3) any water immediately proximate to the outer surface of the enclosure (i.e., "proximate" aqueous environment).

While in some embodiments the enclosure may substantially surround and/or encompass an exterior surface of the substrate, in some alternative applications the enclosure may desirably be positioned and/or configured to protect substrates located adjacent to and/or outside of the enclosure, wherein the "open aqueous environment" might be considered to be located within the enclosure, and the "enclosed" or "differentiated" aqueous environment could be positioned between the exterior walls of the enclosure and the interior walls of the substrate. For example, in a water storage tank, the interior walls of the tank might constitute the "substrate" to be protected, and some or all of water being pumped into the tank (i.e., from an external environmental source such as a stream, lake, well, harbor or reservoir) might constitute the "open aqueous environment" from which the substrate is sought to be protected. In such a case, an enclosure such as described herein could be positioned around the water inlet (or the enclosure walls could be positioned at some point between the water inlet and the tank walls), with the enclosure desirably creating the "different" environmental condition(s) proximate to the tank walls and thereby protecting the tank walls from the various effects of biofouling such as described herein.

In a similar manner, for embodiments potentially involving "filtering" and/or "straining" of liquids using enclosures and/or portions thereof, the "open aqueous environment" might be considered the upstream source of aqueous water (or other liquids) prior to passing through the enclosure walls, and the "differentiated aqueous environment" might be considered the liquid after having passed through the enclosure portion(s). At least one alternative embodiment might include enclosure elements that could line the inner walls of a water tank, holding cell or dispensing unit.

It should be understood that in various alternative embodiments, "enclosing" a substrate as described herein encompasses partially enclosing the substrate with an enclosure to a sufficient degree to induce some and/or all of the desired filtration and/or water chemistry changes in proximity to the protected substrate, including enclosures that do not fully seal or isolate the substrate from the surrounding aqueous or other environments. For example, an enclosure that protects the hull or other submerged and/or partially submerged portions of a boat or ship may be considered to "enclose" the hull as described herein, even where the enclosure only encompasses some or all of the underwater portions of the hull and portions of the enclosure may be open to the surrounding air (i.e., including portions open to the "above water" environment), open to portions of the aqueous environment and/or open towards other objects such as wood structures, rock walls, solid metal sheets, etc. In a similar manner, an enclosure having various breaks, openings, seams, cracks, tears and/or missing wall elements therein may be considered to "enclose" the substrate as described herein where there is sufficient enclosure structure to desirably induce some and/or all of the desired water chemistry changes and/or filtering functions to occur in proximity to the enclosure and/or protected substrate, thereby protecting the enclosure and/or substrate from biofouling and/or reducing the amount of biofouling of the enclosure/substrate to an acceptable level and/or inducing the formation of a desired biofilm on the substrate as described herein.

In at least one embodiment, a partially-open or skirt-type enclosure is disclosed, such as one having a lower edge of the enclosure wall which is proximate to and/or touches the bottom surface of the harbor floor. In at least one possible embodiment, the enclosure may include features that partially and/or fully "seal" some portion(s) of the enclosure against other objects such as seawalls, hull portions, larger vessel hulls, submerged and/or partially submerged structures and/or the bottom surface/mud of the seafloor. In other embodiments, the enclosure may desirably include sufficient depth to provide the biofouling protections described herein, but will be shallow enough to avoid touching the bottom of the aqueous medium during low tide (i.e., lengths of 3 feet, 6 foot and/or 9 foot depths down into the water, for example). If desired, the bottom portion of the vertically oriented sheets can include fenestrations, slits, fringes and/or perforations that may inhibit, but not completely prevent, the flow of water into and/or out of a space between the bottom of the enclosure and the seafloor.

In various embodiments, a skirt-type protection system can include individual elements for the enclosure or "skirt" comprising a plurality of vertically oriented "sheets" or similar structures that can be deployed into the water around an object or portion thereof, with some portion of the sheets extending downward below the object to be protected and, in some embodiments, extending within some portion of the euphotic zone (i.e., the sunlit zone) of a body of water, with the protection system desirably creating a partially or fully disphotic zone (i.e., a poorly lit zone) of water in the proximity of the object or creating a partially and/or fully bounded region of water which induces and/or maintains a desired chemistry change of the water proximate to the protected object that desirably inhibits biofouling. In various embodiments, the protection system desirably may further induces some level of permeability change to the sunlight passing therethrough, which in some embodiments may reduce and/or prevent the passage of large quantities of useable sunlight into this disphotic zone (i.e., useable by organisms for photosynthesis) via the top of the enclosure with the incorporation of barrier materials such as sheets, meshes, screens and/or other obstacles to reduce and/or eliminate sunlight passage (and/or various wavelengths and/or components thereof) between the object and the upper portion of the enclosure walls. In various embodiments, these barrier materials may also inhibit or prevent the physical mixing of oxygen with the water within the barrier by wave and/or wind action.

In other embodiments, a skirt or peripheral enclosure can be placed about an offshore oil platform that desirably reduces and/or eliminates biofouling around various portions of the support structures or "legs" of the platform. In such embodiments, the enclosure walls can be deployed around much of the perimeter of the entire support structure, and extend vertically downward into the water from drum-type dispensers or "floats" (or could be fixed to the platform directly and/or legs), wherein the depth of the enclosure wall(s) can be increased and/or decreased as desired. Desirably, the enclosure walls will fully and/or partially encircle the platform supports (which could include surrounding individual support legs with individual enclosures or the entire support structure in a single enclosure), and will be extended to a sufficient depth to induce desired water chemistry changes in portions of the enclosed or bounded water body, including proximate to the shallower portions and/or surface of the enclosed or bounded water body. If desired, one or more of the enclosure walls can be raised or lowered as desired, which can induce desired changes in the water chemistry if such chemistry is being monitored (i.e., about the rig or at a remote monitoring station, for example). In a similar manner, one or more openings, partitions and/or partitions in or between enclosure walls can be opened and/or closed, as desired, to desirably alter water chemistry in a desired manner.

If desired, an anti-fouling system can comprise a free-floating enclosure, wherein the enclosure walls may be supported by floating booms which can encircle or surround the protected vessel. In various embodiments, the disclosed structures and/or components thereof may be attached directly to and/or hung directly from a dock or boat slip. For example, a U-shaped enclosure can be positioned within a standard boat slip, with the enclosure walls connected to the adjacent dock(s) and/or other structures. If desired, a submerged hanging curtain or other movable wall structure can be provided proximate to the stern of the boat to close the open "U" section, which can be opened and/or closed to allow the boat to enter or leave the dock and/or enclosure. If desired, the hanging curtain may comprise an underwater wall of the enclosure which can be swung or rotated away from and/or rotated towards the enclosure (i.e., in a manner similar to opening and/or closing a door), to open and/or close the enclosure to allow a boat or other floating structure to enter and/or leave the enclosure. Alternatively, a hanging curtain can incorporate feature that allow the curtain and/or portions thereof to be raised and/or lowered to allow vessel ingress/egress to/from the enclosure in a normal manner (i.e., when the curtain section is lowered a sufficient amount the vessel may float in and/or out of the enclosure over the lowered curtain section). As another alternative, one or more sections of an enclosure wall material and/or some or all of the supporting structure(s) (i.e., the support pipe or wire cable support) may be "slid aside" (in a manner similar to opening and/or closing a shower curtain) to allow entry and/or egress from the enclosure. In this embodiment, the upper edge of the enclosure walls might be suspended at least one or two feet above the water surface (with the enclosure desirably extending below the water surface a desired degree) such that water and/or wave action would desirably not encroach over the top of the enclosure walls. In various alternative embodiments, the hanging curtain and/or other structures could be mounted to a variety of surfaces, including mounting to the protected substrate itself, to floating structures, to fixed structures, to above-water surfaces, to underwater surfaces and/or on/into the bottom of the body of water and/or subsurface harbor structures and/or seafloor. In some embodiments, direct contact of the enclosure with the seafloor may be less desirable where stronger bottom currents and/or excessive silting may occur, or where undesirable life forms on the seafloor may invade and/or attempt to colonize the enclosure components, while in other embodiments a partial and/or full seal with a bottom surface (i.e., a natural and/or artificial surface) maybe desired.

In various embodiment, an enclosure may be utilized to provide biofouling protection to a protected substrate on a periodic basis, which may include an interruption of biofouling protection on occasions when waterflow proximate to the protected substrate may be increased, with biofouling protection potentially resuming at time periods where waterflow proximate to the protected substrate has reduced. For example, an enclosure may include one or more subsurface openings that can be automated and/or controlled by a user, which may be opened when increased waterflow into and/or out of the enclosure may be desirous. Such an occasion could include removal of the substrate from the enclosure, a need for sampling of outside environmental water quality and/or a need for substantial levels of cooling and/or other water (via submerged intakes and/or exhaust in a substrate hull, for example). In other embodiments, the enclosure may be designed to provide an increased flow of water through the enclosure walls at desired time periods, which may reduce and/or obviate some or all of the biofouling protection provided by the enclosure during the increased flow time period(s), but which may provide resumption of biofouling protection once the waterflow rate has reduced below a predetermined design threshold.

In at least one exemplary embodiment, an enclosure design can be provided having particular utility as an anti-biofouling and/or filtering system for systems that use sea and/or fresh water as a source of cooling water. In this embodiment, a floating enclosure or "reservoir" in the aqueous environment can be provided, with the enclosure encompassing a much larger amount of aqueous fluid than is required by the cooling system on a normal use basis. For example, if the cooling system demands 1000 gallons of water per minute during normal operations, then the reservoir would desirably encompass at least 10,000 gallons, at least 20,000 gallons, at least 50,000 gallons, at least 100,000 gallons, at least 500,000 gallons and/or at least 1,000,000 gallons and/or more of water. Desirably, the water inlet may be near the top of the reservoir will draw water having a relatively low dissolved oxygen level into the inlet for use in the cooling equipment, with water having a relatively higher dissolved oxygen level being drawn into the bottom and or any side openings or gaps of the reservoir. During the time it takes for the water molecules and/or droplets to transit up the water column within the reservoir, natural and/or artificial oxygen scavengers within the water column will desirably reduce the dissolved oxygen level in the water, such that the dissolved oxygen level is somewhat depleted prior to traveling into the inlet. In at least one alternative embodiment, however, the water inlet may be near the bottom of the enclosure and/or the bottom surface of the reservoir, which is generally the coldest water within the enclosure/reservoir for use in cooling equipment.

In at least one exemplary embodiment, a method for determining an appropriate design, size, shape and/or other features of the of enclosure can be utilized to determine a recommended minimum enclosed or bounded volume and/or water exchange rate to desirably reduce and/or eliminate biofouling within the enclosure. In some embodiments, such as in a membrane filter configuration, where the enclosure may be utilized to provide a cooling water source and/or other source water for a manufacturing plant (i.e., a power plant, a desalination plant, a refinery and/or other manufacturing facility), the disclosed methods can potentially be utilized to reduce and/or eliminate biofouling within the water and/or other conduits of the plant, and in some embodiments without the need for additional filtration and/or microfiltration of the water.

In various embodiments, the design and use of the enclosure, under certain conditions, can potentially promote, induce and/or impel the formation of a layer, biofilm and/or deposit of material on the substrate and/or the enclosure walls that reduces, repels, inhibits and/or prevents micro and/or macro organisms from subsequently attempting to colonize, recruit and/or foul some or all of the protected substrate (i.e., providing some level of "biofouling inoculation" to the substrate). For example, various embodiments of the enclosures disclosed herein can cause the generation of a unique aqueous environment within the enclosure, resulting in the creation of a unique mixture of microbes and/or microflora within the environment, including within one or more aqueous layers proximate to the surface of the substrate. In many embodiments, the unique mix and/or distribution of microbes/microflora within the enclosure can induce and/or influence the creation of a microbial biofilm or other layer on the substrate which, in combination with various surface bacteria, may release compounds that affect the settlement, recruitment and/or colonization of fouling organisms on the substrate. In various embodiments, once the unique microbial biofilm layer is established, this layer may remain durable and/or self-replenishing which, in the absence of the enclosure (i.e., where the enclosure may be removed and/or damaged, either temporarily and/or permanently) could continue to protect the substrate from certain types and/or amounts of biofouling for extended periods of time.

In various embodiments, chemicals and/or compounds that affect the settlement, recruitment and/or colonization of fouling organisms on the substrate could include toxins and/or biocides, as well as chemicals and/or compounds that deter such settlement, recruitment and/or colonization, as well as chemicals and/or compounds that may be void of positive settlement, recruitment and/or colonization cues, as well as chemicals and/or compounds that may produce a lower level of positive settlement, recruitment and/or colonization cues than those produced on surfaces within the surrounding aqueous environment and/or as compared to chemicals and/or compounds that produce positive settlement, recruitment and/or colonization cues for beneficial organisms (for example, organisms that may not be generally considered significant biofouling organisms). In some embodiments, it may be the lack of certain "welcoming cues" on the protected substrate and/or associated biofilm that may provide extended fouling protection for the substrate. In various embodiments, "welcoming cues" might encompass nutrients and/or chemicals that micro and/or macro flora require, desire and/or that facilitate settlement, recruitment, colonization, growth and/or replication on a given surface, and such "deterrence cues" may include waste metabolites and/or other chemicals that inhibit, deter and/or prevent micro and/or macro flora from settling, recruiting, colonizing, growing and/or replicating on a given surface.

In various embodiments, an inhibition of fouling can be represented by a reduction in total cover of the substrate and/or the enclosure surface(s)/interstices by fouling organisms, compared to the total fouling cover of a substantially similar substrate (without a protective enclosure) submerged and/or partially submerged in a substantially similar aquatic environment. This reduction in fouling could be a 10% reduction in fouling or greater, a 15% reduction in fouling or greater, a 25% reduction in fouling or greater, a 30% reduction in fouling or greater, a 40% reduction in fouling or greater, a 50% reduction in fouling or greater, a 60% reduction in fouling or greater, a 70% reduction in fouling or greater, an 80% reduction in fouling or greater, a 90% reduction in fouling or greater, a 95% reduction in fouling or greater, a 98% reduction in fouling or greater, a 99% reduction in fouling or greater, a 99.9% reduction in fouling or greater, and/or a 99.99% reduction in fouling or greater. Alternatively, the inhibition of fouling on the protected article(s) could be represented as a percentage of the amount of fouling cover and/or fouling mass (i.e. by volume and/or weight) formed on an equivalent unprotected substrate. For example, a protected article could develop less than 10% of the fouling cover of an unprotected substrate (such as where the protected substrate develops a fouling cover less than 0.1" thick, and the unprotected equivalent substrate develops a 1" thick or greater fouling cover), which would reflect a more than tenfold reduction in the fouling level of the protected substrate and/or enclosure walls as compared to the fouling level of the unprotected substrate. In other embodiments, the protected article could develop less than 1% fouling, or a more than one hundredfold reduction in the fouling level of the protected substrate and/or enclosure walls. In still other embodiments the protected article could develop less than 0.1% fouling, which is more than a thousand fold reduction in the fouling level of the protected substrate and/or enclosure walls. In even other embodiments of the present invention, the protected substrate and/or enclosure walls may have no appreciable fouling in any affected area(s) of the substrate and/or enclosure walls, which could represent a 0.01% (or more) or even 0% fouling level of the protected substrate and/or enclosure as compared to an unprotected substrate (i.e., greater than a ten thousand fold reduction in the fouling level of the protected substrate and/or enclosure walls—or more). ASTM D6990 and the Navy Ship Technical Manual (NSTM) are known reference standards and methods used for measuring the amounts of fouling percent coverage and fouling thickness on a substrate.

In various additional embodiments, an inhibition of fouling can be represented by a reduction in total cover increase of both the substrate and the enclosure surface by fouling organisms, compared to the total increase in fouling cover of a substantially similar substrate (i.e., without a protective enclosure) submerged and/or partially submerged in a substantially similar aquatic environment, which could be measured by visual inspection, physical measurement and/or based on an increased weight and/or volume of the combined substrate and enclosure (i.e., with the increased weight due to the weight of the fouling organisms attached thereto) when removed from the aqueous medium. This reduction in fouling could be a 10% reduction in fouling or greater, a 15% reduction in fouling or greater, a 25% reduction in fouling or greater, a 30% reduction in fouling or greater, a 40% reduction in fouling or greater, a 50% reduction in fouling or greater, a 60% reduction in fouling or greater, a 70% reduction in fouling or greater, an 80% reduction in fouling or greater, a 90% reduction in fouling or greater, a 95% reduction in fouling or greater, a 98% reduction in fouling or greater, a 99% reduction in fouling or greater, a 99.9% reduction in fouling or greater, and/or a 99.99% reduction in fouling or greater Altered Water Region and Enclosures FIG. 1 depicts one exemplary embodiment of an enclosure 10 in the form of a bag or sack having an open proximal end 20 and a closed distal end 30. In use, the enclosure 10 can be placed around a substrate 40, with the open proximal end constructed large enough to pass over and/or around the substrate and/or any related support structures, with the open proximal end capable of being reduced in size using, for example, a drawstring or pull-wire type closure 50 to desirably separate or enclose (to a desired degree) an aqueous environment within the enclosure (i.e., the "differentiated aqueous environment" or "enclosed environment") from the surrounding "open" aqueous environment. Desirably, once the enclosure is "separated," "enclosed" or otherwise closed in this manner, some amount of liquid from the open environment can still permeate through the walls of the enclosure to pass into the differentiated environment, and similarly some amount of liquid from the differentiated environment can still permeate through the walls of the enclosure to pass into the open environment.

One important characteristic of the present invention is that the enclosure can create a "differentiated aqueous environment" in proximity to the substrate, but the enclosure also permits a controlled amount of "mixing" and/or other transport between the liquid and/or other substances within the enclosure with those of the surrounding aqueous environment (i.e., outside of the enclosure). This controlled transport, which can occur both into and/or out of the enclosure, desirably creates a unique aqueous environment within portions of the enclosure that inhibits and/or prevents significant amounts of biofouling from forming on the substrate. For example, dissolved oxygen in seawater is derived from one of three sources: (1) atmospheric oxygen which dissolves, diffuses and/or mixes (i.e., by aeration) into the water's surface, (2) oxygen that is released by algae, underwater grasses and/or other biologic processes due to photosynthesis or other metabolic pathways, and/or (3) oxygen present in stream and river water flows that mixes into the seawater. When properly designed and deployed in a suitable environment, the enclosure structure will desirably block and/or inhibit significant amounts of sunlight from penetrating into the differentiated aqueous environment, thereby reducing the quantities of dissolved oxygen sourced from photosynthesis within the enclosure. In addition, the presence of the enclosure walls will desirably reduce and/or inhibit the physical bulk flow of water into, through and/or out of the enclosure due to horizontal and/or vertical water flow (or combinations thereof) due to a variety of factors, including because the enclosure walls can flex to varying degrees, which allows them to provide at least a partial barrier to water flow while also allowing the enclosure walls to alter in shape and/or orientations to some meaningful degree to reduce flow resistance, and also because the flexible enclosure walls can "move" and/or deform with the waterflow to varying degrees, thus reducing pressure differentials which impel water flow through the pores of the wall fabric.

In at least one exemplary embodiment, when an enclosure of the present invention is first placed around a substrate, dissolved oxygen in the differentiated aqueous environment can be quickly depleted from the interior of the enclosure by biologic, metabolic and/or other processes and/or activities within the enclosure to create an oxygen-depleted region within the enclosure. Because the enclosure allows some bulk flow of water into and/or out of the enclosure however (i.e., water exchange between the enclosure and the surrounding "open" waters), some amount of oxygen replenishment will occur with the inflow of oxygenated water through the enclosure walls, and some amount of oxygen-depleted water will pass out of the enclosure walls. In general, the oxygen replenishment into the enclosure occurs at a lower rate than it is normally being utilized by the microflora and/or microfauna in open waters, which induces and/or forces at least some of the microflora and/or microfauna within the enclosure to alter their activity, behavior, reproduction, metabolism, diversity, composition and/or relative distribution to accommodate the artificial conditions within the enclosure, as well as affects various natural chemical processes such as oxidation and/or the activity of free radicals, etc. Moreover, as the open water oxygen level and/or exchange rate fluctuates due to a variety of factors (day/night cycle, current/tidal flows and/or other water movement, aeration of water due to wind and/or storm activity, etc.), the inflow of dissolved oxygen will change, which alters the levels of oxygen and/or other chemicals within the enclosure, which induces further changes in the activity, behavior, reproduction, metabolism, composition and/or relative concentrations of the microflora and/or microfauna within the artificial environment inside the enclosure. Desirably, the artificial environmental conditions created by the enclosure will thereby inhibit and/or prevent the settlement, recruitment, growth and/or colonization of the substrate by fouling organisms, and will also induce a unique mix of metabolic and/or other processes to be occurring within the enclosure.

Figure 8A:
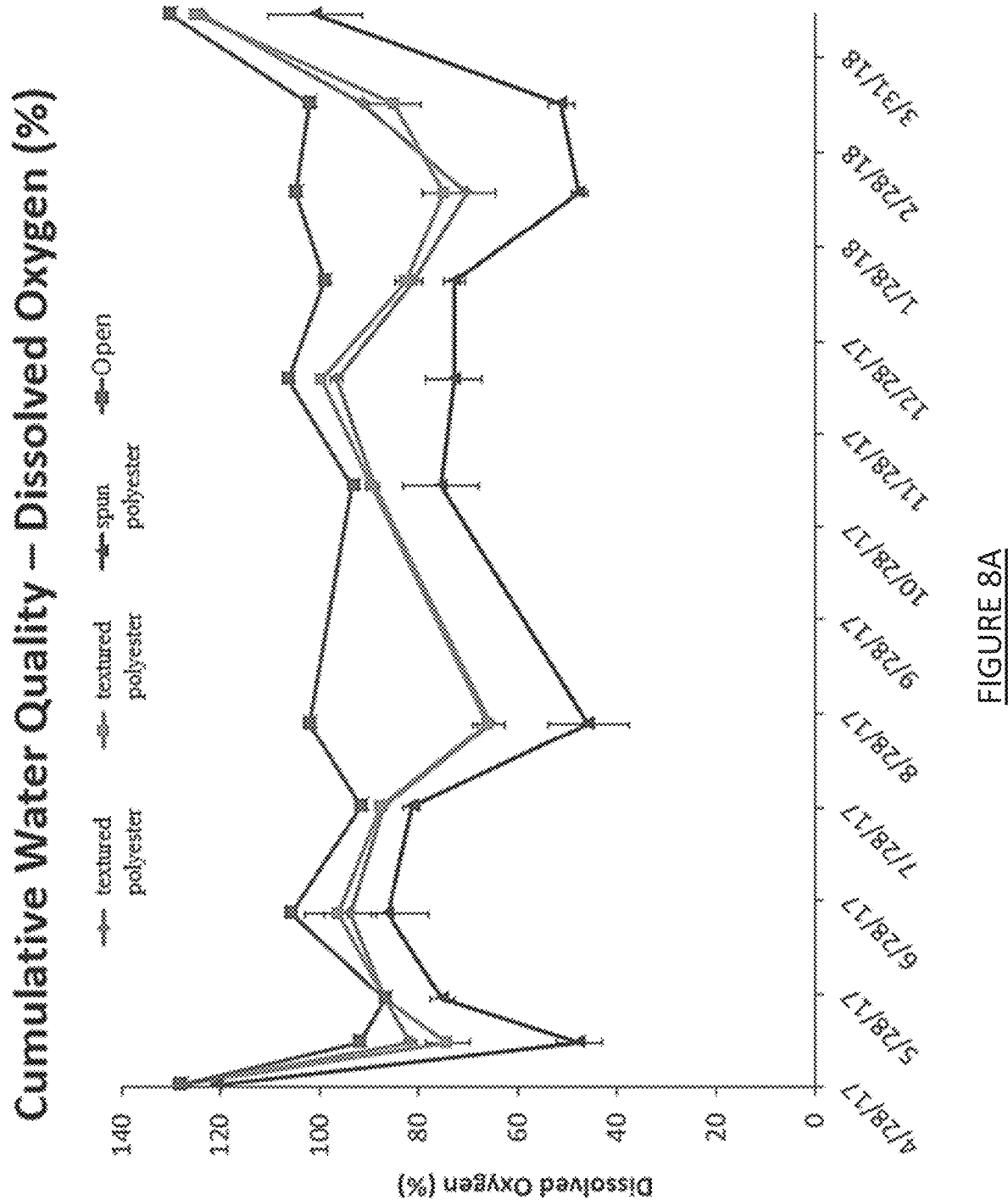
FIGS. 8A and 8B graphically depict exemplary dissolved oxygen levels in various test enclosures as compared to those of the surrounding aqueous environments.
Figure 10A:
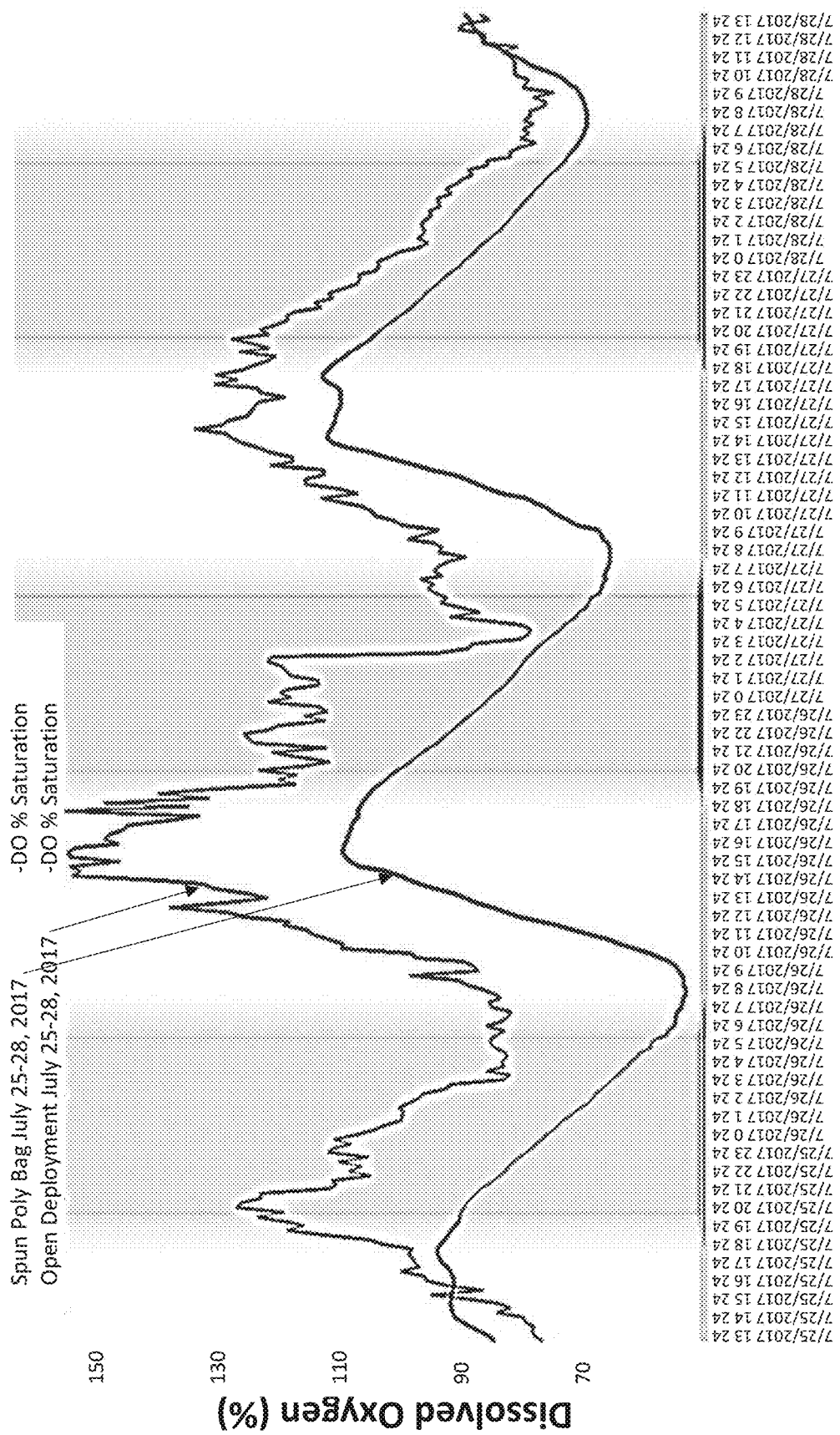
FIGS. 10A through 10D graphically depict dissolved Oxygen (DO) levels within various exemplary enclosures as compared to DO readings of the surrounding aqueous environment.

FIG. 8A depicts dissolved oxygen levels within various enclosure embodiments immersed in seawater over a period of months. For each of these embodiments, the dissolved oxygen levels within the enclosures were generally lower than the dissolved oxygen of the surrounding open waters, creating an artificial environment that causes the microflora and/or microfauna within the enclosure to alter their activity, behavior, reproduction, metabolism, diversity, composition and/or relative distribution to accommodate these artificial conditions. Moreover, the artificial conditions within the enclosure were constantly changing, such as shown in FIG. 10A, where the level of dissolved oxygen within the enclosure (i.e., the lower line labelled "Spun Poly Bag") "followed" or "lagged" behind the changing oxygen levels outside of the enclosure.

Figure 10B:
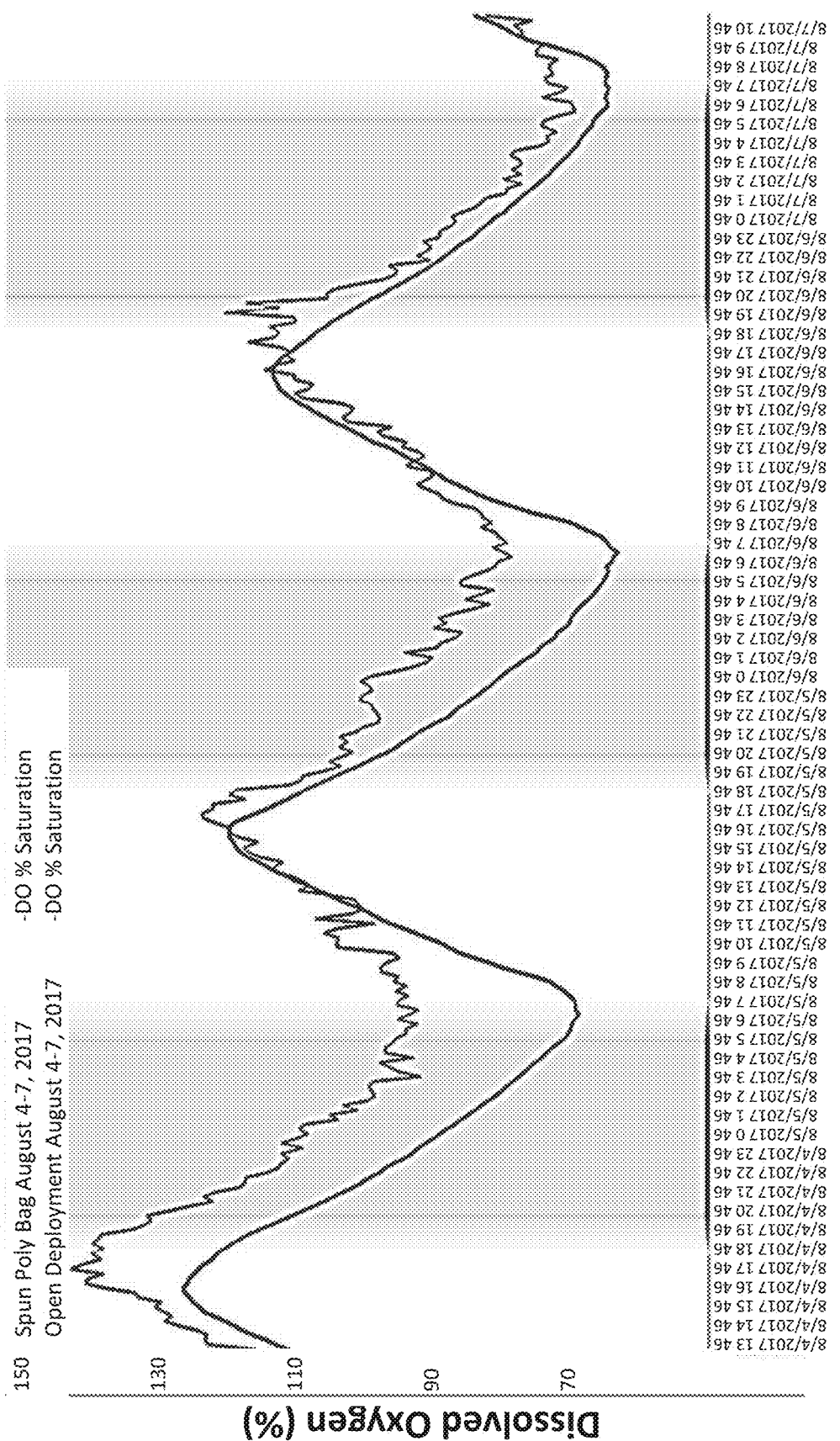
Figure 10C:
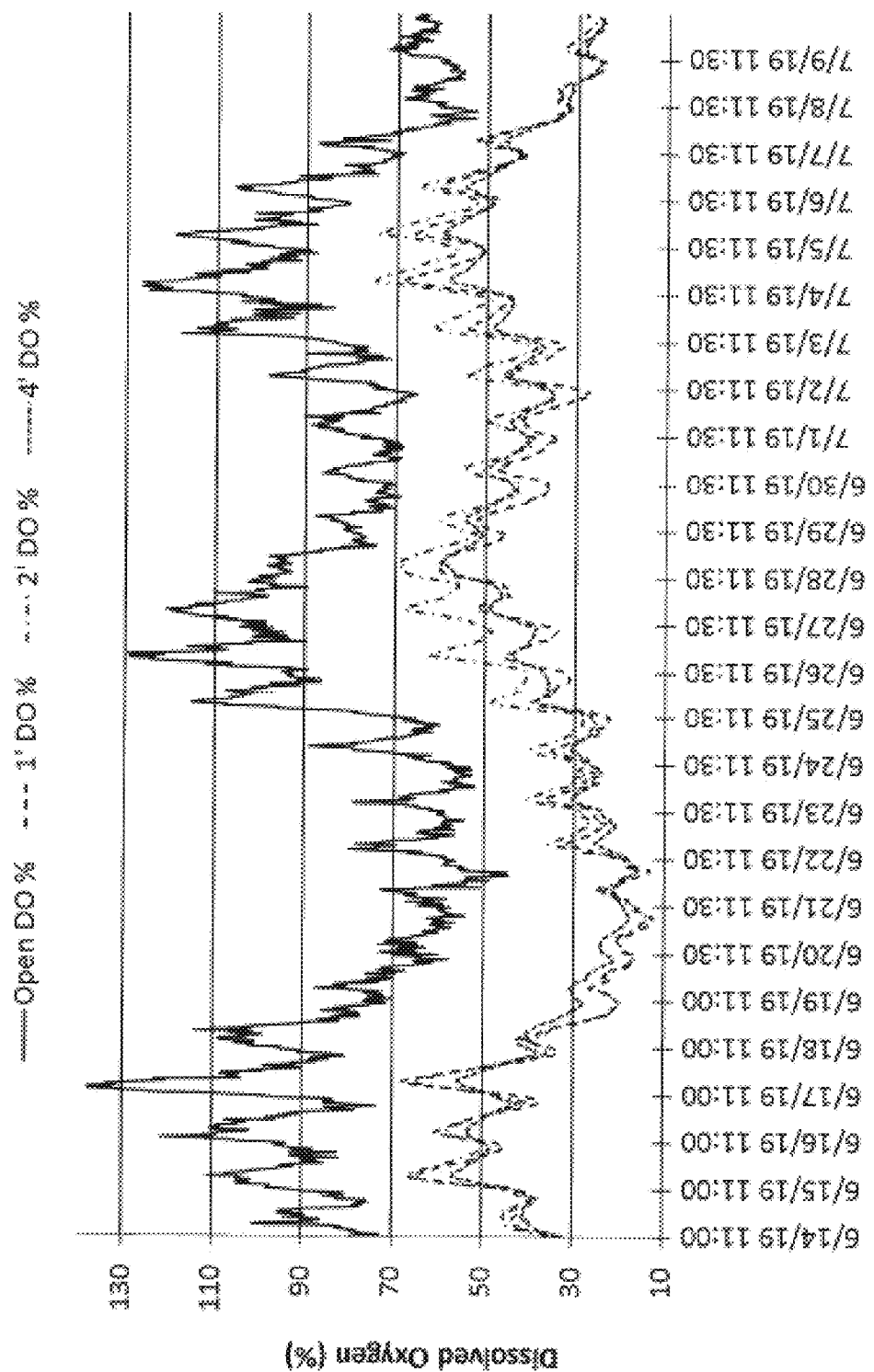
Figure 10D:
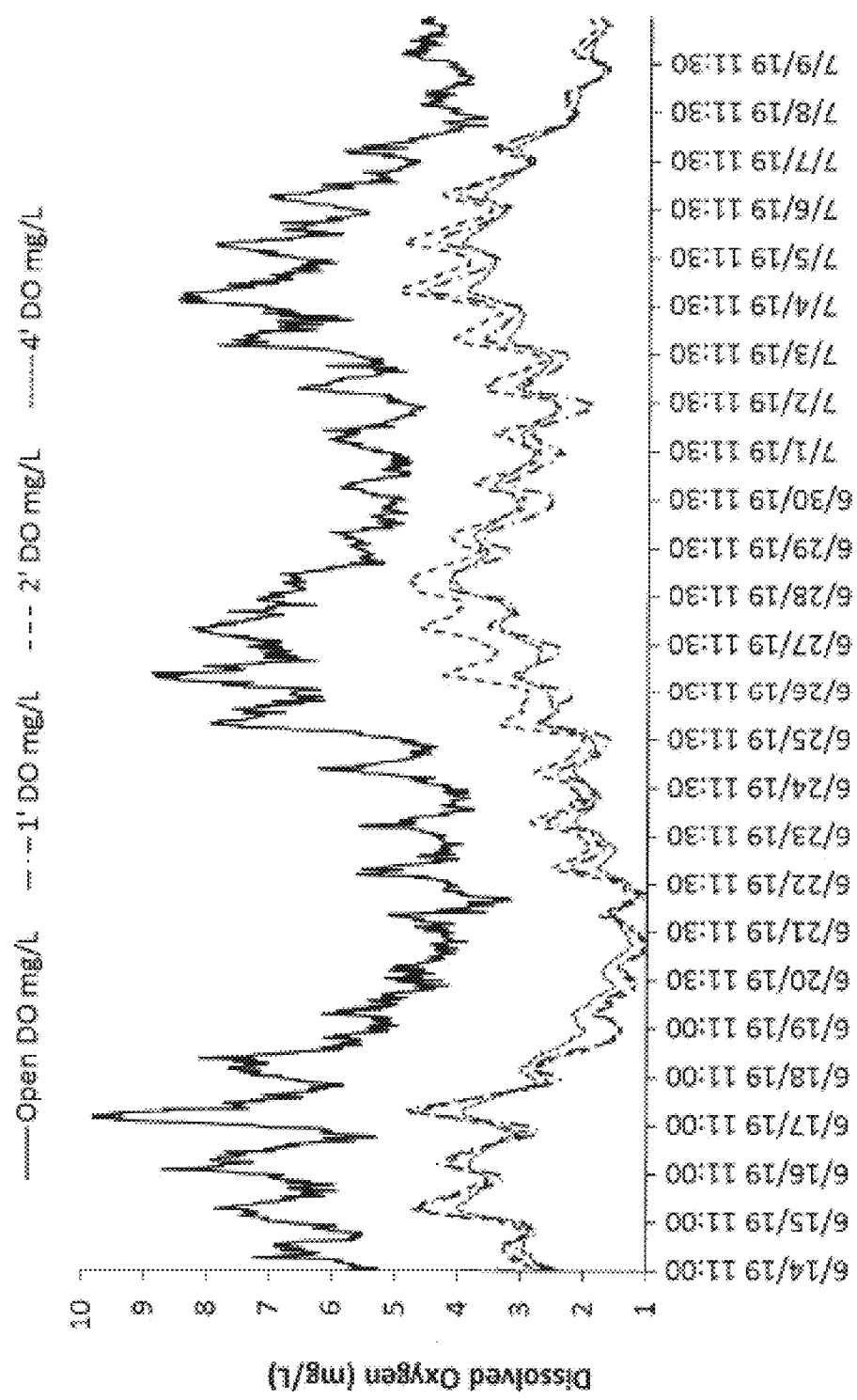

In general, changes in the net amount of dissolved oxygen within an enclosure such as described herein should be due to any inflow of dissolved oxygen (i.e. typically a source of increased oxygen supplies) contained in water flowing through the enclosure walls into the enclosure, minus an amount of oxygen consumed within the enclosure (i.e., decreasing oxygen supplies) by various processes occurring within the enclosure, including oxidative or similar processes and/or metabolic process of the flora and/or fauna therein (and to some extent the flow of any dissolved oxygen in deoxygenated water flowing out of the enclosure). Where the external dissolved oxygen levels are higher and/or where water inflow brings more oxygen into the enclosure than is consumed within the enclosure and/or leaves the enclosure, the net oxygen level in the enclosure should increase to some extent, and where external dissolved oxygen levels are lower and/or when water inflow is slowed and brings less oxygen than is consumed within the enclosure, the net oxygen level in the enclosure should decrease to some extent. The dissolved oxygen levels within the enclosure thus "react" or "lag" behind the dissolved oxygen levels of the waters surrounding the enclosure, with enclosure DO levels typically (but not necessarily always) below the DO of the surrounding waters. Moreover, as best seen in FIGS. 10A and 10B, the DO levels within the enclosure (the lower line labelled "Spun poly Bag") will often generally mimic the diurnal and/or seasonal fluctuations of dissolved oxygen outside of the enclosure (the upper line labelled "Open Deployment"), but at a reduced level. Each of these changes in the differentiated environment will desirably cause the macrofouling and microflora and/or macrofouling and microfauna within the enclosure to further alter their activity, behavior, reproduction, metabolism, diversity, composition and/or relative distribution to accommodate the change in artificial conditions.

In addition to inducing generally lower dissolved oxygen levels within the enclosure than those outside of the enclosure, various embodiments of the present invention can reduce and/or limit the amount of variation between highest and lowest oxygen levels in the open environment, and additionally have the capability to reduce or "smooth out" many of the transient variations in oxygen levels that can contribute to fouling in the open environment. Such buffering or smoothing of the DO levels within enclosures can be seen in FIGS. 10A and 10B, where the variation in dissolved oxygen within the enclosure experiences a much smoother change that that of the open waters, with changes in the DO level within the enclosure being buffered or smoothed as compared to the more "jagged" and/or abrupt DO level changes of the open environment outside of the enclosure.

In various enclosure embodiments, the dissolved oxygen levels within the local aquatic environment will desirably be maintained on an average over a 24 hour period or at levels above 5%, or 8%, or 10%, or 12%, or 15%, or 20%, or 25%, or 50%, or 60%, or 75%, or 80%, or 85%, or 90%, or 100%, or 105%, or 110%, or 115%, or 120%, or 125% concentration or above other dissolved oxygen levels including above 15%, above 14%, above 13%, above 12%, above 11%, above 10%, above 9%, above 8%, above 7%, above 6%, above 5%, above 4%, above 3%, above 2%, above 1% and/or above 0% dissolved Oxygen. In some embodiments, however, it may be acceptable and/or even desirous for the dissolved oxygen levels within the enclosure to reduce to anoxic levels, which may include oxygen concentrations of less than 0.5 milligrams of oxygen per liter of liquid within some or all of the enclosure. Such anoxic conditions will desirably not be maintained for extended periods of time, but rather tend to be relatively transient phenomena having a duration of less than a minute, or less than 10 minutes, or less than a half hour, or less than an hour, or less than 3 hours, or less than 12 hours, or less than 24 hours, or less than a week, depending upon the relevant enclosure design, the local water conditions, the substrate to be protected, the relevant season(s), local fouling pressures and/or other factors. Desirably, such reduced and/or anoxic oxygen levels would not be maintained for a period of time that would be significantly deleterious to the underlying substrate and/or structure of the enclosure.

Figure 12B:
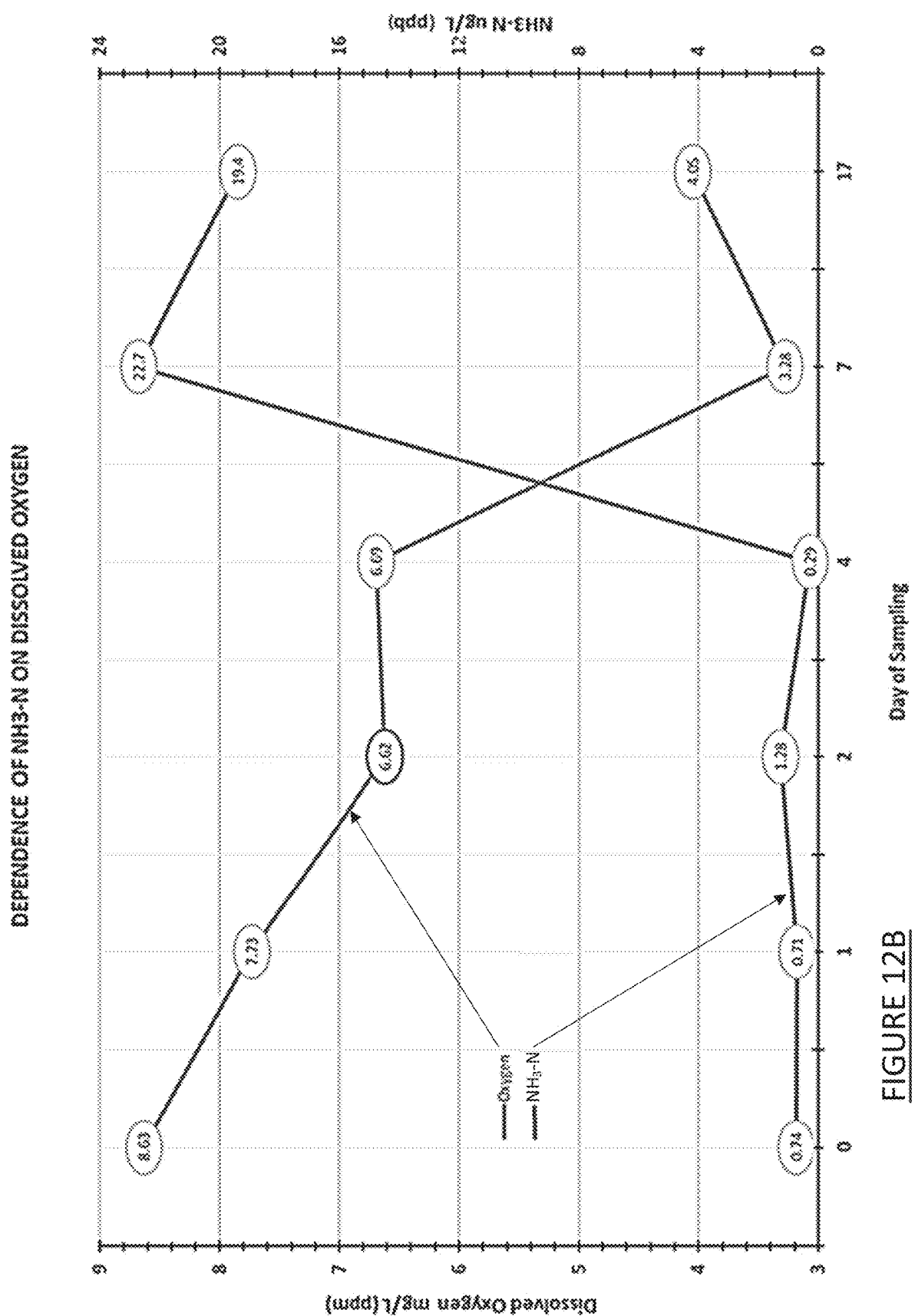
FIG. 12B graphically depicts an exemplary dependence of $NH_3$—N on available dissolved Oxygen levels in an aqueous environment.

It is believed that the reduced dissolved oxygen levels created within the enclosure significantly contribute to the reduction of biofouling of the substrate, in that the reduced availability of oxygen can render it difficult for some fouling organisms to colonize and/or thrive within the enclosure and/or on the substrate. In addition, the reduction in dissolved oxygen levels within the enclosure can increase the creation of, and/or greatly reduce the opportunity for other organisms to process and/or eliminate, waste materials such as hydrogen sulfide and/or ammoniacal nitrogen (i.e., free ammonium nitrogen, Nitrogen-Ammonia or $NH_3$—N), which are both detrimental and/or even toxic to a variety of aquatic organisms and/or microorganisms. For example, FIG. 12A depicts the biologically driven nitrogen cycling which naturally occurs in various bodies of water, which can contribute greatly to the reduction of free Oxygen within the enclosure, and FIG. 12B graphically depicts an exemplary dependence of $NH_3$—N on available dissolved Oxygen levels. In addition, in some embodiments an anammox reaction may potentially be initiated and/or sustained by bacteria within the enclosure, which may produce hydrazine and/or other byproducts that similarly inhibit marine growth. In general, the concentrations of these byproducts will be greater inside of the enclosure than outside of the enclosure (although various of these detrimental compounds-including various known and/or unknown microbial "toxins" and/or inhibitory compounds—may elute through the walls of the enclosure at varying rates), and in some embodiments the individual concentrations and/or comparative ratios of these byproducts within the enclosure may fluctuate for a variety of reasons.

For example, in various embodiments the enclosures described herein can induce the creation of metabolic wastes, toxins or other inhibitory compounds such as $NH_3$—N in concentrations ranging from 0.53 mg/L to 22.8 mg/L within the enclosure, which can be toxic to various freshwater organisms (typically dependent upon pH and/or temperature). In other embodiments, the concentrations of $NH_3$—N created in the differentiated environment within the disclosed enclosures may range from 0.053 to 2.28 mg/L, which may inhibit biofouling formation within the enclosure and/or on exterior surfaces of the enclosure. In addition, at levels as low as 0.002 mg/L or greater of $NH_3$—N, the ability of various aquatic flora and/or fauna to colonize and/or reproduce can be significantly degraded.

It is further proposed that, in some exemplary embodiments, the fluctuations and/or variations in the individual levels of water chemistry constituents within the enclosure, such as dissolved oxygen, ammonium, total dissolved nitrogen, nitrates, nitrites, orthophosphates, total dissolved phosphates and/or silica (as well as various others of the chemistry components described herein), forms an important aspect of some embodiments of the present invention, in that the artificial environments created within the enclosure will desirably "promote" and/or "inhibit" the thriving of different macrofouling and microflora and/or macrofouling and microfauna at different periods of time. Such continuous changes in the differentiated environment desirably forces the various organisms present within and/or in proximity to the enclosure to constantly adapt and/or change to accommodate new environmental conditions, which tends to inhibit predominance of a single species or species grouping within and/or in proximity to the enclosure. This can have the effect of enhancing competition between various of the flora and/or fauna within the enclosure, which may inhibit and/or prevent the domination of the enclosure by a single variety, species and/or distribution of flora and/or fauna, and thereby reduce the potential for a predominant species of bacteria or other micro or macro entities to have an opportunity to thrive and/or devote energy to fouling the substrate or form a base to which other fouling organisms may attach.

In various embodiments, the enclosure may induce the formation of a water chemistry factor which inhibits fouling such as ammoniacal nitrogen in higher concentrations within the enclosure than outside of the enclosure. If desired, a concentration of ammoniacal nitrogen within the enclosure may be obtained that may be equal to or greater than 0.1 parts per billion (ppb), may be equal to or greater than 1 parts per billion (ppb), may be equal to or greater than 10 parts per billion (ppb) and/or may be equal to or greater than 100 parts per billion (ppb). In various embodiments, the enclosure may induce the formation of a water chemistry factor which inhibits fouling such as nitrite in higher concentrations within the enclosure than outside of the enclosure. If desired, a concentration of nitrite within the enclosure may be obtained that may be equal to or greater than 0.1 parts per billion (ppb), may be equal to or greater than 0.1 parts per million (ppm), may be equal to or greater than 0.5 parts per million (ppm) and/or may be equal to or greater than 1 parts per million (ppm).

Another important aspect on the enclosure in many embodiments of the present invention is that the enclosure desirably inhibits but does not completely prevent the flow of water into and/or out of the enclosure under typical water conditions. In many cases, a substrate to be protected will be secured, connected, attached and/or tethered to one or more solid, immovable objects such as the sea floor, anchors, walls, piers, pilings, quays, wharves or other structures, which can constrain the movement of the substrate to varying degrees relative to the water in which it sits, which can induce some level of bulk water flow past the various surfaces of the substrate. However, various embodiments of enclosures described herein (which are typically attached to the substrate, to various supporting structures thereof and/or to other adjacent objects) will desirably interrupt and/or impeded the ambient flow of water immediately adjacent to the substrate surfaces to some degree, and will more desirably maintain an enclosed or bounded body of water in direct contact with the substrate under many water flow conditions. Various enclosure designs disclosed herein accomplish this objective via flexibility of various enclosure components, which allows the enclosure and the enclosed or bounded body of water therein to deform and/or be displaced to varying degrees in response to impingement and/or movement of surrounding waters.

Figure 2:
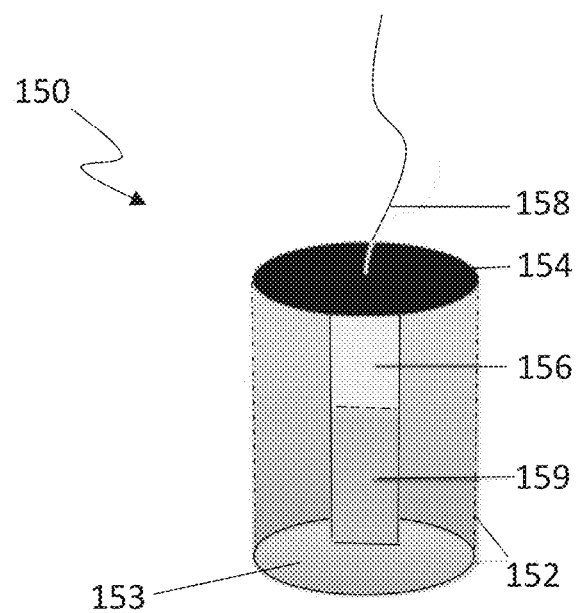
FIG. 2 depicts an alternative embodiment of a cylindrical enclosure.

If desired, the enclosure can be formed into a shape that approximates the size, shape and/or general contours of the substrate (or portions thereof) to be protected, such as a bladed bag shape to protect one or more individual propeller blades (see FIG. 1), or a cylindrical or non-cylindrical "bag" shape 150 (see FIG. 2), which as depicted could comprise a flexible wall 152, a lower cap 153 and/or an upper end cap 154 which substantially surround a substrate 159 (i.e., a sensor or other structure). FIG. 2 also depicts a support 156 which supports and/or substantially isolates the substrate 159 from the inner walls of the enclosure and/or endcap, with the enclosure assembly attached to a rope or tether 158. If desired, such an enclosure design could be utilized to protect a girder, support cable or rope and/or a cylindrically-shaped sensor or sensor support body. In various embodiments, an enclosure can comprise one or more substantially flexible, curved walls, which may optionally incorporate few or no macroscopic externally facing corners, "sharp" indentations and/or externally oriented crevices which might be particularly hospitable to biofouling organisms. In various designs, the externally-facing walls of the enclosure are desirably flexible, including sides structures as well as optionally top and/or bottom facing surfaces of the enclosure. In various embodiments, enclosures of virtually any shape, size and/or configuration can be provided, including enclosures that are "prefabricated" as well as enclosures that have prefabricated or modular subsections that can be assembled into a final enclosure of a desired size, shape and/or configuration, etc. If desired, an enclosure can be designed in a relatively simple shape to accommodate a substrate having a much more complex shape (i.e., a valve, perforated substrate or sensor), or an enclosure can be designed in a relatively complex 3-dimensional shape to accommodate a substrate having a much more simplified exterior shape.

In various embodiments, it may be desirous for the permeable walls of the enclosure to remain spaced apart from the surface of the substrate, while in other embodiments incidental, periodic and/or constant contact between portions of the enclosure and various surfaces of the substrate may provide little or no alteration of the biofouling protection provided thereby. In still other embodiments, incidental, periodic and/or constant contact between portions of the enclosure and various surfaces of the substrate may provide a significant improvement to the anti-biofouling effects of the enclosure. In some embodiments, the enclosure walls may be in direct contact with the protected substrate, such as where the fibrous matrix may be wrapped around substrates such as submerged and/or partially submerged pipes, girders and/or pilings.

Figure 3:
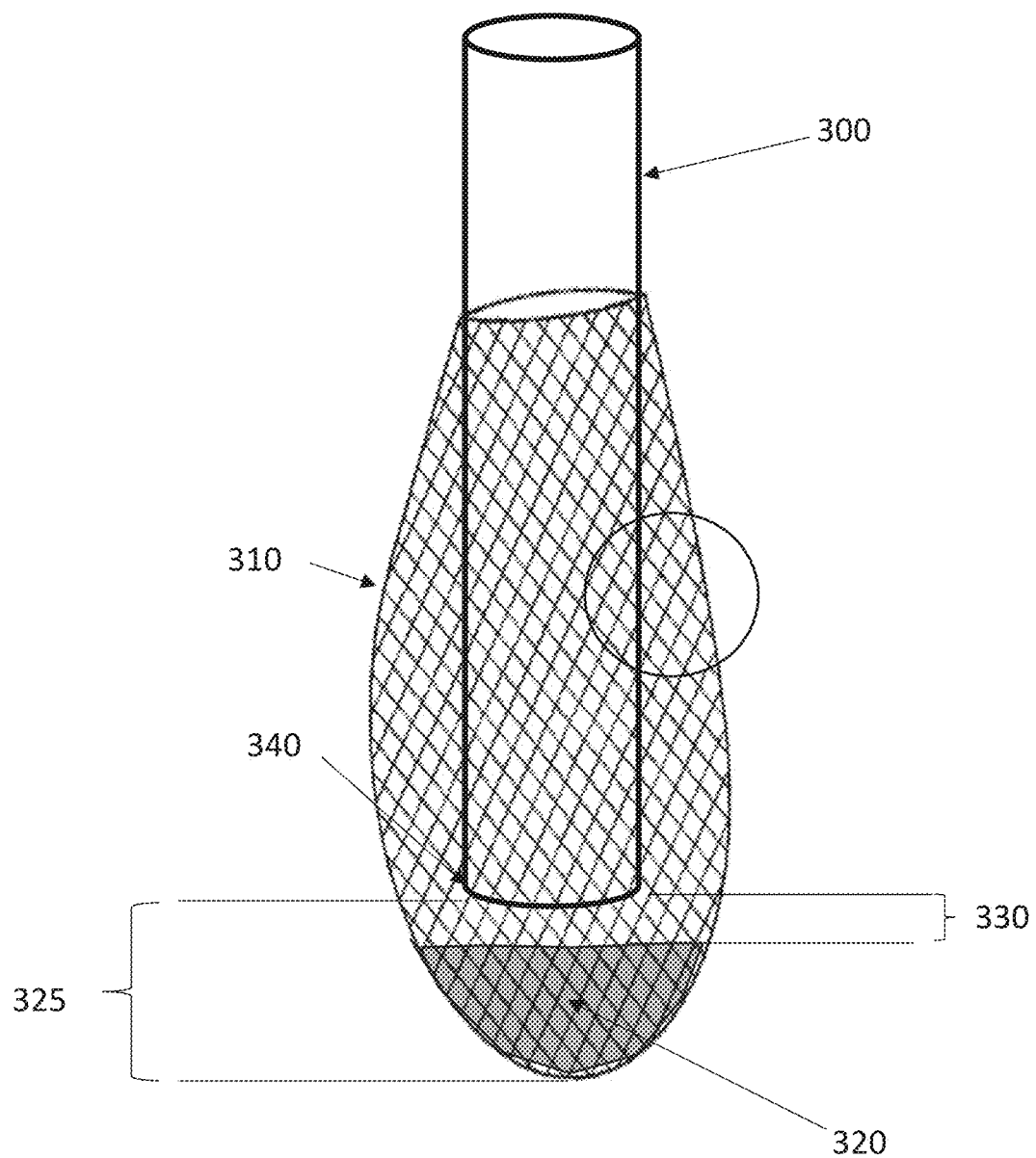
FIG. 3 depicts another exemplary embodiment of an enclosure having one or more gapped or spaced apart sections.

In various embodiments, such as shown in FIG. 3, the enclosure 310 may include one or more gapped or spaced apart sections 325 (i.e., spaced apart from the substrate 300), including portions located proximate to a bottom or lower part 340 of the substrate 300, which can provide additional space within the enclosure for sediment 320 and/or other materials to reside or collect in the differentiated environment without permanently remaining in direct contact with the substrate (i.e., to leave a "space" 330 between the sediment and the substrate). Such sediment(s) could include the dead, dying and/or decomposing bodies of microorganisms that might not pass out of the openings in the enclosure, which may create a progressively rising "pile" of sediment material and/or "mud" within the enclosure. If desired, the openings in the enclosure in such "lower areas" could be formed larger and/or more numerous than corresponding openings in other areas of the enclosure, to desirably allow such sediments or other materials to pass through and/or be expelled from the enclosure over a period of time, as well as to allow inflowing/outflowing liquids or water currents to "wash" the sediment out of the enclosure in a controlled manner. In other embodiment, the openings in the enclosure in such "lower areas" could be formed smaller and/or less numerous to minimize water exchange due to "upwelling" and/or "downwelling" plumes of water that may be caused by localized temperature fluctuations—or increased in number and/or size to allow additional water exchange in certain situations, if desired.

In various descriptions of this disclosure, "permeability" is desirably utilized as a metric for some aspects of the enclosure and/or its components, as it may be somewhat difficult to measure and/or determine an "effective" porosity of the openings in the entirety of a spun poly and/or burlap material due to the "fuzziness" and/or randomness in the architecture of this fabric, which may be compounded by variations in the flexibility and/or form of the fabric in wet and/or dry conditions, which Applicant believes can optionally be important to the effectiveness of various embodiments of the disclosed systems and devices. In various embodiments, the enclosure can comprise one or more walls comprising a flexible material with openings and/or pores formed therethrough. In some desirable embodiments, some or all of the openings through the wall(s) can comprise a tortuous or "crooked" flow path, where the tortuosity ratio is defined as a ratio of the actual length of the flow path ($L_t$) to the straight line distance between the ends of the flow path:

$$\mathcal{T} = \frac{L_t}{L}$$

In one exemplary embodiment, a woven fabric made from Textured Yarn or Spun Polyester Yarn may be highly desirous for use in creating the exemplary enclosure walls, with the Spun Polyester Yarn potentially having a significant number of fiber ends that extend from the yarn at various locations (i.e., a relatively higher level of "hairiness" or ciliation) and in multiple directions—desirably leading to a more complicated 3-dimensional macro-structure and/or more tortuous path(s) from the external to internal surfaces of the fabric. In various preferred embodiments, these fiber ends can extend into natural openings that may exist in the fabric weave, potentially reducing and/or eliminating some "straight path" openings through the fabric and/or increasing the tortuosity of existing paths through the fabric (which in some instances may extend a considerable distance through the topography of the 3-dimensional fabric). In various embodiments, it may be desirable for portions of the fabric to incorporate openings having a tortuosity ratio greater than 1.25, while in other embodiments a tortuosity ratio greater than 1.5 for various openings in the fabric may be more desirable.

Figure 4A:
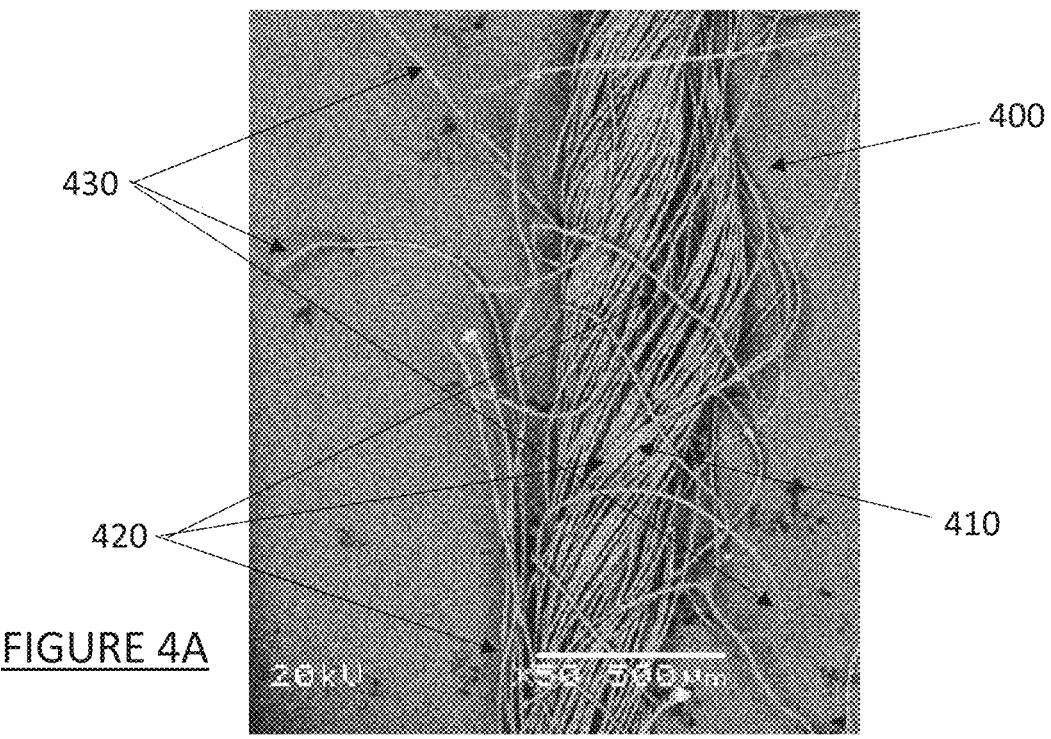
FIG. 4A depicts a scanning electron microscope micrograph of an exemplary spun yarn for use in an enclosure.
Figure 4B:
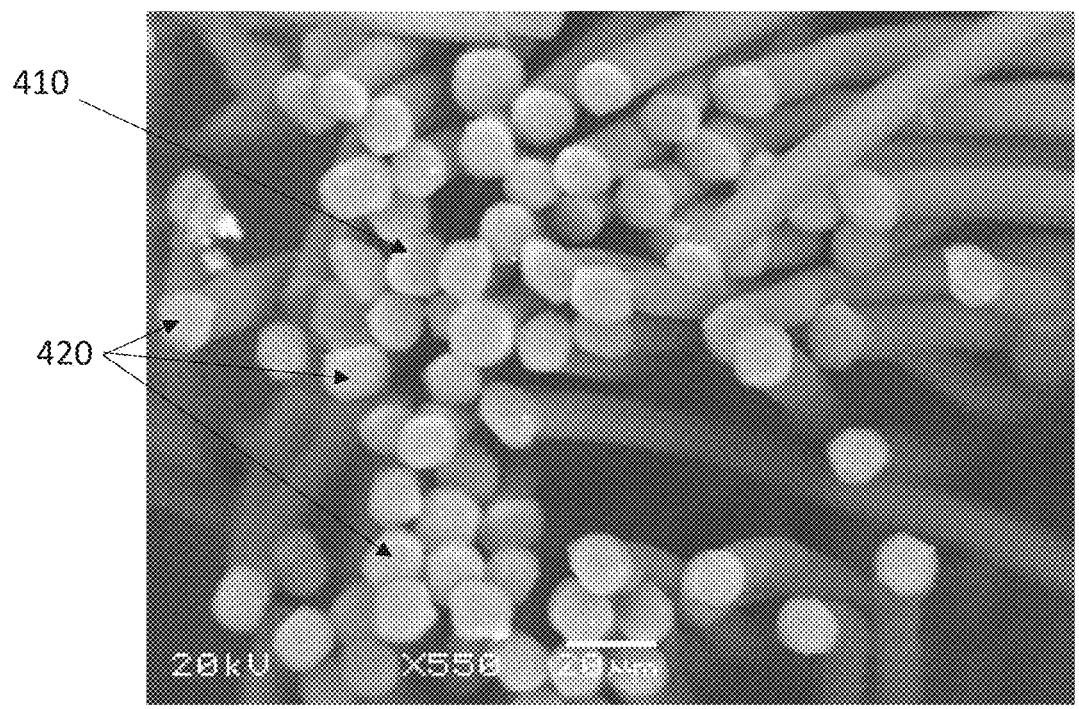
FIG. 4B depicts a cross-sectional view of a central body of the yarn of FIG. 4A.
Figure 4C:
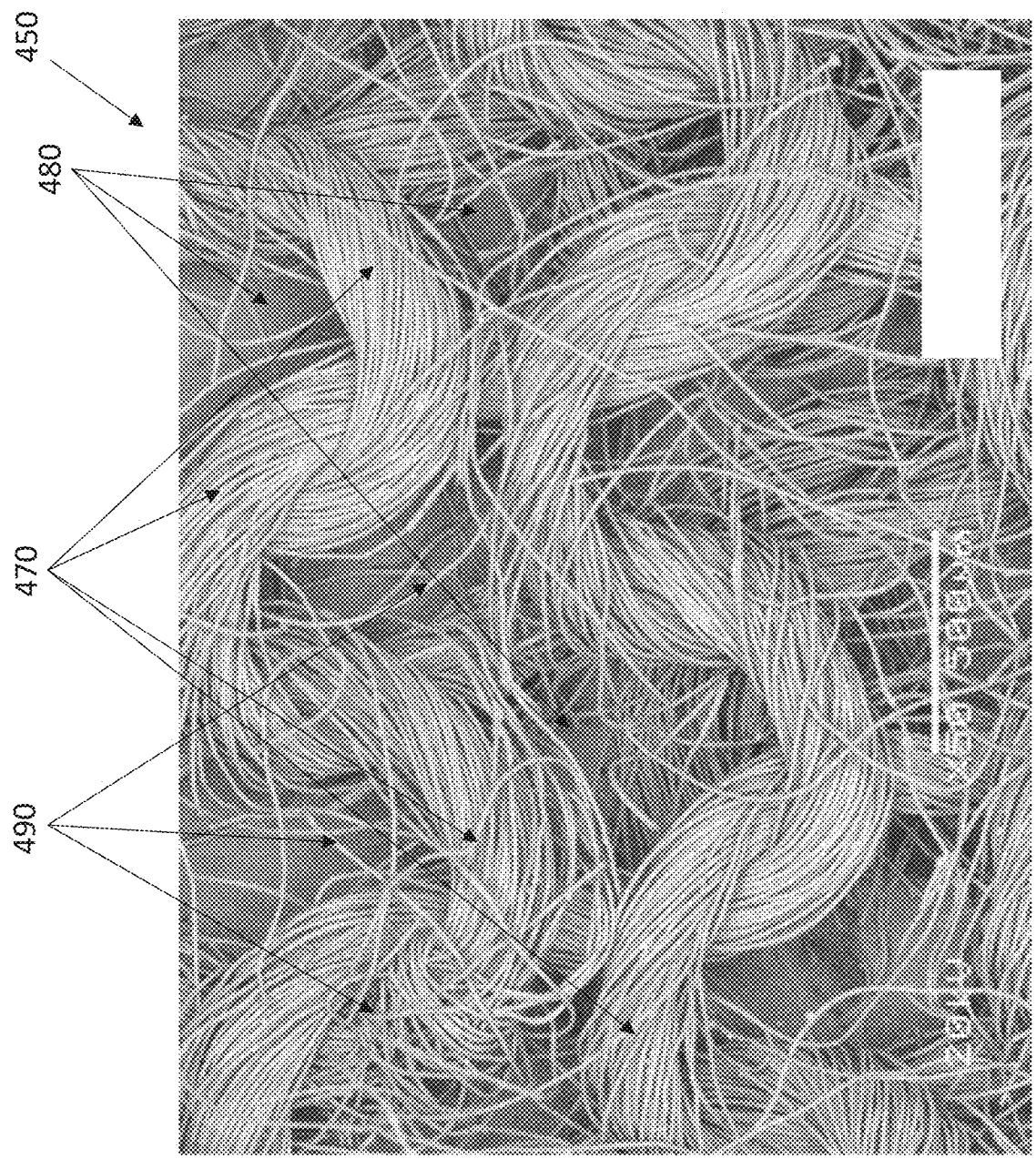
FIG. 4C depicts an enlarged view of a knit fabric comprising PET spun yarn.

FIG. 4A depicts one exemplary scanning electron microscope (SEM) micrograph of an exemplary spun yarn 400, which depicts a central body or yarn bundle 410 of intertwined filaments 420, with various filament ends 430 extending laterally relative to the central body 410. FIG. 4B depicts a cross-sectional view of the central body 410, highlighting the very fine size of the individual filaments 420 within the yarn bundle 410. As best seen in FIG. 4C, which depicts an enlarged view of a knit fabric 450 comprising PET spun yarn, a series of interstices or openings 480 are positioned between the yard bundles 470 during the knitting process, with one or more extending fibers or fiber ends 490 extending across various of the openings (with multiple fiber ends desirably traversing each opening in various embodiments).

In various embodiments, the enclosure walls and the substrate(s) protected therein can be separated and/or spaced apart by an average spacing (i.e., between an inner wall of the enclosure and an outer surface of the substrate) of about 200 inches, or about 150 inches, or about 144 inches, or of about 72 inches or less, or about 36 inches or less, or about 24 inches or less, or about 12 inches or less, or about 6 inches or less, or about 1 inch or less, or about 1 inch or greater, or about 6 inches or greater, or from about 1 inch to about 24 inches, or from about 2 inches to about 24 inches, or from about 4 inches to about 24 inches, or from about 6 inches to about 24 inches, or from about 12 inches to about 24 inches, or from about 1 inch to about 12 inches, or from about 2 inches to about 12 inches, or from about 4 inches to about 12 inches, or from about 6 inches to about 12 inches, or from about 1 inch to about 6 inches, or from about 2 inches to about 6 inches and/or from about 4 inches to about 6 inches. In various alternative embodiments, at least some or all of the enclosure may be in direct contact with the substrate in one or more areas (including, but not limited to, a closure portion of the enclosure), and thus there may be substantially little or no distance between the structure and substrate in some embodiments.

In various other embodiments, it may be desirous for the spacing between the enclosure walls and the substrate to fall within a certain range of average distances, or a desired spacing could be proportional to the width, length, depth and/or other characteristics of the enclosure and/or the substrate to be protected. For example, maintaining a predetermined spacing between a smaller substrate and a smaller enclosure containing only a few gallons of water may be more critical, especially where there is a relatively smaller amount of water in the differentiated environment which may be more susceptible to water exchange levels and the resulting water chemistry changes relative thereto, as compared to the spacing between a relatively large ship hull and a large enclosure which contained many thousands or millions of gallons of water in its "differentiated environment" within the enclosure. In such cases, a desired spacing between an enclosure wall and an opposing surface of the substrate may be 2% or less of the distance between opposing enclosure walls, or 5% or less, or 10% or less, or 20% or less, or 30% or less, or 40% or up to 49.9% of the distance between opposing enclosure walls, depending upon substrate size, type, enclosure design and/or enclosure rigidity and/or design. In another embodiment, the local aqueous environment may extend a distance of 100 inches or more, 50 inches or more, 10 inches or more, 5 inches or more, 3 inches or more, 2 inches or more, 1 inch or more, 0.5 inches or more, 0.1 inches or more, 0.04 inches or more, 50 feet or less, 40 feet or less, 20 feet or less, 20 feet or less, 10 feet or less, 4 feet or less, 2 feet or less, 100 inches or less, 10 inches or less, 5 inches or less, 1 inch or less, 0.1 inches or less, 0.04 inches or less away from the surface of the substrate.

Figure 5:
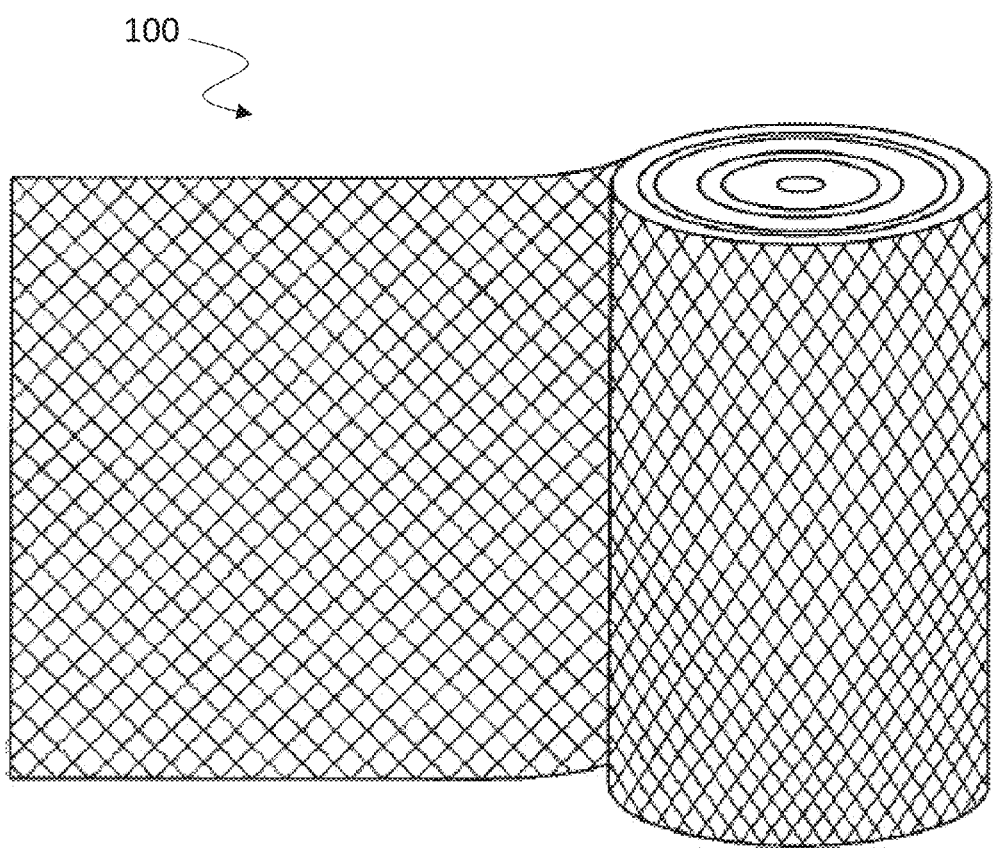
FIG. 5 depicts an exemplary rolled sheet fabric for use in various enclosure designs.

FIG. 5 depicts an exemplary fabric material 100 in a rolled sheet form, which can be used in a variety of ways to form various enclosures described herein. In this embodiment, the material desirably comprises a flexible fibrous material, in this case a fabric material, which can include natural fiber cloth as well as woven, knitted, felted, nonwoven and/or other structures of polyester or other synthetic fibers, and/or various combinations thereof. In various embodiments, the fabric may be utilized to construct the various enclosure embodiments described herein, and/or it may be possible and/or desirous to wrap or otherwise "cover" an elongated substrate with such rolled sheet material, especially where the unrolled and wrapped sheet may overlap other sheet sections (i.e., along a piling or support girder) which may create an "enclosure" comprising a progressively wrapped substrate wherein the fabric material is wrapped around the substrate in an overlapping "barber pole" or maypole-type technique or lining inner walls of water tank or irrigation pipes. In such a case, it may be desirous for the fabric to directly contact the protected substrate, with a very thin layer of liquid between the fabric enclosure walls and the substrate surface (as well as optionally the liquid within the fabric itself) constituting a "differentiated environment" as described herein.

In various alternative embodiments, the enclosure and/or component materials thereof may comprise a three-dimensional fabric matrix and/or fibrous matrix structure fashioned from interwoven and/or intertwined strands of thread formed in a lattice-like, mesh, mat or fenestrated fabric arrangement, which in various embodiments could incorporate one or more non-flat and/or non-smooth fabric layer(s). In one very simplified form, the enclosure could contain a plurality of horizontally positioned elements interwoven with a plurality of vertically positioned elements (as well as various combinations of other fiber elements aligned in various directions), which can include multiple separated and/or interwoven layers. The flexible materials may include one or more spaced apart layers, which may include baffles or various interconnecting sections. Desirably, each yarn or other thread element(s) in the enclosure material will include a preselected number of individual strands, with at least a portion of the strands extending outward from the thread core elements at various locations and/or directions, thereby creating a three-dimensional tortuous network of interwoven threads and thread strands in the fabric. In various embodiments, the various elements of the fibrous matrix may be arranged in virtually any orientation, including diagonally, or in a parallel fashion relative to each other, thereby forming right angles, or in virtually any other orientation, including three dimensional orientations and/or randomized distributions (i.e., felt matting) and/or patterns. In addition, while in some embodiments there may be a significant spacing between the individual elements, in other embodiments the spacing can be decreased to a much tighter pattern in order to form a tight pattern with little or no spacing in between. In various preferred embodiments, the elements, such as threads and/or fibers, may be made of natural or synthetic polymers, but could be made of other materials such as metals, nylons, cotton, or combinations thereof.

Various aspects of the present invention can include the use of a fibrous matrix and/or flexible material that is highly ciliated, which means that the material can include tendrils or hair-like appendages (i.e., fibers) projecting from its surface or into the pores or open spaces in the 3-dimensional flexible fabric that create a "filtering" media. The tendrils or hair-like appendages may be a portion of or incorporated into the material that makes up the 3-dimensional flexible filtering material. Alternatively, the tendrils or hair-like appendages may be formed from a separate composition adhered or attached to the flexible material. For example, the tendrils or hair-like appendages may be attached to and project from an adhesive layer, which is itself attached to the surface of the flexible material. In aspects of the invention, the tendrils or hair-like appendages may project from the surface of the enclosure material, while in other aspects the tendrils or hair-like appendages may extend inward from the enclosure materials and/or inwards towards and/or into other threads and/or fibers of the enclosure material fibrous matrix and/or fabric. In various aspects of the invention, the tendrils or hair-like appendages may be resilient and/or may vibrate and/or sway due to enclosure and/or water movement. In various embodiments, the combination of the ciliation itself and/or the movement of the tendrils or hair-like appendages may also discourage the settlement of biofouling organisms on or in the surface of the enclosure.

It is believed that the presence of numerous small fibers in the permeable material of an enclosure can provide a substantial increase in the complexity of the 3-dimensional structure of the material, as these structures can extend into and/or around open interstices in the woven pattern. This arrangement of fibers can further provide a more tortuous path for organisms trying to traverse the depth of the fabric and enter the internal environment protected by the enclosure (i.e., increasing the "filtering" effect of the material). In various embodiments, it has been determined that spun polyester has highly desirable characteristics as an enclosure material. In various embodiments, the shape and/or size of the 3-dimensional "entry paths" into the enclosure (i.e., as the microorganisms pass through the openings and/or pores of the material) will desirably provide a longer pathway, a larger surface area and/or prove more effective in filtering and/or impeding the flow of fouling organisms into the enclosure.

In various embodiments, the three-dimensional topography of the enclosure walls will desirably contribute to the anti-biofouling effects of the enclosure, in that such fabric construction can increase the "filtering effect" of the enclosure walls and/or could negatively affect the ability for various fouling organisms to "latch onto" the enclosure fabric and/or protected substrate. In other embodiments, however, enclosure walls and/or other components could comprise "flatter" and/or "smoother" materials such as textured yarn or other materials (and/or other material construction techniques) and still provide many of the anti-biofouling effects disclosed herein. While such materials may be significantly flatter, smoother and/or less-ciliated than materials incorporating spun polyester yarns, these materials may still provide an acceptable level of biofouling protection for a variety of applications.

A variety of materials that may be suitable to varying degrees for constructing the enclosure include various natural and synthetic materials, or combinations thereof. For example, burlap, jute, canvas, wool, cellulosics, silk, cotton, hemp, and muslin are non-limiting examples of possible useful natural materials. Useful synthetic materials can include, without limitation, the polymer classes of polyolefins (such as polyethylenes, ultra-high molecular weight polyethylenes, polypropylenes, copolymers, etc.), polyesters, nylons, polyurethanes, rayons, polyamides, polyacrylics, and epoxies. Fiberglass compositions of various types may also be used. Combinations of polymers and copolymers may also be useful. These three-dimensional flexible materials may be formed into textile structures, permeable sheets, or other configurations that provide a structure capable of providing the anti-fouling and/or filtering properties as described herein. Examples of potentially suitable flexible materials for use in constructing the enclosures described herein include, but are not limited to, burlap, canvas, cotton fabrics, linen, muslin, permeable polymeric sheets, fabrics constructed from polymeric fibers or filaments, and permeable films and membranes. In aspects of the invention, the flexible material may be selected from natural or synthetic fabrics, such as, burlap, knitted polyester or other fabrics, woven polyester or other fabrics, spun polyester or other fabrics, various combinations thereof, or other fabrics having a variety of characteristics, including those shown in FIGS. 19, 27A and 27B and Tables 3, 4A and 4B.

In various embodiments, the flexible material forming one or more walls of the enclosure may have a structure formed by intertwined fibers or bundles of fibers (i.e., yarns). As used herein, "intertwined" means the fibers may be non-woven, woven, braided, knitted, or otherwise intermingled to produce a fibrous matrix capable of various of the filtering and/or water permeability and/or water exchange features discussed herein. The matter in which the fibers are intertwined can desirably create a pattern of open and closed spaces in the 3-dimensional flexible material, the open spaces therein defining interstices. Desirably, the fibers that may make up the flexible material are, for example, single filaments, bundles of multiple filaments, filaments of a natural or a synthetic composition, or a combination of natural and synthetic compositions. In aspects of the invention, the fibers have an average diameter (or "average filament diameter") of: about 50 mils or less, about 25 mils or less, about 10 mils or less, about 6 mils or less, about 5 mils or less, about 4 mils or less, about 3 mils or less, about 2 mils or less, about 1 mil or less, about 0.5 mils or less, about 0.4 mils or less, about 0.3 mils or less, about 0.2 mils or less, or about 0.1 mils or less.

In some aspects of the invention, the flexible material could comprise a woven or knitted fabric. For example, the woven fabric may have picks per inch ("ppi" or weft yarns per inch) of from about 3 to about 150, from about 5 to about 100, from about 10 to about 50, from about 15 to about 25 from about 20 to about 40 and/or approximately 20 ppi. In other aspects of the invention, the woven fabric has ends per inch ("epi" or warp yarns per inch) of from about 3 to about 150, from about 5 to about 100, from about 10 to about 50, from about 15 to about 25, from about 20 to about 40 and/or approximately 20 epi or approximately 24 epi. In still other various other aspects of the invention, a knitted fabric may have courses per inch ("cpi") of from about 3 to about 120, from about 5 to about 100, from about 10 to about 50, from about 15 to about 25, from about 20 to about 40 and/or approximately 36 cpi or approximately 37 cpi. In even other aspects of the invention, the knitted fabric has wales per inch ("wpi") of from about 3 to about 80, from about 5 to about 60, from about 10 to about 50, from about 15 to about 25, from about 20 to about 40 and/or approximately 36 wpi or approximately 33.7 wpi.

Accordingly, in at least one aspect of the invention the woven fabric has a yarn size density (i.e., the weft multiplied by the warp yarns per unit area) of from about 9 to about 22,500, from about 100 to about 20,000, from about 500 to about 15,000, from about 1,000 to about 10,000, from about 2,500 to about 8,000, from about 4,000 to about 6,000, from about 2,500 to about 4,000, from about 5,000 to about 15,000, from about 10,000 to about 20,000, from about 8,000 to about 25,000, from about 20 to about 100, form about 30 to about 50, about 45, or about 40 yarns per square inch.

In another aspect of the present invention, the yarns of the woven or knit fabric have a size of from about 40 denier to 70 denier, about 40 denier to 100 denier, about 100 denier to about 3000 denier, about 500 to about 2500 denier, about 1000 to about 2250 denier, about 1100 denier, about 2150 denier, or about 2200 denier.

In still another aspect of the invention, the woven or knit fabric has a base weight per unit area from about 1 to about 24 ounces per square yard (about 34 to about 814 g/m2), from about 1 to about 15 ounces per square yard, from about 2 to about 20 ounces per square yard (about 68 to about 678 g/m2), from about 10 to about 16 ounces per square yard (about 339 to about 542 g/m2), about 12 ounces per square yard (about 407 g/m2), or about 7 ounces per square yard (about 237 g/m2), or about 3 ounces per square yard. In another aspect of the present invention, a desirable spun polyester fiber based woven fabric can be utilized as an enclosure material, with the fabric having a BASIS WEIGHT (weight of the base fabric before any coating or modifications are included) of approximately 410 Grams/Meter$^2$ (see Table 13)

In various exemplary embodiments, the thickness of a suitable enclosure or structure wall can range from 0.025 inches to 0.0575 inches or greater, with desirable enclosures being approximately 0.0205 inches thick, approximately 0.0319 inches thick, approximately 0.0482 inches thick and/or approximately 0.0571 inches thick. Depending upon the size of perforations and/or openings in the enclosure, as well as the shape, size and/or degree of tortuosity of the various opening in the enclosure, enclosures of greater and/or lesser thicknesses than those specifically described may be utilized in various enclosure designs with varying degrees of success and various enclosure materials. In various alternative embodiments, the flexible base materials, fibers and/or threads utilized in construction of the disclosed fibrous matrices may have a wide variation in thickness and/or length depending on the desired substrate to be protected or specific application. For example, in some aspects of the invention the thickness of the flexible material may be from about 0.001 to about 0.5 inch, from about 0.005 to about 0.25 inch, from about 0.01 to about 0.1 inch, about 0.02 inch, about 0.03 inch, about 0.04 inch, about 0.05 inch, or about 0.06 inch. Variations in thickness and in permeability within a single structure are contemplated, such as in membrane filtration structures, as well as multiple layers thereof.

It should be understood that a wide variety of materials and/or material combinations could be utilized as enclosure materials to accomplish various of the objectives described herein. For example, a film or similar material may be utilized as one alternative to a fabric enclosure wall material, which may include permeable and/or non-permeable films in some or all of the enclosure walls. Similarly, natural and synthetic materials such as rubbers, latex, thin metals, metal films and/or foils and/or plastics or ceramics might be utilized with varying results.

Figure 30:
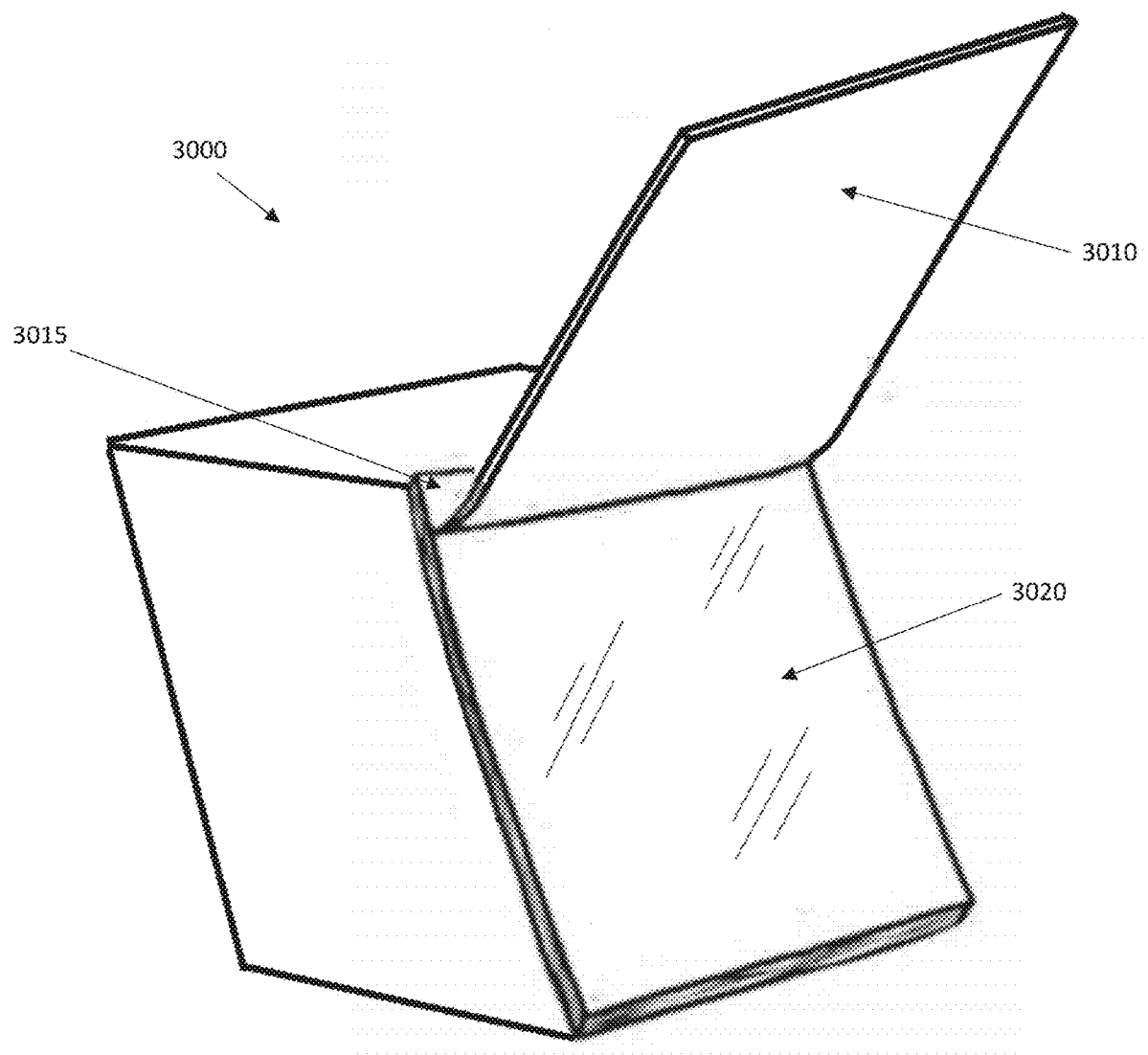
FIG. 30 depicts a perspective view of one exemplary embodiment of an enclosure for protecting a substrate from biofouling that incorporates a wall structure having a plurality of layers.

FIG. 30 depicts a perspective view of one exemplary embodiment of an enclosure 3000 for protecting a substrate from biofouling that incorporates a wall structure having a plurality of layers, which could include wall structures incorporating multiple layers having the same, similar or differing permeabilities in each layer, same, similar or different materials in each layer and/or same, similar or differing thicknesses in each layer. In another embodiment, layers may be spaced with minimal or no distance of spacing between each layer or a significant distance of spacing between each layer. If desired, a first overlayer 3010 could be removable, with removal of the first overlayer (which may include a "tear away" or other type of connection section 3015) the revealing an intact second underlayer 3020, and removal of the second underlayer revealing an intact third underlayer (not shown), etc., all surrounding the protected substrate. If desired, a first overlayer could be removable, with the remaining underlayer(s) left intact about the substrate, and then a replacement first overlayer could be positioned around the intact underlayer(s) and/or substrate, such as where the first overlayer may become sufficiently fouled to justify removal and/or replacement. Alternatively, the multiple over and/or underlayers could comprise a plurality of sacrificial layers, with each layer removed as it becomes sufficiently fouled, revealing a virgin or semi-virgin layer below (i.e., still surrounding and protecting the substrate). In some embodiments, the underlayers could remain in position about a substrate for an extended period of time, even 1, 2, 3, 4 and/or 5 years or more, with periodic removal, replacement, and/or refreshing of the exterior layer about the substrate and/or underlayer(s) as previously described (i.e., removal of a fouled layer and immediate and/or delayed replacement with a new overlayer). Such a system could have applications in salt, fresh and/or brackish water, if desired.

In various embodiment, enclosure designs can incorporate permeable walls of varying configuration, including (1) an enclosure that fully enclose a substrate (i.e., a "box" or "flexible bag" enclosure), (2) an enclosure having lateral walls that surround a periphery of a substrate (i.e., a "skirt" or "drape" that encloses the sides of the substrate, but which may have an open top and/or bottom), (3) an enclosure formed from modular walls that can be assembled around the substrate, which may incorporate various openings and/or missing modular sections (i.e., an "open geodesic dome" enclosure), (4) an enclosure that surrounds only a submerged portion of the substrate (i.e., a "floating bag" enclosure with open top), and/or (5) an enclosure that protects only a single side of a substrate (i.e., a "drape" enclosure), as well as many other potential enclosure designs. In addition, the enclosure walls could be relatively smooth or flat or curved and/or continuous, or the enclosure walls could comprise much more complex structures such as undulating surfaces, corrugated or accordion-like surfaces, folded, "crumpled" or "scrunched" surfaces and/or other features which can dramatically increase the surface area and/or potentially alter a filtering ability of the enclosure walls, if desired.

In various embodiments, an enclosure can incorporate one or more walls which comprise a 3-dimensional flexible filtering fabric including fibrous filaments and having an average base filament diameter of about 6 mils or less (i.e., 0.1524 millimeters or less). In various alternative embodiments, an enclosure material could comprise textured polyesters. In addition, a natural fiber material such as 80×80 burlap might be useful in protecting the substrate as an enclosure material, even if the natural material degrades relatively quickly in the aqueous environment and the underlying degradation process contributes to a significant measurable pH difference within the enclosure, which may be useful in various aqueous environments. If desired, various enclosure embodiments could incorporate degradable and/or hydrolysable materials and/or linkages (i.e., between components and/or along the polymer chains of the component materials) that allow the enclosure components to degrade after a certain time in the aqueous medium.

In various embodiments, the devices of the present invention will desirably provide a reduction, cessation and/or reversal of biofouling protection and/or the creation of a desired enclosed environment that deters settling of biofouling organisms and/or that is conducive to formation of a desired anti-fouling layer and/or biofilm on the substrate—i.e., initiating the creation of a desired local aquatic environment (i.e., the "differentiated environment") upon being deployed to influence the formation of an advantageous biofilm which results in decreased biofouling on the protected substrate or article. In various embodiments, this "differentiated environment" may be created within minutes or hours of enclosure deployment about a substrate, while in other embodiments it may take days, weeks or even months to create a desired "differentiated environment." If desired, an enclosure may be deployed long before a substrate is placed therein, while in other embodiments the enclosure can be deployed concurrently with the substrate or the enclosure can be deployed long after the substrate has been immersed and/or maintained in the aqueous environment. In various embodiments, the creation of significant water chemistry differences and/or other unique aspects of the differentiated environment may begin to be created within 1 hour of the enclosure being placed in the aqueous environment (which could include the enclosure being placed alone in the environment and/or in proximity to the substrate to be protected), while in other embodiments the initiation and/or creation of a desired differentiated environment (which may include creation of the complete differentiated environment as well as creation of various fouling inhibiting conditions which may alter and/or be supplemented as further aspects of the differentiated environment are induced) may require the enclosure to be in place about the substrate for at least 2 hours, at least 3 hours, at least 6 hours, at least 12 hours, at least 18 hours, at least 1 day at least 2 days, at least 3 days, at least 4 days, at least 5 days, at least 6 days, at least 1 week, at least 2 weeks, at least 3 weeks, at least 4 weeks, at least a month, at least 2 months, at least 3 months and/or at least 6 months or longer. In various embodiments, the various water chemistry differences which may be created in these various time periods may include dissolved oxygen, pH, total dissolved nitrogen, ammonium, ammoniacal nitrogen, nitrates, nitrites, orthophosphates, total dissolved phosphates, silica, salinity, temperature, turbidity, chlorophyll, etc.), the various concentrations of which may increase and/or decrease at differing times, including differing concentrations of individual constituents at different durations of enclosure immersion.

In some cases, the devices of the present invention may degrade and no longer provide a desired level of antifouling and/or environment creating effects after a certain period of time. In various embodiments, the amount of time until the enclosure loses its antifouling affect can vary based on numerous factors, including the particular aquatic environment, the season, the temperature, the makeup of marine organisms present, temperature, light, salinity, wind, water speed, etc. It should be noted that, based on the conditions of the aquatic environment, the enclosure may temporarily lose antifouling and/or environment creating effects, only to regain its antifouling/environment creating effect(s) when the conditions return to normal or to some desired measure. "Useful life," as used herein, can mean the amount of time from the deployment of the enclosure to the time when the level of macro-fouling becomes problematic on the substrate, while "enclosure life" can mean the amount of time the enclosure itself remains physically intact and effective around the substrate itself (which may be exceeded by the "useful life" of the biofouling protection provided by the enclosure). In various aspects of the present invention, one or both of the useful life and/or enclosure life of the enclosure can be: not less than 3 days, not less than 7 days, not less than 15 days, not less than 30 days, not less than 60 days, not less than 90 days, not less than 120 days, not less than 150 days, not less than 180 days, not less than 270 days, not less than 1 year, not less than 1.5 years, not less than 2 years, not less than 3 years, not less than 4 years, or not less than 5 years.

If desired, the enclosure or portions thereof could optionally be constructed of a degradable material, which could include biodegradable, photodegradable, oxidizable and/or hydrolysable materials, which desirably results in a decrease in molecular weight, reduction in mass, and/or reduced strength or durability of the enclosure (as well as other potential effects) or portions thereof over time under certain conditions. In various embodiments, the continued exposure to the aquatic environment by such materials may eventually result in detachment of the enclosure (or one or more layers thereof) from the substrate and/or environmentally friendly degradation of the enclosure and/or various constituents thereof. Such detachment could include detachment of the entire enclosure and/or detachment of different layers in a time-released and/or fouling extent (i.e., weight-based, drag-based and/or reduced wall flexibility) released manner.

Whichever type of materials are used, the enclosure may optionally be constructed such that the structure is formable to be capable of being expanded three-dimensionally, radially, longitudinally and/or various combinations thereof. This type of construction would desirably allow positioning over an object in a variety of configurations, which could include positioning such that the enclosure walls might mirror the contour of the surface of the object for which it is attached thereto, if desired. In some embodiments, the enclosure may be formed in a mirror shape of one or more surface of the substrate, and will generally be of at least slightly larger size to accommodate the substrate therein.

In some exemplary embodiments, an enclosure could be constructed of completely natural materials such as burlap or hemp, and deployed to protect substrates in particularly sensitive waters such as drinking water reservoirs and/or wildlife refuges, where the use of artificial materials and/or biocidal toxins may be prohibited and/or discouraged. In such a case, the enclosure would desirably provide protection to the underlying substrate for a desired period of time without posing a significant potential to pollute the water and/or harm the local aquatic environment, even if the enclosure becomes detached from the substrate and/or relevant supporting structure (as the additional opening(s) in the detached structure might now prevent the development of the protected aqueous environment and its attendant advantages). In such a case, once the substrate no longer requires protection, or where the enclosure becomes fouled and/or damaged for a variety of reasons, the enclosure could be removed and/or replaced with a new enclosure and/or enclosure components of similar materials, with fouling protection restored to the substrate as desired.

Enclosure Assembly

Figure 6A:
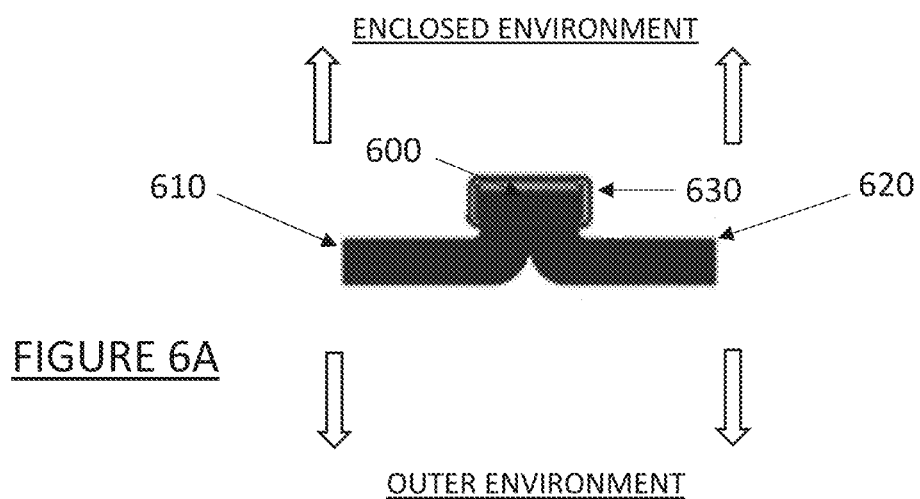
FIGS. 6A and 6B depict exemplary fabric stitching suited for employment in various enclosure designs.
Figure 6B:
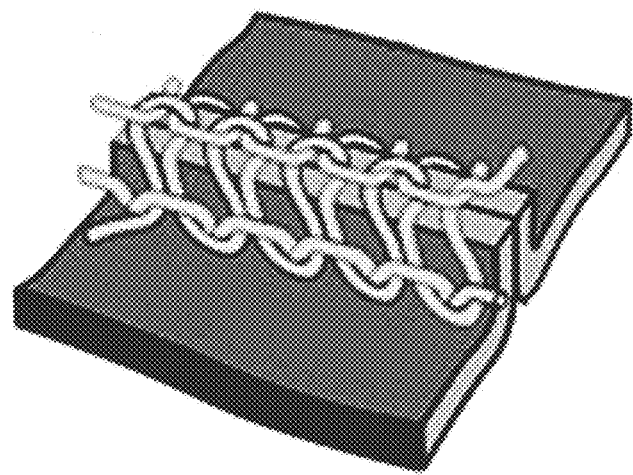

In various embodiments, an enclosure may be constructed in a single piece or may comprise multiple modular pieces that can be assembled in a variety of enclosure shapes. For example, an enclosure design can desirably comprise a plurality of wall structures, with each wall structure attached and/or assembled to one or more adjacent wall structures (if any) by stitching, weaving, hook and loop fasteners, Velcro, and/or the like, which may include the coating and/or encapsulation of any seams and/or stitched/adhered areas. FIGS. 6A and 6B depict exemplary stitching techniques that may be particularly well suited for use in constructing various enclosures of the present invention, wherein the threads 630 forming a seam 600 between a first fabric section 610 and an adjacent second fabric section 620 are positioned towards the differentiated (i.e., inner) environment, such that the threads and/or related irregular surfaces of the seam or overlapping fabric folds are desirably not exposed to the outer environment, and thus desirably do not provide an externally facing surface amenable to biofouling of the enclosure (although a slight crevice formed along the outer surface of the enclosure may not be optimal, but might be acceptable in various embodiments). Alternatively, other connecting techniques such as heat bonding, ultrasonic welding and/or other energy-based bonding techniques, gluing or adhesives, as well as other stitching and/or two-dimensional weaving/knitting techniques, may be utilized as desired. In other alternative embodiments, three-dimensional fabric forming techniques may be used to create a "tube" or bag of material for the enclosure which has no external facing seams on the sides and/or which only has one or more seams and/or openings at the top and/or bottom. In some particularly desirable embodiments, the attachment and/or adhering of various wall section of the enclosure will preferably be accomplished such that some level of flexibility in the attachment region is maintained.

In a similar manner, various embodiments of the enclosure will desirably incorporate permeable and/or flexible attachment mechanisms and/or closures, such that relatively hard, unbroken and/or impermeable surfaces will desirably not be presented externally to the surrounding aqueous environment by the enclosure. In many cases, biofouling entities may prefer a hard, unbroken surface for settlement and/or colonization, which can provide such entities a "foothold" for subsequent colonization on adjacent flexible fabric sections such as those of the enclosures described herein. By reducing the potential for such "foothold" locations, many of the disclosed enclosure designs can significantly improve the biofouling resistance of various of the disclosed embodiments and/or the substrate protection provided thereof. In at least one embodiment, an enclosure can be particularized for a substrate that is made as a single construction with no seams and/or no impermeable wall sections.

In the case of hook and loop or "Velcro" fasteners, the employment of such connecting devices may be particularly well suited for various enclosure embodiments, in that such fasteners can be permeable to the aqueous medium in a manner similar to the permeable enclosure walls. Such design features may allow liquid within the enclosure to elute through the fastener components and/or enclosure walls in a similar manner, thereby inhibiting fouling of the fastener surfaces as described herein. Alternatively, the connective "flap" of a flexible hook and loop fastener may be placed over a corresponding flexible or non-flexible attachment surface to provide additional protection to the attachment surface.

In various embodiments, the enclosure can incorporate one or more features that desirably reduce, mitigate, inhibit and/or prevent the effects of hydrostatic pressure from damaging the enclosure, various enclosure components, the protected substrate and/or any connected objects and/or anchoring systems. For example, much of the enclosure may desirably comprise a flexible fabric material, which desirably can mitigate, reduce and/or eliminate many of the effects of external water movement (i.e., currents, wave and/or tidal action) on the enclosure and/or components thereof (as compared to an inflexible, solid enclosure or enclosure wall). In a similar manner, the presence of perforations and/or the permeability of the enclosure walls desirably reduces and/or mitigates hydrostatic forces acting on various portions of the enclosure and/or support structures thereof, in that at least a portion of any hydrostatic effect will desirably "pass through" the enclosure (typically resulting in a desired level of fluid exchange between the enclosure and the surrounding aqueous environment) and other portions of the enclosure will flex, bend and/or "flap" in the moving water. Moreover, the employment of flexible, pliable cloth fabrics and/or other materials throughout much of the enclosure desirably reduces the potential for work hardening and/or fatigue failure of various enclosure components, increasing the durability and functional life of the enclosure. Accordingly, at least one exemplary embodiment of an enclosure can included one or more wall components (or the entirety of the enclosure design) that can move and/or flex with tidal, current and/or wave movement in the vicinity of the enclosure.

In various embodiments, fabric permeability may be affected and/or altered by a variety of techniques, including mechanical processing, such as by the use of piercing devices (i.e., needles, laser cutting, stretching to create micropores, etc.), abrading materials and/or the effects of pressure and/or vacuum (i.e., water and/or air jets), or chemical means (i.e., etching chemistry). In a similar manner, a low permeability fabric could be treated to desirably increase permeability of the fabric to within a desired range, while in other embodiments a higher permeability fabric could be modified (by using a paint, coating, clogging or clotting agent, for example) to lower permeability a desired amount.

In many embodiments, the type and/or level of permeability of a selected enclosure wall material or materials will be a significant consideration in the design and placement of the enclosure and/or various enclosure components. At the time of initial placement of the enclosure in the aqueous medium, the permeable material will desirably allow sufficient water exchange to occur between the open environment and the enclosed and/or bounded environment to allow the differentiated environment which protects against biofouling to form. However, because various fouling pressures and/or other factors can potentially alter and/or otherwise affect the permeability and/or porousness of a given enclosure wall material over time in the aqueous medium, it is often important that the permeable material continues to allow a desired level of water exchange that maintains the differentiated environment—and which also desirably avoids long term anoxia from occurring within some enclosure embodiments. In accordance with these concerns, it may be desirable to select a higher level of permeability for an enclosure wall material, such that clogging and/or closure of some of the pores in the material should not significantly affect the anti-fouling performance of the enclosure, even though the rate of water exchange may decrease, increase and/or remain the same at different time during the useful life of the enclosure.

Placement and Spacing

In use, an enclosure embodiment will desirably be applied around a substrate prior to immersion of the substrate in the aqueous medium. This could include the protection of an object before the object is initially immersed in the aqueous medium for the first time (i.e., an object's "virgin" immersion into the aqueous environment), as well as the protection of a previously immersed object that was removed from the aqueous medium and cleaned and/or descaled, with the enclosure applied to the object prior to subsequent immersion. In other embodiments, the enclosure may be applied to an object already immersed in the aqueous environment, including objects that may have been previously immersed for extended periods of time and/or already having significant amounts of biofouling thereupon. Once the enclosure is applied to the object, the enclosure can be secured in some manner around one or more exposed surfaces of the substrate, thereby partially and/or fully isolating the aqueous environment within the enclosure from the surrounding aqueous environment to varying degrees. It should also be understood that in various embodiments the enclosure may not "fully" enclose the substrate, such as where the enclosure may have relatively large gaps and/or openings therethrough. In such cases, the enclosure may still be sufficiently "closed" enough to create the desired environmental changes within the enclosure that reduce and/or prevent biofouling of the substrate and/or portions of the substrate as described herein.

Non-limiting examples of substrates include, but are not limited to, the surfaces of sport, commercial and military vessels, ships, vessels, and marine vehicles, such as, jet-skis; civilian boats, ships, vessels, and marine vehicles, such as, jet-skis; propulsion systems of boats, ships, vessels, and marine vehicles; drive systems of boats, ships, vessels, and marine vehicles and components thereof, such as stern drives, inboard drives, pod drives, jet drives, outboard drives, propellers, impellers, drive shafts, stern and bow thrusters, brackets, rudders, bearings; and housings; thrusters of boats, ships, vessels, and marine vehicles, such as, bow thrusters and stern thrusters; inlets of boats, ships, vessels, and marine vehicles, such as, cooling water inlets, HVAC water inlets, and propulsion system inlets; marina operations support equipment, such as, docks, slips, pilings, piers, rafts, floating paint platforms, floating scaffolding platforms, and floating winch and towing equipment platforms; binding and retention equipment, such as, anchors, ropes, chains, metal cables, mooring fixtures, synthetic fiber cables, and natural fiber cables; marine instrumentation, such as, pH measurement instruments, dissolved oxygen measurement instruments, salinity measurement instruments, temperature measurement instruments, seismic measurement instruments, and motion sensor instruments and associated arrays; mooring equipment, such as, anchor chains, anchor cables, attachment chains, attachment cables, mooring chains, mooring cables, fittings, floats, bollards, and associated attachments; buoys, such as, marker buoys, channel marker buoys, inlet marker buoys, diver buoys, and water depth indicator buoys; marine pilings, such as, wooden pilings, metal pilings, concrete dock pilings, wharf pilings, pier pilings, pilings for channel markers, and pilings for subsurface structures; marine subsurface structures, such as, seawalls, oil and gas rig exploration and production structures, municipal-use structures, commercial-use structures, and military-use structures; industrial filtration system equipment, such as, marine filtration systems, membrane filters, water inlet filters, piping and/or storage tanks; marine lifts and boat storage structures; irrigation water storage tanks and irrigation piping and/or equipment; and/or any portions thereof, including water management systems and/or system components, such as locks, dams, valves, flood gates and seawalls. Other mechanisms impacted by biofouling that may be addressed using the present disclosure include microelectrochemical drug delivery devices, papermaking and pulp industry machines, underwater instruments, fire protection system piping, and sprinkler system nozzles. Besides interfering with mechanisms, biofouling also occurs on the surfaces of living marine organisms, when it is known as epibiosis. Biofouling is also found in almost all circumstances where water-based liquids are in contact with other materials. Industrially important impacts are on the maintenance of mariculture, membrane systems (e.g., membrane bioreactors and reverse osmosis spiral wound membranes) and cooling water cycles of large industrial equipment and power stations. Biofouling can also occur in oil pipelines carrying oils with entrained water, especially those carrying used oils, cutting oils, oils rendered water-soluble through emulsification, and hydraulic oils.

In various embodiments, the substrate(s) to be protected may be a surface or subsurface portion made of any material, including but not limited to metal surfaces, fiberglass surfaces, PVC surfaces, plastic surfaces, rubber surfaces, wood surfaces, concrete surfaces, glass surfaces, ceramic surfaces, natural fabric surfaces, synthetic fabric surfaces and/or any combinations thereof.

Figure 7A:
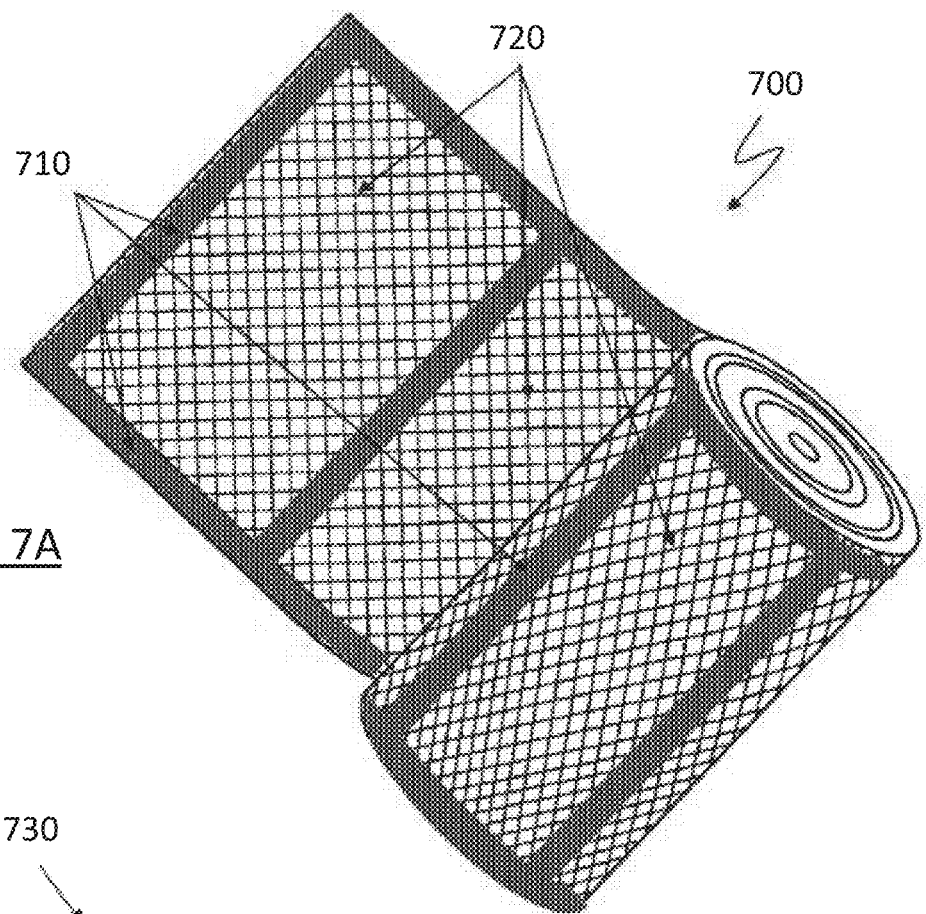
FIG. 7A depicts one exemplary embodiment of a rolled-up sheet fabric that incorporates adhesive, hook-and-loop fastener material.

FIG. 7A depicts one exemplary embodiment of a rolled-up sheet fabric 700 that incorporates adhesive, hook-and-loop fastener material 710 (and/or sewn seams) along various portions of the fabric, which can desirably self-adhere to other fabric portions, with the majority of the fabric comprising perforated or permeable portions 720 as described herein (and in various embodiments the fastener materials themselves could comprise permeable and/or non-permeable portions as well). If desired, a material flap covering some other fabric portion could be non-permeable and protect underlying structures.

Figure 7B:
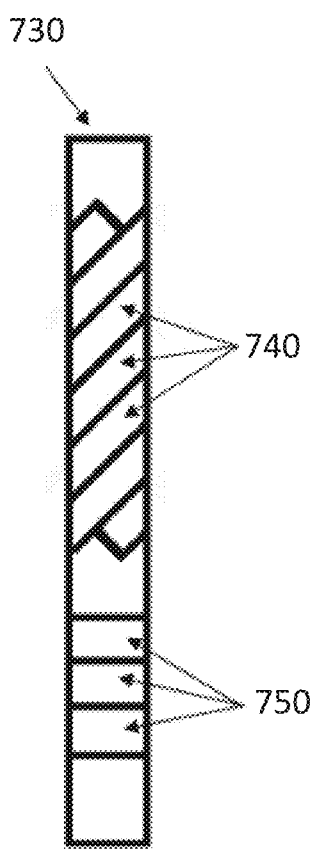
FIG. 7B depicts a progressively wrapped enclosure which incorporates the fabric of FIG. 7A.

In use, the fabric could be wrapped around a piling or support girder 730 (see FIG. 7B) to form an enclosure around some portion of the piling, which could include a progressive wrapping method 740 (i.e., a "barber-pole" type wrapping) or a circular wrapping method 750 (i.e., a "round-robin" type wrapping) to create various enclosures similar in function to those described herein, to protect various portions of the piling from biofouling organisms and/or other degradation. In various embodiments, attachment using hook and loop or similar fasteners may be particularly desirably, as such fastening techniques can be rendered permeable and allow water exchange therethrough in a manner similar to the various permeable materials described herein.

If desired, an enclosure may be constructed using individual components sections that can be assembled into a three-dimensional (3D) construct. For example, individual walls sections of an enclosure can be provided to be attached to each other in a variety of configurations, including triangular, square and/or other polygonal shapes. If desired, the wall sections could be supported by a relatively rigid underframe, or the sections could be highly flexible and/or provided on a roller or other carrier, which could be unrolled to release each individual section prior to assembly. In at least one alternative embodiment, an open enclosure frame or support could be provided, with an elongated sheet or enclosure wall material provided that could be wrapped around and/or overlain over the frame segments (and applied to the frame in a manner similar to "ship wrapping" of an object for shipment by common carrier, for example).

Table 1 depicts additional experimental results of microfouling experienced by various enclosure designs utilized in a seawater environment to protect various substrates, the enclosures incorporating a variety of fabrics wrapped around PVC piping, along with control substrates (i.e., PVC PIPE) in both coated and uncoated states (the coatings containing biocidal eluting components). After 240 days of immersion in sea water, the various enclosures successfully protected the underlying PVC pipe substrate from fouling, and were also highly successful in preventing biofouling entities from attaching on/into the fabric structure of the enclosure walls itself. These results were particularly impressive when compared to the amount and types of biofouling that accumulated on the uncoated control PIPE, as well as the significant amounts of fouling that attached to the pair of control PVC pipes that were directly painted/coated with biocide paints (WB Pnt Pipe and SB Pnt Pipe).

TABLE 1

% Biofouling of Various Substrates after 240 Days of Seawater Immersion.

| Panel | Macrofouling | Encrusting Bryozoan | Arborescent Bryozoan | Barnacle | Tube Worm | Sponge | Biofilm |
|---|---|---|---|---|---|---|---|
| WB10 | 1.33 | 0 | 1 | 0 | 0.33 | 0 | 16.67 |
| WB14 | 0 | 0 | 0 | 0 | 0 | 0 | 15 |
| WB17 | 0 | 0 | 0 | 0 | 0 | 0 | 18.33 |
| SB17 | 0 | 0 | 0 | 0 | 0 | 0 | 30 |
| WBDuk | 2 | 0 | 1 | 0.33 | 0.67 | 0 | 20 |
| SBDuk | 0 | 0 | 0 | 0 | 0 | 0 | 25 |

TABLE 1-continued

% Biofouling of Various Substrates after 240 Days of Seawater Immersion.

| Panel | Macrofouling | Encrusting Bryozoan | Arborescent Bryozoan | Barnacle | Tube Worm | Sponge | Biofilm |
|---|---|---|---|---|---|---|---|
| WB Pnt Pipe | 95 | 50 | 5 | 20 | 20 | 0 | 5 |
| SB Pnt Pipe | 25 | 10 | 10 | 0 | 5 | 0 | 75 |
| Unprotect | 93 | 11.33 | 0 | 28.33 | 1.67 | 51.67 | 7 |

Visual analysis of the above enclosures and related protected substrates after 240 days of water immersion revealed that all of the intact enclosures protected the substrates to a highly desirable level. Specifically, the exterior surfaces of the substrates within each of the enclosures were essentially unfouled, with most substrate surfaces having a light coating, if any, of easily removable sediment and/or residues, with some horizontal surfaces on the substrates developing deeper pockets of sediment deposits which were easily removable as well. In addition, the enclosures protecting each of the substrates were only lightly fouled on their external surfaces, with each enclosure still being generally flexible despite the light fouling cover. Significantly, all intact enclosures prevented macrofouling on the underlying PVC substrate. WB10 and WBDUK experienced some level of damage and/or degradation to the enclosure walls that allowed some fouling to access the test sections within the enclosures. Solvent-based biocidal coated enclosures were still in good condition with some edge fraying and tears at the edges after 240 days of immersion in salt water. After extended submersion, the water-based biocidal coated enclosures appeared to progressively become more fragile, with significant edge tearing and some holes in the bodies of the wraps. In contrast, significant fouling occurred on both of the pipes painted with solvent and water-based coating, although there was less fouling on the solvent-based coated pipe. The unprotected pipe was completely obscured under multiple layers of fouling, to a depth in some areas greater than the diameter of the pipe.

In the various examples of the above test where enclosures experienced unexpected openings, tears and/or were malpositioned, the underlying substrates experienced extremely light fouling on their external surfaces in areas proximate to the unexpected opening(s) and/or tear(s), with many "exposed" areas of the substrates having little or no fouling cover. In many cases it was unknown when the various enclosure failures occurred, although most "failure" areas would have exposed the relevant substrates to the environment for at least a month or longer. In these cases, it is believed that the initial placement of the enclosure caused and/or induced the formation of a "protective" biofilm layer on the surface of the substrate, and this biofilm layer subsequently protected the substrate from significant additional fouling after the integrity of the enclosure was violated and the substrate was directly exposed to the outside environment.

Water Exchange Rate

In various embodiments, an optimal, desired and/or average "water exchange rate" may be determined for protecting a given substrate in a given aqueous environment using a given enclosure design, which may include a range or ranges of desired water exchange rate(s) that may vary due to a wide range of water and/or other environmental conditions. For example, the desired water exchange rate may be optimized to protect a certain type and/or shape of substrate material, may be designed and/or particularized for a specific size, shape and/or volume of enclosure and/or enclosure wall material, may be designed and/or particularized for a specific region or depth of water, may be dependent upon seasonal variation and/or temperature and/or tidal activities, and/or may vary due to water salinity, dissolved oxygen, nutrients, wastes, water velocity, specific applications and/or a host of other considerations. In various embodiments, the water exchange rate will desirably be sufficient to generate a desired gradient in conditions between the external open environment and the internal environment within the enclosure (i.e., dissolved oxygen, wastes, available nutrients, etc.) to protect the underlying substrate surface from an undesirable level of biofouling without creating conditions that could unacceptably damage the substrate—for example, avoiding the detrimental effects of anoxic conditions (i.e., approximately 0.5 mg/L or lower dissolved oxygen levels in some embodiments) over an extended period of time that may lead to unacceptable levels of substrate corrosion.

In various embodiments, it will be highly desirable to allow a metered inflow of "open" environmental water to induce the desirable water chemistry changes within the enclosure (which can include a desired concentration of metabolic wastes and/or detrimental, inhibitory and/or toxic byproducts within the enclosure), and a metered outflow of enclosure water such that the various detrimental compounds—including various known and/or unknown microbial "toxins" and/or inhibitory compounds—and/or other water chemistry factors may elute through the enclosure walls and protect the external surfaces and/or pores of the enclosure from excessive fouling (which in some embodiments and waterflow conditions may create a "cloud" of such compounds which substantially surrounds some or all of the enclosure's outer walls). In these embodiments, the presence of the enclosure may provide biofouling protection to both the substrate and the enclosure walls to differing degrees, even in the absence of a supplemental biocide or other fouling protective toxin supplementally provided to the enclosure. For example, when various enclosure embodiments are placed around a substrate and creates the disclosed differentiated environment, this differentiated environment may also develop an increased concentrations of a variety of metabolic wastes, and the various processes and/or metabolic activities occurring within the enclosure may generate one or more substances (such as hydrogen sulfide or $NH_3$—N, for example) having a detrimental and/or negative effect on fouling organisms. These detrimental compounds can then increase in concentration, and reside in and/or elute through the walls of the enclosure, potentially creating a localized "cloud" of detrimental compounds that protects the outer walls of the enclosure from fouling organism to some degree. However, once the detrimental compounds leave the enclosure, these detrimental compounds quickly become diluted and/or broken down by various natural processes-many of which utilize the abundant dissolved oxygen outside of the enclosure-thus obviating any concern about the longer-term effects of these substances. In addition, because the processes creating these detrimental compounds within the enclosure are continuous and/or periodic, the enclosure can potentially generate a renewed supply of these compounds at a relatively constant level on an indefinite basis.

In various embodiments, a desired water exchange rate of at least 0.5% (inclusive) of the total water volume within the enclosure per minute that is exchanged between a protective enclosure and the surrounding aqueous environment can provide a wide variety of the anti-fouling and/or anti-corrosive effects for a protected substrate as described herein, although exchange rates of less than, equal to and/or greater than 0.5% per minute can desirably provide various anti-fouling and/or anti-corrosive benefits such as described herein. This exchange rate can optionally be determined as an average rate over a specific period of time, such as per minute, per hour, per day and/or per week, as well as during periods of water movement and/or non-movement such as slack water and/or during a tidal ebb or flow). In other embodiments, a desired water exchange rate of up to 5% of the total water volume within the enclosure per minute that is exchanged between a protective enclosure and the surrounding aqueous environment can provide a wide variety of the anti-fouling and/or anti-corrosive effects for a protected substrate as described herein, although exchange rates of less than, equal to and/or greater than 5% per minute can desirably provide various anti-fouling and/or anti-corrosive benefits such as described herein.

In one exemplary embodiment, an enclosure allowing a water exchange rate of approximately 0.417% of the enclosed or bounded water volume per minute (i.e., approximately 25% of the total enclosed or bounded volume per hour) has been shown to provide superior biofouling resistance to a substrate. The enclosed or bounded water volume within an exemplary enclosure can be calculated as the total enclosed or bounded volume of the enclosure minus the volume of the substrate within the enclosure. In other embodiments, the water exchange rate can be approximately 25% of the total enclosed or bounded volume of the enclosure per hour, without accounting for the volume of the substrate within the enclosure.

In various embodiments, a water exchange rate of less than 0.1% per minute may provide a desired level of antifouling and/or anti-corrosive effects, while in other embodiments a desired water exchange rate of at or between 0.1% to 1% of the total water volume per minute may be effective. In other embodiments, a water exchange rate of 1% to 5% of the total water volume may provide a desired level of antifouling and/or anti-corrosive effects, while in other embodiments a desired water exchange rate of 5% to 10% of the total water volume per minute may be effective In other embodiments, the desired exchange rate could range from 1% to 99% of the total water volume per minute, from 5% to 95% of the total water volume per minute, from 10% to 90% of the total water volume per minute, from 15% to 85% of the total water volume per minute, from 25% to 75% of the total water volume per minute, from 30% to 70% of the total water volume per minute, from 40% to 60% of the total water volume per minute, or approximately 50% of the total water volume per minute. In other embodiments, the water exchange rate can vary from 10% to 50% or from 10% to 15%, from 15% to 25%, and/or from 25% to 50% per minute, or various combinations thereof (i.e., 1% to 10% per minute or 5% to 25% per minute, etc.). In various embodiments, such water exchange rates can be obtained in enclosures using the various permeable fabrics disclosed in FIG. 19 and Table 3 (below).

It should also be understood that, where local water conditions provide higher velocities of water flow on and/or away from the enclosure and/or where the enclosure may be subject to movement (i.e., by being attached to a moving and/or moveable object, for example), a lower permeability of the enclosure material may be more desirous in that the higher velocity water contacting and/or impacting upon the enclosure wall(s) may cause a sufficiently larger quantity of liquid to permeate through the fibrous matrix and/or permeable fabric than would normally occur in relatively quiescent waters, thereby causing the desired rate of water exchange to provide biofouling protection as described herein. In a similar manner, where local water conditions provide lower velocities of water flow on and/or away from the enclosure, a higher permeability of the enclosure material may be more desirous in that the lower velocity water contacting and/or impacting upon the enclosure wall(s) may cause a sufficiently lesser quantity of liquid to permeate through the fibrous matrix and/or permeable fabric than would normally occur in more active waters, thereby causing the desired rate of water exchange to provide biofouling protection as described herein.

TABLE 2

Exemplary Surface Area to Volume Ratios

| | Enclosure | | | Surface | Volume | Enclosure Surface Area: Volume Ratio (feet²) | | | |
|---|---|---|---|---|---|---|---|---|---|
| Protected Substrate | Length (feet) | Width (feet) | Depth (feet) | Area (feet²) | Volume (feet³) | Volume with no Substrate | Volume with 50% Substrate | Volume with 95% Substrate | Volume with 99% Substrate |
| Underwater sensor | | | | 3.1 | 0.4 | 8.0 | 16.0 | 160.0 | 800.0 |
| Boat Stern | 4.0 | 3.0 | 3.0 | 54.0 | 36.0 | 1.5 | 3.0 | 30.0 | 150.0 |
| 18" Pump | 1.5 | 1.5 | 1.5 | 11.3 | 3.4 | 3.3 | 6.7 | 66.7 | 333.3 |
| 50' Boat | 50.0 | 12.0 | 5.0 | 1220.0 | 3000.0 | 0.4 | 0.8 | 8.1 | 40.7 |

In various embodiments, it may be desirous to employ an enclosure design which contains sufficient amounts and/or volumes of the "aqueous medium" to allow the described differentiation of the enclosed environment to occur, and which also contains a sufficient "reservoir" of fluid to allow the "build up" of sufficient concentrations of toxic and/or detrimental chemicals and/or compounds to maintain a desired concentration of such chemicals/compounds during periods of desired water exchange. In some instances, the enclosed volume of the aqueous medium (i.e., water) within the enclosure may be a multiple of the volume of the enclosed substrate, especially for relatively smaller substrates such as sensors and/or water intakes, while in some other embodiments the enclosed volume of the aqueous medium within the enclosure may be a fraction of and/or equal to the volume of the enclosed substrate (i.e., for ship hulls and/or other large structures in some cases). In various embodiments, a surface to volume ratio may be utilized to describe various enclosure designs, which can include three exemplary enclosure embodiments having surface to volume ratio ranging from 0.4 to 800 inverse feet, such as a pumping cube enclosure design having a 0.4 inverse foot or less surface to volume ratio, a boat hull enclosure design (for a 50 foot or longer vessel) having an 800 inverse foot or greater surface to volume ratio, and a stern mimic enclosure design having a 350 inverse foot (or lesser or greater) surface to volume ratio, as shown in Table 2.

In other embodiments, an enclosure may be designed having a specific surface area ratio and/or ratio range as compared to a surface area of the enclosed substrate, which can greatly vary depending upon the enclosure design and/or the surface texture and/or fully or partially submerged and/or other features of the substrate. For example, a given enclosure design and/or size may be utilized to protect a generally smooth surface of a substrate and a more complex substrate surface (i.e., a valve and/or propeller), with the surface area ratio being approximately 1:1 or 1.1:1 for the enclosure/smooth substrate or approximately 1:2 or greater for the enclosure/complex substrate. In a similar manner, a complex enclosure design may have a ratio of 1.1:1 or greater to a less complex substrate. In various embodiments, the enclosure will have a surface area ratio ranging from 1:1.1 to 1.1:1 for a given protected substrate, and this range can expand to 1:2 to 2:1 or greater in both directions for varying degrees of substrate and/or enclosure complexity. In general, the enclosure design is expected to be at least slightly larger than the substrate (to enclosure some volume of water) and the enclosure surface features are expected to be somewhat less complex than the substrate surface features, so in many embodiments the surface area ratio of the enclosure to the substrate will approximate 1:1 or 2:1 or 3:1 or 10:1 or 50:1 or 100:1 or higher. In other embodiments, the surface area of the enclosure design is expected to be less than the surface area of the substrate. This could occur when the substrate is only partially submerged, whether the substrate is submerged 1%, 5%, 10%, 20%, 25%, 50%, 60%, 75%, 80%, 95%, 99% or less. In some embodiments the surface area ratio of the enclosure to the substrate will approximate 1:1 or 1:2 or 1:3 or 1:10 or 1:50 or 1:100 or lower.

Permeability

One important aspect of the various enclosure embodiments disclosed herein is the incorporation of permeable elements, components and/or structures into some and/or all of the enclosure components, which allow some bulk transport of water into and/or out of the enclosure in a controlled manner and/or rate. Desirably, the material or materials selected for the enclosure will include one or more walled structures having a level of permeability that allows for some level of "bulk fluid exchange" between the enclosure and the surrounding aqueous environment. This permeability will desirably be optimized and/or suited to the local environment within which the enclosure will be placed, although in general the enclosure may incorporate a low to moderate level of permeability, as enclosure materials with very high permeabilities may be somewhat less effective at altering the water chemistry within the enclosure and/or limiting or reducing biofouling on the protected article, while enclosure materials with exceptionally low or no permeability (or that may become very low in permeability over time for many reasons, including due to fouling on and/or in the textile surface) may lead to an unacceptably low level of liquid exchange through the walls of the fabric, which could lead to various substrate corrosion or other issues resulting from a low oxygen level (i.e., anoxic or other conditions) or other chemical levels within the protected environment. In various locations and/or environmental conditions (including various changes in seasons and/or weather patterns), greater or lesser permeabilities or other enclosure design changes may be desirous. In many cases, the local environmental conditions (i.e., water flow, temperature, bio-floral type, growing season, salinity, available nutrients and/or oxygen, pollutants, etc.) and/or local water conditions/velocity (i.e., due to currents and/or tides) could affect the desired permeability and/or other design considerations—for example, the impingement of higher velocity liquids on an enclosure may create an increased water exchange rate for a given permeability of material, which may require or suggest the use of a lower permeability material in such conditions.

In various embodiments, the enclosure can desirably inhibit biofouling on a substrate or substrate portion at least partially submerged in an aquatic environment, with the enclosure including a material which is or becomes water permeable during use, said enclosure adapted to receive said substrate and form a differentiated aquatic environment which extends from a surface of the substrate to at least an interior/exterior surface of the structure, wherein said structure or portions thereof has a water permeability, upon positioning the structure about the substrate or thereafter, of about 100 milliliters of water per second per square centimeter of substrate or less. In various embodiments, water permeability of the structure may be achieved by forming the structure to allow water to permeate there through, such as by manufacturing a textile to have a desired permeability. In some embodiments, the structure may be designed to become water permeable over time as it is used. For example, an otherwise water permeable structure may include a coating that initially makes it substantially non-permeable (which impermeability may be particularly useful in "jump starting" a desired low-oxygen condition within the enclosure immediately after initial placement), but as the coating ablates, erodes, or dissolves, the underlying permeability increases and/or becomes useful (which can allow oxygenated water to permeate through into the enclosure and help prevent unwanted sustained anoxic conditions from occurring within the enclosure after the low-oxygen condition has been attained).

In various embodiments, an optimal and/or desired permeability level for an enclosure fabric can approximate any of the fabric permeabilities identified in Table 3 (below), and in some embodiments can include permeabilities ranging from 100 ml/s/cm$^2$ to 0.01 ml/s/sm$^2$. In various alternative embodiments, a fabric or other permeable material may be utilized in or on one or more walls of the enclosure, including materials having a permeability range from 0.06 ml/s/cm$^2$ to 46.71 ml/s/cm$^2$, or from 0.07 ml/s/cm$^2$ to 46.22 ml/s/cm$^2$, or from 0.08 ml/s/cm$^2$ to 43.08 ml/s/cm$^2$, or from 0.11 ml/s/cm$^2$ to 42.54 ml/s/cm$^2$, or from 0.13 ml/s/cm$^2$ to 42.04 ml/s/cm$^2$, or from 0.18 ml/s/cm$^2$ to 40.55 ml/s/cm$^2$, or from 0.19 ml/s/cm$^2$ to 29.08 ml/s/cm$^2$, or from 0.32 ml/s/cm$^2$ to 28.16 ml/s/cm$^2$, or from 0.48 ml/s/cm$^2$ to 25.41 ml/s/cm$^2$, or from 0.50 ml/s/cm$^2$ to 22.30 ml/s/cm$^2$, or from 0.77 ml/s/cm$^2$ to 21.97 ml/s/cm$^2$, or from 0.79 ml/s/cm$^2$ to 20.46 ml/s/cm$^2$, or from 0.83 ml/s/cm$^2$ to 15.79 ml/s/cm$^2$, or from 0.90 ml/s/cm$^2$ to 14.72 ml/s/cm$^2$, or from 1.05 ml/s/cm$^2$ to 14.19 ml/s/cm$^2$, or from 1.08 ml/s/cm$^2$ to 14.04 ml/s/cm², or from 1.11 ml/s/cm² to 13.91 ml/s/cm², or from 1.65 ml/s/cm² to 11.27 ml/s/cm², or from 2.09 ml/s/cm² to 11.10 ml/s/cm², or from 2.25 ml/s/cm² to 10.17 ml/s/cm², or from 2.29 ml/s/cm² to 9.43 ml/s/cm², or from 2.36 ml/s/cm² to 9.20 ml/s/cm², or from 2.43 ml/s/cm² to 9.02 ml/s/cm², or from 2.47 ml/s/cm² to 8.24 ml/s/cm², or from 2.57 ml/s/cm² to 8.16 ml/s/cm², or from 2.77 ml/s/cm² to 8.11 ml/s/cm², or from 3.68 ml/s/cm² to 6.04 ml/s/cm², or from 3.84 ml/s/cm² to 5.99 ml/s/cm², or from 4.43 ml/s/cm² to 5.40 ml/s/cm², and/or from 4.70 ml/s/cm² to 4.77 ml/s/cm².

In various embodiments, an optimal and/or desired water exchange rate between the differentiate environment within the enclosure and the open environment can range from about 0.1% to about 500% per hour, or from about 0.1% to about 400%, or from about 0.1% to about 350%, or from about 20% to about 375%, or from about 0.1% to about 100%, or from about 0.1% to about 250%, or from about 20% to about 500%, or from about 50% to about 200%, or from about 100% to about 200%, or from about 0.1% to about 20%, or from about 100% to about 200%, or from about 25% to about 200%, or from about 25% to about 100%, or from about 10% to about 75%, or from about 25% to about 275%, or from about 100% to about 500%, or from about 100% to about 250%, or from about 50% to about 150%, or from about 75% to about 200%, or from about 20% to about 350%, or from about 50% to about 100%, or from about 0.2% to about 120% per hour, or from about 0.2% to about 20% per hour, or from about 20% to about 50% per hour, or approximately 25% of the volume per hour.

Where an enclosure is being utilized to protect a substrate, such as disclosed herein, the biological colonizing sequence on the substrate will significantly vary from the normally expected, open water sequence. For example, where an enclosure such as described herein is utilized, the biological colonizing sequence on the substrate may be interrupted (disrupted, altered, etc.) to reduce and/or minimize the settlement, recruitment and ultimate macrofouling of the substrate. Once positioned around or inside (if protecting inner surface of a substrate) the substrate, the permeable, protective fabric walls of the enclosure can desirably filter and/or impede the passage of various micro- and/or macro-organisms into the enclosure, and the different water conditions created between the enclosure walls and the substrate can prevent some and/or all of the organisms from settling on and/or colonizing the substrate if they are already located within the enclosure and/or if they ultimately pass through the enclosure. For example, when microscopic plankton and other traditional non-settling organisms and other settling organisms transit a permeable fabric membrane of an enclosure, the different water conditions within the enclosure may impair or injure some of the plankton, while other plankton which remain alive and active will avoid settling and/or colonizing the substrate surface.

In various embodiments, an apparatus by which the permeability of candidate materials can be assessed in the laboratory can be prepared, such as a water column pressure test apparatus commonly known to those of ordinary skill in the art. For example, an exemplary test apparatus can utilize a pump to supply water from a reservoir to a column of water of a specific height with a test sample inserted onto the bottom of the column. There can optionally be an overflow integrated into the design so that the height of the water in the column desirably remained constant, if desired. The test sample size can be varied, as desired. In one test setup, the water in a column above a 4"×4" fabric coupon can remain constant at a height of approximately 3 inches, providing a 0.25 PSI "head" pressure. The permeability of each fabric coupon can then be calculated by measuring the volume of water per unit time per unit area exposed to the water column. If desired, the material could be tested in a pre-wetted condition, while in other tests the material could be dried prior to initiation of the test. In at least one exemplary embodiment, using a dried sample with the permeability testing, it was observed that water did not flow through the testing apparatus evenly for accurate measurements.

TABLE 3

Exemplary Wall Fabric Permeabilities

| Fabric | Coating | Average Permeability (ml/s/cm2) |
|---|---|---|
| 1/64 Poly | Un | 43.08 |
| | SW | 42.04 |
| | HC | 28.16 |
| 23 × 17 | Un | 8.11 |
| | SW | 0.83 |
| | HC | 1.65 |
| 23 × 23 | Un | 0.79 |
| | SW | 0.18 |
| | HC | 0.08 |
| 61588 | Un | 20.46 |
| | SW | 2.29 |
| | HC | 0.50 |
| 61598 | Un | 25.41 |
| | SW | 0.19 |
| | HC | 2.57 |
| 900d | Un | 14.04 |
| | SW | 0.07 |
| | HC | 8.24 |
| 6/1 Poly | Un | 40.55 |
| | SW | 29.08 |
| | HC | 22.30 |
| A21 | Un | 46.71 |
| | SW | 46.22 |
| | HC | 42.54 |
| Text | Un | 11.10 |
| | 40 MB | 14.19 |
| | 50 MB | 13.91 |
| Spun Poly | Un | 10.17 |
| | SW | 0.32 |
| | HC | 1.08 |
| | MB(out) | 2.47 |
| | MB(in) | 2.09 |
| | 154-30-v | 9.20 |
| | 154-30-nv | 0.90 |
| | 154-40-v | 11.27 |
| | 154-40-nv | 0.77 |
| | 153-30-v | 9.02 |
| | 153-30-nv | 2.36 |
| | 153-40-v | 9.43 |
| | 153-40-nv | 1.11 |
| 60 × 60 Bur | Un | 21.97 |
| | SW | 14.72 |
| | HC | 4.43 |
| 60 × 70 Bur | Un | 15.79 |
| | SW | 5.99 |
| | HC | 3.68 |
| 80 × 80 Bur | Un | 8.16 |
| | SW | 2.77 |
| | HC | 0.48 |
| | SW(HVY) | 2.25 |
| | HC(HVY) | 0.06 |
| | MR(HVY) | 0.11 |
| | MB(HVY) | 0.13 |
| Poly | 152 | 2.43 |
| | 9696-7W | 5.40 |
| | 9696-7C | 4.77 |
| | 9696-7M | 4.70 |
| | 154-40/25 | 1.05 |
| | 10311803 | 3.84 |
| | 03061907 | 6.04 |

Tables 4A and 4B depict experimental permeability results for various fabrics and coated fabrics for pre-immersion conditions and after immersion for 23 days in an aqueous environment (i.e., seawater). From Table 5B, it can be seen that the permeability of the Burlap test sample was significantly lower than that of Spun Polyester. However, both Burlap and Spun Polyester performed somewhat similarly as anti-foulant fabrics, at least in part by exclusion of larger larval macro organisms from the environment of the substrate. In various instances, fabric permeability may decrease as function of time related to surface fouling and/or other fabric degradation. One significant result of this test is that spun polyester may be a more preferred material over Burlap (which may be less preferred, but still acceptable for various applications), due to degradation and/or other properties of Burlap, as well as production difficulties that may present with various natural fibers such as delousing, cleaning, sterilization and/or contamination of production equipment (i.e., natural fibers may require more extensive and frequent equipment cleaning during processing than synthetic materials).

TABLE 4A

Sample Pre-Immersion Permeabilities of Coated/Uncoated Fabrics

| Name | Description | Average Permeability (ml/s/cm$^2$) |
|---|---|---|
| 80 | 80 × 80 Burlap uncoated | 8.16 |
| SB80 | 80 × 80 Burlap coated | 2.77 |
| WB80 | 80 × 80 Burlap coated | 0.48 |
| SPUN | 100% Spun poly uncoated | 10.17 |
| SBSPUN | 100% Spun poly coated | 0.32 |
| WBSPUN | 100% Spun poly coated | 1.08 |

TABLE 4B

Permeabilities of Coated/Uncoated Fabrics 23 Days Post Immersion (Sea Water)

| Name | Description | Average Permeability (ml/s/cm$^2$) |
|---|---|---|
| SPUN | Uncoated Spun Polyester | 10.16 |
| SPUN SB | Spun Polyester | 0.32 |
| SPUN WB | Spun Polyester | 1.07 |
| 80 | Uncoated 80 × 80 Burlap | 8.16 |
| 80SB | 80 × 80 Burlap | 2.76 |
| 80WB | 80 × 80 Burlap | 0.47 |

The water permeability of a material can be a function of numerous factors, including the composition of the material, the method and type of construction of the material, whether the material is coated or uncoated, whether the material is dry, wet, or saturated, whether the material is itself fouled in some manner and/or whether the fabric has been "pre-wetted" prior to testing and/or use in the aqueous environment. Moreover, because permeability of a given material may alter over time, even for a single material there may be a range of acceptable and/or optimal water permeabilities. In various aspects of the present invention, the water permeability of the enclosure may be an initial minimum permeability sufficient to desirably avoid the creation of a constant anoxia condition in the local (i.e. protected within the enclosure) aquatic environment, while in other embodiments the permeability may be greater. In various aspects of the invention, the enclosure material has a water permeability (milliliters of water per second per square centimeter of substrate) as measured by the above test method, either prior to use or achieved during use of: about 100 or less, about 90 or less, about 80 or less, about 70 or less, about 60 or less, about 50 or less, about 40 or less, about 30 or less, about 25 or less, about 20 or less, about 10 or less, about 5 or less, about 4 of or less, about 3 or less, about 2 or less, about 1 or less, about 0.5 or less, about 0.1 or less, about 1 or greater, about 0.5 or greater, about 0.1 or greater, from about 0.1 to about 100, from about 0.1 to about 90, from about 0.1 to about 80, from about 0.1 to about 70, from about 0.1 to about 60, from about 0.1 to about 50, from about 0.1 to about 40, from about 0.1 to about 30, from about 0.1 to about 25, from about 0.1 to about 20, from about 0.1 to about 10, from about 0.1 to about 5, from about 0.5 to about 100, from about 0.5 to about 90, from about 0.5 to about 80, from about 0.5 to about 70, from about 0.5 to about 60, from about 0.5 to about 50, from about 0.5 to about 40, from about 0.5 to about 30, from about 0.5 to about 25, from about 0.5 to about 20, from about 0.5 to about 10, from about 0.5 to about 5, from about 1 to about 100, from about 1 to about 90, from about 1 to about 80, from about 1 to about 70, from about 1 to about 60, from about 1 to about 50, from about 1 to about 40, from about 1 to about 30, from about 1 to about 25, from about 1 to about 20, from about 1 to about 10, or from about 1 to about 5.

Dissolved Oxygen

In various embodiments, the placement of an enclosure within the aqueous medium about a substrate will desirably "modulate" the dissolved oxygen and create a dissolved oxygen differential between waters of the inside and outside of the enclosure, which desirably provides a significant improvement in preventing fouling of the protected article. In many cases, dissolved oxygen modulation of the differentiated environment can encompass the creation of a meaningfully lower dissolved oxygen level within the enclosure versus the external environment, with this dissolved oxygen level within the enclosure fluctuating by varying degrees in response to internal oxygen consumption and external dissolved oxygen levels. In addition, a secondary gradient between the dissolved oxygen of the "bulk water" within the differentiated environment and the dissolved oxygen in the water within a "boundary layer" at the surface of the protected substrate or article may also exist, at least in part due to the lower energy environment within the enclosure compared to the external environment and/or the absence of significant turbulence and/or eddy flow currents that can "mix" the water within the enclosure. These localized differential conditions may be caused by the consumption of oxygen and/or nutrients by organisms and/or other factors at the substrate's or article's surface and/or in the water column within the enclosure, which can lead to a further depleted "boundary layer" that contributes to the lack of biofouling and/or creation of an anti-fouling biofilm on the protected article.

In general, 100% DO ("dissolved oxygen") means that the water contains as much dissolved oxygen molecules as possible at equilibrium, while over 100% DO means the water is "super-saturated" with oxygen (which can occur often in seawater due to the effects of photosynthesis, atmospheric exchange and/or temperature changes). At equilibrium, the proportion of each gas in the water may approximate, but is rarely identical to, the proportion of each gas in the atmosphere. Thus, at equilibrium the percentage of oxygen in the water (compared to the other gases in the water) may be equivalent to the percentage of oxygen in the atmosphere (compared to the other gases in the atmosphere). However, the specific concentration of dissolved oxygen in a body of water will typically vary based on temperature, pressure, salinity and other factors such as the availability of photosynthesis and/or surface agitation. First, the solubility of oxygen decreases as temperature increases. Thus, warmer water contains less dissolved oxygen at 100% saturation than does cooler water, and cooler water can therefore carry more oxygen. For example, at sea level and 4° C., 100% air-saturated water would hold 10.92 mg/L of dissolved oxygen. But if the temperature were raised to room temperature, 21° C., there would only be 8.68 mg/L DO at 100% air saturation. Second, dissolved oxygen increases as pressure increases. Deeper water can hold more dissolved oxygen than shallow water. Gas saturation decreases by 10% per meter increase in depth due to hydrostatic pressure. Thus, if the concentration of dissolved oxygen is at 100% air saturation at the surface, it would only be at 70% air saturation three meters below the surface even though there would still be the same amount of oxygen available for biological demand. Third, dissolved oxygen decreases exponentially as salt levels increase. Accordingly, at the same pressure and temperature, saltwater holds about 20% less dissolved oxygen than freshwater. In addition, the dissolved oxygen at any specific time may not be at equilibrium with the environment because the factors above have changed (for example, the air or water temperature may vary over the course of the day) and equilibrium may not yet have been achieved. Moreover, wind and other agitation of the water may lead to aeration of the water beyond that expected under ambient conditions, and local oxygen usage and/or production by biologic and/or other processes can continually increase or decrease the amount of dissolved oxygen.

In various embodiments, once an enclosure as described herein is placed about a substrate in an aqueous environment, the dissolved oxygen in the enclosure will desirably be utilized by various naturally occurring biologic and/or other processes such that the localized levels of dissolved oxygen within the enclosure begin to change relative to the levels of dissolved oxygen in the water outside of the enclosure. Because osmotic transport of dissolved oxygen occurs very slowly in water, and because there typically is little to no sunlight energy streaming into the enclosure to permit oxygen production via photosynthesis, the primary source of additional dissolved oxygen into the enclosure generally comes from bulk transport of water outside of the enclosure (which typically carries dissolved oxygen at a higher percentage) into the enclosure through openings in the enclosure walls and other components. This additional dissolved oxygen is then utilized within the enclosure in a similar manner as previously described, with this cycle continually repeating, until the dissolved oxygen levels within the enclosure typically reach a steady level, which is generally above anoxic levels but is also significantly lower than oxygen levels outside of the enclosure.

Exemplary Dissolved Oxygen Measuring Protocol

In determining the dissolved oxygen content of a given region, as well as differences between two aqueous regions, dissolved oxygen (DO) sensing probes can be utilized. For continuous monitoring, individual probes may be preferable to bundled sensor packages, largely in part due to the way that DO values are determined from the collected measurements.

For various measurements, a DO sensor will collect a reading or readings, which can be then processed against readings from other sensor types to output usable values. DO concentrations, such as mg/L, may then require reference to a salinity/temperature data file. DO percent saturation measurements may require an atmospheric pressure data file in addition to the salinity/temperature file. All sensors can be calibrated within an acceptable tolerance level, and it is highly unlikely that any two sensors will ever hold an identical calibration. This calibration variability is one reason why individual probes are likely to yield better results than bundled sensors.

When a group of sensor readings are all processed with the same temperature, salinity and pressure files, the DO data generated is directly comparable. Conversely, each sensor bundle typically processes its raw data internally. The inherent variability of each probe in such a case may be compounded as the data is calculated. This can lead to a larger margin of error when comparing sensor bundles than when comparing individual DO probes. To further aid confidence, the calibration of all the DO probes should be compared.

New probes and recently serviced probes (such as sensor face replacement etc.) should be calibrated according to the manufacturer specifications. All of the DO probes for which readings may be compared (along with the temperature/salinity gauge) and should be placed in a bucket or other container of water. The water should be bubbled or pumped to maintain uniform water flow, and the probes should be evenly distributed. The pressure sensor should be in close proximity. Once processed, data collected in this way is likely to show any significant variability among the probes. This comparison should be conducted at the beginning and end of the sensors' deployments.

In one exemplary method, utilizing HOBO brand water quality monitoring probes, a use may (1) Install sensor caps and conduct both 100% and 0% calibrations for all U26-001 DO loggers according to manufacturer's specifications. (if desired, launch details can be set at this time), (2) Determine the appropriate logging interval, (3) for deployments greater than 1 day, sample every 0.5 hrs.—for shorter deployments more frequent sampling may be desirable, (4) in order to synchronize data, all loggers should be set to sample at the same interval and utilizing the delayed start function, should be set to start at the same time and data, (5) consider performing a "Bucket Comparison" when setting the start time, (6) launch the Pressure Sensor (U20L water level logger), Temperature/Salinity Sensor (U24-002-C conductivity logger) and all DO. Sensors (U26-001 dissolved oxygen logger) according to manufacturer's specifications, (7) prepare all sensors and test fixtures for the deployment, (8) offload the sensor data just before deployment to eliminate extraneous data, (9) deploy all sensors, (10) remember that sensors that are deployed for open water readings (as well as those that are not adequately protected from macrofouling) will need to be maintained to avoid data drift associated with macrofouling (depending on location and season this can be as frequently as every other day, but typically every few days is sufficient for tropical and subtropical regions—the goal is to gently wipe the slime layer off the logger, especially the sensor face, before macrofouling can form-removing macrofouling from the sensor face can damage the coating on optical sensors-if possible, having two sensors alternating in and out of the water on a twice weekly schedule with a gentle wipe down before each re-deployment is very effective—these two data sets must then be combined to create one continuous open water data set-when the loggers are swapped out, offload the data to the waterproof shuttle. This will give one "in water" data set and one "out of water" data set from each swap out-which can simply combine the "in water" data to create the desired data set—and choose the two loggers with the closest calibration results from the "bucket test" for the open water data), (11) offload sensor data at appropriate intervals—for long term deployments monthly data retrieval is sufficient, (12) process the data using the dissolved oxygen assistant in HOBOware Pro or other suitable software—for combining large data sets in excel, the import comma delimited data assistant is very efficient, and (13) if the experiment has run its course, or the loggers may be brought in for sensor face replacement (every 6 months per manufacturer spec.) conduct the "Bucket Comparison" for calibration confidence and save results for future reference.

Bucket Comparison

If desired, a comparison of sensors can be conducted, which can be used to confirm calibration confidence and save results for future reference. Some of the steps for such comparison can include: (1) place DO Loggers and Conductivity Logger in a 5-gallon plastic bucket ½ full of water at least 15 minutes prior to the first sampling interval, (2) keep the pressure sensor in the vicinity of the bucket for the duration of the test, (3) evenly distribute the sensors in the bucket, (4) place an air-stone in the center and middle of the water column to generate water movement for the duration of the test, (5) allow test to run for at least 24 hours, (6) offload the data from the loggers using the waterproof shuttle (U-DTW-1) or similar device according to manufacturer's specifications, (7) process the data using the dissolved oxygen assistant in HOBOware Pro or equivalent software—i.e., open a DO data set with HOBOware pro—choose process data with dissolved oxygen assistant—specify the conductivity file to use—specify the pressure file to use—once data set has been generated export to an excel file for processing and comparison-complete the processing for all the DO loggers and combine the data from the excel files to compare the calibrations).

Figure 8B:
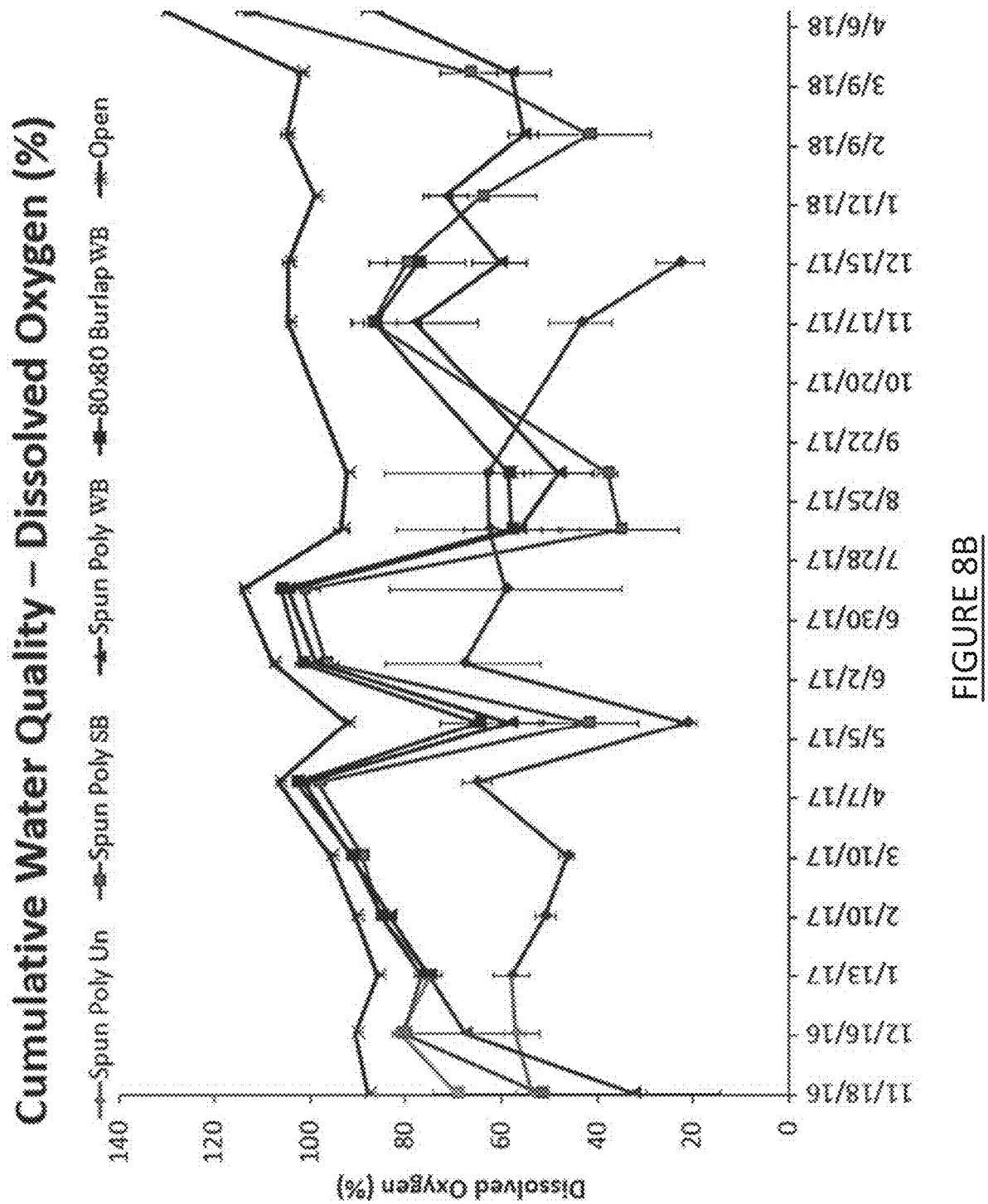
Figure 9:
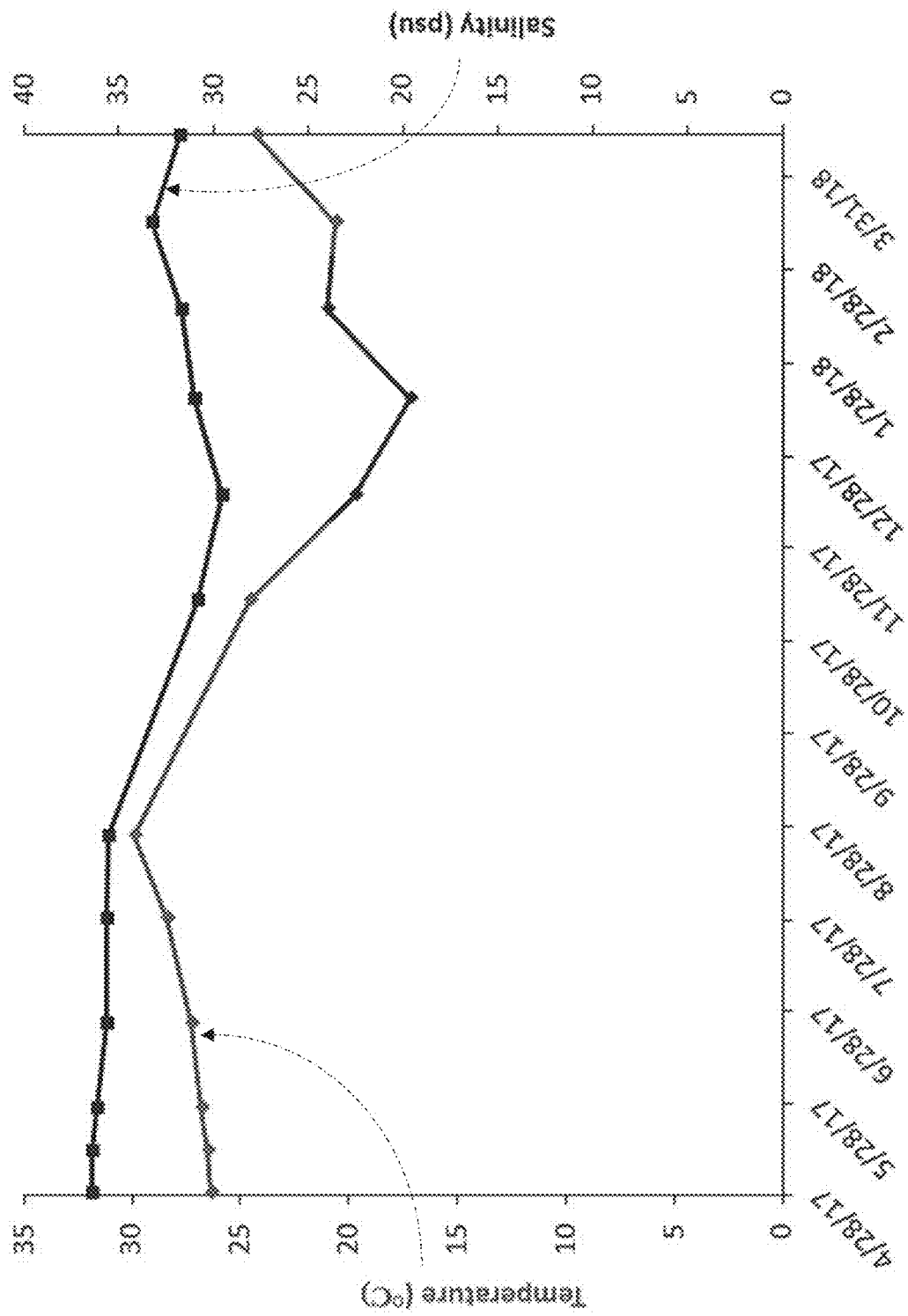
FIG. 9 depicts some water chemistry factors inside of enclosures which remained the same or similar to those of the surrounding aqueous environment.
Figure 13:
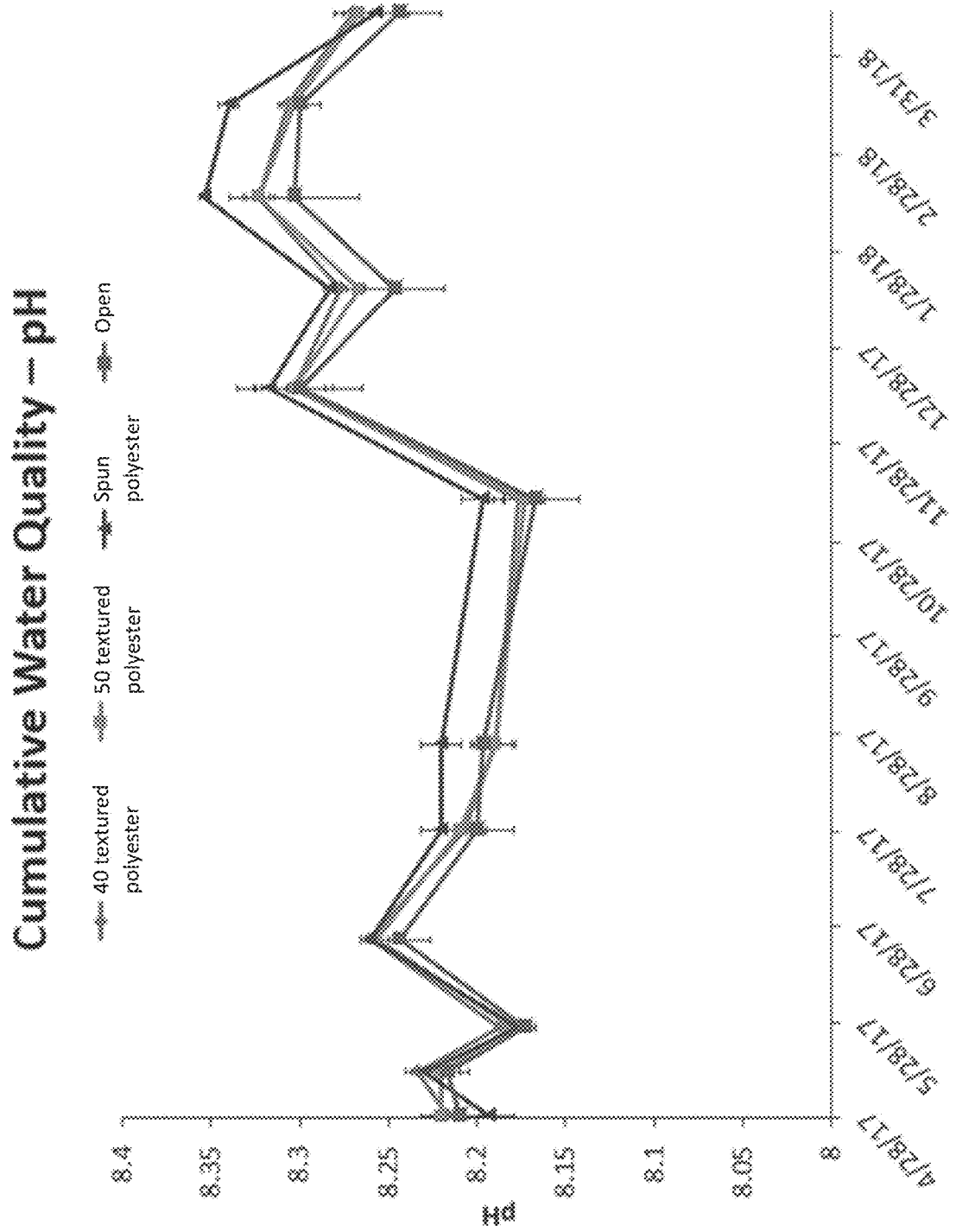
FIG. 13 depicts a pH water chemistry factor inside of various enclosures which remained somewhat similar to those of the surrounding aqueous environment.

FIGS. 8A and 8B graphically depict exemplary dissolved oxygen levels in various test enclosures as compared to those of the surrounding aqueous environment (i.e., the "open" reading). In these embodiments, the dissolved oxygen level is consistently lower in the enclosures than the open reading for each of the enclosures, thereby creating a "different environment" than the surrounding aqueous environment. However, because the various enclosures allowed various levels of "fluid exchange" with the external aqueous environment, many other characteristics of the overall water quality within the enclosures (including pH, temperature and salinity) were the same or similar to those of the surrounding aqueous environment (see FIGS. 9 and 13).

During a 24-hour period, the oxygen levels outside of the enclosure will typically fluctuate in a diurnal fashion, such as shown in FIG. 10A, with higher levels of dissolved oxygen occurring during the daytime (lighter regions of the graph) due to photosynthesis, and dissolved oxygen levels dropping during periods of darkness (shaded regions of the graph). Within the enclosure, the levels of dissolved oxygen over the same 24-hour period will typically fluctuate in a similar fashion as the levels outside of the enclosure, because the quantity of "dissolved oxygen replacement" which enters the enclosure via bulk fluid transport will change depending upon outside dissolved oxygen levels. Moreover, because the replacement dissolved oxygen enters the enclosure proximate to the walls of the enclosure, and there is often limited bulk movement and/or mixing of water within the enclosure, causing a gradient of higher to lower dissolved oxygen to typically be present between the enclosure walls and the surface of the protected substrate.

As seen in FIGS. 10A and 10B, the enclosures described herein can desirably control, mitigate and/or "smooth" the level(s) of dissolved oxygen in the differentiated aqueous environment (i.e., proximate to the protected substrate) as compared to the DO levels of water in the surrounding open aqueous environment. In many instances, the DO levels within the enclosure will desirably be lower than the DO levels of the surrounding aqueous environment (see FIGS. 8A, 8B, 10A and 10B), although the differentiated DO levels may periodically exceed the DO levels of the surrounding open aqueous environment in some embodiments and/or some conditions. In addition, the enclosures described herein will desirably maintain the differentiated DO levels above anoxic DO levels, although periodic and/or intermittent differentiated DO levels falling within the anoxic range may be acceptable in various situations, including situations where the anoxic period is short enough to allow little or no anoxic corrosion of the substrate to occur.

In various embodiments, a dissolved oxygen level of 0.5 mg/L or less can be considered undesirable and/or "anoxic" conditions, while dissolved oxygen levels of approximately 2 mg/L (or less) being capable of causing significant negative effects to an aqueous organism's ability to colonize, thrive and/or reproduce in an aqueous environment.

In many cases, a significant change in the dissolved oxygen content of a given aqueous environment can provoke a quick response from many organisms, with a downward change in DO levels being one of the parameters to which organisms respond the fastest. The broad classification of bacteria or other organisms as anaerobic, aerobic, or facultative is typically based on the types of reactions they employ to generate energy for growth and other activities. In their metabolism of energy-containing compounds, aerobes require molecular oxygen as a terminal electron acceptor and typically cannot grow in its absence. Anaerobes, on the other hand, typically cannot grow in the presence of oxygen-oxygen is toxic for them, and they must therefore depend on other substances as electron acceptors. Their metabolism frequently is a fermentative type in which they reduce available organic compounds to various end products such as organic acids and alcohols. The facultative organisms are the most versatile. They preferentially utilize oxygen as a terminal electron acceptor, but also can metabolize in the absence of oxygen by reducing other compounds. For example, much more usable energy, in the form of high-energy phosphate, is obtained when a molecule of glucose is completely catabolized to carbon dioxide and water in the presence of oxygen (38 molecules of ATP) than when it is only partially catabolized by a fermentative process in the absence of oxygen (2 molecules of ATP). In some cases, a reduction in DO levels within an enclosure may prompt an organism to alter its rate and/or type of metabolic pathways, which may include adaptation to the new DO levels, while other organisms may simply enter a stasis state and/or die. Where an enclosure environment has an undesirably low level of DO, organisms will generally seek another environment with higher DO levels to settle (and/or may seek to abandon a lower DO environment), as remaining within the lower DO environment of the enclosure can negatively affect settlement ability and/or can cause various health issues and/or death if the organisms does not find an increased DO environment.

In various embodiments, an optimal and/or desired level of DO within the enclosure could be a DO content of at least an average of 20% or greater, or at least an average of 50% or greater, or at least an average of 70% or greater, or within a range of an average of 20% to 100%, or within a range of an average of 33% to 67%, or within a range of an average of 50% to 90%, or within a range of an average of 70% to 80%. Alternatively, a desired level of DO within the enclosure could be a DO content of at least an average of 10% less than a level of dissolved oxygen in water detected some distance from the outside of the enclosure (i.e., at 1 or 2 or 5 or 10 or 12 inches, or 2 or 5 or 10 feet away from the enclosure).

In various embodiments, the modulation of dissolved oxygen within the enclosure will induce a dissolved oxygen differential of at least 10% between the differentiated environment within the enclosure and the open aqueous environment outside of the enclosure. In various embodiments, this differential may occur within/after a few hours after the enclosure is placed within the aqueous medium, or it may occur within 2 to 3 hours, 6 hours, 12 hours, 1 day, 2 days, 3 days, 4 days, 5 days, 6 days, 1 week, 2 week or even within a month after enclosure placement. In various alternative embodiments, a desired dissolved oxygen differential of at least 5%, at least 10%, at least 15%, at least 20%, at least 25%, at least 50%, at least 70% and/or at least 90% or greater will be created.

In many cases, the Dissolved Oxygen levels within a given enclosure will be depleted by biologic and/or other processes, with the maintenance of Dissolved Oxygen levels within various enclosure designs potentially dependent upon the influx of dissolved oxygen from the surrounding aqueous environment (when such DO levels are higher than the DO levels within the enclosure) through the walls of the enclosure-which may also occur at some level via diffusion through the wall structure itself as well as accompanying the bulk transfer of water via the permeable enclosure walls. The structures and methods described herein desirably provide an enclosure having an adequate level of "water exchange" to provide sufficient water flow (and/or dissolved oxygen flow) into and/or through the structure in order to avoid the creation of an anoxic environment within the enclosure for an extended period of time, which could lead to the corrosion of metal surfaces, but also desirably creating a local aquatic environment and/or biofilm coating on the substrate that minimizes and/or prevents aquatic organisms from settling and/or thriving on the substrate. In particular, the devices of the invention will desirably provide a permeability level that is intended to maintain dissolved oxygen (DO) levels within the differentiated aquatic environment (i.e., around the object to be protected) at levels that are "different" than DO level(s) of the surrounding aqueous environment.

In one exemplary embodiment shown in FIG. 10A, the open aquatic environment DO levels range from approximately 90% to approximately 150% DO, while the DO levels of the differentiated aquatic environment (i.e., containing the substrate to be protected) ranged from about 50% to about 110% DO—which in this embodiment inhibited the ability of various organisms to foul the substrate (which is believed to substantially inhibit and/or prevent their ability to thrive and/or colonize), and which did not "dip" for an extended period of time to DO levels where anoxia might occur and promote corrosion on the substrate (although periodic anoxic conditions for relatively shorter time periods may have occurred and may have been acceptable for a variety of reasons). In various embodiments, including those shown in FIGS. 10A through 10D, the presence of the enclosure may also mediate, "smooth out" or "buffer" the natural spikes and/or dips that may occur in the dissolved oxygen levels of the surrounding aqueous environment, which may further prevent and/or inhibit aquatic organisms from settling and/or thriving on the protected substrate.

In at least one alternative embodiment, an enclosure design could include wall material that may be permeable to one or more water chemistry factors, such as dissolved oxygen (i.e., by diffusion and/or osmotic transport) while not facilitating transport or passage of one or more other factors, chemicals and/or even the water itself, which might allow a sufficient level of oxygen (or other chemistry factor) to penetrate the enclosure to create some or all of the water chemistry differences described herein. Such an alternative design may have some potential to create various of the biofouling improvements disclosed herein.

In various other alternative embodiments, particular enclosure designs could include features to supplement various water chemistry components (such as dissolved oxygen, for example) within the enclosure to obtain a desired fouling protection. For example, an enclosure having walls that are somewhat less permeable than an optimal level may include a supplemental source of dissolved oxygen, which could be utilized to maintain dissolved oxygen levels within the enclosure above an undesired anoxic level. Alternatively, one embodiment of an enclosure could include a supplemental fluid supply pump or even an externally mounted "propeller" which can be activated to induce additional fluid outside of the enclosure to pass through and/or into the enclosure, thereby providing additional supplemental dissolved oxygen and/or waste removal from the enclosure, with the pump/propeller actuated and/or deactivated on a periodic basis and/or based on various measurements of water chemistry factors taken within the enclosure, which could include water chemistry factors directly influenced by the design and placement of the enclosure, as well as water chemistry factor changes that may result from one or more water chemistry factors directly altered by the presence of the enclosure. Alternatively, a supplemental pump and/or pumping system could be utilized to pump water directly into and/or out of the enclosed or bounded body of water without said water passing through the permeable enclosure walls.

Figure 31:
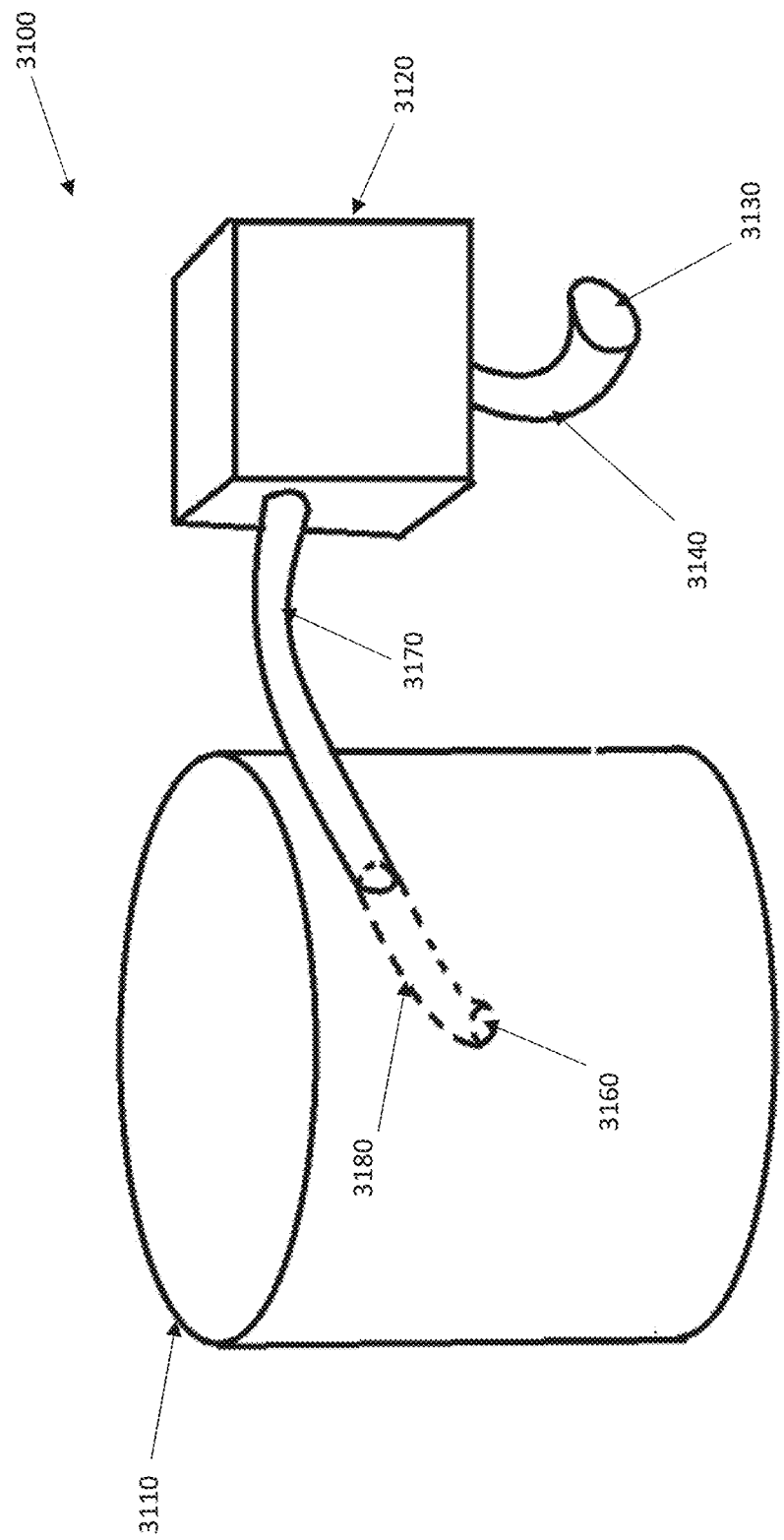
FIG. 31 depicts an alternative embodiment of an enclosure and supplemental pumping system.

FIG. 31 depicts one exemplary embodiment of an aqueous flow mechanism of a supplemental pumping system 3100 for adding and/or removing aqueous liquids and/or other materials or substances to/from the enclosed environment within an enclosure 3110. In this embodiment, the enclosure includes an outer wall or boundary, which in some embodiments may comprise one or more permeable walls, and in other embodiments may comprise one or more semi-permeable and/or non-permeable walls (which in some embodiments may include some or all walls of the enclosure being non-permeable). A pumping mechanism 3120 with a flow cavity or intake 3130 and intake tube 3140 can be provided, with the pump further including an outlet 3160 and outlet tube or flow cavity or flow path tube 3170 extending from an outlet of the pump, through at least one wall of the enclosure, and through/into the aqueous environment within the enclosure. In various embodiments, at least some flow cavity portion 3180 of the outlet tube can extend some distance within the enclosure, with the outlet potentially positioned proximate and/or distal from a protected substrate (not shown) and/or one or more enclosure walls of the enclosure. During use, the pumping mechanism may be activated to supply outside water into the enclosure in a desired manner, and/or the pump operation may be reversed to draw water from the enclosure to be released in the environment outside of the enclosure. Alternatively, the pumping mechanism could be utilized to supply additional oxygen or other water chemistry factors to the enclosed environment. If desired, some or all of the pumping mechanism and/or flow cavity and/or intake 3130 could be positioned within the enclosure, or alternatively within and/or through some portion of the enclosure walls, or could be positioned outside of the enclosure, if desired. In another embodiment, the aqueous flow mechanism may be a propeller system, petal system, flow pipes, flow canals, or flow tunnels that may be used in a similar manner to move water or create desired flow characteristics as the pump system.

In place of and/or in addition to a reduction of the dissolved oxygen levels in the water contained in the enclosure, a wide variety of other water chemistry factors may be affected by the design and placement of the enclosure embodiments described herein, including water chemistry factors which may significantly retard and/or prevent fouling of a protected substrate. For example, when oxygen is depleted within an enclosure, some species of naturally occurring bacteria within the enclosure will typically first turn to a second-best electron acceptor, which in sea water is nitrate. Denitrification will occur, and the nitrate will be consumed rather rapidly. After reducing some other minor elements, these bacteria eventually turn to reducing sulfate, which results in the byproduct of hydrogen sulfide ($H_2S$), a chemical toxic to most biota and responsible for a characteristic "rotten egg" smell. This elevated level of hydrogen sulfide within the enclosure, among other chemicals, can then inhibit fouling of the substrate in a desired manner as described herein. Moreover, the hydrogen sulfide within the enclosure can also elute through the walls of the enclosure (i.e., with bulk flow of water out of the enclosure) and potentially inhibit fouling growth in the pores of and/or on the external surfaces of the enclosure.

In addition to creating localized conditions that inhibit fouling of a protected substrate contained within an enclosure, the various embodiments of enclosures described herein are also extremely environmentally friendly, in that any toxic and/or inhospitable conditions created within the enclosure are quickly neutralized outside of the enclosures. For example, when 1 ml of fluid enters the enclosure through an opening, it can be assumed that approximately 1 ml of enclosure fluid will be displaced outside of the enclosure to the external environment. This displaced fluid will typically contain components that are toxic and/or inhospitable to marine life (which desirably reduce and/or prevent fouling from attaching to the substrate within the enclosure). Once outside the enclosure, however, these components are quickly degraded, oxidized, neutralized, metabolized and/or diluted in the external aqueous environment by a wide variety of naturally-occurring mechanisms, which generally cause no lasting effect on the aquatic environment, even in close proximity to the enclosure itself. This is highly preferable to existing antifouling devices and/or paints that incorporate high levels of biocides and/or other agents, some of which are highly toxic to many forms of life (including fish and humans and/or other mammals), and which can persist for decades in the marine environment.

In various alternative embodiments, the enclosure walls may incorporate a supplemental biocide or other chemical(s) or compound(s) that can inhibit and/or prevent fouling on the surface and/or within the pores of the enclosure. In various embodiments, the biocide or other chemical(s)/compound(s) can be applied and/or incorporated such that the primary biocidal activity is limited to the surface of enclosure fabric and/or within the pores, with extremely low and/or nonexistent levels of biocide elution into and/or outside of the enclosure. In such a case, the biocide will desirably protect the enclosure from fouling, while the enclosure in turn protects the substrate from fouling.

A variety of test enclosure designs were highly effective in providing biofouling protection to substrates under a variety of daily and/or seasonal water conditions. For instance, an enclosure incorporating permeable fabric walls of spun polyester with a biocide coating was immersed in seawater, and dissolved oxygen levels of the aqueous environments within and outside of the enclosure were measured and tabulated. FIG. 10A depicts a frequent sampling (i.e., every 15 minutes) of dissolved oxygen levels during a three-day period in the spring/early summer, which exhibited a diurnal variation of dissolved oxygen in and outside of the enclosure (i.e., the light and dark areas reflect day and night). In this Figure, it can be seen that the level of dissolved oxygen within the enclosure typically lagged or "followed" (i.e., at a lower level) the dissolved oxygen levels of the outside aqueous environment during the day and night sequence, and the in-enclosure DO appeared "smoother" or more buffered than the outside environment DO. In contrast, FIG. 10B depicts a similar sampling of dissolved oxygen levels during a three-day period in the late summer/early fall, where the level of dissolved oxygen within the enclosure could often equal or exceed that of the surrounding environment, and wherein the enclosure provided a "buffer" to the DO level. In all cases, the enclosures were successful in limiting and/or preventing biofouling of the protected substrate, even though the relative levels of dissolved oxygen within and/or without the enclosures had changed.

Figure 11:
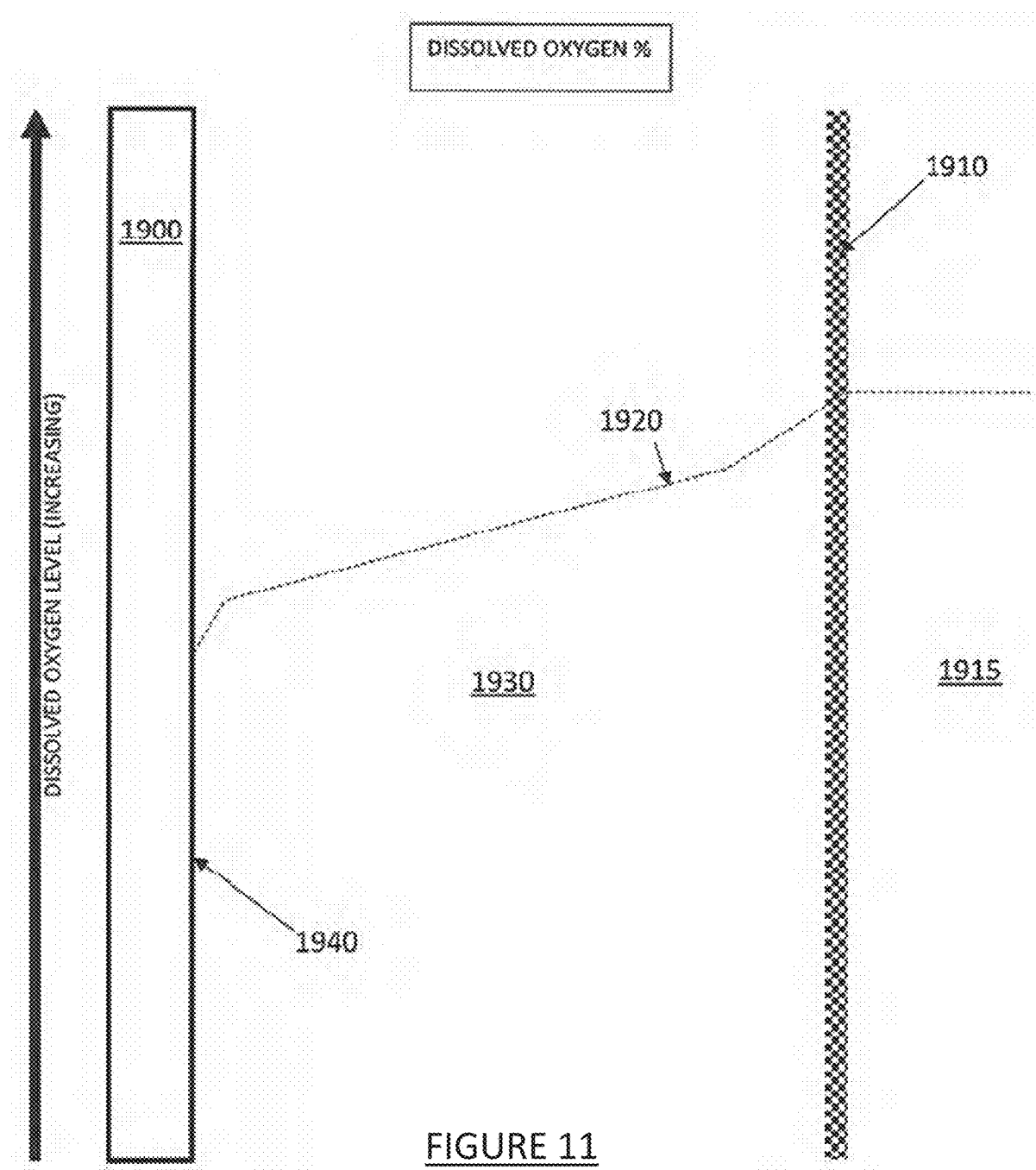
FIG. 11 depicts an exemplary cross-sectional view of a substrate and associated enclosure wall within an aqueous environment.

FIG. 11 depicts an exemplary cross-sectional view of a substrate 1900 and associated enclosure wall 1910 within an aqueous environment 1915. In this embodiment, the dissolved oxygen level 1920, shown in a dotted line, may be equal and/or equivalent to a DO of the surrounding aqueous environment at the boundary of the enclosure (although in some embodiments the dissolved oxygen level may drop by measurable degrees during water passage through the wall 1910 of the enclosure), and this DO level begins to progressively decrease in the enclosure liquid as the measurement sensor (not shown) is moved further into the differentiated environment 1930 towards the substrate (following along the line of level 1920), where the DO levels may desirably reaching a lower and/or lowest DO level reading at a location proximate to the substrate surface 1940. In various embodiments, the change in DO percentage from liquid within the inner wall to liquid near the substrate surface may be only a 1 or 2 percent change, while in other embodiments this DO change may be much more significant, such as a 3%, 4%, 5%, 6%, 7%, 8%, 9%, 10%, 11%, 12%, 13%, 14%, 15%, 16%, 17%, 18%, 19%, 20%, 21%, 22%, 23%, 24% and 25% or greater difference in DO between the inside wall readings and the substrate surface readings.

Water Chemistry

In various embodiments, the design and positioning of the protective enclosure about the substrate may desirably alter various water chemistry features and/or components of the enclosed environment to a meaningful degree, as compared to those of the open aqueous environment. In various instances, the enclosure may induce some water chemistry features to be "different" as compared to the surrounding aqueous environment, while other water chemistry features may remain the same as in the surrounding aqueous environment. For example, where dissolved oxygen levels may often be "different" between the differentiated environment and the open environment, the temperature, salinity and/or PH levels within the differentiated and open environments may be similar or the same. Desirably, the enclosure can affect some water chemistry features in a desired manner, while leaving other water chemistry features minimally affected and/or "untouched" in comparison to those of the surrounding open aqueous environment. Some exemplary water chemistry features that could potentially be "different"

and/or which might remain the same (i.e., depending upon enclosure design and/or other environmental factors such as location and/or season) can include dissolved oxygen, pH, total dissolved nitrogen, ammonium, nitrates, nitrites, orthophosphates, total dissolved phosphates, silica, salinity, temperature, turbidity, chlorophyll, etc.

In some exemplary embodiments, a measure of one or more water chemistry features may be "different" inside of the enclosure as compared to a equivalent measurement outside of the enclosure (which may include measurement at some distance removed from the enclosure to account for potential elution outside of the enclosure-such as a distance of only 1 or 2 inches or more, or even 1, 2, 3, 5, 10, 20 feet or greater from the enclosure outer wall)). Such "difference" may include a difference of 0.1% or greater between inside/outside measurements, or a difference of 2% or greater between inside/outside measurements, or a difference of 5% or greater between inside/outside measurements, or a difference of 8% or greater between inside/outside measurements, or a difference of 10% or greater between inside/outside measurements, or a difference of 15% or greater, or a difference of 25% or greater, or a difference of 50% or greater, or a difference of 100% or greater. In addition, such differences may be for multiple chemistry factors with unequal differences, or may include an increase of one factor and a decrease of another factor. Combinations of all such described water chemistry factors are contemplated, including situations where some water chemistry factors remain essentially the same for some factors, while various differences may be noted for other factors.

Exemplary Water Chemistry Testing Protocol

In determining various water chemistry parameter measures such as temperature, salinity, dissolved oxygen and/or pH (among others), hand cast sensors can be convenient to use and highly accurate. Such sensors are often tethered and equipped with a readout screen. If the readings are going to be taken within a relatively short time frame (minutes to hours), then readings between samples can be fairly comparable without worrying about calibration concerns. If more than one probe is to be deployed at the same time, it can be helpful to bundle them using Velcro strips or cable ties.

When working with sensors, calibration of the handheld units should be performed on a schedule according to the manufacturer's specifications. In between calibrations, a confidence solution can be used as a spot check for some sensors. It is important to check handheld sensors before going into the field (battery life, confidence solutions, etc.). Prepare to take readings by unboxing units, straightening cables, bundling the sensors if using more than one, and marking a desired water depth on the cable (½ meter is standard for static immersion). Turn on the power for each handheld unit and place probe(s) in the desired location-checking that the probes are at the desired depth. Wait for the probes to come to equilibrium—and if equilibrium is never achieved, spot readings may not be sufficient to capture differences between samples, and continuous monitoring equipment may be necessary. Record values and repeat each asset of steps until all desired locations have been tested. Once testing is completed rinse probes and cables before replacing protective caps/bottles and allow equipment to dry before returning to their respective boxes.

Exemplary Water Analysis Protocols

In various embodiments, it may be desirous to quantify water differences inside and outside of an anti-fouling enclosure, such as those described herein, including measurement readings for dissolved oxygen (DO), pH and/or salinity. In such a case, DO (YSI, ProODO), pH (YSI, Pro10) and salinity (YSI, Pro30) can be measured using YSI single parameter drop sondes using the following method: (1) Calibrate YSI sensors according to manufacturer's specification, (2) Place YSI probe 0.5 m (18") below the water surface, (3) Allow probes to stabilize before recording measurement, (4) Record DO, pH or salinity value with water location, date and time, and (5) Record water temperature value with water location, date and time.

Exemplary Water Sample Collection for Water Chemistry Testing

In various embodiments, it may be desirous to collect water samples for analyzing the water chemistry, including (1) nutrient testing and (2) alkalinity testing. The water collection apparatus can be a modified design of a standard 600 ml water collection apparatus using the following method: (1) Using one water collection apparatus for each water sample. The water collection apparatus can consist of a 1' long 1" diameter PVC pipe for water collection, which is attached, using a slip coupler, to a 3' long 1" diameter PVC pipe for handling. A plug consisting of a rubber cork stopper and stainless-steel eyebolt are suspended at the water collection end by a stainless-steel ring at the opposite end of the water collection apparatus using 50 lb. test nylon fishing line, (2) disinfect water collection apparatus before use. Rinse all apparatus parts that encounter the water sample, 1" diameter PVC pipe, plug, and fishing line, with filtered water, soak in DI water for at least 12 hrs then dry. The apparatus handle and coupler should be rinsed with filtered water, (3) Disinfect all supplies that encounter the water sample during testing. Rinse sampling bottles (250 mL), alkalinity analysis bottles (8 mL), funnels and filtration syringes with filtered water, soak in DI water for at least 12 hrs then dry. Soak nutrient analysis bottles (125 ml) in a 10% HCL solution for at least 12 hrs. Rinse twice in DI water then dry, (4) To collect water sample, submerge water collection apparatus 12" under the water's surface or when the slip coupler is just above the water's surface. Lift the stainless-steel ring on the apparatus handle to close the plug and collect the water sample. Make sure the plug is completely locked tight before removing the apparatus from the water. Remove apparatus from water, and (5) Place water collector apparatus over a clean funnel and collection bottle. Carefully and slowly open the plug by releasing the stainless-steel ring to transfer water sample from the water collector apparatus to the collection bottle. Store water sample on ice.

In some situations, immediate testing of collected water samples may not be possible, thus water samples may be filtered and preserved for up to 28 days using the following method: (1) filter collected water samples. For dissolved chemicals and alkalinity testing, filter water sample using syringe polypropylene filters with 0.45 µm pore size (Part #6788-2504, Whatman). For nutrient testing, 125 ml of filtered water may be needed. For alkalinity testing, 8 mL of filtered water may be needed, and (2) For preservation up to 28 days, freeze unacidified, filtered water samples at −20° C. (Strickland and Parsons, 1972; Grasshoff et al., 1999; Venrick and Hayward, 1985). Store water samples for nutrient analysis at −20° C. Store water samples for alkalinity analysis at 4° C.

In various embodiments, it may be desirous to quantify water differences inside and outside of an anti-fouling enclosure, such as those described herein, including measurement readings for total dissolved nitrogen (TDN), ammonium, nitrate+nitrite, orthophosphate, total dissolved phosphorus (TDP) and/or silica. In many cases, a manufacturer's standard methods can be used for dissolved chemical testing with the SEAL AA3 HR Continuous Segmented Flow AutoAnalyzer, following the following methods:

For TDN, ammonium and nitrate+nitrite analysis, the following method can apply: (1) Obtain filtered water samples, (2) Prepare reference standard from RICCA ammonium (R0692500, RICCA Chemical Company), (3) Analyze reference standard twice to calibrate absorbance readings at 540 nm on SEAL AA3 HR Continuous Segmented Flow AutoAnalyzer. All standard absorbance values should be within 10% of the known concentration, (4) Follow the manufacturer's methods G-218-98 (SOP FIT-5008-TDN) for TDN, ammonium and nitrate+nitrite analysis. Run filtered water samples on the SEAL AA3 HR Continuous Segmented Flow AutoAnalyzer to determine the absorbance at 540 nm of pink azo dye, formed from nitrogen reduction using a cadmium column and reacting the resulting nitrite with diazo compound and N-(1-naphthyl) ethylenediamine dihydrochloride, and (5) Record absorbance values. Analytical precision (RSD) averages ~2%.

For orthophosphate analysis, the following method can apply: (1) Obtain filtered water samples, (2) Prepare reference standard from NIST-traceable Dionex 5-Anion (Fisher Scientific), (3) Analyze reference standard to calibrate absorbance readings at 880 nm on SEAL AA3 HR Continuous Segmented Flow AutoAnalyzer. All standard absorbance values should be within 95% confidence interval for the standard, (4) Follow the manufacturer's methods SEAL analytical G-297-03 for orthophosphate analysis. Run filtered water samples on the SEAL AA3 HR Continuous Segmented Flow AutoAnalyzer to determine the absorbance at 880 nm of phospho-molybdenum blue complex, formed when orthophosphate reacts with ascorbic acid, molybdate and antimony, and (5) Record absorbance values. Analytical precision (RSD) averages ~1%.

For TDP analysis, the following method can apply: (1) Obtain filtered water samples, (2) Prepare reference standard from NIST-traceable Dionex 5-Anion (Fisher Scientific), (3) Analyze reference standard to calibrate absorbance readings at 880 nm on SEAL AA3 HR Continuous Segmented Flow AutoAnalyzer. All standard absorbance values should be within 10% of the known concentration, (4) Follow the manufacturer's methods G-219-98 (SOP FIT-5008-TDP) for TDP. Run filtered water samples on the SEAL AA3 HR Continuous Segmented Flow AutoAnalyzer to determine the absorbance at 880 nm of phospho-molybdenum blue complex, formed when orthophosphate reacts with ascorbic acid, molybdate and antimony, and (5) Record absorbance values. Analytical precision (RSD) averages ~3%.

For silica analysis, the following method can apply: (1) Obtain filtered water samples, (2) Analyze sodium silicate reference standards (Part Number SS465, Fisher Scientific) to calibrate absorbance readings at 820 nm on SEAL AA3 HR Continuous Segmented Flow AutoAnalyzer. Prepare a standard curve with absorbance values and known concentrations of analyzed reference standards, (3) Follow the manufacturer's methods SEAL analytical G-177-96 for silica. Run filtered water samples on the SEAL AA3 HR Continuous Segmented Flow AutoAnalyzer to determine the absorbance at 820 nm of molybdenum blue complex, formed when ammonium molybdate is added to filtered water samples to yield silicomolybdates then reduced using ascorbic acid, (4) Record absorbance values. Compare measured absorbance values to reference standard curve absorbance values to determine concentration of silica in filtered water samples. Analytical precision (RSD) averages ~3%.

In order to determine calcium carbonate levels, alkalinity of filtered water samples can be measured, which corresponds to the level of calcium carbonate in the samples. Standard methods (APHA Method 2320-B: Standard Methods for the Examination of Water and Wastewater) can be used for testing utilizing the Gran Function, according to the following method: (1) Obtain filtered water samples, (2) Obtain reference standard seawater solutions (OSIL, UK), (3) Analyze reference standards for calibration. Prepare a standard curve with alkalinity values and known concentrations of analyzed reference standards. All concentrations should be within 95% confidence interval, (4) Follow Standard Methods (2320-B) for alkalinity titrations. Using Gran Function, titrate filtered water samples with 0.01N HCL, (5) Alkalinity is determined using the Gran Function. Alkalinity (mg CaCO3/L) is directly proportional to the volume of acid added during the titration, and (6) Record the alkalinity values.

For various tests, different size and/or shaped structures or enclosure embodiments using different materials were tested to determine whether the presence of the enclosure reduces, decreases, eliminates, inhibits and/or prevents macrofouling settlement, including performing a visual comparison of the biofilms formed in the enclosures as compared to the open water, and comparing water quality and water chemistry in the enclosures to the open water. Table 5A depicts the results of salt water tests in tabular form, and shows that Ammonium, Nitrate+Nitrite (N+N), Total Dissolved Nitrogen (TDN), Dissolved Organic Nitrogen (DON), Phosphate and Silica all differed significantly between the enclosures and open samples at different points during sampling, with Table 5B depicting additional chemistry measures such as temperature, salinity, dissolved oxygen and pH. The testing results showed that ammonium was significantly higher inside the enclosures on Days 14 (Jun. 22, 2018) and 30 (Jul. 9, 2018), and N+N was significantly higher inside the enclosures on Days 1 (Jun. 9, 2018), 3 (Jun. 11, 2019) and Month 10 (Apr. 15, 2019) and 12 (Jun. 24, 2019). TDN and DON were significantly higher in open samples on Day 7 but switched and were higher in the enclosures on Days 14 and 30. Phosphate was significantly higher in enclosures on Days 3, 7, 14 and 30 and Months 10 and 12. Silica was significantly higher in open samples on Days 1, 3 and 14 but higher in enclosures on Day 30.

TABLE 5A

Water chemistry results for saltwater within enclosures ("bag") and open water

| DATE | Jun. 8, 2018 | Jun. 9, 2018 | Jun. 11, 2018 | Jun. 15, 2018 | Jun. 22, 2018 | Jul. 9, 2018 | Apr. 15, 2019 | Jun. 24, 2019 |
|---|---|---|---|---|---|---|---|---|
| Ammonium (µM) | | | | | | | | |
| Bag | 0.51 (±0.14) | 0.49 (±0.23) | 0.89 (±0.27) | 0.21 (±0.11) | 15.73 (±3.16) | 13.45 (±0.96) | 0.07 (±0.07) | 0.81 (±0.14) |
| Open | 0.17 (±0.07) | 0.1 (±0.0) | 0.35 (±0.16) | 0.1 (±0.0) | 6.54 (±0.17) | 3.76 (±0.17) | 0.13 (±0.13) | 6.93 (±0.25) |

TABLE 5A-continued

Water chemistry results for saltwater within enclosures ("bag") and open water

| DATE | Jun. 8, 2018 | Jun. 9, 2018 | Jun. 11, 2018 | Jun. 15, 2018 | Jun. 22, 2018 | Jul. 9, 2018 | Apr. 15, 2019 | Jun. 24, 2019 |
|---|---|---|---|---|---|---|---|---|
| Nitrate + Nitrate ($\mu M$) | | | | | | | | |
| Bag | 1.85 (±0.83) | 2.8 (±0.92) | 4.73 (±2.97) | 1.47 (±0.54) | 1.13 (±0.17) | 0.59 (±0.15) | 12.29 (±1.93) | 15.92 (±0.46) |
| Open | 0.62 (±0.12) | 0.42 (±0.03) | 0.73 (±0.14) | 0.78 (±0.24) | 1.35 (±0.3) | 1.05 (±0.32) | 1.43 (±0.73) | 1.02 (±0.10) |
| Total Dissolved Nitrogen ($\mu M$) | | | | | | | | |
| Bag | 43.15 (±2.15) | 28.88 (±2.43) | 26.45 (±4.92) | 28.25 (±1.18) | 39.86 (±5.0) | 41.78 (±0.44) | 32.32 (±2.99) | 39.02 (±1.67) |
| Open | 36.9 (±4.42) | 29.33 (±1.62) | 23.23 (±1.72) | 32.28 (±1.1) | 25.14 (±0.56) | 20.13 (±1.82) | 18.45 (±1.6) | 30.16 (±0.71) |
| Dissolved Organic Nitrogen ($\mu M$) | | | | | | | | |
| Bag | 40.79 (±1.65) | 25.58 (±1.5) | 20.84 (±2.28) | 26.57 (±0.88) | 23.01 (±2.08) | 27.73 (±0.84) | 19.95 (±1.05) | 22.28 (±1.42) |
| Open | 36.11 (±4.35) | 28.81 (±1.63) | 22.15 (±1.76) | 31.4 (±0.87) | 17.26 (±0.53) | 15.32 (±1.94) | 16.89 (±1.09) | 22.21 (±0.88) |
| Phospate ($\mu M$) | | | | | | | | |
| Bag | 0.44 (±0.01) | 0.29 (±0.01) | 0.19 (±0.01) | 0.2 (±0.01) | 0.73 (±0.08) | 0.49 (±0.01) | 1 (±0.1) | 0.67 (±0.03) |
| Open | 0.38 (±0.02) | 0.27 (±0.02) | 0.15 (±0.01) | 0.16 (±0.01) | 0.45 (±0.01) | 0.35 (±0.01) | 0.4 (±0.02) | 0.29 (±0.02) |
| Silica ($\mu M$) | | | | | | | | |
| Bag | 61.18 (±1.41) | 43.33 (±1.18) | 28.88 (±1.25) | 43.98 (±2.04) | 37.53 (±0.86) | 40.56 (±0.72) | 27.39 (±1.15) | 29.04 (±1.15) |
| Open | 71.2 (±6.72) | 54.43 (±3.23) | 34.23 (±0.52) | 55.65 (±4.72) | 43.73 (±1.29) | 24.71 (±0.32) | 21.4 (±2.74) | 29.13 (±1.06) |
| Alkalinity (meq/L) | | | | | | | | |
| Bag | 2.6 (±0) | 2.65 (±0.05) | 2.58 (±0.03) | 2.63 (±0.03) | 2.58 (±0.03) | 2.59 (±0.03) | 2.26 (±0.08) | 2.27 (±0.07) |
| Open | 2.68 (±0.05) | 2.65 (±0.03) | 2.58 (±0.03) | 2.6 (±0) | 2.56 (±0.02) | 2.52 (±0.03) | 2.16 (±0.06) | 2.28 (±0.05) |
| Alkalinity (mg/L) | | | | | | | | |
| Bag | 130.75 (±0.95) | 132.5 (±2.25) | 127.75 (±1.93) | 130.5 (±1.04) | 128.91 (±1.58) | 129.72 (±1.68) | 112.72 (±4.2) | 113.69 (±3.60) |
| Open | 135 (±2.12) | 133.5 (±1.32) | 129.5 (±1.32) | 129.25 (±0.75) | 128.22 (±0.82) | 126.05 (±1.6) | 108 (±2.84) | 114.31 (±2.70) |

TABLE 5B

Additional water chemistry for saltwater in enclosures ("bag") and open water

| DATE | Jun. 8, 2018 | Jun. 9, 2018 | Jun. 11, 2018 | Jun. 15, 2018 | Jun. 22, 2018 | Jul. 9, 2018 |
|---|---|---|---|---|---|---|
| Temperature (° C.) | | | | | | |
| Bag | 27.6 (±0) | 27.3 (±0) | 26.9 (±0.07) | 28.28 (±0.05) | 28 (±0.04) | 26.28 (±0.03) |
| Open | 27.55 (±0.05) | 27.55 (±0.05) | 27.13 (±0.03) | 28.38 (±0.08) | 28.18 (±0.05) | 26.35 (±0.03) |
| Salinity (psu) | | | | | | |
| Bag | 31.28 (±0.03) | 31.13 (±0.02) | 32.58 (±0.05) | 31.55 (±0.05) | 32.83 (±0.05) | 31.55 (±0.05) |
| Open | 31.35 (±0.19) | 32.4 (±0.25) | 33.65 (±0.49) | 33.08 (±0.41) | 33.15 (±0.44) | 33.83 (±0.34) |
| Dissolved Oxygen (mg/L) | | | | | | |
| Bag | 8.63 (±0.03) | 7.73 (±0.03) | 6.62 (±0.09) | 6.69 (±0.19) | 3.28 (±0.35) | 4.05 (±0.21) |
| Open | 8.59 (±0.03) | 7.94 (±0.06) | 6.75 (±0.04) | 7.22 (±0.03) | 5.19 (±0.06) | 6.42 (±0.07) |
| Dissolved Oxygen (%) | | | | | | |
| Bag | 109.2 (±0.33) | 97.48 (±0.4) | 82.95 (±1.2) | 87.48 (±1.22) | 41.8 (±4.54) | 50.28 (±2.57) |
| Open | 108.7 (±0.32) | 100.58 (±0.62) | 84.8 (±0.64) | 92.78 (±0.45) | 66.38 (±0.8) | 79.58 (±0.92) |
| pH | | | | | | |
| Bag | 8.16 (±0) | 8.26 (±0.006) | 8.17 (±0.006) | 8.19 (±0.009) | 7.99 (±0.021) | 8.07 (±0) |
| Open | 8.17 (±0.002) | 8.26 (±0.005) | 8.18 (±0.002) | 8.21 (±0.003) | 8.14 (±0.003) | 8.16 (±0.002) |

Various conclusions appeared from the data, including: (1) the dissolved inorganic nitrogen (N+N and Ammonium) was higher in the enclosures while dissolved organic nitrogen (amino acids, urea) was higher outside the enclosures through Day 7. This may indicate higher biological activity outside the enclosures, with bacteria, cyanobacteria and phytoplankton using inorganic nitrogen for growth and creating organic nitrogen (through decay and excretion). Biofilm results from this experiment (observationally) and DNA results from the previous test confirmed this hypothesis. The overall dissolved organic nitrogen (DON) inside the enclosures remained similar throughout the latter part of the experiment, while the open DON fluctuated, likely due to natural cycling of Nitrogen in the seaport, which was insulated or buffered by the enclosures, (2) the phosphate level was higher in the enclosures than in the open water, likely due to greater biological activity using the phosphorus outside the enclosures, and/or (3) the silica level was higher outside the enclosures through Day 14, likely due to the greater activity and turnover of diatoms outside the enclosures, which switched on Day 30. The overall silica level in the enclosures was reasonable similar over time, while the open level silica fluctuated. This variability likely indicated cycling in the open water as the silica was used by diatoms- cycling that was insulated or buffered by the enclosure.

In another example, water chemistry and water quality were observed in various enclosure embodiments. The purpose of this salt-water testing was to examine the water chemistry differences between water within the various size enclosures (1, 2 and 4' diameter) and the open water. Table 5C depicts the results of 12-month salt water test in tabular form, and shows that Ammonium, Nitrate+Nitrite (N+N), Total Dissolved Nitrogen (TDN), Dissolved Organic Nitrogen (DON), Phosphate, Silica, and alkalinity all differed significantly between the enclosures and open samples at different points during sampling, with Table 5D depicting additional chemistry measures such as temperature, salinity, dissolved oxygen and pH.

The testing results showed dissolved oxygen and pH were significantly higher in the open water compared to the waters within the enclosure, for all size enclosures (1, 2 and 4' diameter). N+N, TDN, Phosphate and silica all differed significantly in waters within the enclosures compared to open waters. Alkalinity, N+N, TDN and phosphate were all significantly higher inside of the enclosure compared to open waters. This data shows a similar trend as other water chemistry tests in saltwater. The increased water chemistry concentrations within the enclosures when compared to the open waters may indicate a greater biological activity outside of the enclosures, with bacteria, cyanobacteria, and phytoplankton using available nutrients for growth.

Furthermore, some of the results of these water chemistry studies suggest various enclosure embodiments may create an effect that respiration or material metabolism is greater or exceeds photosynthesis within the enclosure structure. This effect may happen due to the lowered levels of dissolved oxygen or other water chemistry parameters that is created by the enclosure structure. Differences in dissolved oxygen inside the enclosure may likely be related to light limitation within the enclosure. Slight measurement variations among days may be related to timing of sampling (i.e. morning sampling vs. night sampling), as seen in FIGS. 10A and 10B.

The effect of respiration exceeding photosynthesis within the enclosure structure may be confirmed based on the phosphate results. Phosphate concentration in the waters within the enclosure is consistently higher than open waters. Based on the phosphate cycle and knowing that phosphate is exchanging between particles and the dissolved phase, diffusion may be acting to try to restore water chemistry equilibrium on each side of the permeable enclosure. The more of a difference in the water conditions within the enclosure compared to the open water conditions, the more diffusion generally acts to restore equilibrium. Therefore, phosphate should likely continue to increase within the enclosure waters but may be lost due to diffusion.

TABLE 5C

Water chemistry results for saltwater in enclosures ("1', 2', 4'") and open water.

| Treatment | Ammonium (µM) | N + N (µM) | TDN (µM) | DON (µM) | Phosphate (µM) | Silica (µM) | Alkalinity (Meq/L) | Alkalinity (mgCaCo$_3$/L) |
|---|---|---|---|---|---|---|---|---|
| 1' | 1.44 | 17.33 | 36.93 | 18.16 | 0.77 | 23.03 | 2.73 | 137 |
|  | (±0.56) | (±1.33) | (±3.21) | (±2.09) | (±0.14) | (±0.55) | (±0.04) | (±1.79) |
| 2' | 1.53 | 17.42 | 36.09 | 17.14 | 0.87 | 22.5 | 2.59 | 129 |
|  | (±0.48) | (±0.83) | (±1.34) | (±1.1) | (±0.03) | (±0.86) | (±0.04) | (±2.01) |
| 4' | 1.18 | 15.7 | 34.83 | 17.94 | 0.74 | 23.95 | 2.31 | 116 |
|  | (±0.09) | (±0.96) | (±1.34) | (±0.57) | (±0.11) | (±0.66) | (±0.01) | (±0.43) |
| Open | 2.24 | 1.27 | 22.03 | 18.53 | 0.27 | 20.66 | 2.4 | 120 |
|  | (±0.76) | (±0.13) | (±2.5) | (±1.69) | (±0.05) | (±0.32) | (±0.01) | (±0.75) |

TABLE 5D

Additional water chemistry for saltwater in enclosures ("1', 2', 4'") and open water.

| Disk Size | Temperature (C.) | Salinity (psu) | DO mg/L | DO % | pH |
|---|---|---|---|---|---|
| 1' | 28.87 | 33.03 | 1.44 | 22.2 | 8.06 |
| 2' | 28.77 | 33.13 | 1.65 | 25.4 | 8.04 |
| 4' | 28.73 | 33.07 | 1.62 | 24.97 | 8.03 |
| Open | 28.77 | 34.17 | 4.79 | 73.67 | 8.2 |

In one embodiment, the enclosure structure provides antifouling protection within its confines through the initial establishment of a nitrification and de-nitrification rich environment. During this testing, data shows consistently higher ammonium in the water within the enclosure structure. As shown in FIG. 12A, the initial nitrogen product of respiration is reduced nitrogen or ammonium. After 4 days of immersion, the internal environment becomes less oxygenated resulting in the formation of un-ionized ammonia nitrogen (NH3-N) which is toxic to marine organisms within the confines of the device. In addition to NH3-N production, it is possible that nitrite (NO2) and other toxic reactive nitrogen molecules may also be produced within the medium filled confines of the enclosure structure. This effect appears to be enhanced as the exterior of the enclosure becomes progressively more fouled. Further, the microbial biofilm that forms within and on the surface the enclosure device may contribute to universal nitrification and de-nitrification pathways.

Testing data confirms that Nitrate+Nitrite (N+N) in many cases was higher in waters within the enclosure structure when compared to open waters. This result may be related to nitrification of ammonia under oxic conditions. In some embodiments, even though dissolved oxygen is lower in the bag, it may not be low enough to inhibit nitrification, and the source of ammonium may come from respiration. In some embodiments, dissolved oxygen is not likely low enough to promote dissimilatory nitrate reduction to ammonium (DNRA) or nitrate/nitrite ammonification; however, it is possible there are anoxic microenvironments (less than 0.5 mg/L dissolved oxygen concentration in water) within the bag that can promote DNRA. DNRA is the result of microbial anaerobic respiration using nitrate as an electron acceptor, reducing to nitrite, then ammonium, as shown in FIG. 12A.

Additionally, Total Dissolved Nitrogen (TDN) was typically higher in enclosed waters compared to open waters during the saltwater testing. This result is consistent with high microbial respiration and dissolved nitrogen coming off particles as they decompose. In some embodiments, settlement of particles in the low-energy environment of the enclosure result in a settlement source of dissolved nutrients to the enclosed waters. This settlement, dead, dying or decomposed particles at the bottom of the enclosure can account for the water chemistry and water quality differences within the enclosure water and open waters in some embodiments. These decomposing particles or settlement may be consuming the majority of dissolved oxygen within the enclosure structure.

As respiration releases $CO_2$, this in turn can lower pH to drive or reduce to carbonate. By creating an increase in carbonic acid in the seawater, the water results in a more acidic condition, thus a lower pH measure. Organisms quickly respond to a decrease in dissolved oxygen, specifically when dissolve oxygen starts to reach levels of 3 mg/L or 2 mg/L. This difference in the water may cause organisms to not produce a shell or produce a thinner shell. Furthermore, this difference may cause organisms not to settle or swim and/or move to a different location if the oxygen difference is too great.

Carbonate chemistry also appears to be modified within the enclosure structure device confines, with the entrained water becoming more corrosive to calcium carbonate mineralization over time. To enable a comparison of the open waters and enclosed waters that were sampled during the experiment, a NOAA $CO_2$ Sys program which evaluates changes in carbonate water chemistry can be used to generate a single integrated measure, the saturation index for aragonite, (Omega—$\Omega$) for each water mass sampled at a particular time point. The aragonite (aragonite is a crystallized form of calcium carbonate mineral) saturation index ($\Omega$) is a dimensionless number which indicates the degree of super saturation of calcium carbonate in seawater. A value greater than 1 denotes super saturation (aragonite will grow in size) and a value less than 1 denotes under saturation (aragonite will dissolve). Chemical oceanographers rely on Omega values to ascertain the magnitude and trend of ocean acidification for a given oceanic water mass. A declining $\Omega$ trend is considered to be a corrosive threat for calcium carbonate formation. The determination of $\Omega$ is dependent on following parameters; salinity, water temperature, depth (as pressure), phosphate, silica, ammonium, alkalinity and pH. The integration of all these parameters into a single unified measure enabled direct comparison of the water mass samples taken over the duration of the settlement experiment (shown in FIG. 12B).

The Redfield ratio or Redfield stoichiometry was analyzed to understand the atomic ratio of carbon, nitrogen and phosphate found in the marine phytoplankton within the waters inside the enclosure structure and in open waters. With this theory, the ratio of Carbon:Nitrogen:Phosphate=106:16:1, nutrient limitations were studied in saltwater. Based on increased concentration levels of ammonium (i.e. nitrogen) and phosphate within the waters inside the enclosure, it was determined that in some embodiments there may not be any nutrient limitations within the waters of the enclosure compared to open waters.

In one embodiment, the enclosure may serve as a substratum for bacterial colonization and macrofouling settlement. Free exchange of dissolved oxygen, ammonia, nitrite and nitrate may occur across the permeable enclosure. In one embodiment, the respiration of macrofoulers and/or bacterial biofilm may account for much of the oxygen and/or chemical nutrient uptake across the permeable enclosure. An oxygen, nitrogen, phosphate and other nutrient consumption may occur by the biofilm as the water passes or exchanges into the permeable enclosure. Bacterial biofilm may begin to participate in the oxygen uptake rate (OUR) of the enclosure until the enclosure waters reach steady state with respect to the biofilm OUR. In one example, steady state of nutrients in the water inside the enclosure with respect to the biofilm may occur within less than 12 months, less than 6 months, less than 3 months, between 1 and 60 days, between 1 and 30 days, or at day 58. The bacterial biofilm growing within or on the surface of the enclosure and the invertebrate macrofoulers growing on the external surface of the enclosure may be responsible for establishing and maintaining the fixed film barrier in many embodiments, which can provide significant antifouling protection. In some embodiment the film barrier can be a mechanism that prevents biofouling from occurring within the water compartment that enclosed by the fabric structure.

In general, un-ionized ammonia as NH3-N is highly toxic at levels approaching 100 µg/L (ppb) to both aquatic and marine species. NH3-N concentrations observed after day 7 from within the device were approaching 20% of the toxic level and may have been higher. Another potential contributor of toxicity from within the device is nitrite (NO2), which is considered toxic at the 1 ppm level. During the saltwater experiment, dissolved oxygen in the device did not drop to hypoxic levels (hypoxia occurs at less than 2 mg/L dissolved O2) however it was trending downward. Since this water chemistry mechanism of action is not dependent on any particular microbial biofilm, it is also relevant for freshwater applications.

TABLE 5E

Water chemistry results for freshwater within enclosures and open water.

| Treatment | Ammonium (μM) | Nitrite | N + N (μM) | TDN (μM) | DON (μM) | Phosphate (μM) | Silica (μM) | Alkalinity (Meq/L) | Alkalinity (mgCaCo$_3$/L) |
|---|---|---|---|---|---|---|---|---|---|
| Valve M | 6.31 (±1.38) | 0.27 (±0.04) | 27.95 (±0.22) | 49.04 (±0.72) | 14.77 (±1.4) | 0.34 (±0.04) | 37.54 (±0.86) | 2.21 (±0.04) | 110 (±2.15) |
| Boat M | 3.21 | 0.21 | 27.29 | 41.84 | 11.34 | 0.3 | 35.66 | 2.25 | 112 |
| Open M | 1.75 (±0.16) | 0.2 (±0) | 26.68 (±0.12) | 40.25 (±0.89) | 11.83 (±0.69) | 0.22 (±0.01) | 35.29 (±0.08) | 2.25 (±0.03) | 113 (±1.54) |
| Boat UWM | 5.86 (±0.15) | 1.11 (±0.03) | 48.58 (±1.39) | 76.76 (±0.93) | 22.32 (±1.91) | 1.21 (±0.01) | 101 (±0.25) | 3.79 (±0.02) | 190 (±0.95) |
| Open UWM | 6.31 (±0.52) | 0.74 (±0.01) | 46.01 (±0.37) | 78.72 (±1.94) | 26.39 (±1.7) | 1.17 (±0.01) | 97.71 (±0.03) | 3.67 (±0.05) | 184 (±2.44) |

In another example, water chemistry and water quality freshwater samples were collected and analyzed from experiments at University of Wisconsin at Milwaukee (UWM). Enclosure structures were deployed to protect a valve and boat from fouling in the Great Lakes. After 1-month of immersion, water samples were collected within the enclosure and open waters. These results are presented in Table 5E-5G. As shown in Table 5E, Ammonium, Nitrite, N+N, TDN, DON, Phosphate and Silica differed significantly in freshwater, where most of the chemistry differed significantly between the two separate locations in the Great Lakes. The freshwater at the marina (M) demonstrated a significantly higher ammonium, TDN and Phosphate concentrations within the waters inside of the enclosure structure compared to open waters. Nitrite, N+N, Phosphate and Silica concentrations were all significantly higher within the water inside the enclosure compared to open waters at UWM's sea wall. These results may be an indication of greater biological activity outside the enclosure structures, with bacteria, cyanobacteria and phytoplankton using available nutrients for growth.

TABLE 5F

Additional water chemistry for freshwater within enclosures and open water.

| Treatment | Replicates | Temperature (C.) | Conductivity (μS/cm) | DO (mg/L) | DO (%) | pH |
|---|---|---|---|---|---|---|
| Valve M | 3 | 16.2 | 364.6 | 7.01 | 71.4 | 7.97 |
| Boat M | 1 | 16.0 | 361.4 | 7.53 | 79.6 | 8.01 |
| Open M | 1 | 16.7 | 362.9 | 9.19 | 94.6 | 8.01 |
| Boat UWM | 2 | 17.15 | 442.55 | 7.18 | 74.65 | 7.84 |
| Open UWM | 1 | 16.9 | 418.4 | 6.97 | 72.1 | 7.76 |

Table 5F shows 1-month freshwater temperature, conductivity, dissolved oxygen and pH results for the two locations in the Great Lakes: marina (M) and UWM's sea wall (UWM). The dissolved oxygen concentration within the water inside of the enclosure structure is different than the dissolved oxygen in open freshwater at each location. In another freshwater experiment, water chemistry samples were analyzed for entrained waters inside of an enclosure protecting a metal valve and open waters at a similar location of the Great Lakes after 2-months. The testing results of freshwater temperature, conductivity, dissolved oxygen (OD), pH, turbidity and chlorophyll are presented in Table 6G. Dissolved oxygen, pH and chlorophyll show to have a significant difference between waters within the enclosure and open waters. Dissolved oxygen and pH are lower in the local aquatic environment (waters within the enclosure) compared to open waters. Chlorophyll readings are significantly higher in the local aquatic environment compared to open waters. The dissolved oxygen, pH and chlorophyll differences may be accounted for based on the understanding that respiration of bacteria in the oxic environment is greater or more prominent than photosynthesis or nutrient uptake for algae. Similar conclusions are made for freshwater testing as the saltwater testing.

In another exemplary embodiment, shown in Tables 6A and 6B below, water chemistry results were obtained for various enclosures incorporating spun polyester fabric coated with 154 (3500 cP, original formula) or 153 (3500 cP, no acrylic formula) water-based biocidal coatings using a commercial printing process with a 30 or 40 screen (with or without vacuum) and open water samples. Overall, a total of 8 treatments: 154-30 v, 154-30 nv, 154-40 v, 154-40 nv, 153-30 v, 153-30 nv, 153-40 v & 153-40 nv and open water samples (control) were tested. The permeability for each

TABLE 5G

Additional water chemistry for freshwater within enclosures and open water

| | West (1) Valve Bag | Middle (2) Valve Bag | East (3) Valve Bag | Ambient |
|---|---|---|---|---|
| Depth m | 0.5 | 0.5 | 0.5 | 1 |
| Temperature C. ° | 14.6 | 14.4 | 14.5 | 14.4 |
| Conductivity μS/cm | 321.3 | 319.7 | 318.9 | 319.5 |
| Specific Conductivity μS/cm | 400.9 | 400.8 | 399 | 400.7 |
| ODO % Sat | 53.1 | 45.4 | 58.5 | 68.2 |
| ODO mg/L | 5.39 | 4.64 | 5.96 | 6.97 |
| pH | 7.38 | 7.39 | 7.50 | 7.6 |
| Turbidity FNU | 32.27 | 27.86 | 44.02 | 2.84 |
| Chlorophyll RFU | 1.18 | 1.06 | 3.72 | 0.67 |
| Chlorophyll μg/L | 4.8 | 4.31 | 15.04 | 2.77 |
| BGA-PC RFU | 0.34 | 0.061 | 1.04 | 0.13 | fabric type was collected using disclosed methods, and the following sample key provided:

TABLE 6A

Sample Key

| | |
|---|---|
| 153 or 154 | sample formulation |
| 30 or 40 | screen identifier |
| v or nv | vacuum or no vacuum |
| Example: 154-30v is formula 154, applied with the 30 screen using a vacuum | |

Water samples were collected from lower permeable enclosures, 154-30 nv, 153-40 nv and 153-30 nv, higher permeable enclosures, 153-40 v and 154-40 v, and open water (control) using a water chemistry core sampler. Testing results demonstrated an observable difference in nutrient levels between the water samples collected from within the enclosures and open water samples. The less permeable enclosures show a greater difference in nutrient content compared to the open water samples. In general, the water nutrient content levels were higher inside of the enclosure compared to open waters. Additionally, the pH of the water within the enclosure compared to pH of open waters was observed. Depending upon enclosure design, substrate composition and/or other objectives, as well as various environmental and/or water conditions, the pH within the enclosure could be higher than that of the open environment, or the water contained within the novel enclosure could reflect a lower pH or a more acidic pH than the open water, which can constitute a key water chemistry "difference" of the differentiated environment that contributes to the biofouling effectiveness of some enclosure designs.

another aspect of the invention, the enclosure may encourage the growth of microorganisms that create one or more local settlement cues that discourage the settlement of larvae of biofouling organisms within the differentiated aquatic environment formed by the enclosure. In a further aspect of the invention, the enclosure may encourage the growth of microorganisms that create one or more local settlement cues that discourage the settlement of larvae of biofouling organisms onto and/or within the enclosure material itself. Accordingly, in these aspects of the invention, larvae of biofouling organisms may be unable or less likely to settle or attach to the submerged substrate or substrate portion(s) protected by the enclosure.

In various embodiments, biofilms can be on the protected substrate, can be formed outside of the enclosure, and/or inside of the enclosure. Biofilms on each location can be different based on the amount of bacteria, cyanobacteria, diatoms, different bacteria phyla, diversity, thickness, and integrity, as well as by other measures.

Figure 14:
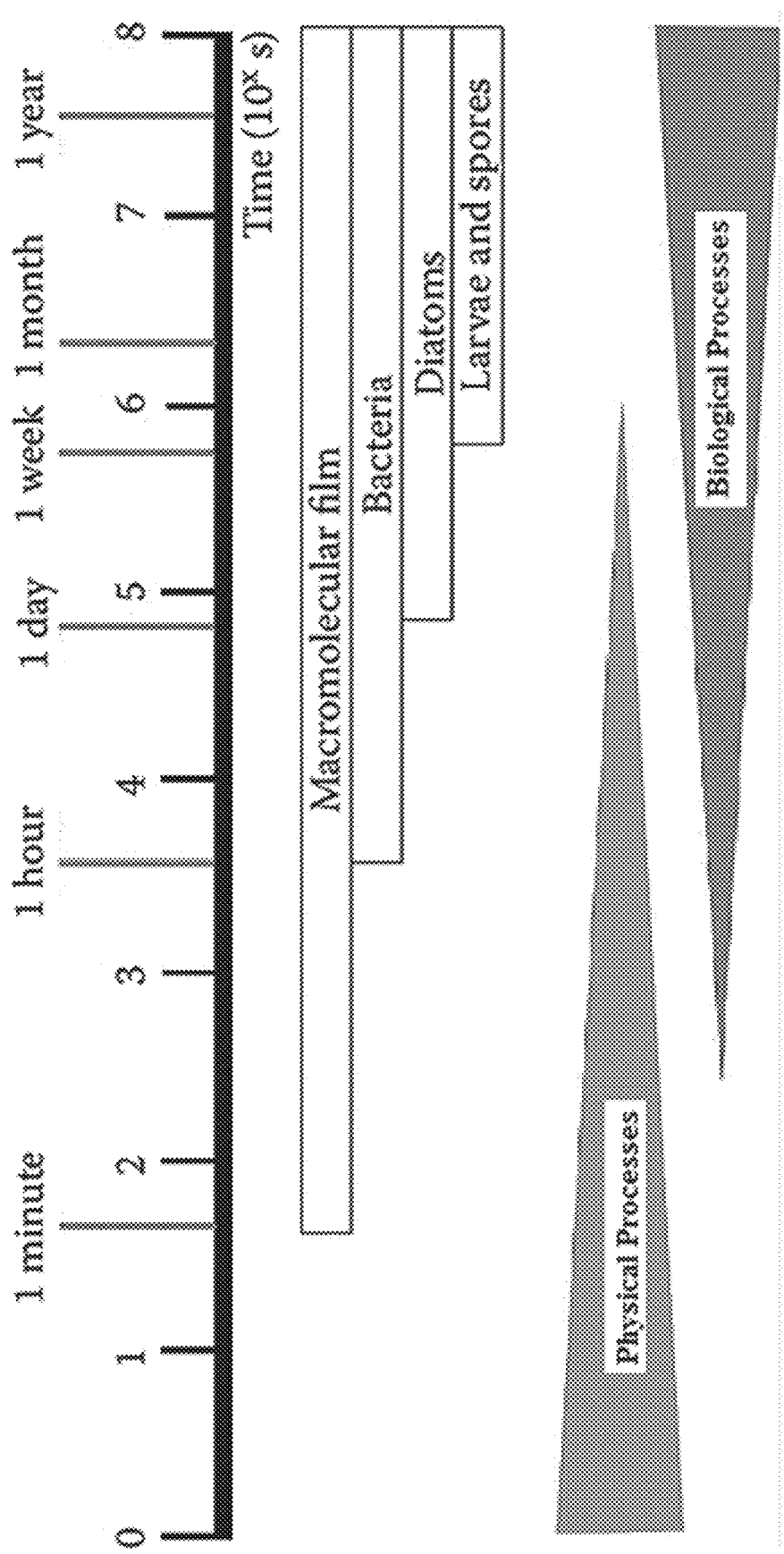
FIG. 14 depicts an exemplary "standard" progression or colonizing sequence for a fouling community on a substrate immersed in an aqueous medium such as sea water.

FIG. 14 depicts one exemplary "standard" progression or colonizing sequence typically leading to the establishment of a fouling community on a substrate immersed in an aqueous medium such as sea water, brine and/or fresh water. In this sequence, immersion of the substrate into the aqueous medium immediately initiates a physical process of macromolecular adsorption, followed by prokaryotic cells and bacteria that rapidly land, attach and form colonies on any surface in the marine environment. In some cases, the subsequent formation of a microbial biofilm may then promote the attachment of algal spores, protozoa, barnacle cyprids and marine fungi, followed by the settlement of other marine invertebrate larvae and macroalgae, while in

TABLE 6B

Water Chemistry and Permeability

| Sample | Pre-immersion Permeability (mL/cm²/s) | Permeability (30 days, multiwell) | Ammonium | Nitrate + Nitrate | Total Dissolved Nitrogen | Dissolved Organic Nitrogen | Phosphate | Silica |
|---|---|---|---|---|---|---|---|---|
| 154-30nv | 0.9 (±0.32) | 0.92 (±0.28) | 7.61 | 19.4 | 65.7 | 38.69 | 0.93 | 55.2 |
| 153-40nv | 1.11 (±0.18) | 1.3 (±0.15) | 2.89 | 4.78 | 23.3 | 15.63 | 0.81 | 33 |
| 153-30nv | 2.36 (±0.41) | 2.95 (±0.28) | 4.13 | 7.73 | 32.5 | 20.64 | 1.21 | 69.7 |
| 153-40v | 9.43 (±0.49) | 8.54 (±0.77) | 3.17 | 1.03 | 17.8 | 13.6 | 0.98 | 87.1 |
| 154-40v | 11.27 (±0.45) | 7.99 (±0.58) | 3.21 | 1.1 | 17 | 12.69 | 0.89 | 81 |
| Open Column | n/a | n/a | 2.25 | 1.24 | 19.9 | 16.41 | 0.73 | 76.5 |

Biofilm and/or Film Formation

In various aspects of the invention, the proper design and use of an enclosure, such as described herein, can create an "different environment" within the enclosure that influences and/or induces the formation of a biological coating, layer and/or biofilm on a surface of the substrate that effectively reduces and/or prevents the settlement of biofouling organisms on the substrate. In some aspects of the invention, this reduction and/or prevention may be due to one or more local settlement cues that discourage (e.g., lessen, minimize, or prevent) the settlement of larvae of biofouling organisms, which may include the discouragement of settlement on the substrate, while in other aspects of the invention the reduction and/or prevention may be due to the absence of one or more positive settlement cues that encourage the settlement of larvae of biofouling organisms, which may similarly reduce settlement on the substrate (and/or various combinations of the presence and/or absence of settlement cues thereof may be involved in various embodiments). In other cases macrofoulers may settle without a biofilm while still some other macrofoulers may prefer a cleaner surface.

Marine fouling is typically described as following four stages of ecosystem development. The chemistry of biofilm formation describes the initial steps prior to colonization. Within the first minute the van der Waals interaction causes the submerged surface to be covered with a conditioning film of organic polymers. In the next 24 hours, this layer allows the process of bacterial adhesion to occur, with both diatoms and bacteria (e.g. *Vibrio alginolyticus, Pseudomonas putrefaciens*) attaching, initiating the formation of a biofilm. By the end of the first week, the rich nutrients and ease of attachment into the biofilm allow secondary colonizers of spores of macroalgae (e.g. *Enteromorpha intestinalis, Ulothrix*) and protozoans (e.g. *Vorticella, Zoothamnium* sp.) to attach themselves. Within 2 to 3 weeks, the tertiary colonizers—the macrofoulers—have attached. These include tunicates, mollusks and sessile Cnidarians.

Where an enclosure such as described herein is utilized, however, the biological colonizing sequence on the substrate can vary. For example, the biological colonizing sequence on the substrate may be interrupted (disrupted, altered, etc.) to reduce and/or minimize the settlement, recruitment and ultimate macrofouling of the protected substrate. Once positioned around the substrate, the permeable, protective fabric walls of the enclosure can desirably filter and/or impede the passage of various micro- and/or macro-organisms into the enclosure, as well as potentially alter various aspects of the water chemistry within the enclosure.

Figure 15:
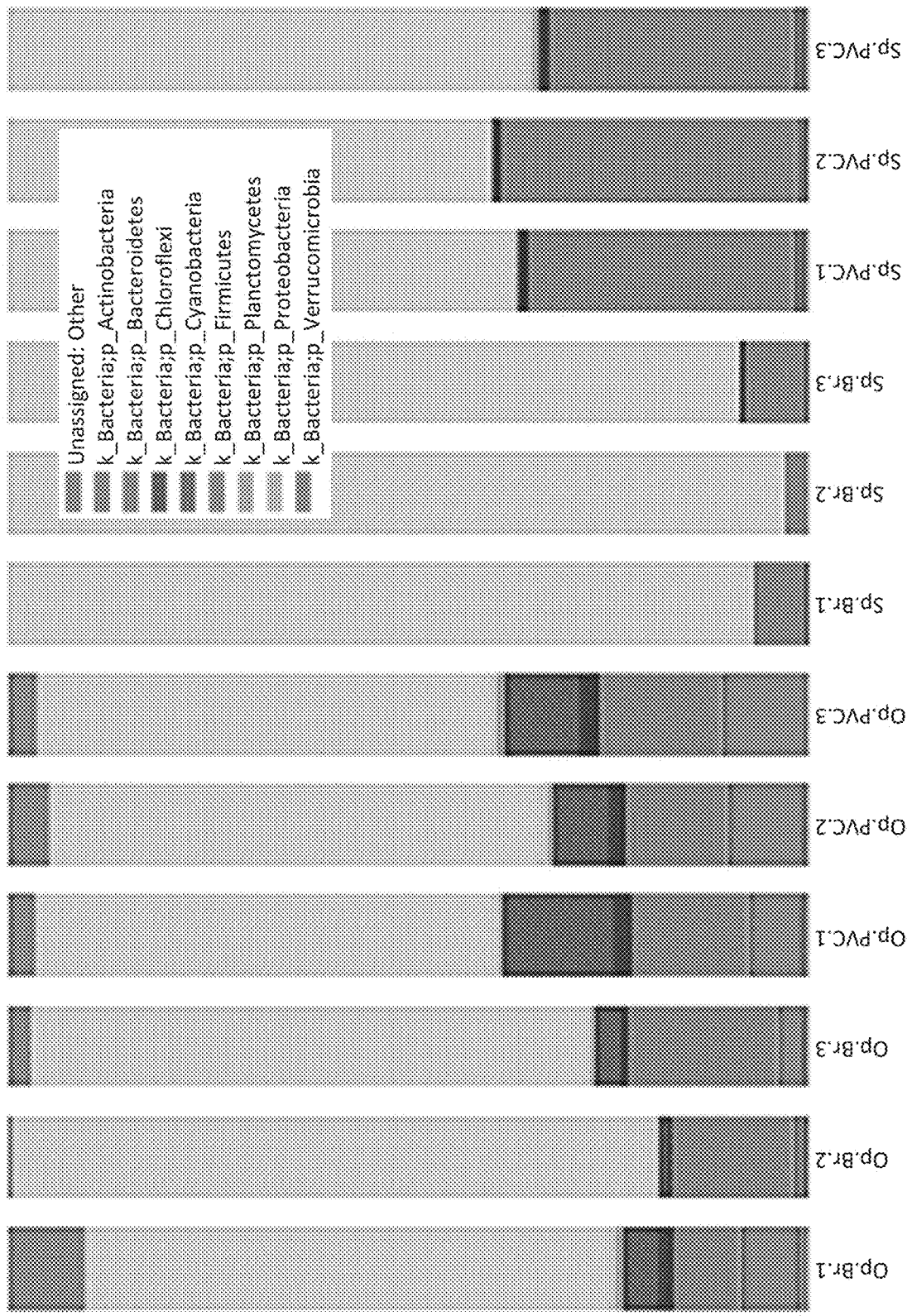
FIG. 15 depicts various distributions of bacterial phyla in biofilms formed on various substrates in seawater.

FIG. 15 graphically depicts various distributions of bacterial phyla in biofilms formed on substrates for open samples (six leftmost bars) and substrates within various enclosure embodiments (six rightmost bars) in seawater, with Table 7 (below) containing the underlying data being depicted in FIG. 15. The bacterial biofilms that formed on the substrate or other article protected by an enclosure was meaningfully different from any natural biofilm that form on a substrate or other object in the open ocean or other aqueous environment in the proximity to that protected article. In various embodiments, the enclosure's proper design and operation will desirably induce and/or promote the growth and replication of certain combinations of microorganisms, many of which are normally found in different (i.e., often relatively low) levels in the natural environment, and these combinations of microorganisms may have an ability to promote a certain "recruitment and settlement" behavior to other organisms, identifying the surface of the substrate as inhospitable and/or "less desirable" (and signaling this fact through a variety of means).

DNA analysis confirmed that the surface biofilms that form on PVC and bronze substrates inside of various protected enclosure embodiments were significantly different from those formed on similar substrates outside of the enclosure, and this is also true of the biofilm forming communities present within the enclosure as well as the biofilms that form in/on an inner wall surface of the enclosure. For example, biofilms that appeared on PVC and bronze article coupons in open waters were thicker and more diverse compared to biofilms appearing on PVC and bronze article coupons protected by an enclosure of the present invention. In addition, macrofouling was observed on the articles in open waters; whereas little to no macrofouling was present on the substrates protected by enclosures. In some embodiments, the biofilm on the enclosed substrates was less diverse that the open biofilms, with different amounts of diatoms, bacteria, cyanobacteria and differing distributions of bacterial phyla. In addition, the dominant bacterial phyla and bacterial distribution within each enclosure (and/or on each substrate) were markedly different for each enclosure design. For example, as best seen in FIG. 15 and supported by data of Table 7, the PVC substrate within a spun poly enclosure (three rightmost bars) were dominated by Proteobacteria (large grouping at top of bar) and Bacteriodetes (second largest grouping towards the bottom of the bar). In contrast, the bronze substrate within a spun poly enclosure (bars 6 through 9) were dominated by Proteobacteria, with a much smaller remainder portion being dominated by Bacteriodetes. This distribution chart of the dominant bacterial phyla in the biofilms are for open bronze bars (first through third columns), open PVC bars (fourth through sixth columns), enclosed bronze bars (seventh through ninth columns) and enclosed PVC bars (tenth through twelfth columns). Additionally, the biofilm "integrity" for the enclosed substrates was different from the open samples, in that the biofilm on some of the enclosed substrates appeared easier to remove and/or clean from the substrate surfaces as compared to the open substrates.

TABLE 7

DISTRIBUTIONS OF BACTERIAL PHYLA IN BIOFILMS

| Bacterial Taxa | Open Bronze 1 | Open Bronze 2 | Open Bronze 3 | Open PVC 1 | Open PVC 2 | Open PVC 3 | Spun Poly Bronze 1 | Spun Poly Bronze 2 | Spun Poly Bronze 3 | Spun Poly PVC 1 | Spun Poly PVC 2 | Spun Poly PVC 3 |
|---|---|---|---|---|---|---|---|---|---|---|---|---|
| Other | 1.2 | 0.3 | 0.5 | 0.8 | 0.5 | 0.1 | 0.1 | 0 | 0.1 | 0.9 | 0.2 | 0.7 |
| Actinobacteria | 7.2 | 1.5 | 3.1 | 6.6 | 9.4 | 10.5 | 0.1 | 0.1 | 0.2 | 1 | 1.1 | 1 |
| Bacteroidetes | 8.5 | 15.4 | 19.1 | 14.9 | 13 | 15.7 | 6.3 | 2.5 | 8 | 33.2 | 37.2 | 31 |
| Chloroflexi | 1.8 | 0.4 | 0.9 | 2.3 | 2.1 | 2.5 | 0 | 0 | 0 | 0.5 | 0.4 | 0.4 |
| Cyanobacteria | 4.6 | 1.3 | 3.3 | 13.7 | 6.9 | 9.3 | 0.3 | 0.1 | 0.3 | 0.8 | 0.6 | 0.7 |
| Firmicutes | 1.1 | 0.2 | 0.4 | 0.5 | 0.8 | 1 | 0 | 0 | 0 | 0.1 | 0.1 | 0.8 |
| Planktomycetes | 0.2 | 0 | 0.1 | 0.2 | 0.3 | 0.2 | 0 | 0 | 0 | 0 | 0 | 0 |
| Proteobacteria | 65.9 | 80.5 | 69.9 | 57.6 | 61.7 | 57.2 | 93.1 | 97.2 | 91.5 | 63.3 | 60.3 | 65.2 |
| Verrucomicrobia | 9.6 | 0.5 | 2.8 | 3.5 | 5.2 | 3.6 | 0 | 0 | 0 | 0.1 | 0 | 0 |
| TOTAL | 100.1 | 100.1 | 100.1 | 100.1 | 99.9 | 100.1 | 99.9 | 99.9 | 100.1 | 99.9 | 99.9 | 99.8 |

In a number of experiments, various substrates were immersed in an aqueous environment (i.e., natural seawater), with some substrates protected by enclosure designs such as those described herein for a period of three weeks of immersion, at which point the substrates were removed from the seawater and the enclosures and the resulting substrate surface biofilms (which had formed on these substrates during that time) were subjected to DNA analysis. A visual comparison between a bronze substrate protected by an enclosure as compared to an unprotected (i.e., open) bronze substrate depicted a marked reduction in fouling organisms on the protected substrate. Moreover, the biofilms that formed on the open bars (i.e., unprotected PVC and bronze) proved to be significantly thicker than the biofilms on the protected substrates. In addition, one significant difference between the biofilms of the open and differentiated samples was the predominance of Proteobacteria and Bacteroidetes in the biofilms of the protected substrates, as well as the virtual absence of the Verrucomicrobia and the Actinobacteria in the protected biofilms. It is believed that predominance and/or absence of various bacteria in the novel and/or "artificial" or "synthetic" biofilms formed on the substrates within the man-made "differentiated" environment created by the novel enclosures are unique and significantly different artificial biofilms which yield different (and possibly unfavorable) settlement cues than those normal settlement cues presented by biofilm layers formed naturally in the open aquatic environment, which thereby reduces the chance for settlement and/or colonization of the substrate by micro- and/or macro-fouling agents, even in the absence of the enclosure (i.e., after the enclosure is permanently and/or temporarily removed).

In another experimental test, a series of clear glass substrates were immersed in an aqueous environment and analyzed to determine the thickness and types of biofilms/fouling that form on substrates protected and unprotected by novel enclosure designs such as those described herein for a period of thirty days, 8 months and 12 months. These test results concluded that no macrofouling settlement occurred on slides inside the novel enclosures during the entirety of the 30 day test. In contrast, the slides placed in open water continued to accumulate macrofouling through day 30. Macrofouling on the open slides consisted of hydroids, encrusting and arborescent bryozoans, barnacles, tube worms, and sponges, and there was significantly higher settlement on open slides starting on day 14.

With regards to the biofilms on the various substrates, it was determined that the unique biofilm on the slides from inside the protective enclosure were so thin as to be not easily visible, with the biofilm presence indicated by small, adhered clumps of sediment. There was little change in the appearance of the biofilms in these protected slides from day 1 to day 30. Conversely, the open slide biofilms after 30 days of immersion in saltwater, underwent significant changes over the course of the experiment. On day 1, biofilms were very light and similar to the differentiated biofilms. By day 3, however, the open biofilms were dominated by peritrichs (a predatory ciliate that feeds on biofilms). On day 7, the visible portion of the open biofilms consisted of a conglomerate of diatoms, cyanobacteria and microalgae as well as microscopic motile organisms (ciliates, dinoflagellates, etc.) that feed on the sessile biofilm organisms. These unprotected biofilms were even thicker and more developed on day 14 and had accumulated filamentous algae. In addition, the level of dissolved oxygen was significantly higher in the open water than in the novel enclosures on day 1, day 7 and day 14. Moreover, the pH of the liquid was significantly higher in open water than within the novel enclosures after day 14.

After a year of immersion in saltwater, glass substrates, protected with a fabric antibiofouling enclosure, were examined for settlement of organisms. There was no major or minor biofouling or settlement of organisms on the protected glass substrates after 12-months of immersion; however a biofilm had formed on the glass substrate that was protected by a fabric enclosure. This 12-month biofilm ranged from a spotty, patchy, non-continuous thin layer on some substrates to a continuous thin film layer that extended fully across the surface on other substrates. These 12-month biofilm structures were more developed and complex compared to a biofilm on a glass substrate after 30 days; however a biofilm on an unprotected glass substrate after 30 days was exponentially more developed, complex and thicker than the biofilm on the protected glass substrate after 12 months. No cyanobacteria or diatoms were present in the biofilm on the protected glass substrate after 12 months, with the exception of a few trapped (but not settled) centric diatoms. The structure of the 12-month biofilm on the protected glass substrate contained silt trapped in the extracellular polymeric substances (EPS), and a few glass substrates contained a low cover of tube worms (spirorbid and *Hydroides* sp.).

There are a wide variety of larval and/or other settlement cues ranging from physical to biochemical. These cues indicate the presence of favorable or unfavorable habitat to settling larvae. Physical cues can include light and color, current direction and speed, oxygen, orientation, texture, sound and surface energy/wettability settlement. Other cues indicating the presence of predators or superior competitors may inhibit settlement. Incumbent fouling may enhance or inhibit settlement, and the effect may change depending on the incumbent and settling species. For purposes of the present disclosure, local settlement cues can mean current conditions and historical markers in a local aquatic environment that provide information to larvae of aquatic organisms that either encourage or discourage settlement (including the absence of encouragement) in the local aquatic environment. In an aspect of the invention, the enclosure defines, in conjunction with the substrate and/or the differentiated aquatic environment, a local aquatic environment that produces and/or promotes the creation of local settlement cues that don't encourage and/or actively discourage the settlement of aquatic organisms on the substrate and/or on/within the enclosure. In various embodiments of the present invention, there is provided a novel enclosure or other device(s) which induces, promotes, enables and/or encourages the formation of at least one exogenous local settlement cue.

It is anticipated that, once a biofilm or other layer with or without local settlement cues is present or established, these cues may remain with/on the substrate (e.g., the surface being sufficiently protected by the enclosure) for a period of time after the enclosure is no longer engaged with or is removed from the substrate. For example, once local settlement cues become associated with or present on the substrate, the enclosure may be removed and/or damaged and at least a portion of the local settlement cues should persist on the substrate to provide ongoing signaling to discourage and/or not encourage settlement of macrofouling organisms. As an example, this prophylactic effect of the local settlement cues may remain on the hull of a boat after the enclosure has been removed (and/or damaged) and may continue to discourage settlement. This discouragement of settlement may extend for periods of time up to about two (2) years, at least 1.5 years, at least 1 year, at least 9 months, at least 6 months, at least 3 months, at least 1 month, at least 1 week, at least 3 days, at least 1 day and/or at least 12 hours. Moreover, the biofilm or other layer(s) created thereupon may be resistant to removal, and thus may provide continued protection to moveable and/or mobile submerged and/or partially submerged surfaces and/or items, including items used to generate propulsion such as propeller vanes and/or shafts. Thus, the enclosure and the inventive processes described herein can allow for an "inoculation" of a substrate against biofouling, which inoculation may continue for a time due to the sustained effect of the local settlement cues (LSCs).

In various embodiments, it is proposed that the changes in water chemistry, including all parameters measured, may have been due, at least in part, to the accumulation of biofouling organisms on the outside surface, inside surface or within the fabric of the enclosure structure. In one embodiment, the external biofilm developed on the outside surface of the enclosure structure accumulated and was pronounced by Day 13, with maturing and developing an organized structure by Day 30. At these time points (Day 13 and Day 30), dissolved oxygen and pH fell significantly inside the enclosure structure. It is believed that, in some exemplary embodiments, dissolved oxygen and pH may be tied together, as it is anticipated that microbial respiration within the enclosure structure leads to a decrease of oxygen and a relative increase in carbon dioxide. The increase in carbonic acid in the water results in a more acidic condition, thus lowers the pH in the water.

In some embodiments, biofilm components may be used as cues to appropriate settlement sites. Further, receptors for bacterial cues of invertebrate larvae can be unique to each organism. For many organisms, larval settlement occurs in response to surface biofilms. The difference in the biofilm on the substrate surface and the biofilm on the enclosure surface may cause the organisms to settle on one biofilm and not the other. Preferably, settlement will occur on the biofilm on the enclosure surface, and not on the biofilm on the substrate surface.

In at least one additional embodiment, the biofilm(s) on the surface of the enclosure structure may act as a "biofilter" and/or utilize or consume nutrients (i.e. oxygen, nitrogen, carbon, phosphates, etc.), thus not allowing some or all of the nutrients to pass or migrate into the waters inside of the enclosure structure, which may be confirmed where water chemistry data showing that more respiration or nutrient uptake occurs in the open waters when compared to the enclosed waters within the structure. These two communities, the bacteria biofilm growing within the fabric and the invertebrate macrofouling growing on the external surface of the structure, may be responsible for establishing and maintaining the fixed-film barrier which provides the antifouling protection—at least one mechanism that can prevent biofouling from occurring within the compartment that is enclosed by the structure.

In another embodiment, one or more biofilms may be grown on the surface of the enclosure structure to protect the substrate and extend the life of the enclosure. These protective biofilms may be located on the exterior surface of the enclosure, on the inner surface of the enclosure or may be penetrative or within the wall(s) of the enclosure. In some embodiments, the 3-dimensional, multifilament textile enclosure structure may provide significantly more effective contact surface area than a flat surface, therefore, the biofilm resident thereon may be significantly more active and/or may be optimized to provide higher protection.

Optional Biocide Coatings and/or Integration

In some exemplary embodiments, the disclosed enclosures may not include and/or not require the use of supplemental biocidal and/or antifouling agent(s) for the enclosure to provide adequate biofouling protection for the enclosure materials and/or substrate, which could include the use of uncoated fabric enclosures during certain immersion periods when the fouling pressure may be such that unprotected fabrics could be free of macrofouling and/or where an uncoated enclosure might be sufficient to provide protection to the contained substrate for a desired period of time. Similarly, the disclosed enclosures could provide protection for a substrate against destructive and/or invasive organisms such as wood boring fouling organisms (i.e., Teredo worms or "shipworms" and their associated bacteria), with a variety of enclosure designs, including a tight wrap enclosure, a bag enclosure embodiment and/or a "skirt" enclosure embodiment providing such protection in varying degrees.

In various alternative optional embodiments, however, at least a portion of a surface of the enclosure wall structure may be impregnated by, infused with and/or coated with a biocidal paint, coating and/or additive. In some additional embodiments, biocidal and/or antifouling agent(s) may be integrated into the enclosure walls and/or other portions thereof to desirably protect the enclosure itself from unwanted fouling. In some exemplary embodiments, the fabric or material may act as a carrier for the biocide.

In general, a biocide or some other chemical, compound and/or microorganism having the capacity to destroy, deter, render harmless and/or exert a controlling effect on any unwanted or undesired organism by chemical or biological means may optionally be incorporated into and/or onto some portion(s) of the material, such as during manufacture of the material or material components, or the biocide et al can be introduced to the material after manufacture. Desirably, the one or more biocides in/on the material will inhibit and/or prevent colonization of aquatic organisms on the outer surface and/or within openings within the enclosure, as well as to repulse, incapacitate, compromise and/or weaken biofouling organisms small enough to attempt or successfully penetrate through the openings in the enclosure, such that they are less able to thrive within the artificial or synthetic local aquatic environment between the structure and the substrate. In various embodiments, the enclosure desirably incorporates a material which maintains sufficient strength and/or integrity to allow the protection and/or inhibition of biofouling (and/or enables the creation of the desired artificial local aquatic environment or synthetic local aqueous environment) for a useful life of not less than about 3 to 7 days, 7 to 15 days, 3 to 15 days, at least 1 month, at least 3 months, at least 6 months at least 12 months, at least 2 years, at least 3 years, at least 4 years and/or at least 5 years or longer.

In at least one exemplary embodiment of an enclosure, the enclosure can incorporate a material which is coated, painted and/or impregnated with a biocide coating, which desirably adheres to and/or penetrates the material to a desired depth (which could include surface coatings of the material on only one side of the fabric, as well as coatings that may penetrate from 1% to 99% of the way through the fabric, as well as coatings that may fully penetrate through the fabric and coat some or all of the opposing side of the fabric). Desirably, the biocide will reduce and/or prevent the type, speed and/or extent of biofouling on the material, and/or may have some deleterious effect on microorganisms attempting to pass through openings in the material into the differentiated aqueous environment (and may also have some effect on microorganisms already resident within the enclosure). In various embodiments, the presence of the biocide coating or paint along the 3-dimensional "entry path" into the enclosure (i.e., as the microorganisms pass through the openings and/or pores of the material) will desirably provide a larger surface area and prove more effective than the standard 2-dimensional paint biocide coverage (i.e., a hard-planar coating) utilized on rigid, submerged surfaces in marine use today. In various aspects, especially where the fabric matrix material is highly fibrillated and/or ciliated, the coating of such materials can desirably provide a higher "functional surface area" of the fabric for the biocide coating to adhere to, which desirably increases the potential for anti-biofouling efficacy as organisms are more likely to be located near to and/or in contact with these small fibers (and the biocide paint, coating or additive resident thereupon or therein) as they pass through the fabric.

In various alternative embodiments, the enclosure can incorporate a material which is coated, painted and/or impregnated with a biocide coating (which could include surface coatings of the material on only one side of the fabric, as well as surface coatings from the front and/or back of the fabric which may extend some amount into the pores of the fabric), which may include coatings on one surface of the fabric that penetrate up to 5% into the pores of the fabric, up to 10% into the pores of the fabric, up to 15% into the pores of the fabric, up to 20% into the pores of the fabric, up to 25% into the pores of the fabric, up to 30% into the pores of the fabric, up to 35% into the pores of the fabric, up to 40% into the pores of the fabric, up to 45% into the pores of the fabric, up to 50% into the pores of the fabric, up to 55% into the pores of the fabric, up to 60% into the pores of the fabric, up to 65% into the pores of the fabric, up to 70% into the pores of the fabric, up to 75% into the pores of the fabric, up to 80% into the pores of the fabric, up to 85% into the pores of the fabric, up to 90% into the pores of the fabric, up to 95% into the pores of the fabric, up to 99% into the pores of the fabric, up to 100% of the way through the pores of the fabric and/or extending out of the pores onto the opposing surface of the fabric.

In various embodiments, the additional incorporation of a biocide coating or other coating/additives in some embodiments also desirably improves durability and functional life of the enclosure and/or its components, in that biofouling organisms and/or other detrimental agents should be inhibited and/or prevented from colonizing the flexible fabric and/or perforations therein for a period of time after immersion, thereby desirably preserving the flexible, perforated nature of the enclosure walls and the advantages attendant therewith. Where the biocide is primarily retained proximate to the fabric matrix (i.e., having very low or no biocide elution levels), the biocide will desirably significantly inhibit biofouling of the enclosure walls, while the presence of the enclosure and the "differentiated aqueous environment" created therein will reduce and/or inhibit biofouling of the protected substrate. In various exemplary embodiments, it is possible for the biocide to have extremely low and/or no detectable levels in water within the differentiated aqueous environment and/or in open waters adjacent to the enclosure (i.e., below 30 ng/L) and still remain highly effective in protecting the enclosure and/or substrate from biofouling. As shown in FIG. 28A, biocide release rate from an enclosure was detected as 0.2-2 ppm and/or lower between 7 days in artificial sea waters and low local concentrations (i.e. biocide release rates) were detected as 0.2-2 ppm and/or lower between 7 days in artificial sea waters and were effective at protecting the enclosure from biofouling.

Figure 28C:
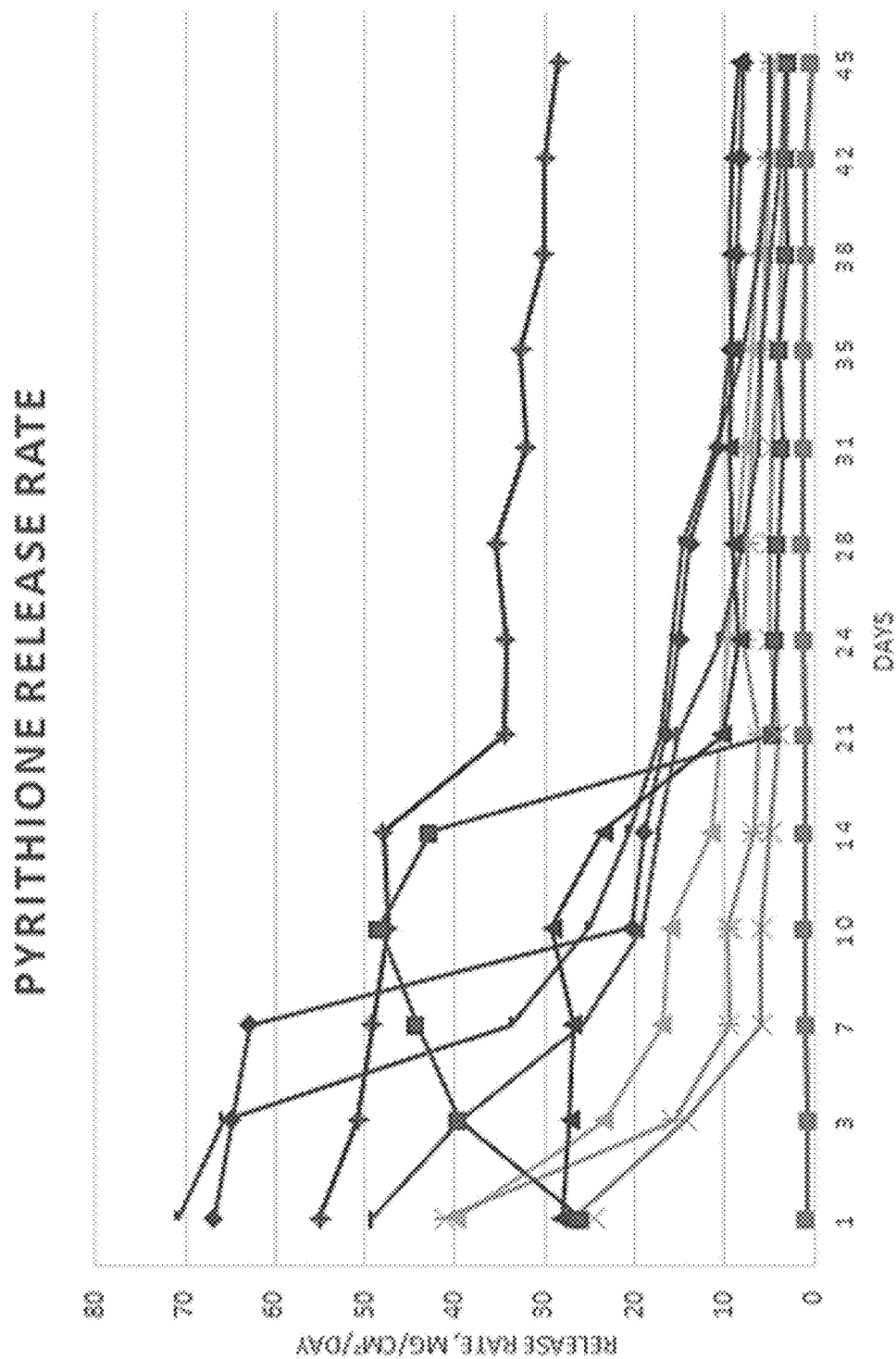

A wide variety of supplemental coatings incorporating various biocides and/or other dispensing and/or eluting materials may be incorporated into a given enclosure design to provide various anti-fouling advantages. For example, FIGS. 28B and 28C depict various biocide release rates for a variety of coatings and/or enclosure designs, including coatings which release econea and/or pyrithione in varying amounts and/or timing, including embodiments having initially high release rates which significantly reduce after only a few days and/or weeks after immersion, as well as other embodiments having initially low release rates which increase over time of immersion.

In at least one exemplary embodiment, an enclosure material can comprise a spun polyester fabric having a surface and/or subsurface coating of commercially available biocide coating, including water-based and/or solvent-based coatings containing registered biocides, with the coating applied to the fabric by virtually any means known in the art, including by brushing, rolling, painting, dipping, spray, production printing, encapsulation and/or screen coating (with and/or without vacuum assist). Coating of the material may be accomplished on one or both sides of the material, single-sided coating on the inner facing side of the materials, although single-sided coating on the outwardly facing side of the material (i.e., away from the substrate and towards the open aqueous environment) has demonstrated significant levels of effectiveness while minimizing biocide content, cost, and maintaining advantageous flexibility. While water-based ("WB") biocidal coatings are primarily discussed in various embodiments herein, solvent-based ("SB") biocidal coatings could alternatively be used in a variety of applications (and/or in combination with water-based paints), if desired.

In various embodiments, the use of various printing processes for the coating could have an added benefit of allowing the incorporation of visible patterns and/or logos into and/or on the enclosure walls, which could include marketing and/or advertising materials to identify the source of the enclosure (i.e., enclosure manufacturer) as well as identification of one or more users (i.e., a particular marina and/or boat owner/boat name) and/or identification of the anticipated use area and/or conditions (i.e., "salt water immersion only" or "use only in Jacksonville Harbor" or "summer use only"). If desired, various indicators could be incorporated to identify the age and/or condition of the enclosure, including the printing of a "replace by" date on the outside of the enclosure. If desired, the visible patterns could be printed using the biocide coating itself, which could incorporate supplemental inks and/or dyes into the coating mix, or the additional logos, etc. could be printed using a separate additive.

In various embodiments, the biocide coating or paint can desirably be applied to the material in an amount ranging from 220 grams per square meter to 235 grams per square meter, although applications of less than 220 grams per square meter, including 100 grams per square meter or less, as well as applications of more than 235 grams per square meter, including 300 grams per square meter and greater, show significant potential. In various alternative embodiments, the coating mixture could comprise one or more biocides in various percentage weights of the mixture, including weights of 10% biocide or less, such as 2%, 5% and/or 7% of the mixture, or greater amounts of biocide, including 10%, 20%, 30%, 40% 50% and/or more biocide by weight of the coating mixture, as well as ranges encompassing virtually any combination thereof (i.e., 2% to 10% and/or 5% to 50%, etc.). Where the enclosure design may be particularly large, it may be desirous to significantly increase the percentage of biocide in the coating mixture, which would desirably reduce the total amount of coating required for protection of the enclosure and/or substrate.

Figure 29:
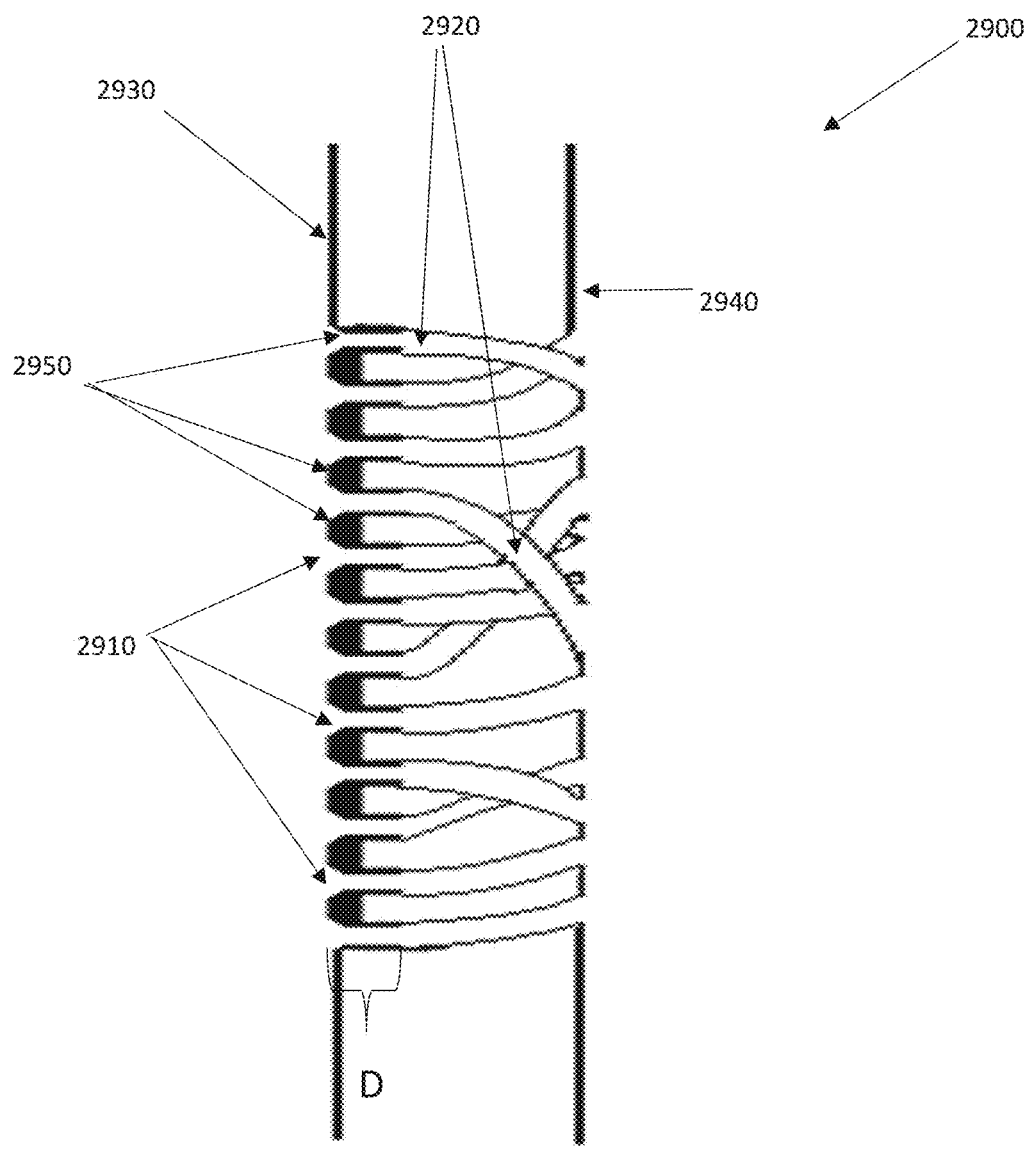
FIG. 29 depicts a cross-sectional view of an enclosure fabric with a biocide coating penetration at least partially into the fabric and pores thereof.

FIG. 29 depicts a cross-sectional view of an exemplary permeable fabric 2900, with various pore openings 2910 and simplified passages 2920 extending from a front face 2930 to a back face 2940 of the fabric 2900. A coating substance 2950 containing a biocide or other debilitating substance is also shown, wherein some portions of this coating substance extends from the front face 2930 at least some distance "D" into the pore openings 2910 and/or passages 2920 of the fabric 2900. In various embodiments, the coating substances will desirably penetrate some average distance "D" into the fabric of the material and/or fabric wall openings/pores (i.e., a 3%, 5%, 10%, 15%, 20%, 25%, 50%, 75% or greater depth of penetration into the fabric—see FIG. 29). Desirably, the coating substance, which is often "stiffer" in a dried configuration than the fabric to which is it applied, will be applied, in such a manner as to allow the fabric to be bent and/or molded to some degree (i.e., the coating will desirably not appreciably or severely "stiffen" the fabric to an undesirable degree), allowing the fabric to be formed into a desired enclosure shape and/or to be wrapped around structures and/or formed into flexible bags and/or containers (if desired). Where a bag or similar enclosure (i.e. a closable shape) is provided, the coating may desirably be applied onto/into the item after manufacture thereof, which may include the coating and/or encapsulation of any seams and/or stitched/adhered areas beneath one or more coating layers. In various embodiments, the coating penetration depth will average no more than half of the depth through the material.

Once coated with the biocide coating or paint, the material and/or enclosure can be allowed to cure and/or air dry for a desired period of time (which may take less than two minutes for some commercial applications, or up to an hour or longer in other embodiments) or may be force dried utilizing gas, oil or electric heating elements. The material and/or enclosure can then be used as described herein.

In various embodiments, the enclosure may include a biocide agent that is attached to, coated on, encapsulated, integrated into and/or "woven into" the threads of the material. For example, the biocide could be incorporated into strips containing various concentrations of one or more biocides, thus desirably preventing the various plant and animal species from attaching or establishing a presence on and/or in the enclosure. Alternatively, the enclosure could include a reservoir or other component which contains free or a microencapsulated form of a biocide. The microencapsulation desirably provides a mechanism in which the biocide may be diffused or released into the environment in a time dependent manner. The biocide filled microcapsules could be embedded into the individual threads and/or the woven material without the use of a reservoir or container, or alternatively the biocide could be coated onto the surface of the fibrous substrate elements (i.e., the threads) and/or the openings or "pores" therebetween.

Other methods of inserting and/or applying the biocide or anti-fouling agent, such as the use of spray-on applications as known to one of skill in the coating art, are contemplated. Additionally, the enclosure need not contain individual fibrous elements, but may instead be made of a perforated and/or pliable sheet which contains the biocide agent embedded therein and/or coated on the material. To provide a securing mechanism, the enclosure can include fastening elements, such as but not limited to loop and hook type fasteners, such as VELCRO® snaps, buttons, clasps, clips, buttons, glue strips, or zippers. If desired, an enclosure can desirably comprise a plurality of wall structures, with each wall structure attached to one or more adjacent wall structures (if any) by stitching, weaving or the like, which may include the coating and/or encapsulation of any seams and/or stitched/adhered areas beneath one or more coating layers to form a modular enclosure. If desired, enclosure material may be added to expand beyond and/or on to the enclosure fastening element to protect the fastening element from fouling.

In various embodiments, the enclosure desirably includes anti-biofouling characteristics, attached to and/or embedded within the threads and/or fibers (i.e., the various elements of the fibrous matrix) to inhibit and/or prevent biofouling of the enclosure. In a preferred embodiment, the anti-biofouling agent is a biocide coating comprising Econea™ (tralopyril—commercially available from Janssen Pharmaceutical NV of Belgium) and/or zinc omadine (i.e., pyrithione), but other anti-biofouling agents currently available and/or developed in the future, such as zinc, copper or derivatives thereof, known to one of skill in the art, may be used. Moreover, antifouling compounds from microorganisms and their synthetic analogs could be utilized, with these different sources typically categorized into ten types, including fatty acids, lactones, terpenes, steroids, benzenoids, phenyl ethers, polyketides, alkaloids, nucleosides and peptides. These compounds are isolated from seaweeds, algae, fungus, bacteria, and marine invertebrates, including larvae, sponges, worms, snails, mussels, and others. One or more (or various combination thereof) of any of the previously described compounds and/or equivalents thereof (and/or any future developed compounds and/or equivalents thereof) may be utilized to create an anti-biofouling structure which prevents both microfouling, such as biofilm formation and bacterial attachment, and macrofouling, such as attachment of large organisms, including barnacles or mussels, for one or more targeted species, or may be utilized as a more "broad-spectrum" antifoulant for multiple biofouling organisms, if desired.

In one exemplary embodiment, a desirable spun polyester fiber based woven fabric can be utilized as an enclosure wall material, with the fabric having a BASIS WEIGHT (weight of the base fabric before any coating or modifications are included) of approximately 410 Grams/Meter$^2$ (See Table 8).

TABLE 8

Exemplary Fabric Specifications

| | | |
|---|---|---|
| Fabric Name | 100% polyester woven canvas fabric (loomstate) | |
| Content | 100 Polyester (virgin) | |
| Yarn Count | Warp | 10 s/4 |
| | Filing | 10 s/4 |
| Density | Warp | 20/inch ± 3 |
| | Filing | 20/inch ± 2 |
| Weight | 410 gsm ± 10 g (12.09 OZ/sqy) | |
| Width | 64/65" | |
| | Overroll | 64/65" |
| | Cuttable | 63" |
| | Edge | Plain selvage |
| Color | Nature white | |
| Finishing | None | |
| Dyeing | None | |
| Washing | None | |
| Packing | Rolling with plastic bag inside and weave bag outside | |

Table 9 depicts some alternative fabric specifications that can be utilized as enclosure wall materials with varying levels of utility.

TABLE 9

Additional Exemplary Fabric Specifications

| Style | Yarn size and type | Ends/ Courses | Picks/ Wales | Weight oz/yd | Thickness inches |
|---|---|---|---|---|---|
| 61598 | 75.4% 70/36 SD Rd Text Nat Polyester, 24.6% 40/24 SD Rd Flat at Polyester | 36 cpi | 36 wpi | 3.68 | 0.0571 |
| 61588 | 75.4% 70/36 SD Rd Text Nat Polyester, 24.6% 40/24 SD Rd Flat at Polyester | 37 cpi | 33.7 wpi | 3.26 | 0.0205 |

TABLE 9-continued

Additional Exemplary Fabric Specifications

| Style | Yarn size and type | Ends/ Courses | Picks/ Wales | Weight oz/yd | Thickness inches |
|---|---|---|---|---|---|
| 410G/SM2 | 100% 10 singles, 4 ply spun polyester | 20 epi | 20 ppi | 12.09 | 0.0482 |
| 235GSM | 100%-300 den, 4 ply textured polyester | 24 epi | 20 ppi | 6.93 | 0.0319 |

For various structure or enclosure embodiments, a target add-on weight on the paint/coating could be currently set from approximately about 5 grams/meter$^2$ to 500 grams/meter$^2$, from about 50 grams/meter$^2$ to 480 grams/meter$^2$, from about 100 grams/meter$^2$ to 300 grams/meter$^2$, from about 120 grams/meter$^2$ to 280 grams/meter$^2$, from approximately 224 grams/Meter$^2$ (or up to ±10% thereof). FIGS. 27A and 27B depict various additional exemplary embodiments including a variety of coating weights for a fabric, for use with various enclosure designs.

In various embodiments where the addition of a biocide or other coating may be desirous, it should be understood that in some embodiments the coating may be applied to the enclosure after the enclosure has been fully assembled and/or constructed, while in other embodiments the coating may be applied to some or all of the components of the enclosure prior to assembly and/or construction. In still other embodiments, some portions of the enclosure could be pre-coated and/or pretreated, while other portions could be coated after assembly. Moreover, where processing and/or treatment steps during the manufacture and/or assembly of the may involve techniques that may negatively affect the quality and/or performance of the biocide or other coating characteristics, it may be desirous to perform those processing and/or treatment steps to the enclosure and/or enclosure components prior to application of the coating thereof. For example, where a heat sensitive biocide and/or coating may be desired, material processing techniques involving elevated temperatures might be employed to create and/or process the fabric and/or the enclosure walls before application of the biocide coating thereof (i.e., to reduce the opportunity for heat-related degradation of the biocide and/or coating).

In various embodiments, a coating material or other additive (including a biocide coating or other material) may be applied to and/or incorporated into the fabric of the enclosure, potentially resulting in an altered level of permeability, which may convert a material that may be less suitable for protecting a substrate from biofouling to one that is more desirable for protecting a substrate from biofouling once in a coated condition. For example, an uncoated polyester fabric, which experimentally demonstrates a relatively high permeability to liquids (i.e., 150 ml of a liquid passed through a test fabric in less than 50 seconds), which may be less desirable for forming an enclosure to protect a substrate from biofouling, as described herein. However, when properly coated to a desired level with a biocidal coating, the permeability of the coated fabric can be substantially reduced to a much more desirable level, such as a moderately permeable level (i.e., 100 ml of a liquid passed through a test fabric in between 50 to 80 seconds) and/or a very low permeability level (i.e., little to no liquid passed through the test fabric). In this manner, a deliberate permeability level can optionally be "dialed into" or tuned for each selected fabric, if desired.

During immersion testing in an aqueous environment over an extended period of time, one embodiment of an enclosure incorporating a polyester coated fabric developed no macrofouling and/or a very minimal coating of macrofouling. Moreover, one example the polyester fabric became more permeable during the immersion period, while another example became less permeable during the immersion period.

Figure 16A:
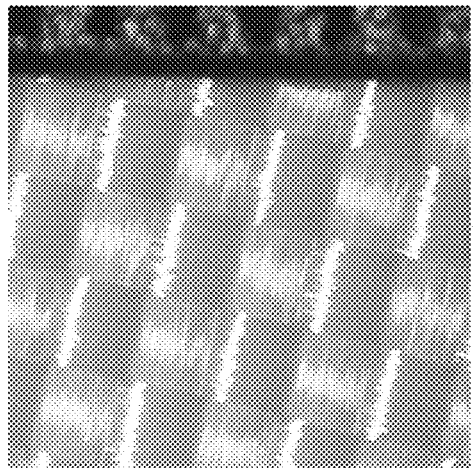
FIG. 16A depicts another exemplary embodiment of an uncoated polyester woven fabric.
Figure 16B:
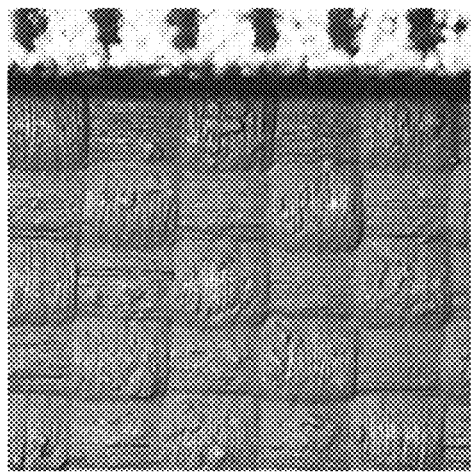
FIG. 16B depicts the embodiment of 16A coated with a biocide coating.

FIG. 16A depicts another exemplary embodiment of an uncoated 23×23 polyester woven fabric, which experimentally demonstrates a relatively low permeability to liquids (i.e., 100 mL of a liquid passed through a test fabric in approximately 396 seconds), which may be on a low end of a desirable permeability range for forming an enclosure to protect a substrate from biofouling, as described herein, depending upon local conditions. When coated (See FIG. 16B), these materials became essentially non-permeable prior to immersion, but became more permeable after immersion. As previously noted, the desired permeability level could be "dialed into" or tuned for each selected fabric, if desired. In various embodiment, the permeability of a given fabric and/or enclosure components can change or be different in wet or dry conditions, if desired.

During immersion testing in an aqueous environment over an extended period of time, the uncoated 23×23 polyester and coated polyester fabrics all had no macrofouling on the enclosure and/or the substrate. Moreover, each of these materials experienced a significant increase in permeability during immersion, with the 23×23 uncoated polyester fabric allowing passage of 150 ml of liquid in 120 seconds, while the first 23×23 coated polyester fabric allowed 150 ml of liquid in 160 seconds and the second 23×23 coated polyester allowed 150 ml of liquid in 180 seconds.

Figure 17A:
FIG. 17A depicts a natural uncoated burlap fabric.
Figure 17B:
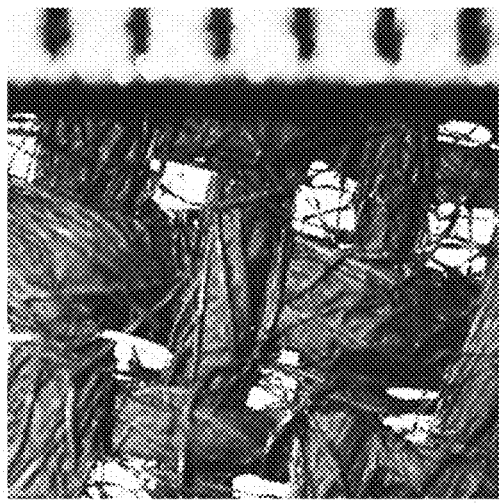
FIGS. 17B and 17C depict the fabric of FIG. 17A coated with a solvent based biocidal coating and a water based biocidal coating.
Figure 17C:
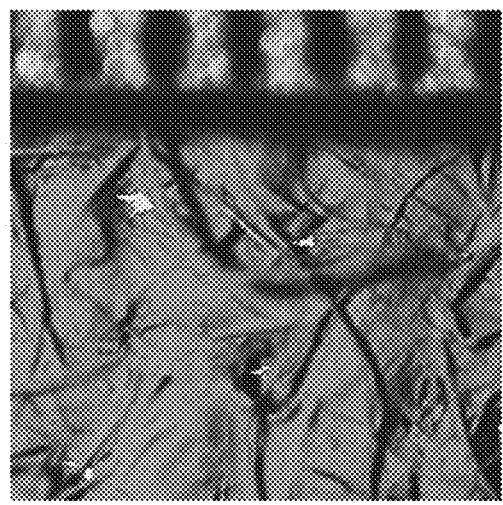

In another alternative embodiment, FIGS. 17A through 17C depict a natural material, burlap, uncoated (FIG. 17A), coated with a solvent based biocidal coating (FIG. 17B) and coated with a water based biocidal coating (FIG. 17C). During permeability testing, the uncoated burlap fabric demonstrated a permeability of 50.99 ml/s/cm2, while the coated burlap fabrics had permeabilities of 52.32 ml/s/cm2 and 38.23 ml/s/cm2, for solvent based biocidal coating and water based biocidal coating, respectively. After 32 days of immersion in salt water, the permeability for both coated fabrics significantly increased to 85.23 ml/s/cm2 and 87.28 ml/s/cm2, whereas the uncoated burlap fabric decreased permeability to 20.42 ml/s/cm2. For fouling observations, uncoated burlap fabrics experienced very minimal fouling and the coated burlap fabrics experiencing virtually no macrofouling.

Additionally, in another alternative embodiment, a 1/64 polyester uncoated fabric was coated with a solvent based biocidal coating, and alternatively coated with a water based biocidal coating. During permeability testing, the uncoated 1/64 polyester fabric demonstrated a permeability of 26.82 ml/s/cm2, while the coated 1/64 polyester fabrics had permeabilities of 44.49 ml/s/cm2 and 29.25 ml/s/cm2, for solvent based biocidal coating and water based biocidal coating, respectively. After 32 days of immersion in salt water, the permeability for all 1/64 polyester fabrics significantly decreased to 10.99 ml/s/cm2, 13.78 ml/s/cm2 and 13.31 ml/s/cm2, respectively. For fouling observations, uncoated $\frac{1}{16}$ polyester fabrics experienced some fouling, whereas the coated $\frac{1}{64}$ polyester fabrics experiencing virtually no macrofouling.

Figure 18A:
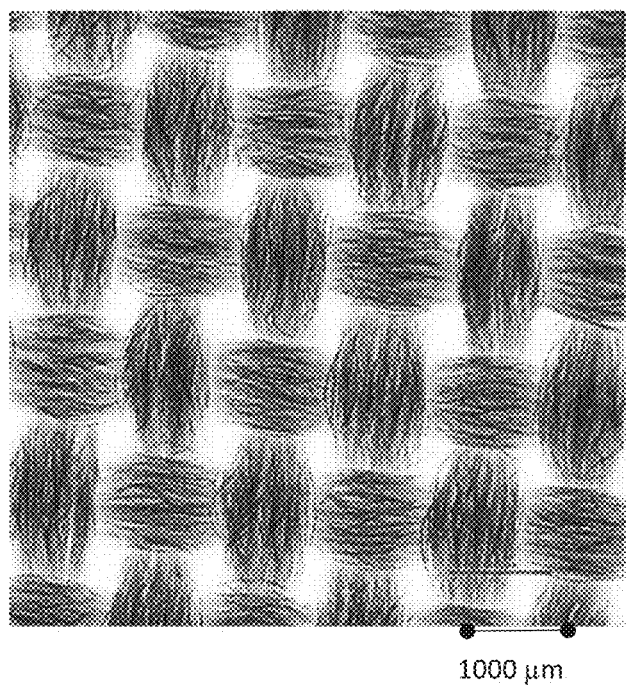
FIG. 18A depicts an uncoated polyester fabric.
Figure 18B:
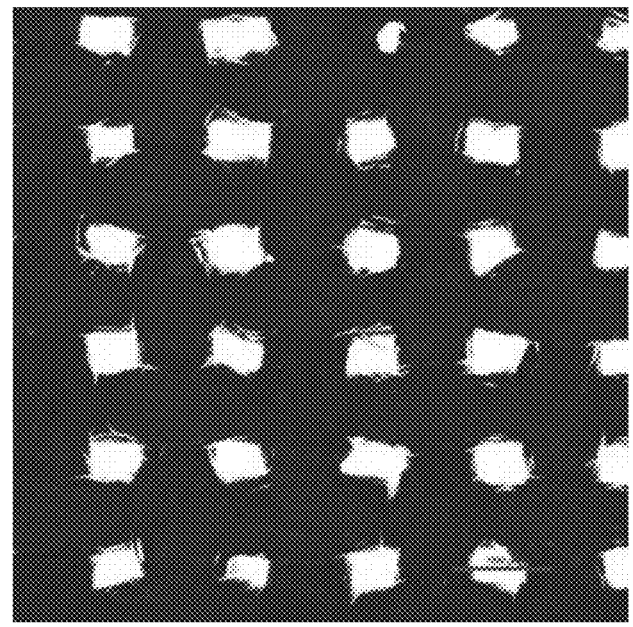
FIG. 18B depicts the fabric of FIG. 18A coated with a biocidal coating.

Different varieties of fabric cloth were manufactured, coated and utilized in the construction and testing of anti-biofouling enclosures. In a first embodiment (shown in FIG. 18A with a scale bar of 1000 μm), a textured polyester cloth was coated with a biocide coating on a first surface, with a significant amount of this coating penetrating completely through the cloth to the opposing second surface (with some areas of coating on the second surface being thinner than in other areas). FIG. 18B depicts this coated cloth at a bar scale of 1000 μm. On average, this coated cloth had 523.54 (+2.33) pores/in$^2$, with approximately less than 5 percent of the pores occluded (on average).

Figure 18C:
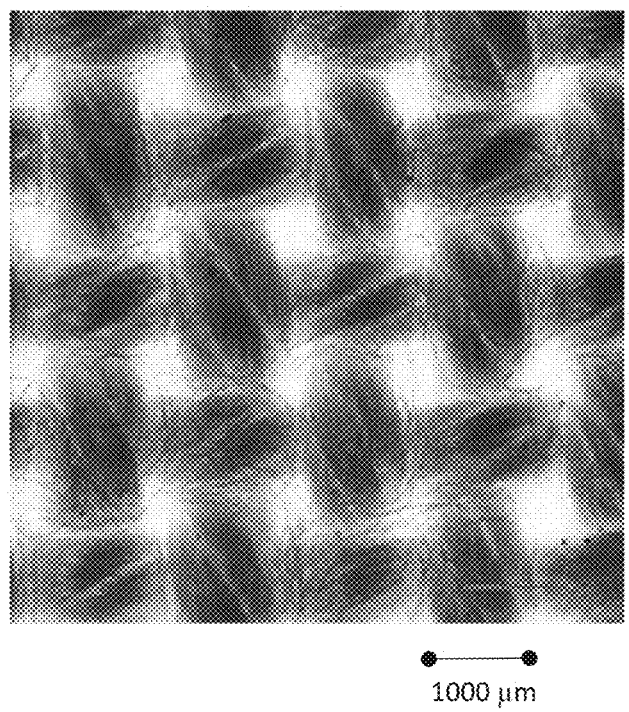
FIG. 18C depicts an uncoated spun polyester fabric
Figure 18D:
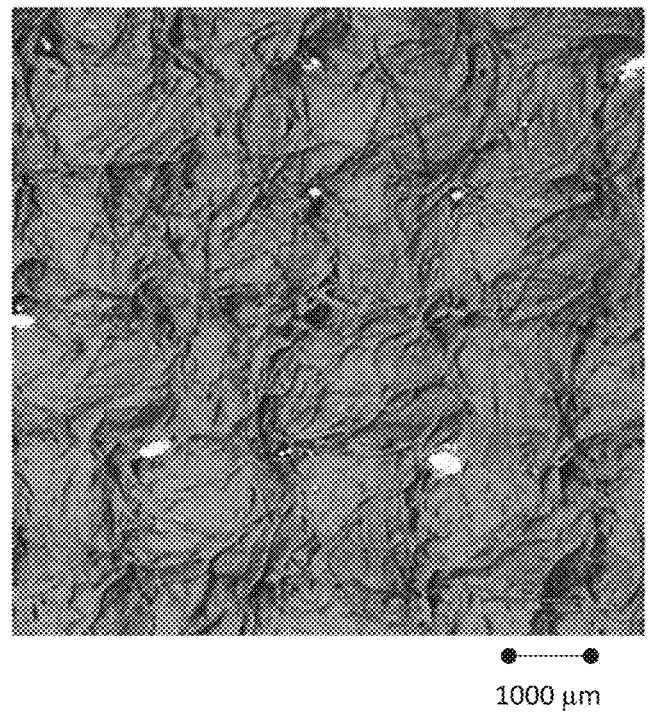
FIG. 18D depicts the fabric of FIG. 18C coated with a biocidal coating.

FIG. 18C depicts another preferred embodiment of a 100% spun polyester fabric, with FIG. 18D depicting this fabric coated with a biocidal coating. During testing, the uncoated 100% polyester fabric demonstrated a permeability of 10.17 ml/s/cm$^2$ of the fabric, while the coated poly fabrics had permeabilities of 0.32 ml/s/cm$^2$ and 1.08 ml/s/cm$^2$. After 23 days of immersion, the permeability for both coated fabrics was not significantly changed, with the uncoated poly fabric experiencing very minimal fouling and the coated poly fabrics experiencing virtually no macrofouling. In various other embodiments, however, other approaches to preparing spun polyester yarn, such as core-spinning staple fiber around a continuous core, open end spinning, ring spinning, and/or air jet spinning are anticipated to yield favorable results as well.

Figure 18E:
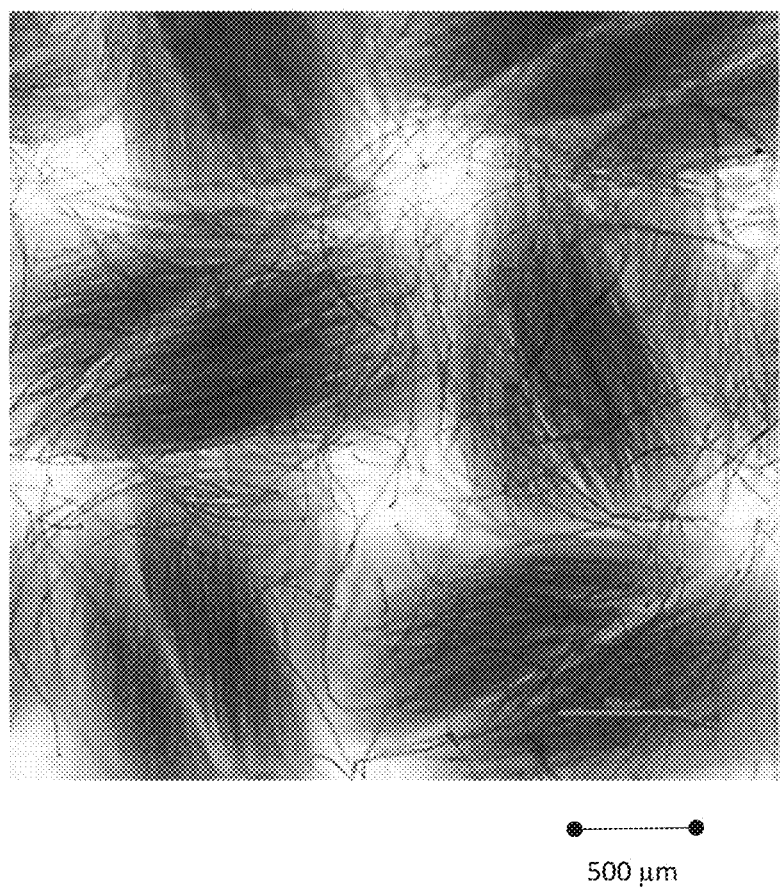
FIG. 18E depicts an uncoated spun polyester cloth.
Figure 18F:
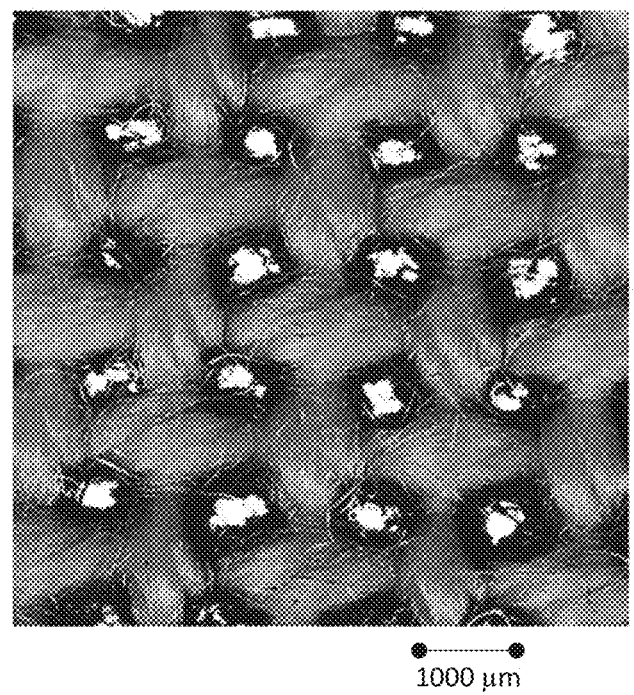
FIG. 18F depicts an uncoated side of the spun polyester cloth of FIG. 18E after coating.

In another embodiment (the uncoated fabric shown in FIG. 18E with a scale bar of 500 μm), a spun polyester cloth was subsequently coated with a biocide coating on a first surface, with a significant amount of this coating penetrating partially through the fibers and/or pores of the cloth (in some embodiments, up to or exceeding 50% penetration through the cloth). FIG. 18F shows the opposing uncoated side of the fabric at 1000 μm, with this figure also demonstrating the significant pore size reduction that can be accomplished using this coating technique, if desired. On average, this coated cloth had 493 (+3.53) pores/in$^2$, with approximately 7 to 10 percent of the pores fully occluded by the coating material (on average).

Experimentally, all of these fabric embodiments demonstrated desirable levels of permeability, which may be due to the high number of small pores, the smaller size of the fibers, and or various combinations thereof. The various coating methods were very effective in coating and penetrating the fabric to a desired level and produced a highly effective material for incorporation into a protective enclosure.

Figure 19:
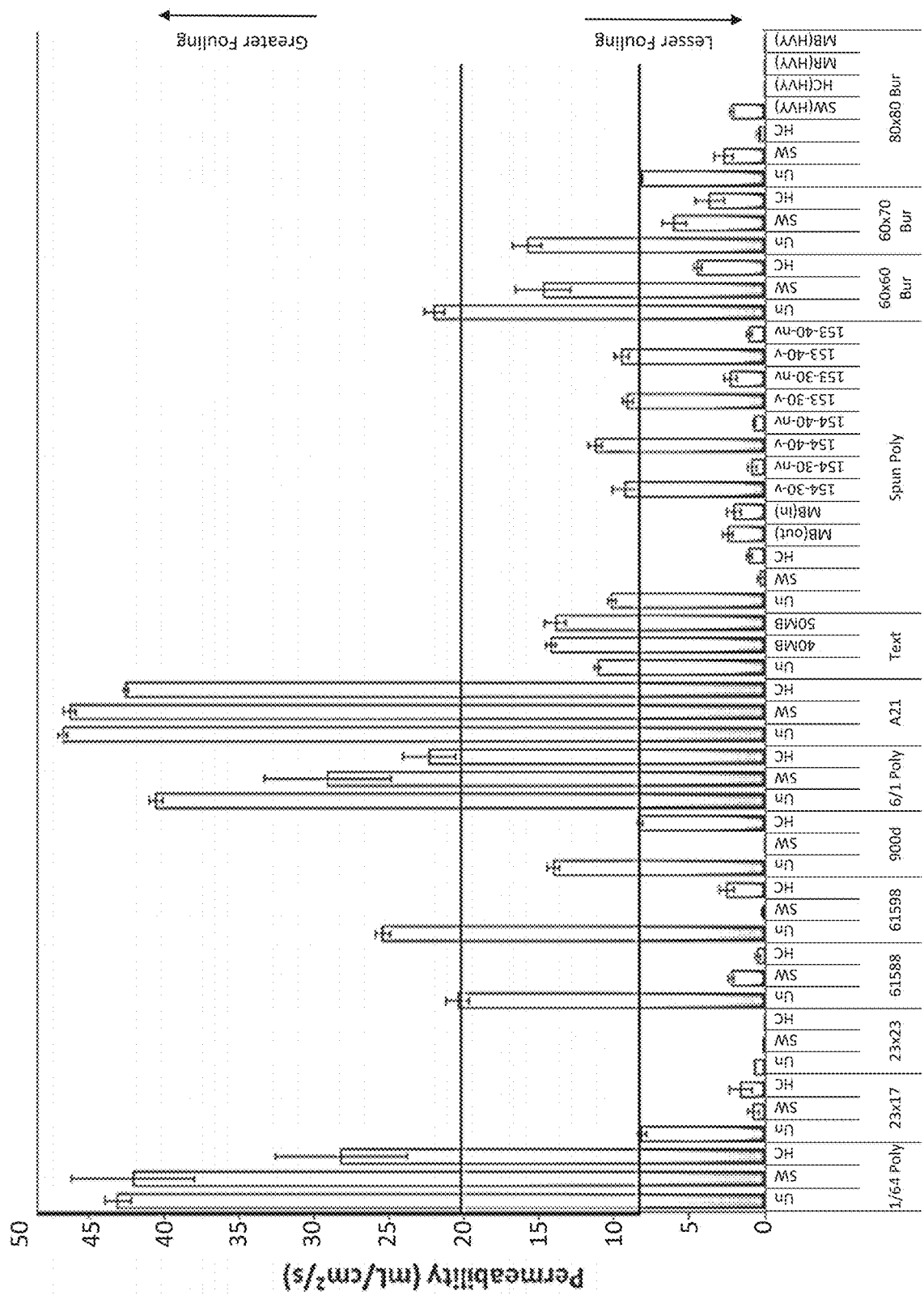
FIG. 19 depicts various fabrics suitable for use in various embodiments of the present invention.

FIG. 19 and Table 3 depict a variety of fabrics potentially suitable for use in various embodiments of the present invention, with exemplary permeabilities of these fabrics in uncoated and coated states. For example, in Port Canaveral Harbor (Port Canaveral, Florida, USA), it was experimentally determined that a permeability range of 0.5 ml/s/cm$^2$ to 25 ml/s/cm$^2$ to 50 ml/s/cm$^2$ to 75 ml/s/cm$^2$ to 100 ml/s/cm$^2$ or from about 0.1 ml/s/cm$^2$ to about 100 ml/s/cm$^2$, cm$^2$ or from about 1 ml/s/cm$^2$ to about 75 ml/s/cm$^2$, or from about 1 ml/s/cm$^2$ to about 10 ml/s/cm$^2$, or from about 1 ml/s/cm$^2$ to about 5 ml/s/cm$^2$, or from about 5 ml/s/cm$^2$ to about 10 ml/s/cm$^2$, or from about 10 ml/s/cm$^2$ to about 20 ml/s/cm$^2$, or from about 10 ml/s/cm$^2$ to about 25 ml/s/cm$^2$, or from about 10 ml/s/cm$^2$ to about 50 ml/s/cm$^2$, or from about 20 ml/s/cm$^2$ to about 70 ml/s/cm$^2$, or from about 10 ml/s/cm$^2$ to about 40 ml/s/cm$^2$, or from about 20 ml/s/cm$^2$ to about 60 ml/s/cm$^2$, or from about 75 ml/s/cm$^2$ to about 100 ml/s/cm$^2$, or from about 60 ml/s/cm$^2$ to about 100 ml/s/cm$^2$, or from about 10 ml/s/cm$^2$ to about 30 ml/s/cm$^2$, might be sufficient (depending upon local conditions) to prevent significant amounts of fouling from occurring on and/or within the enclosure and/or on the protected substrate, while still allowing sufficient water flow to inhibit and/or prevent anoxia within the enclosure. In addition, fabrics with a permeability of 0.5 ml/s/cm$^2$ or lower may be suitable for various enclosure embodiments, where occasional periods of hypoxic conditions may be acceptable and/or desired. Lower permeability than these ranges may lead to anoxic conditions during periods of low water movement in some areas, which may be less desirable and/or undesirable in various embodiments. In another exemplary embodiment, a permeability range of at least 0.32 ml/s/cm$^2$, and up to 10.17 ml/s/cm$^2$ was determined to be an optimal range of desirable permeability characteristics and/or a desired range of anticipated permeability changes during the life of the enclosure. In other embodiments, a range of at least 1.5 ml/s/cm$^2$, and up to 8.0 ml/s/cm$^2$ may be desirous (as well as any combination of the various ranges disclosed herein). In many cases, because the specific fouling organisms, the incidence of fouling incursion and/or rate of fouling growth in a given region and/or water body can be highly dependent upon a multiplicity of interrelated factors, as well as the local and/or seasonal conditions of the intended area of use (and the intended substrate to be protected, among other things), the acceptable ranges of permeability for a given fabric in a given enclosure design may vary widely-thus a fabric permeability that may be optimal and/or suitable for one enclosure design and/or location may be less optimal and/or unsuitable for another enclosure design and/or location. In FIG. 19, the "greater" and "lesser" fouling arrows on the graphic relate to observed fouling on the protected substrates, and these permeability numbers and ranges therein should be interpreted as general trends of the ability of a given fabric and/or permeability to provide antifouling protection while avoiding extended periods of anoxic conditions in a given body of water, but should not be interpreted as precluding the use of a given fabric in other enclosure designs and/or water conditions.

In various embodiments, the permeability of the material of the enclosure can desirably be maintained within a desired range of permeabilities over its useful life in situ (or until the desired biofilm layer has been established, if desired), such that any potential increases in the permeability of the material due to changes in the structure and/or materials of the enclosure (as one example) would desirably approximate various expected decreases in the material's permeability due to clogging of the pores by organic and/or inorganic debris (including any biofouling of the material and/or its pores that may occur). This equilibrium will desirably maintain the integrity and/or functioning of the enclosure and the characteristics of the differentiated environment over an extended period of time, providing significant protection for the enclosure and/or the protected substrate.

In various embodiments, the enclosure walls may incorporate a variety of materials that experience permeability changes during immersion testing in an aqueous environment over an extended period of time. For example, uncoated synthetic materials may generally become less permeable over time (which may be due to progressive fouling of the fabric once positioned around a substrate), while some materials coated with biocidal coatings can undergo a variety of permeability changes, including some embodiments becoming less permeable over time. In addition, a natural test fiber (Burlap) in an uncoated state became more permeable, while biocide coated burlap became less permeable over time. In various embodiments, varying of coating parameters (i.e., coating add-on/thickness, application methods, vacuum application to maintain and/or increase pore size, drying parameters, etc.) and varying textile parameters (i.e., construction, materials, initial permeability, constrained during drying or not, heat set or not, etc.) can make it possible to produce a broad range of desirable permeability characteristics as well as anticipated permeability changes during the life of a given enclosure design. When deployed into the aqueous environment, it is thus possible to influence (and/or control) whether the permeability increases or decreases over time for some extended period(s), as well as the associated correlation with product life cycle.

In various embodiments, the enclosure can desirably inhibit biofouling on a substrate at least partially submerged in an aquatic environment, with the enclosure including a material which is or becomes water permeable during use, said enclosure adapted to receive said substrate and form a differentiated aquatic environment which extends from a surface of the substrate to at least an interior/exterior surface of the structure, wherein said structure or portions thereof has a water permeability, upon positioning the structure about the substrate or thereafter, of about 100 milliliters of water per second per square centimeter of substrate, of about 100 milliliters of water per minute per square centimeter of substrate, or values therebetween, or greater/lesser permeabilities.

In various embodiments, water permeability of a structure may be achieved by forming the structure to allow water to permeate there through, such as by weaving a textile to have a desired permeability and/or optionally coating a textile with a biocide coating (or non-biocide containing coating) that provides the textile with a desired permeability. In some embodiments, the structure may be designed to become water permeable over time as it is used. For example, an otherwise water permeable structure may have a coating that initially makes it substantially non-permeable, but as the coating ablates, erodes, or dissolves, the underlying permeability increases and/or becomes useful.

Figure 20:
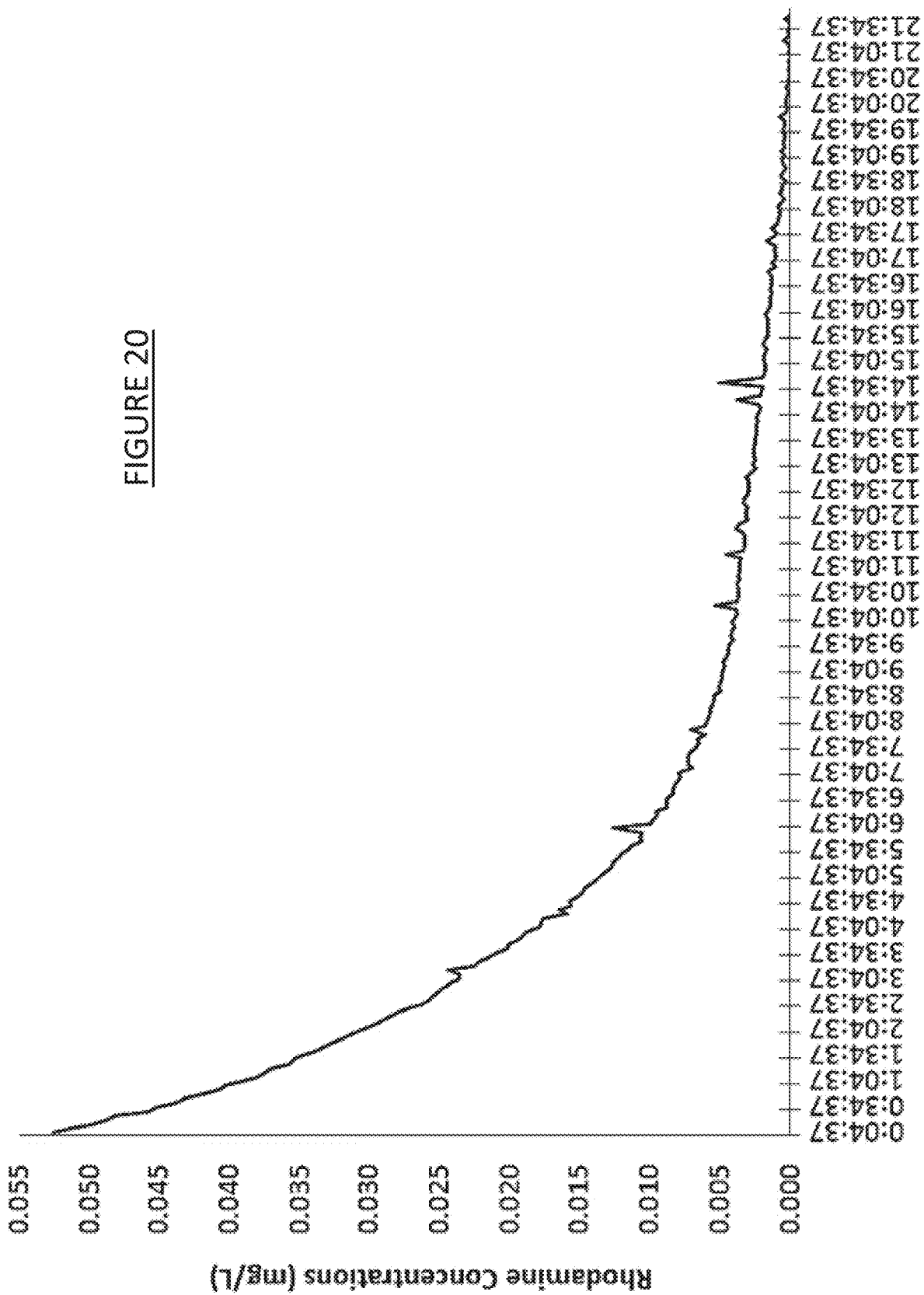
FIG. 20 depicts the detection of a rhodamine concentration in an exemplary enclosure over time.

FIG. 20 and Table 10 (below) depicts one exemplary test of water permeability of an enclosure incorporating permeable fabric walls. In this embodiment, an initial high concentration of Rhodamine was created in an enclosure in an aqueous environment, and then the Rhodamine concentration was measured over time to determine how the concentration of this marker fell as water exchange occurred in and out of the enclosure's permeable walls. The test indicated that the residence time of Rhodamine in this enclosure with its dimensions and wall permeabilities was approximately 4 hours and 10 minutes, with a half-life of 3 hours and a flow rate of approximately 0.0027 ml/cm$^2$/sec.

TABLE 10

RHODAMINE DYE TESTING

Flow Rate Calculations for Rectangular Enclosures

| Enclosure | length (feet) | width (feet) | depth (feet) | area (square ft) | volume (gallons) | pumping rate (gallons/hr) | turnover time (hrs) | (gal/sq ft /hr) flow rate | ml/sq cm/sec |
|---|---|---|---|---|---|---|---|---|---|
| Stern Mimic (dye test) | 4.0 | 3.0 | 3.0 | 54 | 269 | 65 | 4.17 | 1.20 | 0.001357 |
| 18" Cube (pumping Test) | 1.5 | 1.5 | 1.5 | 11 | 25 | 650 | 0.04 | 57.78 | 0.065397 |
| 50' boat (theoretical) | 50.0 | 12.0 | 5.0 | 1220 | 22,442 | 1200 | 18.70 | 0.98 | 0.001113 |

The Rhodamine Dye testing was utilized as an analog for determining water exchange rate in various test enclosures. For example, a YSI Total Algae Sensor (TAL) was placed into a fully bagged stern mimic. A concentration of 0.9 mg/L of Rhodamine was added to the stern mimic. When data had returned to background concentrations for the pigments in the bag, the YSI was placed in the open water for 2 days to get open water readings for comparison with the undosed bag levels. Residence time, half-life and flow rate were calculated from the rhodamine data. Residence time was calculated as 37% of the initial concentration of rhodamine dye. Half-life was calculated as 69.3% of the residence time (using these calculations as found in the literature). Flow rate was calculated by taking 2× the volume (to account for 1 volume in and one out) and dividing that by the residence time and the surface area. Rhodamine concentration in mg/L was graphed after background pigment was subtracted to get a better idea of the dilution rate. The test results show that it took approximately 26 hours for the pigment concentration in the stern mimic to stabilize back to natural levels. The residence time was calculated as 4 hours 10 minutes with a flow rate calculated to be 0.0027 mL/cm$^2$/s.

In various embodiments, it may be highly desirous for an enclosure or portions thereof to have an initially high permeability, with a subsequent reduction in permeability that occurs after the enclosure has been placed about a substrate to be protected. For example, an enclosure having extremely low permeability might maintain positive buoyancy after placement in an aqueous medium, which might render it difficult if not impossible to place the enclosure about a submerged and/or partially submerged substrate. In contrast, an enclosure incorporating more permeable elements might "sink" more readily upon deployment about a substrate. Such an enclosure might include a lower portion that is highly permeable (to allow water inflow and rapid filling of the enclosure), with other enclosure elements that are more or less permeable. Once deployed about a substrate as desired, the more permeable elements may change permeability (i.e., more or less permeable) or may remain the same permeability, as desired.

In various embodiments, when an enclosure such as described herein is utilized, the biological colonizing sequence on the substrate may be interrupted (disrupted, altered, etc.) to reduce and/or minimize the settlement, recruitment and ultimate macrofouling of the substrate.

Once positioned around or inside (if protecting inner surface of a substrate) the substrate, the permeable, protective fabric walls of the enclosure can desirably filter and/or impede the passage of various micro- and/or macro-organisms into the enclosure, and the optional biocide coating in some embodiments might prevent fouling of the enclosure and/or might injure and/or impair some and/or all of the organisms as they contact and/or pass through the fabric. If desired, the biocidal coating may experience significant biocidal elution upon initial placement around the substrate to establish an initial higher "kill level" affecting fouling organisms, with the biocidal elution levels significantly reducing over a period of time as the water chemistry changes within the enclosure to create the desired differentiate environment, thus protecting the substrate from further fouling.

In one exemplary embodiment, testing of microscopic plankton transiting a biocide coated permeable fabric membrane of an enclosure indicated that some organisms were likely to remain alive and viable after the transit, while some other organisms were likely to be impaired and/or injured during the transit. This observation of living organisms within the enclosure was reinforced by testing of differentiated water within an enclosure, wherein a significant percentage of micro-organisms within the enclosure that use appendages (like barnacle larvae and tunicates with speeds in the 1-10+ cm/s range) appeared to remain viable within the biocide coated enclosure, along with many viable micro-organisms that use cilia (like bivalve veligers and tube worms with speeds in the 0.5-2 mm/s range). But even while living fouling organisms were present inside of the enclosure and/or in direct contact with the substrate, the enclosure protective features prevented these living and/or viable organisms from thriving and/or colonizing on the protected substrate.

FIG. 21 depicts various plankton types and conditions (i.e., live or dead) identified in the various enclosures, by permeable fabric type. In various enclosure tests, the results showed there were more poor than good swimmers within the biocide coated fabric enclosures, suggesting that the biocide may have injured or otherwise affected the larvae that were swept into the enclosures with coated fabric and then could not get out. Additionally, the "good" swimmers may have been able to swim out of the enclosure and the "poor" swimmers might not have been able to leave the enclosure due to limited water movement within the enclosure. This observation was further supported by the fact that there were significantly more poor swimmers in coated fabric enclosures than the uncoated fabrics and open samples. It also appeared that there were more plankton total in coated fabric enclosures than in uncoated.

While the instant invention has been described in the form of a flexible bag-type enclosure with a closeable end opening, the anti-biofouling enclosure can be shaped to fit any structure. In various embodiments, the enclosure material can be provided in the form of a rolled up sheet, with or without the biocide or other coating applied to the outer surface of the sheet material, which could include significant penetration into and/or through the sheet material, or could alternatively include a biocide or other anti-biofouling material incorporated into the sheet material, which could utilize microencapsulation to customize the release of the biocide. As such, the anti-biofouling enclosure can be placed onto various types of aquatic structures, such as netting, in-take pipes, sewage pipes and/or holding tanks, water system control valves and safety valves, offshore systems, irrigation systems, power plants, pipeline valves and safety control systems, military and commercial monitoring sensors and arrays, et al. Other embodiments could include support columns for aquatic structures, bridges, flood barriers, dikes and/or dams. To extend the life of subsurface structures that extend above the water, the support and base structures could incorporate wrappings (tight or loosely bound) and/or similar enclosures.

Other objects that could be protected include tethered and/or free-floating structures such as buoy and/or sensors. An enclosure can be attached to the portion of the buoy that is near or in direct contact with the aquatic environment to prevent the accumulation of biofouling within those areas, as well as wrapped or enclosed/bounded envelope structures, blankets and/or sleeves placed around linkages and/or cables which anchor the buoy to the sea floor.

Once an enclosure is properly positioned about the substrate and closed or otherwise "sealed" to a desired degree (including embodiments that may not be fully enclose the substrate, and/or embodiments that may only partially enclose a substrate) the influence of the enclosure will desirably create a unique aqueous environment in the area immediately surrounding the substrate and/or other object, with the goals of (1) buffering and/or minimizing exposure of the substrate from incursions of additional viable micro- and/or macro-fouling agents, (2) filtering any liquids passing into and/or out of the enclosure, (3) reducing and/or eliminating the direct effects of sunlight or other light/energy sources on the substrate and/or biological entities within the differentiated environment, (4) regulating the amount of dissolved oxygen and/or other water chemistry values within the differentiated environment, (5) metering, controlling and/or limiting liquid exchange between the differentiated environment and the open environment, including reducing the velocity and/or turbulence of liquid within the enclosure, (6) insulating and/or isolating the substrate from electrical charges and/or electrically charged fouling particles, and (7) maintaining various water chemistry values, such as pH, temperature, salinity and/or other environmental factors within the differentiated environment in close proximity to those of the surrounding open environment, if desired. Moreover, in various embodiments some or all of the enclosure itself will desirably be protected from significant biofouling by the activity of the biocide coating, the elution of various chemicals from inside of the enclosure, the flexibility of the enclosure material and/or the potential for biofouling agents to slough off of or other detach from the enclosure's structure(s).

Fouling Weight/Mass Control

In various embodiments, it may be desirous for an enclosure to reduce, minimize and/or prevent certain types and/or species or fouling organisms from attaching to the enclosure and/or protected substrate. For example, it may be desirous to prevent bivalves or other "heavier" fouling organisms (i.e., those having high fouling biomass and/or causing significant drag) from attaching to an enclosure, while fouling by "lighter" organisms such as bacterial colonies, neutrally buoyant organisms and/or "slimes" may be acceptable and/or desirous. In such a case, the enclosure, any optional biocide and/or other enclosure elements may be selected and/or designed to reduce, minimize and/or prevent colonization by one or more specific types of such unwanted organisms.

Preconditioning of Aqueous Environment

In some embodiments, it may be desirous to provide supplemental modification of the aqueous environment proximate to the substrate/object to be protected, including such modification prior to, during and/or after the enclosure has been placed about the object as previously described. In some embodiments, such modification may include the use of natural and/or artificial mechanisms and/or compounds to alter various components of the water chemistry, such as by causing an accelerated depletion and/or replacement of the dissolved oxygen or other change in water chemistry in the aqueous environment within the enclosure by the introduction of one or more aerobic microbes, chemicals and/or compounds (including oxygen depleting compounds) into the aqueous environment proximate to the substrate. For example, in one embodiment an object to be protected from biofouling could comprise the underwater hull portion of a boat, wherein an enclosure such as described herein is placed around the hull, and then a supplemental oxygen depleting compound or substance comprising one or more species of aerobic bacteria, such as aerobic *bacteroides*, can be artificially introduced into the aqueous environment of the enclosed or bounded space in large numbers and/or quantities, desirably accelerating the reduction in dissolved oxygen levels induced by the enclosure. Such introduction could be by way of liquid, powdered, solid and/or aerosolized supplement thrown or deployed into the seawater and/or enclosed/bounded aqueous environment, or alternatively the oxygen depleting bacteria or other constituents could be incorporated into a layer or biofilm formed in or on an inner surface of the enclosure walls prior to deployment. Desirably, the aerobic *bacteroides* could comprise a bacterial species already present in the aqueous environments, wherein eventual release of such bacteria through the bottom and/or walls/openings in the sides of the enclosure would not be detrimental and/or consequential to the surrounding environment. In other embodiments, a chemical compound may be introduced into the aqueous environment within the enclosure to desirably absorb dissolved oxygen from the water within the enclosure, such as powdered iron (i.e., zero-valent iron Fe0 or partially oxidized ferrous iron $Fe^{2+}$), nitrogen gas or liquid nitrogen, or additives such as salt may be added to the aqueous environment to reduce the amount of dissolved oxygen the water can hold for a limited period of time.

In various embodiments, the modification compound could comprise a solid, a powder, a liquid, a gas or gaseous compound and/or an aerosol compound which is introduced into the enclosed or bounded aqueous environment with the enclosure and/or separately (including prior to, concurrent with and/or after enclosing the substrate). In some embodiments, the modification compound may be positioned within the enclosed or bounded aqueous environment for a limited or desired period of time, and then removed from the environment after the desired modification and/or conditioning of the water has occurred (i.e., creation of the "differentiated" aqueous environment). In other embodiments, the modification compound may be distributed into the enclosed or bounded aqueous environment, with some embodiments of the compound potentially dissolving and/or distributing into the water while other compounds may remain in a solid and/or granular state. If desired, the modification compound may include buoyancy features which desirably maintain some or all of the compound within the enclosure and/or at a desired level within the water column (i.e., at the surface and/or at a desired depth within the enclosure, such as at a position deeper than the submerged depth of the protected object), while other embodiments may allow the compound to exit from the bottom and/or sides of the enclosure and/or rest on the bottom of a harbor or other seafloor feature within and/or proximate to the enclosure. In still other embodiments, the modification compound may alter the density and/or salinity of the water or other liquids within the differentiated environment, which may reduce and/or eliminate the natural tendency for liquids within and/or outside of the differentiated environment to mix together and/or otherwise flow.

In at least one alternative embodiment, a modification compound or compounds may be released into the external, non-enclosed waters adjacent or near the enclosure, which may flow into and/or through the enclosure, if desired. In still other embodiments, the modification compound and/or constituents thereof may be deployed in combination, with some components placed outside of the enclosed or differentiated environment, which other components could be placed within the enclosed or differentiated environment.

In some embodiments, the modification compound may be attached to and/or integrated into the walls of the enclosure and/or pockets formed therein, including within the material construction and/or any coatings therein/thereon. If desired, the compound could include a water and/or salt-activated and/or ablative material which reacts with the aqueous medium, having a limited duration such as 10 minutes, 1 hour, 12 hours and/or 2 days for which the compound affects the dissolved oxygen level and/or other water chemistry level(s) within the enclosure, or could be effective for longer periods of time such as 1 week or 1 month or 1 year. If desired, the modification compound or other material could be positioned within replaceable bags that can be positioned within and/or outside of the enclosure, with the material in the bags "depleting" over time and potentially requiring replacement as needed.

In one exemplary embodiment, the modification compound could comprise a crystalline material that absorbs oxygen from the aqueous environment within the enclosure, such as a crystalline salt of cationic multi-metallic cobalt complexes (described in "Oxygen chemisorption/desorption in a reversible single-crystal-to-single-crystal transformation," published in CHEMICAL SCIENCE, the Royal Society for Chemistry, 2014). This material has the capability of absorbing dissolved oxygen ($O_2$) from air and/or water, and releasing the absorbed oxygen when heated (i.e., such as being left out in ambient sunlight) and/or when subjected to low oxygen pressures. If desired, this oxygen absorptive material could be incorporated into the wall material of the enclosure such that oxygen is immediately absorbed when the enclosure is placed within the water in proximity to the protected substrate, but such oxygen absorption would taper off after a period of time after placement. Subsequently, the enclosure walls could be removed from the water (such as after protection is no longer desired), and the enclosure walls left in the sunlight to release the absorbed oxygen and "recharge" for the next use.

In another exemplary embodiment, the modification compound could comprise a gas or gaseous compound such as nitrogen or carbon dioxide (or some other gas or compound) that could be introduced into the enclosure in gaseous form or which could be released from a pellet or other liquid or solid compound (including potentially the "dry ice" form of CO2) after introduction into the enclosure. Such introduction or "sparging" could comprise injection of nitrogen and/or N2 bubbles into the water inside the enclosure, or within/along the walls of the enclosure. Injection may be accomplished at the surface of the enclosure and/or at any depth within the water column. Desirably, such injection will not induce significant convective currents within the enclosure to bring significant amounts of outside water and/or dissolved oxygen into the system. In some embodiments an enclosure such as described herein can be combined with an installed nitrogen dosing system and monitoring probe for oxygen levels that controls the periodic renewal of the nitrogen flush when needed. In various embodiments, nitrogen injection may be accomplished using a small nitrogen tank with a porous weighted dispenser (i.e., an aquarium aeration stone) while other embodiments may utilize an on-site nitrogen generator to purify nitrogen from the air, and then dispense this nitrogen through a pumping system. If desired, the nitrogen dispensing system could include a bubble dispensing system that releases bubbles of a single range of sizes or of varying size ranges, if desired. In at least one embodiment, a nitrogen nanobubble infusing system may be utilized.

In at least one alternative embodiment, a gaseous compound injection suitable for use in the various systems described herein could comprise an ozone injection system such as the Ozonix® system, commercially available from Ecosphere Technologies, Inc. of Stuart Florida, USA.

In various embodiments, the modification compounds described herein will desirably induce a reduction in the dissolved oxygen levels of the enclosed or bounded aqueous environment (i.e., within the enclosure as compared to dissolved oxygen levels outside of the enclosure) within/after a few seconds or application and/or within/after a few minutes of application (i.e., 1 minute to 5 minutes to 10 minutes to 20 minutes to 40 minutes to 60 minutes of applied nitrogen bubbling) and/or within/after a few hours of application by at least 10%, by at least 15%, by at least 20%, by at least 25%, by at least 50%, by at least 70%, and/or by at least 90% or greater. In some instances, the environment within the enclosure may have already altered to some degree to a "differentiated" aqueous environment as described herein prior to addition of the modification compound (i.e., where the compound may simply alter, supplement, reverse, retard and/or accelerate some of the various chemical changes that may be already in progress), while in other embodiments the environment within the enclosure may possess similar chemistry to the surrounding open aqueous environment prior to addition of the modification compound.

In various alternative embodiments, the modification compound could comprise a material or materials that alter one or more constituents of the water chemistry within the enclosure other than the dissolved oxygen levels, or the modification compound may comprise a material that alters one or more additional constituents of the water chemistry within the enclosure in combination with some level of modification of the dissolved oxygen levels within the enclosure. Such additional constituents of the water chemistry could include pH, total dissolved nitrogen, ammonium, nitrates, nitrites, orthophosphates, total dissolved phosphates, silica, salinity, temperature, turbidity, as well as others described in various locations herein. In another embodiment, a secondary preconditioning/dousing agent, chemical, powder, or similar may be used to precondition the waters.

In various embodiments, the amount and/or type of modification or "preconditioning" compound (or compound combinations) or "conditioning" or "continuous conditioning" or "post-conditioning" desirable for a given enclosure may be determined (1) based on the cross-sectional (i.e., lateral and/or vertical) size of the enclosure, (2) based on a volume of the aqueous medium contained within the enclosure, (3) based on the wetted surface area and/or depth of the protected object, (4) based on the chemical and/or environmental characteristics of the aqueous environment within and/or outside of the enclosure (5) based on the size of opening(s) and/or depth of the water outside of the enclosure, (6) based on the amount of water exchange between the enclosed or bounded environment and the surrounding aqueous environment, and/or (7) various combinations thereof.

In various embodiments, the employment of an oxygen "scavenger" and/or modifier and/or increaser and/or absorber and/or or "displacer" or similar physical, chemical and/or biologic process (which may affect dissolved oxygen or alternatively some other element and/or compound within the enclosed or bounded environment) as an initial means of altering the water chemistry within the enclosure at or directly before/after the time of enclosure placement and/or substrate placement may be desirous to reduce and/or eliminate biofouling which may occur within the enclosure when dissolved oxygen or other water chemistry levels are at undesirable levels, including during initial enclosure deployment, in situations where the initial enclosure deployment may have been sub-optimal (i.e., due to human error), where the enclosure has been intentionally "breached" by opening or closing the enclosure or portions thereof, where the enclosure has been damaged in some manner during use, and/or where the natural environmental conditions may be particularly amenable to the occurrence of biofouling (i.e., where water movement increases the water exchange rate between the differentiated and external environments to undesirable levels and/or during periods of particularly heavy biofouling occurrence such as during daylight hours in spring or summer or "heavy biofouling season"). Desirably, the scavenger can quickly reduce the dissolved oxygen levels or create other targeted water parameters within the enclosure so as to initiate the inhibition and/or reduction in biofouling caused by the enclosure for a limited period of time, allowing for the enclosure to be correctly deployed and/or repaired at a later period of time and/or to allow the artificial conditions within the enclosure to stabilize to desired levels due to slower natural processes. In various embodiments, such employment may alternatively be undertaken a significant amount of time after the enclosure has been placed, if desired, to "refresh" or otherwise alter water conditions to a desired degree and/or for a limited period of time, after the enclosure has been opened for a period of time (such as to allow an object to enter or leave the enclosure) and/or to allow for repair and/or replacement of enclosure components when necessary and/or desired. In contrast to oxygen reduction actions, in some embodiments the dispersion of an oxygen source or other modification compound (i.e., direct injection of gaseous oxygen and/or introduction of a chemical which may release oxygen directly or through some chemical reaction), or some other oxygen addition activity (i.e., manually agitating a water surface of the enclosure) might be useful in some embodiments to transiently increase the dissolved oxygen level in an enclosure experiencing undesirable anoxic conditions.

In various embodiments, the modification compound may affect other water chemistry features in a desired manner, which may include effects which are directly induced by the modification compound as well as effects which may "cascade" from initial effects caused by the modification compound. In some cases, other water chemistry may be minimally affected and/or "untouched" in comparison to those of the surrounding open aqueous environment. Some exemplary water chemistry features that could potentially be "different" and/or which might remain the same (i.e., depending upon the type and amount of the modification compound, the dosage method and/or the frequency of dosing, as well as various aspects of the enclosure design and/or other environmental factors such as location and/or season) can include dissolved oxygen, pH, total dissolved nitrogen, ammonium, nitrates, nitrites, orthophosphates, total dissolved phosphates, silica, salinity, temperature, turbidity, etc. For example, an oxygen scavenger, absorber and/or displacer could potentially affect other water chemistry characteristics that may directly affect or be used to target or modify other conditions (and/or including the extension of biofouling effects long after the oxygen scavenger has been depleted and/or utilized).

In still more alternative embodiments, the modification compound may include substances that alter various water chemistry features in a variety of ways, including substances that may increase and/or decrease one of more of the water chemistry levels described herein. For example, where an enclosure may experience some fouling or other incident that potentially reduces the permeability and/or water exchange rate below a desired threshold level, it may be desirous to supplement the dissolved oxygen levels within the enclosure to some degree (i.e., to avoid anoxic conditions), which may include the addition of chemicals and/or compounds that release some level of dissolved oxygen into the differentiated environment. Alternatively, a physical mixing apparatus and/or other aeration source might be utilized to directly increase the dissolved oxygen level within the water of the enclosure for a desired period of time.

In some cases, it may be desirous to construct an enclosure that supplies significantly less than a single day or even a few hours of water usage, especially where design constraints may be limited by the amount of available real estate, environmental concerns and/or other concurrent uses of the aqueous medium. In such cases, it may be desirous to provide a continuous and/or periodic water conditioning treatment, such as previously described, which may artificially induce and/or accelerate the various water chemistry factors described herein. In such a case, the water chemistry within the enclosure may be monitored on a periodic and/or continuous basis, with one or more water conditioning treatments being applied to the water within the enclosure on an as-needed basis. For example, it can be possible to determine a desired minimum enclosure size by comparing an amount of anticipated needs in a day or so and the required "dwell time" to allow the water chemistry to reach a desired and/or acceptable level. But where the minimum enclosure size cannot be attained, or where the water chemistry changes require an excessive amount of time to attain, it may be desirous to condition the water on an as-needed basis, which may include periodic "refresher" treatments as the water within the enclosure is drained and replaced. Moreover, where the use of a large enclosure is not desired, the various water conditioning treatments described herein may be utilized in smaller enclosures and/or even within the suction piping of the facility on a continuous basis, if desired. In such a case, the various water conditioning treatments described herein could be used to condition the water continuously (such as in a water plant) with Nitrogen or other gases and/or chemicals. Such treatments may be particularly useful where there is not enough dwell time within a given enclosure to accomplish batch processing, or where a closed loop processing technique to continuously treat water may be desirous (i.e., with a closed testing and treatment loop to determine and/or maintain a desired water chemistry level (oxygen level, etc.) within certain ranges. In various embodiments, the various enclosures and/or water conditioning treatments described herein may be utilized separately and/or together on an as-needed basis, which could include the sole use of the enclosure during low water demand periods, and the use of both techniques concurrently during periods of higher water demand, if desired. In a similar manner, the water conditioning treatments described herein may be utilized alone during low water demand periods, with the use of both water conditioning with a concurrent enclosure during periods of higher water demand. It should also be understood that different environmental conditions may necessitate different treatments for the aqueous medium, including seasonal and/or other differences in temperature, sunlight, salinity, high/low water levels, high/low fouling season, etc.).

In some embodiments, it may be desirous to modify an existing body of water to include various features of the present enclosures, such as where a natural or artificial water source is being utilized to provide water for cooling and/or some other industrial processes. For example, energy generating facilities will often utilize between 300,000 to 500,000 gallons of water (or more) per minute to cool the generating units, while a typical large petroleum refining plant may utilize 350,000 to 400,000 gallons per minute. In such cases it may not be economical, practical and/or desirable to construct a single enclosure or series of enclosures that contain a full day's worth of water usage. Rather, various embodiments that incorporate "partial" enclosures and/or enclosure components described herein (i.e., vertical sheets and/or skirts) may be utilized to create a tortuous path for the water within the existing natural and/or artificial reservoir to condition the water to meet a desired water chemistry level, and may include features that expose the surface of the flowing water to the atmosphere to promote evaporating cooling of the water reservoir and/or turbulent mixing of the water along the tortuous flow path.

If desired, a modification compound or compounds may be released into one or more of the enclosures, or could alternatively be released and/or placed in the external, non-enclosed waters adjacent or near one or more of the enclosures.

In some instances, such as during periods of relatively higher water flow and/or greater water exchange %, it may be desirous to utilize a preconditioning material to augment, supplement and/or replace the various enclosure features and/or anti-fouling protective mechanisms described herein. For example, where increased water flow and/or increased water exchange may alter the differentiated environment within the enclosure to a degree to permit significant fouling to occur, it may be desirous to dispense or apply a preconditioning material into and/or adjacent to the enclosure to alter the water chemistry to reduce fouling during the increased flow period. Depending upon the duration and/or extent of such flow occurrence(s), multiple applications of preconditioning material may be desired, with such application suspended once water flow and/or the differentiated environment have returned to their desired more-normal conditions.

EXPERIMENTAL RESULTS

Experiment 1—Salt Water Immersion Protecting a Boat Propeller

Figure 22A:
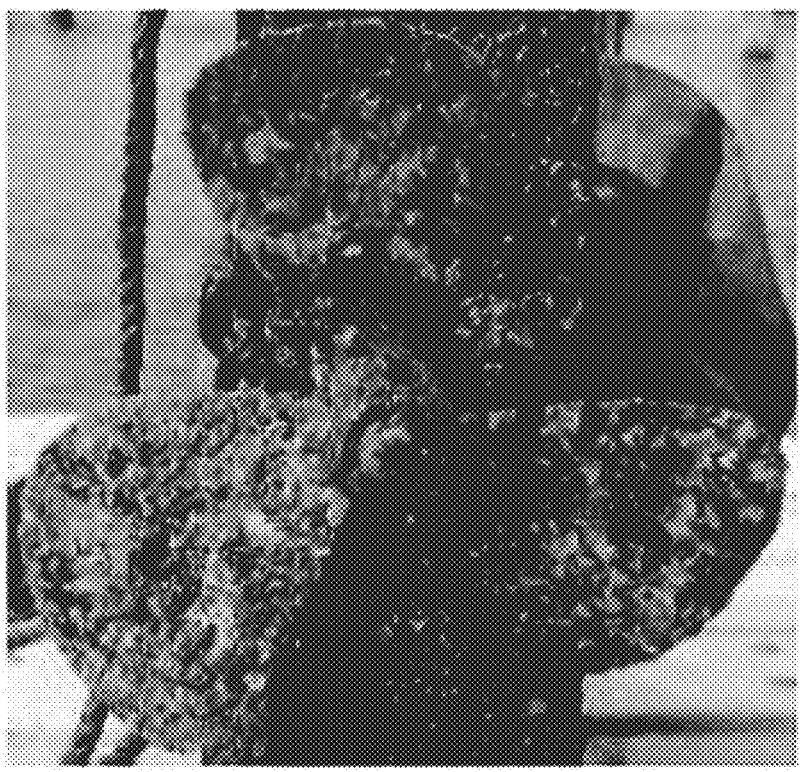
FIGS. 22A and 22B depict a pair of bronze propellers immersed in seawater, with the propeller of FIG. 22A unprotected and the propeller of FIG. 22B protected by an enclosure embodiment.
Figure 22B:
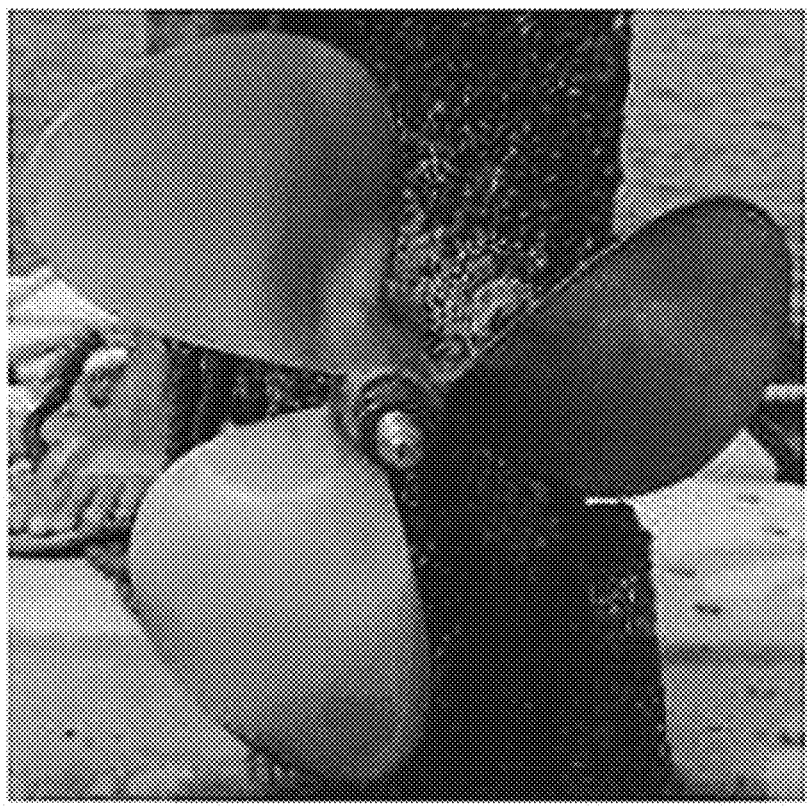

A protective enclosure formed from biocide coated canvas hemp fabric was utilized to protect a bronze propeller from fouling, in comparison with an unprotected bronze propeller as a control. The propellers were inspected at 35 days, 59 days, 89 days, 133 days and 157 days after immersion (at which point the enclosure had degraded to the point that large holes were beginning to appear therein). As best seen in FIGS. 22A and 22B, after 157 days immersed in the saltwater of a protected harbor, the unprotected propeller (22A) was heavily fouled with biofilms, hydroids, encrusting bryozoans, barnacles, tube worms, and tunicates, and the barnacles had grown quite large. In contrast, the protected propeller (22B) was clean of all fouling, although some small amount of cathodic chalk had formed on the back of the propeller blades, and the upward facing blade tips had dark stains and possibly some slight etching. The enclosure was free of macrofouling, but had some relatively heavy sediment in the folds of the enclosure. In addition, significant amounts of biofilms had begun to form on the outside of the enclosure, and the enclosure had large holes formed therein.

Experiment 2—Salt Water Immersion Protecting Bronze Substrates for 12 Months

In another experiment, enclosures incorporating permeable fabric walls of uncoated spun polyester, spun polyester coated in water-based biocide coating and solvent-based biocide coating, and 80×80 burlap coated in biocide were randomly placed on two PVC frames. The enclosures were each wrapped around a bronze substrate bar (with the distance between the enclosure walls and the substrate varying between 0.25 inches to 1.5 inches, between 1 to 4 inches, and between 4 to 6 inches in various embodiments), with the enclosures secured to the respective frame using end caps (similar to the enclosures shown in FIG. 2). An additional set of frames was modified so as to provide undisturbed water quality measurements. An opening was made in the top end caps on the samples of these frames that eliminated the need to remove the frames from the water (and thereby avoided disrupting the water inside the enclosures).

The enclosures prevented macrofouling on the substrate bars, while fouling on the unprotected bars was heavy and consisted of encrusting and arborescent bryozoans, barnacles, tube worms and oysters. In addition, there was very light tube worm fouling (1% cover) on the end caps of (one) 1 replicate each of the coated Poly enclosures. After 12 months immersion in salt water, the enclosure protected bronze bar substrates developed about 60% coverage of a thin biofilm with no or limited macrofouling; whereas, the unprotected bronze bar substrates contained close to 100% coverage of macrofouling after the first month with increasing concentrations of macrofouling up to 3 months consisting of Encrusting Bryozoans, Arborescent Bryozoans, Barnacles, Tube Worms and Tunicates (see Table 11). Note: the biofilm levels of Table 11 for the control fabrics were not directly or easily visible due to the presence of significant macrofouling.

Figure 23A:
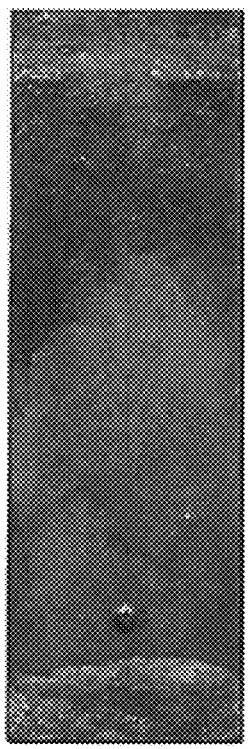
FIG. 23A depicts a substrate protected by an enclosure after 12 months immersion in seawater.
Figure 23B:
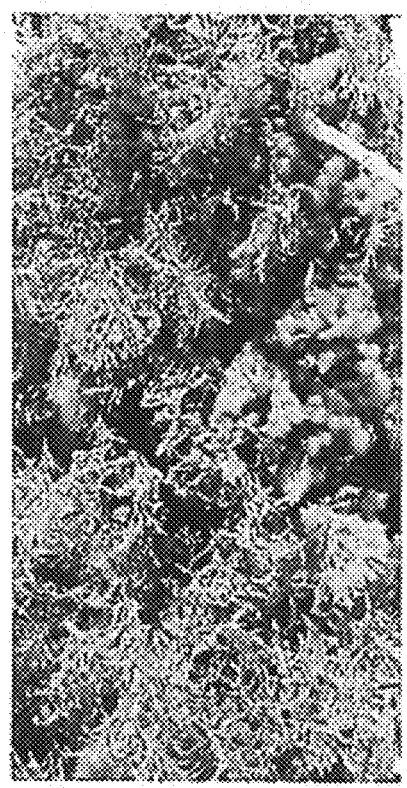
FIG. 23B depicts the enclosure which protected the substrate of FIG. 23A.
Figure 23C:
FIG. 23C depicts an unprotected substrate immersed for 12 months in seawater in proximity to the substrate and enclosure of FIGS. 23A and 23B.

FIG. 23A depicts a protected bronze substrate and FIG. 23B depicts a protective enclosure (which surrounded the bronze substrate of FIG. 23A) comprising a spun poly uncoated fabric, after 12 months of immersion in seawater, with 23C depicting a bronze substrate which was not protected during the same immersion period. As best seen in FIGS. 23B and 23C, significant levels of fouling occurred on both the enclosure outer surface and the unprotected substrate, but the protected substrate of FIG. 23A was virtually pristine.

Figure 23D:
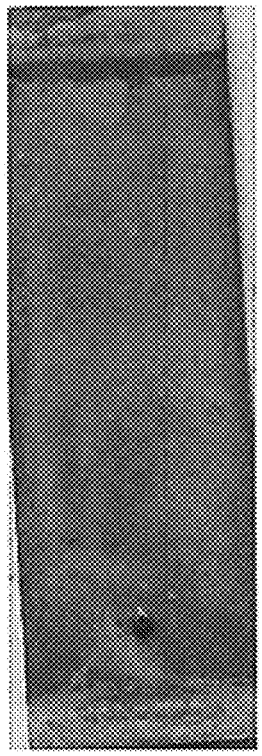
FIG. 23D depicts a protected substrate.
Figure 23E:
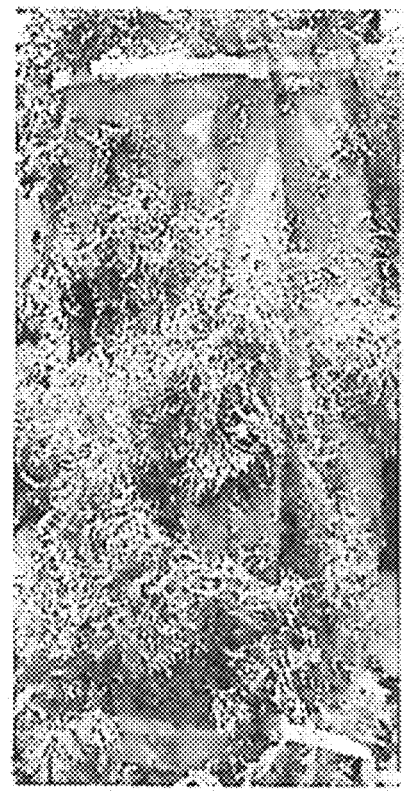
FIG. 23E depicts the enclosure that protected the substrate of FIG. 23D.

In various experiments, all of the enclosure embodiments tested prevented macrofouling on bronze, and many additionally prevented (<2% macrofouling cover) significant fouling on associated end caps for at least 1 year in situations where the enclosure's integrity was maintained. Enclosures incorporating a spun polyester fabric protected the underlying substrate completely from macrofouling, as long as the enclosure's integrity was maintained (~6 mos.), even in the absence of a biocide coating. FIG. 23D depicts another substrate that was protected by fouling, even though the coated poly enclosure of FIG. 23E did begin to foul heavily and quickly after 12 months of immersion in some embodiments, but this enclosure still maintained the differentiated environment and fouling protection of the substrate, even while the external fouling may have negatively affected the water exchange rate and/or water quality in the enclosure (particularly with regards to optimal ranges of Dissolved Oxygen within the differentiated aqueous environment). While the water quality in the coated enclosures was generally different than in the open water, the Dissolved Oxygen level in these enclosures did not appear to dip low enough for an extended period of time to cause significant potential corrosion issues (i.e., anoxia).

Figure 23F:
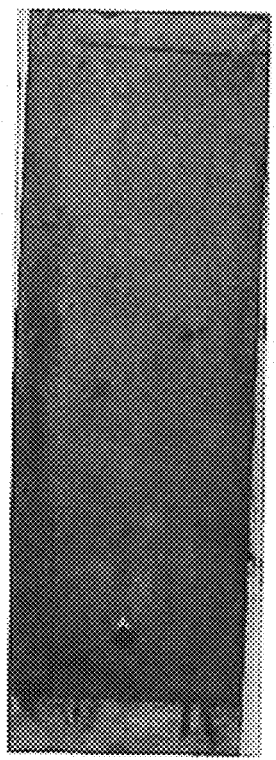
FIG. 23F depicts a protected substrate.
Figure 23G:
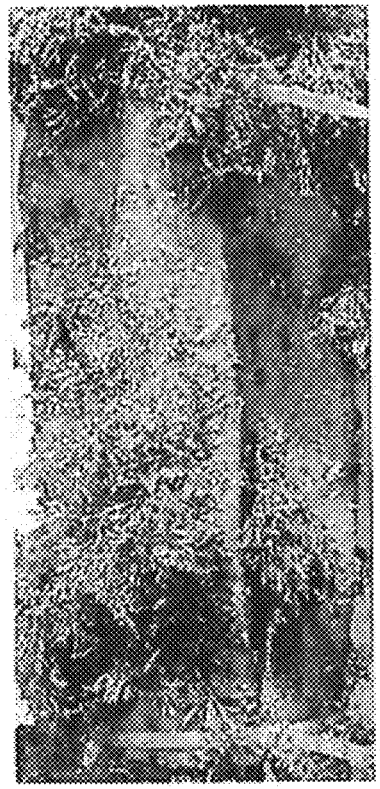
FIG. 23G depicts the natural fiber enclosure that protected the substrate of FIG. 23F.

In various embodiments, a biocidal coated enclosure material, which was formed using water-based and/or solvent-based coatings, such as various polyester fabrics showed no signs of degradation after over 1 year of immersion in salt water, which was a significant improvement over natural fibers like burlap (see FIGS. 23F and 23G), which degraded within one year. However, various embodiments of natural fibers may have some advantages over uncoated poly in some embodiments, including reduced cost and/or ability to quickly break down and/or degrade after disposal (i.e., in a natural environment). Additionally, a biocidal coated polyester enclosure material contained less macrofouling on the material surface compared to a polyester material with no biocidal coating.

In this test, water quality measurements of open waters and water within the enclosures were consistent for tem-

TABLE 11

Biofouling of Various Substrates after 240 Days of Seawater Immersion.

| Fabric | Treatment | Macro-fouling | Encrusting Bryozoan | Arborescent Bryozoan | Barnacle | Tube Worm | Tunicate | Biofilm |
|---|---|---|---|---|---|---|---|---|
| Spun | Un | 0 | 0 | 0 | 0 | 0 | 0 | 63.33 |
| Poly | SB | 0 | 0 | 0 | 0 | 0 | 0 | 62.5 |
|  | WB | 0 | 0 | 0 | 0 | 0 | 0 | 67.5 |
| Burlap | WB | 0.83 | 0 | 0 | 0 | 0.83 | 0 | 69.17 |
| Control | 1 mo | 82.5 | 2.5 | 73.75 | 0 | 2.5 | 3.75 | 17.5 * |
|  | 2 mo | 100 | 0 | 37.5 | 0 | 52.5 | 10 | 0 * |
|  | 3 mo | 100 | 0 | 37.5 | 3.75 | 42.5 | 16.25 | 0 * | perature, salinity and pH for these water conditions, although one or more of these characteristics might be different in different embodiments and/or different weather conditions. In addition, the dissolved oxygen levels differed significantly among all enclosure treatments, with open readings being the highest levels and solvent-based coated Poly fabric being the lowest level.

Experiment 3—Salt Water Immersion Protecting Bronze Substrates for 16 Months

In another experiment, enclosures of two polyester fabrics (spun and textured) were coated with a water-based biocide coating using the disclosed processes herein, and were placed over bronze bar substrates. Three replicates of each treatment were randomized and placed onto two frames. The samples were removed from the water monthly, photographs were taken and visual assessments were performed and compared to unprotected bronze bar substrates. An additional set of replicates was placed on two frames in the same order for water quality measurements.

Figure 24A:
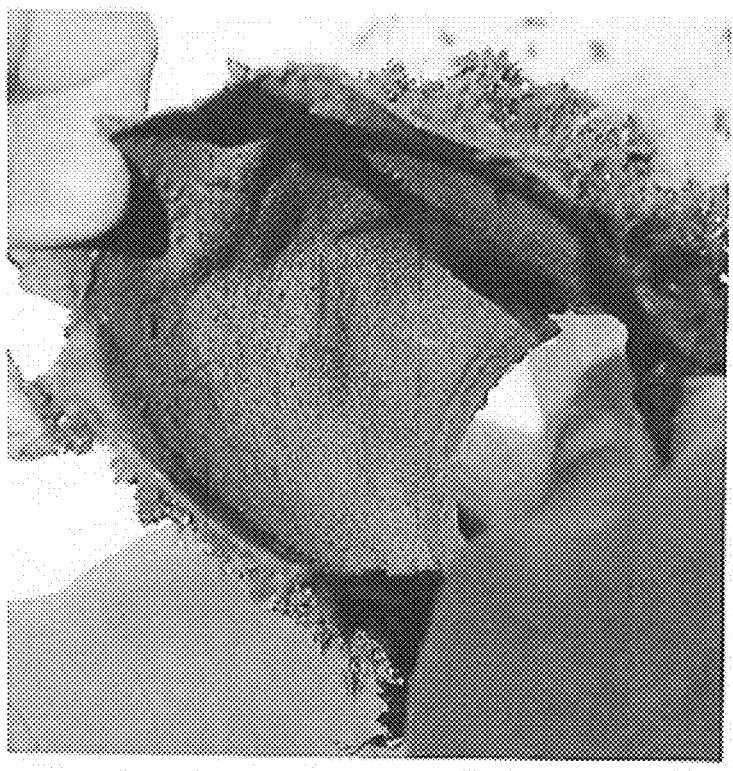
FIGS. 24A and 24B depict inner surfaces of exemplary enclosures constructed of spun polyester and textured polyester, respectively.
Figure 24B:

After 16 months of immersion in salt water, the experiment revealed that no macrofouling occurred on the bronze samples enclosed in the spun polyester enclosure, and the bronze bars enclosed in 50 textured polyester and 40 texture polyester enclosures had light macrofouling consisting of hydroids and tube worms (See Table 12). (Note: the biofilm level for control samples was not easily visible due to thick macrofouling cover obscuring the film.)

spun and textured polyester enclosures. Textured polyester treatment had light to moderate fouling on the inert end caps, with 40 textured polyester beginning to accumulate some macrofouling on the bronze bar substrate after 16 months immersed in salt waters. There was no degradation apparent on any of the enclosures, although some of the enclosures accumulated heavy fouling consisting primarily of encrusting and arborescent bryozoans, barnacles, tube worms (spirorbid—the circular ones, and serpulid—the long, straight ones) and tunicates on the outer material surface (surface exposed to open water) after 16 months immersion in salt water. The arborescent bryozoans appeared to have begun to die back (become senescent) and self-clean from the enclosures as their season ended. Furthermore, fouling growth on the inside of the enclosure was very limited, as FIGS. 24A and 24B show little to no fouling on the inner surface material of the spun and textured polyester enclosures after 16 months in salt water, although the textured polyester enclosure of FIG. 24B contains significantly more attached macrofouling organisms on the inner material surface of the enclosure compared to none or limited amounts of fouling on the inner material surface of the spun polyester enclosure (FIG. 24A).

This experiment led to a conclusion that spun and textured polyesters could be highly effective fabrics for protective enclosures, which can effectively protect the substrates from macrofouling. These embodiments may be effective for

TABLE 12

Biofouling of Various Substrates after 16 months of Seawater Immersion.

| Treatment | Macrofouling | Algae | Hydroid | Encrusting Bryozoan | Arborescent Byrozoan | Barnacle | Tube Worm | Mollusc | Tunicate | Biofilm |
|---|---|---|---|---|---|---|---|---|---|---|
| 40TXT | 4.83 | 0 | 0.33 | 0 | 0 | 0 | 4.5 | 0 | 0 | 46.67 |
| 50TXT | 3.17 | 0 | 0.67 | 0 | 0 | 0 | 2.5 | 0 | 0 | 56.67 |
| SPUN | 0.33 | 0 | 0 | 0 | 0 | 0 | .033 | 0 | 0 | 43.33 |
| Control 1 | 58.75 | 0 | 2.5 | 30 | 17.5 | 0 | 8.75 | 0 | 0 | — |
| Control 2 | 91.25 | 0.25 | 6.5 | 52.5 | 10.25 | 0 | 18.75 | 2.75 | 0.25 | — |
| Control 3 | 98.75 | 1.25 | 2.5 | 35 | 1.25 | 2.5 | 51.25 | 1.25 | 3.75 | — |

In this experiment, the fouling on unprotected bronze bar substrates was heavy and consisted of encrusting and arborescent bryozoans, barnacles, tube worms and oysters after 3 months of immersion in salt water. After 16 months immersed in salt water, the bronze bar substrate in the spun polyester enclosure had a detectable biofilm, but no macrofouling, while the bronze bar substrate in the textured polyester enclosures had some arborescent bryozoans and tube worms. There was a low cover of arborescent bryozoans and moderate cover of tube worms on the end caps of the significantly extended period of time, such as up to 1 year and/or greater than 500 days of protection or more for the underlying substrate.

Figure 25:
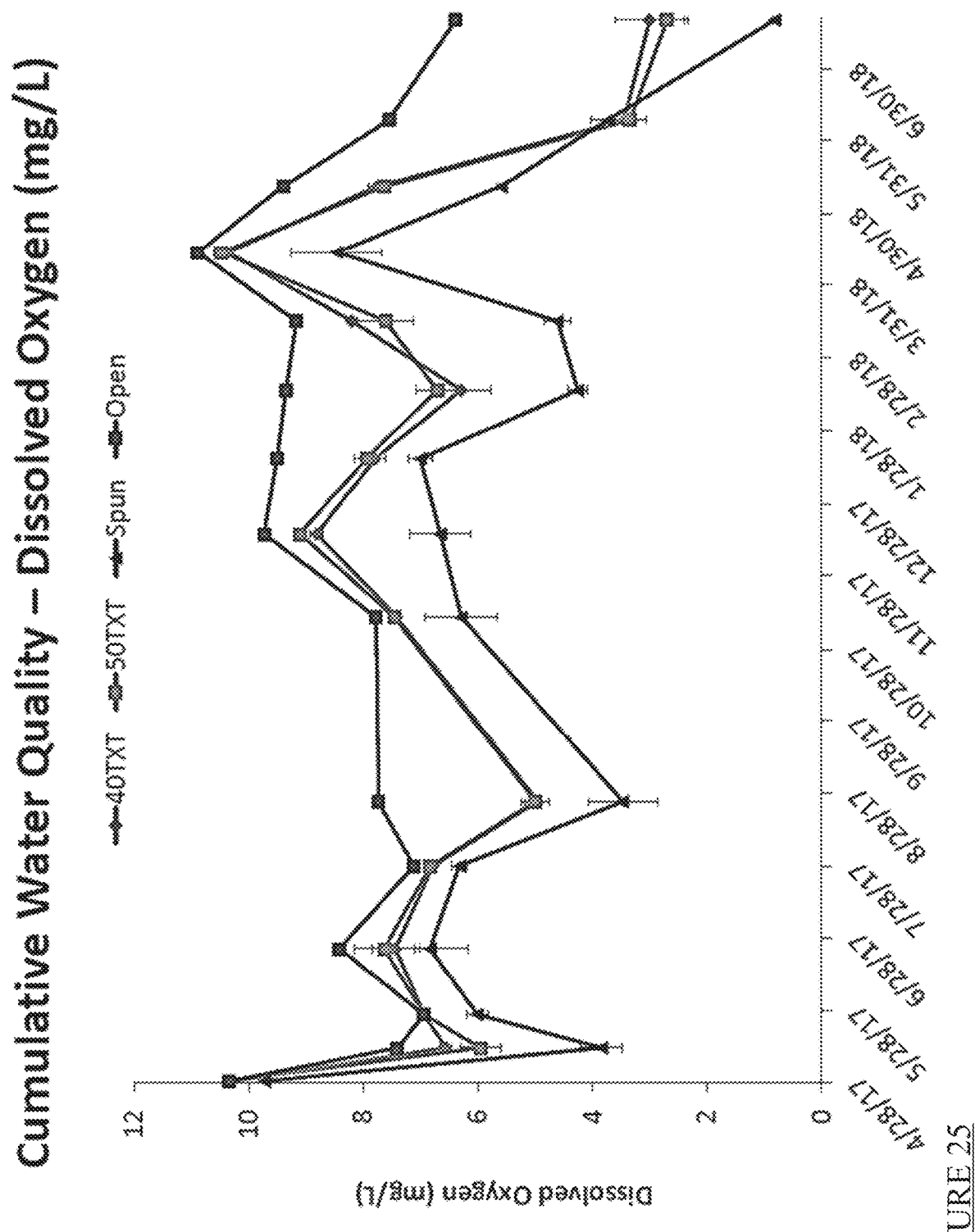
FIG. 25 graphically depicts DO levels within various exemplary enclosures as compared to DO readings of the surrounding aqueous environment.

Similar to previous experimental results, water quality measurements of open waters and water within a polyester enclosure do not show a significant difference for temperature, salinity and pH after 16 months immersed in salt water. Dissolved oxygen differed significantly among all polyester enclosures, with open readings being highest levels and water-based coated spun polyester was the lowest level (see FIG. 25 and Table 13).

TABLE 13

Chemistry within enclosures after 16 mos. immersion compared to Open Water

| Treatment | Temp (C.) | stderr | Salinity (psu) | stderr | DO (mg/L) | stderr | DO (%) | stderr | pH | stderr |
|---|---|---|---|---|---|---|---|---|---|---|
| 40TXT | 26.37 | 0.03 | 32 | 0.06 | 3.44 | 0.01 | 42.67 | 0.09 | 8.22 | 0.003 |
| 50TXT | 26.37 | 0.03 | 32 | 0 | 3.34 | 0.29 | 41.40 | 3.65 | 8.23 | 0.003 |
| SPUN | 26.43 | 0.03 | 31.63 | 0.22 | 3.73 | 0.31 | 46.23 | 3.83 | 8.27 | 0.01 |
| Open | 26.43 | 0.09 | 31.50 | 0.45 | 7.55 | 0.02 | 93.70 | 0.3 | 8.24 | 0.012 |

Experiment 4: Fresh Water Immersion Protecting PVC Substrates

Figure 26A:
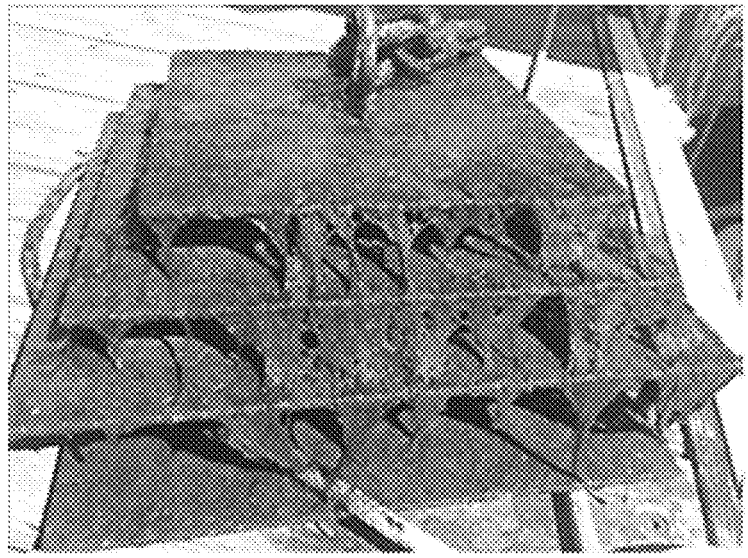
FIGS. 26A and 26B depict an unprotected substrate with a substrate protected by an enclosure embodiment after 3 months immersion in fresh waters.
Figure 26B:
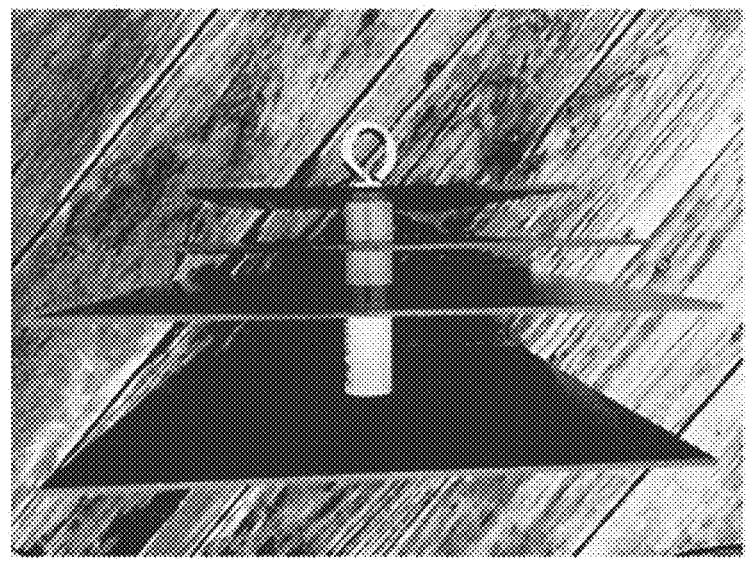

In another exemplary embodiment, with results depicted in FIGS. 26A and 26B, various enclosure embodiments were tested to determine whether the presence of the enclosure inhibits and/or prevents macrofouling in a fresh water environment (which was conducted at Milwaukee, Wisconsin Mckinley Marina at slip B31). In these experiments, a 4-tier artificial PVC substrate arrangement was used, with an enclosure incorporating biocide coated fabric walls, with the substrate suspended inside of the enclosure.

Tables 14 through 17B depict various test results for water chemistry measurements during a 3 months immersion in fresh water, showing initial water chemistry values on 5/18 (Table 14), and subsequent variations in various water quality measurements in the open aqueous environment and within the enclosures for 6/21 (Tables 15A and 15B), 7/19 (Tables 16A and 16B) and 8/28 (Tables 17A and 17B). The water chemistry results demonstrate a temperature and salinity that were similar between the open fresh water and waters within the enclosures during spot sampling for 3 months. On the other hand, dissolved oxygen was lower in the enclosure, pH was lower in the enclosure and turbidity was higher in the enclosure when comparisons were made between the differentiated environment within the enclosure and the open fresh water away from the enclosure. In addition, chlorophyll in the differentiated environment was higher for months 1 and 2, and became lower after 3 months of immersion.

TABLE 14

Fresh Water Experiment

May 18, 2018
Treatment and Control

| Placement | Ambient |
|---|---|
| Sonde Time | (17:23:13) |
| Depth m | 1.49 |
| Temperature C. ° | 11.192 |
| Conductivity µS/cm | 335.6 |
| Specific Conductivity µS/cm | 455.8 |
| Salinity psu | 0.22 |
| ODO % sat | 85.2 |
| pH | 7.92 |
| Turbidity FNU | 1.23 |
| Chlorophyll RFU | 0.70 |
| Chrolophyll µg/L | 3.18 |
| BGA-PC RFU | 0.16 |
| BGA-PC µg/L | na |

TABLE 15A

Fresh Water Enclosures After 1 Month Immersion

| | | | Treatments | | |
|---|---|---|---|---|---|
| Jun. 21, 2018 | Ambient 1 | Ambient 2 | East | Middle | West |
| Sonde Time | (08:17:45) | (08:20:13) | (09:24:41) | (09:48:59) | (10:05:27) |
| Depth m | 1.535 | 1.202 | 0.149 | 0.172 | 0.112 |
| Temperature C. ° | 15.657 | 15.874 | 15.926 | 15.949 | 15.872 |
| Conductivity µS/cm | 326.5 | 336.8 | 349.2 | 342.8 | 338.3 |
| Specific Conductivity µS/cm | 397.4 | 407.9 | 422.4 | 414.5 | 409.8 |
| Salinity psu | 0.19 | 0.195 | 0.20 | 0.20 | 0.20 |
| ODO % sat | 105.55 | 104.7 | 40.9 | 660 | 70.02 |
| ODO mg/L | 10.475 | 10.345 | 4.03 | 6.51 | 6.94 |
| pH | 8.41 | 8.405 | 7.7 | 7.93 | 7.99 |
| Turbidity FNU | 0.965 | 1.00 | 36.22 | 19.35 | 76.51 |
| Chlorophyll RFU | 2.135 | 1.675 | 2.87 | 2.47 | 4.54 |
| Chrolophyll µg/L | 9.85 | 7.71 | 13.24 | 11.38 | 20.99 |
| BGA-PC RFU | 0.34 | 0.28 | 0.65 | 0.66 | 1.64 |
| BGA-PC µg/L | 0.125 | 0.065 | 0.48 | 0.49 | 1.61 |

TABLE 15B

Organisms After 1 Month Immersion

| | Treatments | | | Controls | | |
|---|---|---|---|---|---|---|
| | Jun. 21, 2018 East | Jun. 21, 2018 Middle | Jun. 21, 2018 West | Jun. 21, 2018 East | Jun. 21, 2018 Middle | Jun. 21, 2018 West |
| Dreissenid mussels | | | | | | |
| Prodissoconch 1 (No/dm$^2$) | 132 | 128 | 240 | 14 | 19 | 23 |
| Prodissoconch 2 (No/dm$^2$) | 0 | 0 | 0 | 0 | 0 | 0 |
| Pediveliger (No/dm$^2$) | 0 | 0 | 0 | 0 | 0 | 0 |
| Juvenile (No/dm$^2$) | 0 | 0 | 0 | 2 | 1 | 0 |
| Adults (No/dm$^2$) | 0 | 0 | 0 | 3 | 2 | 12 |
| Translocators (No/dm$^2$) | 0 | 0 | 0 | 5 | 3 | 12 |
| Ectoprocta (No/dm$^2$) | 0 | 0 | 0 | 50 | 22 | 36 |
| Chironomidae | 0 | 0 | 0 | 5 | 4 | 6 |
| Chironominae (No/dm$^2$) | 0 | 0 | 0 | 5 | 4 | 6 |
| Tanypodinae (No/dm$^2$) | 0 | 0 | 0 | 0 | 0 | 0 |
| Nematoda | 0 | 0 | 0 | 3 | 4 | 1 |
| Cladophora | NP | NP | NP | EG | EG | EG |
| Diatoms | NP | NP | NP | EG | EG | EG |

TABLE 16A

Fresh Water Enclosures After 2 Months Immersion

| Jul. 19, 2018 | Ambient 1 | Ambient 2 | Treatments East | Middle | West |
|---|---|---|---|---|---|
| Sonde Time | (09:00:48) | (09:14:13) | (09:28:40) | (09:39:49) | (09:57:09) |
| Depth m | 1.376 | 1.541 | 0.298 | 0.223 | 0.273 |
| Temperature C. ° | 19.489 | 19.237 | 19.47 | 19.326 | 19.293 |
| Conductivity µS/cm | 336.2 | 332.1 | 347.6 | 356.4 | 344.5 |
| Specific Conductivity µS/cm | 375.8 | 373.1 | 388.7 | 399.7 | 386.7 |
| Salinity psu | 0.18 | 0.185 | 0.19 | 0.19 | 0.19 |
| ODO % sat | 111.6 | 115.7 | 88.5 | 71.4 | 82.5 |
| ODO mg/L | 10.24 | 10.67 | 8.12 | 6.58 | 7.6 |
| pH | 8.21 | 8.48 | 8.05 | 7.87 | 7.95 |
| Turbidity FNU | 0.17 | 0.33 | 7.59 | 25.9 | 24.99 |
| Chlorophyll RFU | 0.96 | 0.85 | 1.04 | 1.01 | 2.49 |
| Chrolophyll µg/L | 4.38 | 3.87 | 4.77 | 4.62 | 11.48 |
| BGA-PC RFU | 0.15 | 0.12 | 0.26 | 0.32 | 0.73 |
| BGA-PC µg/L | −0.08 | −0.12 | 0.04 | 0.11 | 0.57 |

TABLE 16B

Organisms After 2 Months Immersion

| | Treatments | | | Controls | | |
|---|---|---|---|---|---|---|
| | Jul. 19, 2018 East | Jul. 19, 2018 Middle | Jul. 19, 2018 West | Jul. 19, 2018 East | Jul. 19, 2018 Middle | Jul. 19, 2018 West |
| Dreissenid mussels | | | | | | |
| Prodissoconch 1 (No/dm$^2$) | 38 | 37 | 55 | 9 | 7 | 6 |
| Prodissoconch 2 (No/dm$^2$) | 21 | 13 | 24 | 22 | 12 | 31 |
| Pediveliger (No/dm$^2$) | 3 | 1 | 1 | 2 | 4 | 2 |
| Juvenile (No/dm$^2$) | 2 | 3 | 3 | 5 | 3 | 6 |
| Adults (No/dm$^2$) | 0 | 0 | 0 | 2 | 2 | 1 |
| Translocators (No/dm$^2$) | 0 | 0 | 0 | 2 | 2 | 3 |
| Ectoprocta (No/dm$^2$) | 0 | 0 | 0 | >500 | >500 | >500 |
| Chironomidae | | | | | | |
| Chironominae (No/dm$^2$) | 0 | 0 | 0 | 11 | 14 | 9 |
| Tanypodinae (No/dm$^2$) | 0 | 0 | 0 | 1 | 2 | 1 |
| Nematoda | 0 | 0 | 0 | 4 | 2 | 3 |
| Cladophora | NP | NP | NP | EGC/CC | EGC/CC | EGC/CC |
| Diatoms | EG | EG | EG | CC | CC | CC |
| Porifera | 0 | 0 | 0 | 1 | 2 | 1 |

TABLE 17A

Fresh Water Enclosures After 3 Months Immersion

| Aug. 28, 2018 | Ambient 1 | Ambient 2 | Treatments East | Middle | West |
|---|---|---|---|---|---|
| Sonde Time | (09:45:11) | (09:47:28) | (10:18:16) | (10:34:14) | (10:57:50) |
| Depth m | 1.014 | 0.805 | 0.271 | 0.092 | 0.114 |
| Temperature C. ° | 22.744 | 22.744 | 22.755 | 22.753 | 22.766 |
| Conductivity µS/cm | 320.0 | 320.3 | 322.0 | 322.7 | 323.6 |
| Specific Conductivity µS/cm | 334.4 | 334.7 | 336.4 | 337.2 | 338.0 |
| Salinity psu | 0.16 | 0.160 | 0.16 | 0.16 | 0.16 |
| ODO % sat | 89.5 | 90.8 | 61.0 | 58.9 | 49.8 |
| ODO mg/L | 7.71 | 7.82 | 5.25 | 5.07 | 4.29 |
| pH | 8.01 | 8.03 | 7.74 | 7.71 | 6.92 |
| Turbidity FNU | 1.40 | 1.86 | 4.76 | 3.65 | 4.70 |
| Chlorophyll RFU | 3.24 | 4.19 | 1.37 | 0.98 | 0.66 |
| Chrolophyll µg/L | 14.83 | 19.14 | 6.25 | 4.47 | 2.99 |
| BGA-PC RFU | 0.82 | 0.84 | 0.37 | 0.22 | 0.18 |
| BGA-PC µg/L | 0.92 | 0.94 | 0.41 | 0.28 | 0.19 |

TABLE 17B

| | Organisms After 3 Months Immersion | | | | | |
|---|---|---|---|---|---|---|
| | Treatments | | | Controls | | |
| | Aug. 28, 2018 East | Aug. 28, 2018 Middle | Aug. 28, 2018 West | Aug. 28, 2018 East | Aug. 28, 2018 Middle | Aug. 28, 2018 West |
| Dreissenid mussels | | | | | | |
| Prodissoconch 1 (No/dm$^2$) | 1 | 2 | 2 | 3 | 2 | 4 |
| Prodissoconch 2 (No/dm$^2$) | 3 | 11 | 3 | 6 | 4 | 10 |
| Pediveliger (No/dm$^2$) | 6 | 4 | 4 | 10 | 6 | 7 |
| Juvenile (No/dm$^2$) | 0 | 1 | 0 | 57 | 72 | 87 |
| Adults (No/dm$^2$) | 0 | 0 | 0 | 2 | 2 | 1 |
| Translocators (No/dm$^2$) | 0 | 0 | 0 | 2 | 2 | 3 |
| Ectoprocta (No/dm$^2$) | 0 | 0 | 0 | 131 | 120 | 287 |
| Chironomidae | | | | | | |
| Chironominae (No/dm$^2$) | 0 | 0 | 0 | 8 | 15 | 11 |
| Tanypodinae (No/dm$^2$) | 0 | 0 | 0 | 2 | 2 | 1 |
| Nematoda | 0 | 0 | 0 | 4 | 2 | 3 |
| Cladophora | NP | NP | NP | DG | DG | DG |
| Diatoms | EG | EG | EG | DG | DG | DG |
| Porifera (No. colonies) | 0 | 0 | 0 | 0 | 1 | 0 |

Tables 15B, 16B and 17B depict the various concentrations of organisms identified within and outside of the enclosure during the fresh water immersion study, including three basic groups of freshwater biofouling organisms common in most U.S. freshwaters, invasive dreissenids zebra mussels (*Dreissena polymorpha*) and quagga mussel (*Dreissena rostriformis*), Ectoprocta *Fredericella sultana*, and Cladophoraceae alga *Cladophora* glomerate, and additional substrate colonizing macro-organisms, e.g., *Porifera* sponges, chironomids, gastropods, etc. included. The first month of immersion in fresh water, there was a higher concentration of unsettled mussels on the substrates within the enclosure compared to unprotected substrates. However, after 2 and 3 months immersed in fresh waters, the concentration of mussels on the substrates protected by the enclosures was significantly less than the number of mussels on the unprotected substrates. This difference in fouling is readily apparent from FIGS. 26A and 26B, which visually depict a comparison in fouling of an unprotected substrate (FIG. 26A) with a substrate protected by the disclosed enclosure (FIG. 26B) after 3 months immersion in fresh waters.

Experiment 5: Pontoon Hull "Boat Wrap"

In another exemplary embodiment, an enclosure comprising a "pontoon wrap" was immersed for over 12 months to test the efficacy of a Boat Wrap on a hull coated with a bottom paint coating, secondly to evaluate its' impact on different coating types, and thirdly to identify and provide insight into any variables/issues that may be encountered as the technology is scaled to larger size configurations. A 21-foot fiberglass catamaran was treated with various biocidal coating and/or other substances coatings on the underwater hull of both the port and starboard pontoons. The port-side pontoon of the catamaran was substantially enclosed within an enclosure having biocide coated flexible fabric walls.

After 12 months in salt water, the enclosure successfully prevented macrofouling on all coatings, including the inert surface. The macrofouling on active coatings on the unprotected pontoon were light to moderate, however, all coatings had a much higher cover of a heavy, fluffy biofilm on the unprotected pontoon as compared to the pontoon in the enclosure. The biofilm on surfaces within the enclosure was thin and light. Macrofouling on the inert coating on the unprotected pontoon was heavy after 2 months of immersion in salt water.

In addition, as shown in Table 18, despite the significant increase in size of the enclosure (to accommodate the complete pontoon), dissolved oxygen and pH were significantly lower inside the enclosure. Salinity was also significantly lower inside the enclosure. Some of these factors may have been due to buffering and/or delay in water quality modification (i.e., to match the outside water conditions) within the enclosure as the tide changed, a ship lock was opened, a rain storm occurred, a cruise ship moved nearby and/or some other combination of factors.

TABLE 18

| | Organisms After 12 Months Immersion-Pontoon Test | | | | |
|---|---|---|---|---|---|
| Treatment | Temp (C.) | Salinity (psu) | DO (mg/L) | DO (%) | pH |
| Bag | 29.13 | 31.6 | 6.48 | 84.4 | 8.09 |
| Open | 29.3 | 34.57 | 7.82 | 102.27 | 8.15 |

Experiment 6—Turbidity and Sediment Experiment

In this experiment, an enclosure embodiment was tested to determine whether the presence of the enclosure affects the turbidity and/or amount of suspended sediment within the enclosure as compared to that of the outside environment, with the test results demonstrating that water within the enclosure was notably clearer than the water in the open environment.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

All references, including publications, patent applications, and patents, cited herein are hereby incorporated by reference to the same extent as if each reference were individually and specifically indicated to be incorporated by reference and were set forth in its entirety herein.

The various headings and titles used herein are for the convenience of the reader and should not be construed to limit or constrain any of the features or disclosures thereunder to a specific embodiment or embodiments. It should be understood that various exemplary embodiments could incorporate numerous combinations of the various advantages and/or features described, all manner of combinations of which are contemplated and expressly incorporated hereunder.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., i.e., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device for reducing biofouling on a surface at least partially submerged in an aqueous environment, the device comprising:
    a structure which is or becomes fluid permeable, said structure defining an open top adapted to receive said surface therethrough, wherein the open top defines one or more walls that remain spaced apart from the surface in a not fully sealed arrangement, wherein the structure comprises at least one of mesh, lattice, fenestration, or holes that enable fluid flow therethrough, wherein the structure is flexible and defines a first side and a second side,
    wherein, when the structure at least partially surrounds the surface in the aqueous environment such that the first side of the structure faces the surface, the structure allows fluid exchange therethrough to the surface while preventing or limiting biofouling on the surface such that a first chemistry of the aqueous environment between the surface and the first side of the structure is different than a second chemistry of the aqueous environment outside the second side of the structure, wherein the first chemistry is measured in the aqueous environment proximate the surface, wherein the second chemistry is measured in the aqueous environment at a spaced apart distance from the second side of the structure facing away from the surface.

2. The device of claim 1 further comprising at least one floating boom attached to the structure, wherein the at least one floating boom is configured to float on a top surface of the aqueous environment, wherein the structure is attached to the at least one floating boom so as to hang therefrom into the aqueous environment.

3. The device of claim 1, wherein the structure includes biocide.

4. The device of claim 1, wherein the structure comprises a fabric layer.

5. The device of claim 1, wherein the fabric layer is formed of a three-dimensional fabric or fibrous matrix fashioned from interwoven or intertwined strands of thread formed into a lattice, mesh, or fenestrated arrangement.

6. The device of claim 1, wherein the structure comprises at least one of a membrane, a film, or a sheet.

7. The device of claim 1, wherein, when the structure at least partially surrounds the surface in the aqueous environment, the structure provides an average water exchange of about 0.1% to 500% of a volume of water therethrough each hour.

8. The device of claim 1, wherein, when the structure at least partially surrounds the surface in the aqueous environment, the structure has a permeability within a range of about 0.06-100 milliliters of water per second per square centimeter.

9. The device of claim 1, wherein the first water chemistry is different than the second water chemistry by having at least one difference of a water chemistry characteristic, wherein the water chemistry characteristic is one of dissolved oxygen, pH, total dissolved nitrogen, ammonium, nitrates, orthophosphates, total dissolved phosphates, silica, alkalinity, salinity, or chlorophyll.

10. The device of claim 9, wherein the at least one difference of the water chemistry characteristic is at least a 10% difference as measured after the structure is at least partially submerged in the aqueous environment for at least 2 days.

11. The device of claim 1, wherein the spaced apart distance from the second side of the structure is 12 inches.

12. The device of claim 1, wherein the first chemistry is measured in the aqueous environment proximate the surface at a position that is spaced apart from the first side of the structure and spaced apart from the surface.

13. A material for reducing biofouling on a surface at least partially submerged in an aqueous environment, the material comprising:
    a structure which is or becomes fluid permeable, said structure defining an open top adapted to receive said surface therethrough, wherein the open top defines one or more walls that remain spaced apart from the surface in a not fully sealed arrangement, wherein the structure comprises at least one of mesh, lattice, fenestration, or holes that enable fluid flow therethrough, wherein the structure is flexible and defines a first side and a second side,
    wherein, when the structure at least partially surrounds the surface in the aqueous environment such that the first side of the structure faces the surface, the structure allows fluid exchange therethrough to the surface while preventing or limiting biofouling on the surface such that a first chemistry of the aqueous environment between the surface and the first side of the structure is different than a second chemistry of the aqueous environment outside the second side of the structure, wherein the first chemistry is measured in the aqueous environment proximate the surface, wherein the second chemistry is measured in the aqueous environment at a spaced apart distance from the second side of the structure facing away from the surface.

14. The material of claim 13, wherein the structure comprises a fabric layer.

15. The material of claim 14, wherein the fabric layer is formed of a three-dimensional fabric or fibrous matrix fashioned from interwoven or intertwined strands of thread formed into a lattice, mesh, or fenestrated arrangement.

16. The material of claim 13, wherein the structure comprises at least one of a membrane, a film, or a sheet.

17. The material of claim 13, wherein the structure includes biocide.

18. The material of claim 13, wherein, when the structure at least partially surrounds the surface in the aqueous environment, the structure provides an average water exchange of about 0.1% to 200% of a volume of water therethrough each hour.

19. The material of claim 13, wherein, when the structure at least partially surrounds the surface in the aqueous environment, the structure provides an average water exchange of about 0.1% to 500% of a volume of water therethrough each hour.

20. The material of claim 13, wherein, when the structure at least partially surrounds the surface in the aqueous environment, the structure has a permeability within a range of about 0.06-46.71 milliliters of water per second per square centimeter.

21. The material of claim 13, wherein, when the structure at least partially surrounds the surface in the aqueous environment, the structure has a permeability within a range of about 0.90-14.72 milliliters of water per second per square centimeter.

22. The material of claim 13, wherein, when the structure at least partially surrounds the surface in the aqueous environment, the structure has a permeability of about 100 milliliters of water per second per square centimeter or less.

23. The material of claim 13, wherein the first water chemistry is different than the second water chemistry by having at least one difference of a water chemistry characteristic, wherein the water chemistry characteristic is one of dissolved oxygen, pH, total dissolved nitrogen, ammonium, nitrates, orthophosphates, total dissolved phosphates, silica, alkalinity, salinity, or chlorophyll.

24. The material of claim 23, wherein the at least one difference of the water chemistry characteristic is at least a 10% difference as measured after the structure is at least partially submerged in the aqueous environment for at least 2 days.

25. The material of claim 13, wherein the spaced apart distance from the second side of the structure is 12 inches.

26. The material of claim 13, wherein the first chemistry is measured in the aqueous environment proximate the surface at a position that is spaced apart from the first side of the structure and spaced apart from the surface.

27. A roll or sheet of material that is deployable for reducing biofouling on a surface at least partially submerged in an aqueous environment, the material comprising:

a structure which is or becomes fluid permeable, said structure defining an open top adapted to receive said surface therethrough, wherein the open top defines one or more walls that remain spaced apart from the surface in a not fully sealed arrangement, wherein the structure comprises at least one of mesh, lattice, fenestration, or holes that enable fluid flow therethrough, wherein the structure is flexible and defines a first side and a second side, wherein, when the structure at least partially surrounds the surface in the aqueous environment such that the first side of the structure faces the surface, the structure allows fluid exchange therethrough to the surface while preventing or limiting biofouling on the surface such that a first chemistry of the aqueous environment between the surface and the first side of the structure is different than a second chemistry of the aqueous environment outside the second side of the structure, wherein the first chemistry is measured in the aqueous environment proximate the surface, wherein the second chemistry is measured in the aqueous environment at a spaced apart distance from the second side of the structure facing away from the surface.

28. The roll or sheet of material of claim 27, wherein the structure includes biocide.

29. The roll or sheet of material of claim 27, wherein the structure comprises a fabric layer.

30. The roll or sheet of material of claim 27, wherein the fabric layer is formed of a three-dimensional fabric or fibrous matrix fashioned from interwoven or intertwined strands of thread formed into a lattice, mesh, or fenestrated arrangement.

31. The roll or sheet of material of claim 27, wherein the structure comprises at least one of a membrane or a film.

32. The roll or sheet of material of claim 27, wherein, when the structure at least partially surrounds the surface in the aqueous environment, the structure provides an average water exchange of about 0.1% to 500% of a volume of water therethrough each hour.

33. The roll or sheet of material of claim 27, wherein, when the structure at least partially surrounds the surface in the aqueous environment, the structure has a permeability within a range of about 0.06-46.71 milliliters of water per second per square centimeter.

34. The roll or sheet of material of claim 27, wherein the first water chemistry is different than the second water chemistry by having at least one difference of a water chemistry characteristic, wherein the water chemistry characteristic is one of dissolved oxygen, pH, total dissolved nitrogen, ammonium, nitrates, orthophosphates, total dissolved phosphates, silica, alkalinity, salinity, or chlorophyll.

35. The roll or sheet of material of claim 34, wherein the at least one difference of the water chemistry characteristic is at least a 10% difference as measured after the structure is at least partially submerged in the aqueous environment for at least 2 days.

36. The roll or sheet of material of claim 27, wherein the second chemistry is measured in the aqueous environment at 12 inches away from the second side of the structure.

37. The roll or sheet of material of claim 27, wherein the first chemistry is measured in the aqueous environment proximate the surface at a position that is spaced apart from the first side of the structure and spaced apart from the surface.

38. A device for reducing biofouling on a substrate at least partially submerged in an aqueous environment, the device comprising:

a structure which is or becomes fluid permeable, said structure defining an open top adapted to receive said substrate therethrough, wherein the open top defines one or more walls that remain spaced apart from a surface of the substrate in a not fully sealed arrangement, wherein the structure comprises at least one of mesh, lattice, fenestration, or holes that enable fluid flow therethrough, wherein, when the structure at least partially surrounds the substrate in the aqueous environment in a not fully sealed arrangement, the structure separates the aqueous environment into a local aqueous environment and an open aqueous environment relative to the substrate and provides for fluid flow therethrough while reducing biofouling within the local aqueous environment relative to the open aqueous environment.

39. The device of claim 38, wherein, when the structure at least partially surrounds the substrate in the aqueous environment, the structure provides an average water exchange of about 0.1% to 500% of a volume of water therethrough each hour.

40. The device of claim 38, wherein, when the structure at least partially surrounds the substrate in the aqueous environment, the structure has a permeability of about 100 milliliters of water per second per square centimeter or less.

41. The device of claim 38, wherein, when the structure at least partially surrounds the substrate in the aqueous environment, the structure allows fluid exchange therethrough to the substrate while preventing or limiting biofouling on the surface such that a first chemistry of the local aqueous environment is different than a second chemistry of the open aqueous environment.

\* \* \* \* \*